US011999110B2

(12) United States Patent
Buller et al.

(10) Patent No.: US 11,999,110 B2
(45) Date of Patent: Jun. 4, 2024

(54) QUALITY ASSURANCE IN FORMATION OF THREE-DIMENSIONAL OBJECTS

(71) Applicant: Velo3D, Inc., Fremont, CA (US)

(72) Inventors: Benyamin Buller, Cupertino, CA (US); Gregory Ferguson Brown, San Jose, CA (US); Jatinder Randhawa, Milpitas, CA (US); Gustavo A. Tapia Imbaquingo, San Francisco, CA (US); Josiah Franklin Willard, Santa Clara, CA (US); Aqi He, Livermore, CA (US); Alexander Varlakhanov, San Carlos, CA (US); Aram Yegiazaryan, Lafayette, CA (US); Alexander Talalai, Sunnyvale, CA (US); Zachary Ryan Murphree, San Jose, CA (US); Pieter Coulier, Arlington, MA (US); Erel Milshtein, Cupertino, CA (US); Sergey Korepanov, Los Altos, CA (US)

( * ) Notice: Subject to any disclaimer, the term of this patent is extended or adjusted under 35 U.S.C. 154(b) by 0 days.

(21) Appl. No.: 17/584,881

(22) Filed: Jan. 26, 2022

(65) Prior Publication Data

US 2022/0250328 A1     Aug. 11, 2022

Related U.S. Application Data

(63) Continuation of application No. PCT/US2020/042596, filed on Jul. 17, 2020.
(Continued)

(51) Int. Cl.
*B29C 64/393* (2017.01)
*B29C 64/165* (2017.01)
*B33Y 50/02* (2015.01)

(52) U.S. Cl.
CPC .......... *B29C 64/393* (2017.08); *B29C 64/165* (2017.08); *B33Y 50/02* (2014.12)

(58) Field of Classification Search
CPC ... B29C 64/393; B29C 64/165; B29C 64/153; B33Y 50/02; B33Y 30/00; B33Y 10/00;
(Continued)

(56) References Cited

U.S. PATENT DOCUMENTS 430,047 A    6/1890   Tylee
1,003,518 A  9/1911   Moritz
(Continued)

FOREIGN PATENT DOCUMENTS

CN    1057034 C    10/2000
CN    1057034 C    10/2000
(Continued)

OTHER PUBLICATIONS

US 10,507,527 B2, 12/2019, Romano (withdrawn)
(Continued)

*Primary Examiner* — Vincent H Tran
*Assistant Examiner* — Michael Tang
(74) *Attorney, Agent, or Firm* — Ronit Buller; MacMillan, Sobanski & Todd, LLC

(57) ABSTRACT

Provided herein are methods, apparatuses, and non-transitory computer readable media concerning quality assurance of three-dimensional object(s) and their formation. In some embodiments, a plurality of variables is considered in assessing performance of a manufacturing mechanism (e.g., printer) utilized in forming the three-dimensional object(s). In some embodiments, a plurality of variables is considered in assessing a process for forming the three-dimensional object(s). In some embodiments, a plurality of variables is considered in assessing a quality of the formed three-dimensional object(s).

60 Claims, 19 Drawing Sheets

Related U.S. Application Data

(60) Provisional application No. 62/879,048, filed on Jul. 26, 2019.

(58) Field of Classification Search
CPC .......... Y02P 10/25; B22F 10/31; B22F 10/38; B22F 12/90; G06Q 50/04
USPC ................................................ 700/118, 109
See application file for complete search history.

(56) References Cited

U.S. PATENT DOCUMENTS

| | | |
|---|---|---|
| 1,003,530 A | 9/1911 | Randolph |
| 1,011,223 A | 12/1911 | Charlton |
| 1,025,233 A | 5/1912 | Herbert |
| 1,025,904 A | 5/1912 | Earhart |
| 1,028,645 A | 6/1912 | Weaver |
| 1,028,660 A | 6/1912 | Barber |
| D229,000 S | 11/1973 | O'Neil et al. |
| 3,790,787 A | 2/1974 | Geller |
| 3,849,003 A | 11/1974 | Velzel |
| 3,864,809 A | 2/1975 | Donachie |
| 4,019,066 A | 4/1977 | Lucas |
| 4,177,087 A | 12/1979 | Hills |
| 4,300,474 A | 11/1981 | Livsey |
| 4,323,756 A | 4/1982 | Brown |
| 4,359,622 A | 11/1982 | Dostoomian |
| 4,701,592 A | 10/1987 | Cheung |
| D296,286 S | 6/1988 | Fees et al. |
| 4,823,158 A | 4/1989 | Casey |
| 4,845,356 A | 7/1989 | Baker |
| 4,863,538 A | 9/1989 | Deckard |
| 4,927,582 A | 5/1990 | Bryson |
| 4,938,816 A | 7/1990 | Beaman |
| 4,961,154 A | 10/1990 | Pomerantz |
| 4,962,988 A | 10/1990 | Swann |
| 5,088,047 A | 2/1992 | Bynum |
| 5,106,010 A | 4/1992 | Stueber et al. |
| 5,127,037 A | 6/1992 | Bynum |
| 5,155,321 A | 10/1992 | Grube |
| 5,156,697 A | 10/1992 | Bourell |
| 5,162,660 A | 11/1992 | Popil |
| 5,202,837 A | 4/1993 | Coe |
| 5,203,944 A | 4/1993 | Prinz |
| 5,204,055 A | 4/1993 | Sachs |
| 5,208,431 A | 5/1993 | Uchiyama |
| 5,223,781 A | 6/1993 | Criswell et al. |
| 5,252,264 A | 10/1993 | Forderhase |
| 5,255,057 A | 10/1993 | Stelter |
| 5,286,573 A | 2/1994 | Prinz |
| 5,296,062 A | 3/1994 | Bourell |
| 5,303,141 A | 4/1994 | Batchelder |
| 5,325,516 A | 6/1994 | Blomgren |
| 5,342,919 A | 8/1994 | Dickens, Jr. |
| 5,352,405 A | 10/1994 | Beaman |
| 5,354,414 A | 10/1994 | Feygin |
| 5,386,427 A | 1/1995 | Zayhowski |
| 5,387,380 A | 2/1995 | Cima |
| 5,393,482 A | 2/1995 | Benda |
| 5,396,333 A | 3/1995 | Aleshin |
| 5,424,834 A | 6/1995 | Akedo |
| 5,430,666 A | 7/1995 | Deangelis |
| 5,460,758 A | 10/1995 | Langer |
| 5,508,489 A | 4/1996 | Benda |
| 5,527,019 A | 6/1996 | Schwarz |
| 5,527,877 A | 6/1996 | Dickens, Jr. |
| 5,530,221 A | 6/1996 | Benda |
| 5,534,104 A | 7/1996 | Langer |
| 5,536,467 A | 7/1996 | Reichle |
| 5,554,837 A | 9/1996 | Goodwater et al. |
| 5,582,876 A | 12/1996 | Langer |
| 5,593,531 A | 1/1997 | Penn |
| 5,594,652 A | 1/1997 | Penn |
| 5,601,737 A | 2/1997 | Asahi |
| 5,615,013 A | 3/1997 | Rueb |
| 5,640,667 A | 6/1997 | Freitag |
| 5,647,931 A | 7/1997 | Retallick |
| 5,648,450 A | 7/1997 | Dickens, Jr. |
| 5,658,412 A | 8/1997 | Retallick |
| 5,665,401 A | 9/1997 | Serbin |
| 5,730,925 A | 3/1998 | Mattes |
| 5,733,497 A | 3/1998 | McAlea |
| 5,745,834 A | 4/1998 | Bampton |
| 5,749,041 A | 5/1998 | Lakshminarayan |
| 5,753,171 A | 5/1998 | Serbin |
| 5,753,274 A | 5/1998 | Wilkening |
| 5,764,874 A | 6/1998 | White |
| 5,786,562 A | 7/1998 | Larson |
| 5,800,579 A | 9/1998 | Billingsley |
| 5,818,718 A | 10/1998 | Thomas |
| 5,821,475 A | 10/1998 | Morehead |
| 5,824,259 A | 10/1998 | Allanic |
| 5,832,415 A | 11/1998 | Wilkening |
| 5,859,786 A | 1/1999 | Klein |
| 5,876,550 A | 3/1999 | Feygin |
| 5,876,767 A | 3/1999 | Mattes |
| 5,904,890 A | 5/1999 | Lohner |
| 5,908,569 A | 6/1999 | Wilkening |
| 5,932,059 A | 8/1999 | Langer |
| 5,951,864 A | 9/1999 | Hazrati |
| 6,024,792 A | 2/2000 | Kurz et al. |
| 6,042,774 A | 3/2000 | Wilkening |
| 6,066,285 A | 5/2000 | Kumar |
| 6,085,122 A | 7/2000 | Manning |
| 6,106,659 A | 8/2000 | Spence |
| 6,126,276 A | 10/2000 | Davis |
| 6,136,257 A | 10/2000 | Graf |
| 6,138,892 A | 10/2000 | Kim |
| 6,143,378 A | 11/2000 | Harwell |
| 6,151,345 A | 11/2000 | Gray |
| 6,169,605 B1 | 1/2001 | Penn |
| 6,175,422 B1 | 1/2001 | Penn |
| 6,206,672 B1 | 3/2001 | Grenda |
| 6,207,097 B1 | 3/2001 | Iverson |
| 6,215,093 B1 | 4/2001 | Meiners |
| 6,251,488 B1 | 6/2001 | Miller |
| 6,261,077 B1 | 7/2001 | Bishop |
| 6,268,584 B1 | 7/2001 | Keicher |
| 6,336,480 B2 | 1/2002 | Gaylo |
| 6,337,459 B1 | 1/2002 | Terwijn |
| 6,341,042 B1 | 1/2002 | Matsunaka |
| 6,376,148 B1 | 4/2002 | Liu |
| 6,391,251 B1 | 5/2002 | Keicher |
| 6,401,001 B1 | 6/2002 | Jang |
| 6,483,596 B1 | 11/2002 | Philippi |
| 6,492,651 B2 | 12/2002 | Kerekes |
| 6,531,036 B1 | 3/2003 | Leitgeb |
| 6,531,086 B1 | 3/2003 | Larsson |
| 6,554,600 B1 | 4/2003 | Hofmann |
| 6,583,379 B1 | 6/2003 | Meiners |
| 6,621,039 B2 | 9/2003 | Wang et al. |
| 6,636,676 B1 | 10/2003 | Renn |
| 6,656,409 B1 | 12/2003 | Keicher |
| 6,656,410 B2 | 12/2003 | Hull |
| 6,672,343 B1 | 1/2004 | Perret |
| 6,682,688 B1 | 1/2004 | Higashi |
| 6,688,886 B2 | 2/2004 | Hughes |
| 6,722,872 B1 | 4/2004 | Swanson |
| 6,767,499 B1 | 7/2004 | Hory |
| 6,811,744 B2 | 11/2004 | Keicher |
| 6,814,823 B1 | 11/2004 | White |
| 6,815,636 B2 | 11/2004 | Chung |
| 6,823,124 B1 | 11/2004 | Renn |
| 6,824,714 B1 | 11/2004 | Harald |
| 6,861,613 B1 | 3/2005 | Meiners |
| 6,905,645 B2 | 6/2005 | Iskra |
| 6,930,278 B1 | 8/2005 | Chung |
| 6,932,935 B1 | 8/2005 | Oberhofer |
| 6,945,638 B2 | 9/2005 | Teung |
| 6,949,216 B2 | 9/2005 | Brice |
| 6,955,023 B2 | 10/2005 | Rotheroe |
| 6,963,338 B1 | 11/2005 | Bachelder |
| 6,986,654 B2 | 1/2006 | Imiolek |
| 6,989,115 B2 | 1/2006 | Russell |

(56) References Cited

U.S. PATENT DOCUMENTS

| | | |
|---|---|---|
| 6,994,894 B2 | 2/2006 | Hofmeister |
| 6,998,568 B2 | 2/2006 | Brehm et al. |
| 7,002,754 B2 | 2/2006 | Baer |
| 7,008,209 B2 | 3/2006 | Iskra |
| 7,027,887 B2 | 4/2006 | Gaylo |
| 7,045,015 B2 | 5/2006 | Renn |
| 7,047,098 B2 | 5/2006 | Lindemann |
| 7,073,442 B2 | 7/2006 | Fedor |
| 7,084,370 B2 | 8/2006 | Hagemeister |
| 7,107,118 B2 | 9/2006 | Orozco et al. |
| 7,108,894 B2 | 9/2006 | Renn |
| 7,149,596 B2 | 12/2006 | Berger |
| 7,153,463 B2 | 12/2006 | Leuterer |
| 7,229,272 B2 | 6/2007 | Leuterer |
| 7,241,415 B2 | 7/2007 | Khoshnevis |
| 7,261,542 B2 | 8/2007 | Hickerson |
| 7,261,550 B2 | 8/2007 | Herzog |
| 7,270,844 B2 | 9/2007 | Renn |
| 7,294,366 B2 | 11/2007 | Renn |
| 7,296,599 B2 | 11/2007 | Cox |
| 7,326,377 B2 | 2/2008 | Adams |
| 7,357,629 B2 | 4/2008 | Weiskopf |
| 7,419,632 B2 | 9/2008 | Keller |
| 7,435,368 B2 | 10/2008 | Davidson |
| 7,452,500 B2 | 11/2008 | Uckelmann |
| 7,454,262 B2 | 11/2008 | Larsson |
| 7,485,345 B2 | 2/2009 | Renn |
| 7,515,986 B2 | 4/2009 | Huskamp |
| 7,521,652 B2 | 4/2009 | Mark |
| 7,537,722 B2 | 5/2009 | Andersson |
| 7,540,738 B2 | 6/2009 | Larsson |
| 7,604,768 B2 | 10/2009 | Kritchman |
| 7,615,179 B2 | 11/2009 | Dumond |
| 7,628,600 B2 | 12/2009 | Perret |
| 7,635,825 B2 | 12/2009 | Larsson |
| 7,639,267 B1 | 12/2009 | Desimone |
| 7,658,163 B2 | 2/2010 | Renn |
| 7,661,948 B2 | 2/2010 | Perret |
| 7,665,979 B2 | 2/2010 | Heugel |
| 7,674,107 B2 | 3/2010 | Perret |
| 7,674,671 B2 | 3/2010 | Renn |
| 7,686,605 B2 | 3/2010 | Perret |
| 7,704,432 B2 | 4/2010 | Dumond |
| 7,704,565 B2 | 4/2010 | Slaughter |
| 7,713,048 B2 | 5/2010 | Perret |
| 7,713,454 B2 | 5/2010 | Larsson |
| 7,740,683 B2 | 6/2010 | Thorsson |
| 7,741,578 B2 | 6/2010 | Adams |
| 7,789,037 B2 | 9/2010 | Teulet |
| 7,799,253 B2 | 9/2010 | Hoechsmann |
| 7,814,441 B2 | 10/2010 | Bae et al. |
| 7,820,241 B2 | 10/2010 | Perret |
| 7,833,465 B2 | 11/2010 | Larsson |
| 7,837,458 B2 | 11/2010 | Perret |
| 7,847,212 B2 | 12/2010 | Renz |
| 7,850,885 B2 | 12/2010 | Philippi |
| 7,863,544 B2 | 1/2011 | Serruys |
| 7,871,551 B2 | 1/2011 | Wallgren |
| 7,879,394 B1 | 2/2011 | Keicher |
| 7,891,095 B2 | 2/2011 | Jonsson |
| 7,901,604 B2 | 3/2011 | Oberhofer |
| 7,931,462 B2 | 4/2011 | Mattes |
| 7,936,352 B2 | 5/2011 | Baran |
| 7,938,079 B2 | 5/2011 | King |
| 7,938,341 B2 | 5/2011 | King |
| 7,946,840 B2 | 5/2011 | Perret |
| 7,976,302 B2 | 7/2011 | Halder |
| 7,987,813 B2 | 8/2011 | Renn |
| 7,991,465 B2 | 8/2011 | Bartic |
| 8,025,831 B2 | 9/2011 | Kong |
| 8,031,384 B2 | 10/2011 | Perret |
| 8,034,279 B2 | 10/2011 | Dimter |
| 8,048,359 B2 | 11/2011 | Wang |
| 8,073,315 B2 | 12/2011 | Philippi |
| 8,075,814 B2 | 12/2011 | Fruth |
| 8,083,513 B2 | 12/2011 | Montero-Escuder |
| 8,110,247 B2 | 2/2012 | Renn |
| 8,124,192 B2 | 2/2012 | Paasche |
| 8,132,744 B2 | 3/2012 | King |
| 8,137,739 B2 | 3/2012 | Philippi |
| 8,172,562 B2 | 5/2012 | Mattes |
| 8,186,414 B2 | 5/2012 | Furlong |
| 8,186,990 B2 | 5/2012 | Perret |
| 8,187,521 B2 | 5/2012 | Larsson |
| 8,187,522 B2 | 5/2012 | Higashi |
| 8,249,480 B2 | 8/2012 | Aslam |
| 8,260,447 B2 | 9/2012 | Mattes |
| 8,272,579 B2 | 9/2012 | King |
| 8,299,208 B2 | 10/2012 | Frank |
| 8,303,886 B2 | 11/2012 | Philippi |
| 8,308,466 B2 | 11/2012 | Ackelid |
| 8,313,087 B2 | 11/2012 | Hesse |
| 8,317,508 B2 | 11/2012 | Bokodi |
| 8,366,432 B2 | 2/2013 | Perret |
| 8,414,281 B2 | 4/2013 | Schleiss |
| 8,455,051 B2 | 6/2013 | Renn |
| 8,488,994 B2 | 7/2013 | Hanson |
| 8,501,075 B2 | 8/2013 | Philippi |
| 8,502,107 B2 | 8/2013 | Uckelmann |
| 8,524,142 B2 | 9/2013 | Uckelmann |
| 8,525,071 B2 | 9/2013 | Leuterer |
| 8,543,361 B2 | 9/2013 | Chen et al. |
| 8,556,981 B2 | 10/2013 | Jones |
| 8,570,534 B1 | 10/2013 | Loewgren |
| 8,590,157 B2 | 11/2013 | Kruth |
| 8,640,975 B2 | 2/2014 | King |
| 8,658,078 B2 | 2/2014 | Weidinger |
| 8,663,539 B1 | 3/2014 | Kolodziejska |
| 8,705,144 B2 | 4/2014 | Gullentops |
| 8,710,144 B2 | 4/2014 | Hesse |
| 8,728,387 B2 | 5/2014 | Jones |
| 8,734,694 B2 | 5/2014 | Perret |
| 8,753,105 B2 | 6/2014 | Scott |
| 8,784,720 B2 | 7/2014 | Oberhofer |
| 8,784,721 B2 | 7/2014 | Philippi |
| 8,794,263 B2 | 8/2014 | Scott |
| 8,796,146 B2 | 8/2014 | Renn |
| 8,803,073 B2 | 8/2014 | Philippi |
| 8,845,319 B2 | 9/2014 | Oberhofer |
| 8,854,669 B1* | 10/2014 | Jazayeri ............... G06F 3/1288 358/1.15 |
| 8,884,186 B2 | 11/2014 | Uckelmann |
| 8,887,658 B2 | 11/2014 | Essien |
| 8,895,893 B2 | 11/2014 | Perret |
| 8,906,216 B2 | 12/2014 | Detor |
| 8,915,620 B2 | 12/2014 | Vaes |
| 8,945,456 B2 | 2/2015 | Zenere |
| 8,967,990 B2 | 3/2015 | Weidinger |
| 8,968,625 B2 | 3/2015 | Tan |
| 8,994,592 B2 | 3/2015 | Scott |
| 9,011,982 B2 | 4/2015 | Muller |
| 9,037,068 B2 | 5/2015 | Kojima |
| 9,064,671 B2 | 6/2015 | Ljungblad |
| 9,073,265 B2 | 7/2015 | Snis |
| 9,079,248 B2 | 7/2015 | Ackelid |
| 9,114,478 B2 | 8/2015 | Scott |
| 9,114,652 B1 | 8/2015 | Wayman |
| 9,117,039 B1 | 8/2015 | Mosterman |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King |
| 9,205,691 B1 | 12/2015 | Jones |
| 9,221,100 B2 | 12/2015 | Schwarze |
| 9,233,507 B2 | 1/2016 | Bibas |
| 9,254,535 B2 | 2/2016 | Buller |
| 9,272,369 B2 | 3/2016 | Bruck |
| 9,308,583 B2 | 4/2016 | El-Dasher |
| 9,314,972 B2 | 4/2016 | Green |
| 9,327,450 B2 | 5/2016 | Hein |
| 9,327,451 B2 | 5/2016 | Teulet |
| 9,346,127 B2 | 5/2016 | Buller |
| 9,366,422 B2 | 6/2016 | McClure |
| 9,380,304 B1 | 6/2016 | Chang |

(56) References Cited

U.S. PATENT DOCUMENTS

| | | |
|---|---|---|
| 9,399,256 B2 | 7/2016 | Buller |
| 9,403,235 B2 | 8/2016 | Buller |
| 9,415,443 B2 | 8/2016 | Ljungblad |
| 9,486,878 B2 | 11/2016 | Buller |
| 9,498,921 B2 | 11/2016 | Patrick |
| 9,505,057 B2 | 11/2016 | Nordkvist |
| D774,326 S | 12/2016 | Chang |
| 9,522,426 B2 | 12/2016 | Das |
| 9,527,246 B2 | 12/2016 | Wiesner |
| 9,533,452 B2 | 1/2017 | Guenster |
| 9,550,207 B2 | 1/2017 | Ackelid |
| 9,573,193 B2 | 2/2017 | Buller |
| 9,573,225 B2 | 2/2017 | Buller |
| 9,586,290 B2 | 3/2017 | Buller |
| 9,592,554 B2 | 3/2017 | Abe |
| 9,662,840 B1 | 5/2017 | Buller |
| 9,676,145 B2 | 6/2017 | Buller |
| 9,700,908 B2 | 7/2017 | Baker |
| 9,757,760 B2 | 9/2017 | Halder |
| 9,821,411 B2 | 11/2017 | Buller |
| 9,827,717 B2 | 11/2017 | Huang |
| 9,835,568 B2 | 12/2017 | Woods |
| 9,886,526 B2 | 2/2018 | Huang |
| 9,919,360 B2 | 3/2018 | Buller |
| 9,919,476 B2 | 3/2018 | Paternoster |
| 9,931,697 B2 | 4/2018 | Levin |
| 9,962,767 B2 | 5/2018 | Buller |
| 10,022,915 B2 | 7/2018 | Bostick |
| 10,035,188 B2 | 7/2018 | Weilhammer |
| 10,035,304 B2 | 7/2018 | Reinarz |
| 10,058,920 B2 | 8/2018 | Buller |
| 10,065,270 B2 | 9/2018 | Buller |
| 10,071,422 B2 | 9/2018 | Buller |
| 10,093,123 B2 | 10/2018 | Schwarze et al. |
| 10,112,236 B2 | 10/2018 | Schlick |
| 10,144,062 B2 | 12/2018 | Bayer et al. |
| 10,144,176 B1 | 12/2018 | Buller |
| 10,183,330 B2 | 1/2019 | Buller |
| 10,195,693 B2 | 2/2019 | Buller |
| 10,207,454 B2 | 2/2019 | Buller |
| 10,252,335 B2 | 4/2019 | Buller |
| 10,252,336 B2 | 4/2019 | Buller |
| 10,259,044 B2 | 4/2019 | Buller |
| 10,272,525 B1 | 4/2019 | Buller |
| 10,286,452 B2 | 5/2019 | Buller |
| 10,286,603 B2 | 5/2019 | Buller |
| 10,315,252 B2 | 6/2019 | Symeonidis |
| 10,357,829 B2 | 7/2019 | Spink |
| 10,357,957 B2 | 7/2019 | Buller |
| 10,369,629 B2 | 8/2019 | Symeonidis |
| 10,434,573 B2 | 10/2019 | Buller |
| 10,442,003 B2 | 10/2019 | Symeonidis |
| 10,449,696 B2 | 10/2019 | Elgar |
| 10,493,564 B2 | 12/2019 | Buller |
| 10,507,549 B2 | 12/2019 | Buller |
| 10,583,482 B2 | 3/2020 | Heugel |
| 10,611,092 B2 | 4/2020 | Buller |
| 10,625,374 B2 | 4/2020 | Schwarze |
| 10,688,722 B2 | 6/2020 | Buller |
| 10,888,925 B2 | 1/2021 | Symeonidis |
| D911,065 S | 2/2021 | Borodchuk et al. |
| 11,186,034 B2 | 11/2021 | Vial et al. |
| 2001/0014403 A1 | 8/2001 | Brown et al. |
| 2001/0017085 A1 | 8/2001 | Kubo |
| 2001/0050448 A1 | 12/2001 | Kubo et al. |
| 2002/0017509 A1 | 2/2002 | Ishide |
| 2002/0020945 A1 | 2/2002 | Cho |
| 2002/0041818 A1 | 4/2002 | Abe |
| 2002/0079601 A1 | 6/2002 | Russell |
| 2002/0090410 A1 | 7/2002 | Tochimoto |
| 2002/0104973 A1 | 8/2002 | Kerekes |
| 2002/0129485 A1 | 9/2002 | Mok |
| 2002/0145213 A1 | 10/2002 | Liu |
| 2002/0152002 A1 | 10/2002 | Lindemann |
| 2002/0158054 A1 | 10/2002 | Manetsberger |
| 2002/0166896 A1 | 11/2002 | Mazumder |
| 2002/0195747 A1 | 12/2002 | Hull |
| 2003/0106378 A1 | 6/2003 | Giannakopoulos |
| 2003/0201255 A1 | 10/2003 | Manetsberger |
| 2003/0206820 A1 | 11/2003 | Keicher et al. |
| 2003/0222066 A1 | 12/2003 | Low |
| 2003/0232512 A1 | 12/2003 | Dickinson |
| 2004/0003738 A1 | 1/2004 | Imiolek |
| 2004/0003741 A1 | 1/2004 | Iskra |
| 2004/0004303 A1 | 1/2004 | Iskra |
| 2004/0004653 A1 | 1/2004 | Pryor |
| 2004/0005182 A1 | 1/2004 | Gaylo |
| 2004/0026807 A1 | 2/2004 | Andersson |
| 2004/0045941 A1 | 3/2004 | Herzog |
| 2004/0056022 A1 | 3/2004 | Meiners |
| 2004/0061260 A1 | 4/2004 | Heugel |
| 2004/0084814 A1 | 5/2004 | Boyd |
| 2004/0094728 A1 | 5/2004 | Herzog |
| 2004/0099996 A1 | 5/2004 | Herzog |
| 2004/0118309 A1 | 6/2004 | Fedor |
| 2004/0121257 A1 | 6/2004 | Kaminsky et al. |
| 2004/0173946 A1 | 9/2004 | Pfeifer |
| 2004/0179808 A1 | 9/2004 | Renn |
| 2004/0197493 A1 | 10/2004 | Renn |
| 2004/0200816 A1 | 10/2004 | Chung |
| 2004/0204785 A1 | 10/2004 | Richardson |
| 2004/0217095 A1 | 11/2004 | Herzog |
| 2004/0222549 A1 | 11/2004 | Sano |
| 2004/0228004 A1 | 11/2004 | Sercel |
| 2004/0262261 A1 | 12/2004 | Fink |
| 2005/0011631 A1 | 1/2005 | Hong |
| 2005/0035285 A1 | 2/2005 | Tan |
| 2005/0116391 A1 | 6/2005 | Lindemann |
| 2005/0126476 A1 | 6/2005 | Shutic |
| 2005/0133527 A1 | 6/2005 | Dullea |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar |
| 2005/0258570 A1 | 11/2005 | Kong |
| 2005/0278933 A1 | 12/2005 | Macke, Jr. |
| 2005/0287031 A1 | 12/2005 | Macke, Jr. |
| 2006/0000814 A1 | 1/2006 | Gu |
| 2006/0003095 A1 | 1/2006 | Bullen et al. |
| 2006/0019232 A1 | 1/2006 | Fischer |
| 2006/0054079 A1 | 3/2006 | Withey |
| 2006/0111807 A1 | 5/2006 | Gothait |
| 2006/0118532 A1 | 6/2006 | Chung |
| 2006/0156978 A1 | 7/2006 | Lipson |
| 2006/0180300 A1 | 8/2006 | Lenehan et al. |
| 2006/0181700 A1 | 8/2006 | Andrews |
| 2006/0187326 A1 | 8/2006 | Spencer |
| 2006/0192322 A1 | 8/2006 | Abe |
| 2006/0208396 A1 | 9/2006 | Abe |
| 2006/0211158 A1 | 9/2006 | Arai |
| 2006/0214335 A1 | 9/2006 | Cox |
| 2006/0228248 A1 | 10/2006 | Larsson |
| 2006/0228897 A1 | 10/2006 | Timans |
| 2006/0249485 A1 | 11/2006 | Partanen |
| 2006/0280866 A1 | 12/2006 | Marquez |
| 2007/0001342 A1 | 1/2007 | Oberhofer |
| 2007/0003656 A1 | 1/2007 | Labossiere |
| 2007/0019028 A1 | 1/2007 | Renn |
| 2007/0023977 A1 | 2/2007 | Braun |
| 2007/0035069 A1 | 2/2007 | Wust |
| 2007/0040557 A1 | 2/2007 | Johnstad |
| 2007/0051704 A1 | 3/2007 | Husmann |
| 2007/0052836 A1 | 3/2007 | Yamada |
| 2007/0057412 A1 | 3/2007 | Weiskopf |
| 2007/0068553 A1* | 3/2007 | Friedlaender ........... B29B 17/02 134/18 |
| 2007/0122562 A1 | 5/2007 | Adams |
| 2007/0142914 A1 | 6/2007 | Jones |
| 2007/0154634 A1 | 7/2007 | Renn |
| 2007/0175875 A1 | 8/2007 | Uckelmann |
| 2007/0176312 A1 | 8/2007 | Clark |
| 2007/0183918 A1 | 8/2007 | Monsheimer |
| 2007/0196561 A1 | 8/2007 | Philippi |

(56) References Cited

U.S. PATENT DOCUMENTS

| | | | |
|---|---|---|---|
| 2007/0241482 A1 | 10/2007 | Giller | |
| 2007/0290409 A1 | 12/2007 | Brice | |
| 2008/0006334 A1 | 1/2008 | Davidson | |
| 2008/0006958 A1* | 1/2008 | Davidson | B33Y 40/00 425/72.1 |
| 2008/0013299 A1 | 1/2008 | Renn | |
| 2008/0014457 A1 | 1/2008 | Gennaro | |
| 2008/0026338 A1 | 1/2008 | Cinader | |
| 2008/0060330 A1 | 3/2008 | Davidson | |
| 2008/0131540 A1 | 6/2008 | Perret | |
| 2008/0138515 A1 | 6/2008 | Williams | |
| 2008/0151951 A1 | 6/2008 | Elliott | |
| 2008/0204748 A1 | 8/2008 | Nomaru | |
| 2008/0206460 A1 | 8/2008 | Rhoades | |
| 2008/0208268 A1 | 8/2008 | Bartic | |
| 2008/0257867 A1 | 10/2008 | Malshe | |
| 2009/0004380 A1 | 1/2009 | Hochsmann | |
| 2009/0017220 A1 | 1/2009 | Muller | |
| 2009/0025638 A1 | 1/2009 | Inoue | |
| 2009/0035411 A1 | 2/2009 | Seibert | |
| 2009/0039570 A1 | 2/2009 | Clark | |
| 2009/0042050 A1 | 2/2009 | Matteazzi | |
| 2009/0045553 A1 | 2/2009 | Weidinger | |
| 2009/0047165 A1 | 2/2009 | Syvanen | |
| 2009/0059235 A1 | 3/2009 | Qu | |
| 2009/0061077 A1 | 3/2009 | King | |
| 2009/0069301 A1 | 3/2009 | Milburn | |
| 2009/0090298 A1 | 4/2009 | King | |
| 2009/0114151 A1 | 5/2009 | Renn | |
| 2009/0152771 A1 | 6/2009 | Philippi | |
| 2009/0185178 A1 | 7/2009 | Miyoshi | |
| 2009/0206065 A1 | 8/2009 | Kruth | |
| 2009/0206522 A1 | 8/2009 | Hein | |
| 2009/0257672 A1 | 10/2009 | Sullender | |
| 2009/0314391 A1 | 12/2009 | Crump | |
| 2010/0004454 A1 | 1/2010 | Fukuzumi | |
| 2010/0006228 A1 | 1/2010 | Abe | |
| 2010/0011062 A1* | 1/2010 | Araki | H04L 67/12 709/205 |
| 2010/0012630 A1 | 1/2010 | Leuterer | |
| 2010/0044547 A1 | 2/2010 | Higashi | |
| 2010/0125356 A1 | 5/2010 | Shkolnik | |
| 2010/0138028 A1 | 6/2010 | Tasker et al. | |
| 2010/0140550 A1 | 6/2010 | Keller | |
| 2010/0161102 A1 | 6/2010 | Mattes et al. | |
| 2010/0163405 A1 | 7/2010 | Ackelid | |
| 2010/0173096 A1 | 7/2010 | Kritchman | |
| 2010/0174392 A1 | 7/2010 | Fink | |
| 2010/0215856 A1 | 8/2010 | Kritchman | |
| 2010/0233012 A1 | 9/2010 | Higashi | |
| 2010/0242843 A1 | 9/2010 | Peretti | |
| 2010/0305743 A1 | 12/2010 | Larsson | |
| 2010/0323050 A1 | 12/2010 | Kumagai | |
| 2011/0029093 A1 | 2/2011 | Bojarski | |
| 2011/0033887 A1 | 2/2011 | Fang | |
| 2011/0035597 A1 | 2/2011 | Kevenaar | |
| 2011/0042031 A1 | 2/2011 | Furlong | |
| 2011/0046916 A1 | 2/2011 | Yu | |
| 2011/0052927 A1 | 3/2011 | Martinoni | |
| 2011/0061591 A1 | 3/2011 | Stecker | |
| 2011/0106290 A1 | 5/2011 | Simone | |
| 2011/0122381 A1 | 5/2011 | Hickerson et al. | |
| 2011/0123383 A1 | 5/2011 | Fuwa | |
| 2011/0133367 A1 | 6/2011 | Weidinger | |
| 2011/0135840 A1 | 6/2011 | Doye | |
| 2011/0165339 A1 | 7/2011 | Skoglund | |
| 2011/0165340 A1 | 7/2011 | Baumann | |
| 2011/0168091 A1 | 7/2011 | Baumann | |
| 2011/0187713 A1 | 8/2011 | Pershing | |
| 2011/0190904 A1 | 8/2011 | Lechmann | |
| 2011/0221100 A1 | 9/2011 | Wesselky | |
| 2011/0223349 A1 | 9/2011 | Scott | |
| 2011/0259862 A1 | 10/2011 | Scott | |
| 2011/0278773 A1 | 11/2011 | Bokodi | |
| 2011/0287185 A1 | 11/2011 | Felstead | |
| 2011/0291331 A1 | 12/2011 | Scott | |
| 2011/0293771 A1 | 12/2011 | Oberhofer | |
| 2012/0000893 A1 | 1/2012 | Broude | |
| 2012/0010741 A1 | 1/2012 | Hull | |
| 2012/0013256 A1 | 1/2012 | McDermott | |
| 2012/0013710 A1 | 1/2012 | Ehrlich | |
| 2012/0052145 A1 | 3/2012 | Chen | |
| 2012/0090734 A1 | 4/2012 | Heinlein | |
| 2012/0100031 A1 | 4/2012 | Ljungblad | |
| 2012/0105903 A1* | 5/2012 | Pettis | B33Y 50/00 358/1.14 |
| 2012/0106150 A1 | 5/2012 | Vaes | |
| 2012/0107496 A1 | 5/2012 | Thoma | |
| 2012/0119399 A1 | 5/2012 | Fruth | |
| 2012/0126457 A1 | 5/2012 | Abe | |
| 2012/0130525 A1 | 5/2012 | Tsai | |
| 2012/0133928 A1 | 5/2012 | Urano | |
| 2012/0134386 A1 | 5/2012 | Bender | |
| 2012/0139166 A1 | 6/2012 | Abe | |
| 2012/0139167 A1 | 6/2012 | Fruth | |
| 2012/0145806 A1 | 6/2012 | Yang | |
| 2012/0155606 A1 | 6/2012 | Simon | |
| 2012/0164322 A1 | 6/2012 | Teulet | |
| 2012/0186779 A1 | 7/2012 | Tan | |
| 2012/0203365 A1 | 8/2012 | Hümmeler et al. | |
| 2012/0211926 A1 | 8/2012 | Larsson | |
| 2012/0213615 A1 | 8/2012 | Sakaue | |
| 2012/0213659 A1 | 8/2012 | Bayer et al. | |
| 2012/0223059 A1 | 9/2012 | Ackelid | |
| 2012/0228492 A1 | 9/2012 | Franzen | |
| 2012/0228807 A1 | 9/2012 | Teulet | |
| 2012/0231175 A1 | 9/2012 | Tan | |
| 2012/0231576 A1 | 9/2012 | King | |
| 2012/0234671 A1 | 9/2012 | Ackelid | |
| 2012/0235548 A1 | 9/2012 | Cordes | |
| 2012/0251378 A1 | 10/2012 | Abe | |
| 2012/0267347 A1 | 10/2012 | Arjakine | |
| 2012/0308781 A1 | 12/2012 | Abe | |
| 2012/0318777 A1 | 12/2012 | Kwok | |
| 2013/0016400 A1 | 1/2013 | Yamashita | |
| 2013/0064706 A1 | 3/2013 | Schwarze | |
| 2013/0080866 A1 | 3/2013 | Ogilvie | |
| 2013/0089642 A1 | 4/2013 | Lipson | |
| 2013/0093866 A1 | 4/2013 | Ohlhues | |
| 2013/0101746 A1 | 4/2013 | Keremes | |
| 2013/0108460 A1 | 5/2013 | Szwedowicz et al. | |
| 2013/0112366 A1 | 5/2013 | Mottin | |
| 2013/0112672 A1 | 5/2013 | Keremes | |
| 2013/0134637 A1 | 5/2013 | Wiesner | |
| 2013/0162643 A1 | 6/2013 | Cardle | |
| 2013/0168902 A1 | 7/2013 | Herzog | |
| 2013/0171019 A1 | 7/2013 | Gessler | |
| 2013/0180959 A1 | 7/2013 | Weston | |
| 2013/0186558 A1 | 7/2013 | Comb | |
| 2013/0206058 A1 | 8/2013 | Mauck | |
| 2013/0218531 A1 | 8/2013 | Deichmann | |
| 2013/0228302 A1 | 9/2013 | Rickenbacher | |
| 2013/0256953 A1 | 10/2013 | Teulet | |
| 2013/0270750 A1 | 10/2013 | Green | |
| 2013/0272746 A1 | 10/2013 | Hanson | |
| 2013/0277891 A1 | 10/2013 | Teulet | |
| 2013/0280547 A1 | 10/2013 | Brandl | |
| 2013/0287933 A1 | 10/2013 | Kaiser | |
| 2013/0295212 A1 | 11/2013 | Chen | |
| 2013/0300035 A1 | 11/2013 | Snis | |
| 2013/0300286 A1 | 11/2013 | Ljungblad | |
| 2013/0312928 A1 | 11/2013 | Mercelis | |
| 2013/0329098 A1 | 12/2013 | Lim | |
| 2013/0330470 A1 | 12/2013 | Gersch | |
| 2013/0341313 A1 | 12/2013 | Himmelsbach | |
| 2014/0000836 A1 | 1/2014 | Xu et al. | |
| 2014/0034626 A1 | 2/2014 | Trevor | |
| 2014/0035182 A1 | 2/2014 | Hugo | |
| 2014/0049779 A1 | 2/2014 | Tin | |
| 2014/0049964 A1 | 2/2014 | McClure | |
| 2014/0065194 A1 | 3/2014 | Yoo | |
| 2014/0086654 A1 | 3/2014 | Kojima | |
| 2014/0086780 A1 | 3/2014 | Miller | |
| 2014/0123458 A1 | 5/2014 | Fearon | |

(56) References Cited

U.S. PATENT DOCUMENTS

| | | |
|---|---|---|
| 2014/0147328 A1 | 5/2014 | Abe |
| 2014/0150992 A1 | 6/2014 | Koontz |
| 2014/0154088 A1 | 6/2014 | Etter |
| 2014/0157579 A1 | 6/2014 | Chhabra |
| 2014/0163717 A1 | 6/2014 | Das |
| 2014/0176127 A1 | 6/2014 | Kogej |
| 2014/0197139 A1 | 7/2014 | Burbaum et al. |
| 2014/0241615 A1 | 8/2014 | Shroff |
| 2014/0246809 A1 | 9/2014 | Hofmann |
| 2014/0251481 A1 | 9/2014 | Kroll |
| 2014/0252687 A1 | 9/2014 | El-Dasher |
| 2014/0265045 A1 | 9/2014 | Cullen |
| 2014/0271221 A1 | 9/2014 | Soucy |
| 2014/0271328 A1 | 9/2014 | Burris |
| 2014/0271965 A1 | 9/2014 | Ferrar |
| 2014/0287080 A1 | 9/2014 | Scott |
| 2014/0288890 A1 | 9/2014 | Khainson |
| 2014/0301883 A1 | 10/2014 | Wiesner |
| 2014/0302187 A1 | 10/2014 | Pawlikowski |
| 2014/0314609 A1 | 10/2014 | Ljungblad |
| 2014/0314964 A1 | 10/2014 | Ackelid |
| 2014/0329953 A1 | 11/2014 | Paternoster |
| 2014/0332507 A1 | 11/2014 | Fockele |
| 2014/0335313 A1 | 11/2014 | Chou |
| 2014/0348691 A1 | 11/2014 | Ljungblad |
| 2014/0348692 A1 | 11/2014 | Bessac |
| 2014/0348969 A1 | 11/2014 | Scott |
| 2014/0361464 A1 | 12/2014 | Holcomb |
| 2014/0363585 A1 | 12/2014 | Pialot |
| 2014/0370323 A1 | 12/2014 | Ackelid |
| 2014/0374935 A1 | 12/2014 | Flitsch |
| 2014/0377117 A1 | 12/2014 | Herrmann |
| 2015/0004046 A1 | 1/2015 | Graham |
| 2015/0014281 A1 | 1/2015 | Trimmer |
| 2015/0017013 A1 | 1/2015 | Tozzi |
| 2015/0021815 A1 | 1/2015 | Albrecht |
| 2015/0021832 A1 | 1/2015 | Yerazunis |
| 2015/0034606 A1 | 2/2015 | Blackmore |
| 2015/0035206 A1 | 2/2015 | Maggiore |
| 2015/0037599 A1 | 2/2015 | Blackmore |
| 2015/0048528 A1 | 2/2015 | Barton |
| 2015/0049082 A1 | 2/2015 | Coffey |
| 2015/0050463 A1 | 2/2015 | Nakano |
| 2015/0054191 A1 | 2/2015 | Ljungblad |
| 2015/0060042 A1 | 3/2015 | Shilpiekandula |
| 2015/0061170 A1 | 3/2015 | Engel |
| 2015/0061195 A1 | 3/2015 | Defelice |
| 2015/0064047 A1 | 3/2015 | Hyde |
| 2015/0064048 A1 | 3/2015 | Bessac |
| 2015/0071809 A1 | 3/2015 | Nordkvist |
| 2015/0076739 A1 | 3/2015 | Batchelder |
| 2015/0084240 A1 | 3/2015 | Shuck |
| 2015/0088295 A1 | 3/2015 | Hellestam |
| 2015/0090074 A1 | 4/2015 | Etter et al. |
| 2015/0091200 A1 | 4/2015 | Mech |
| 2015/0093720 A1 | 4/2015 | Beeby |
| 2015/0097307 A1 | 4/2015 | Batchelder |
| 2015/0097308 A1 | 4/2015 | Batchelder |
| 2015/0108098 A1 | 4/2015 | Arjakine et al. |
| 2015/0110910 A1 | 4/2015 | Hartmann |
| 2015/0115490 A1 | 4/2015 | Reinarz |
| 2015/0139849 A1 | 5/2015 | Pialot, Jr. |
| 2015/0142153 A1 | 5/2015 | Chun |
| 2015/0145169 A1 | 5/2015 | Liu |
| 2015/0145177 A1 | 5/2015 | El-Siblani |
| 2015/0158249 A1 | 6/2015 | Goto |
| 2015/0165525 A1 | 6/2015 | Jonasson |
| 2015/0165545 A1 | 6/2015 | Goehler |
| 2015/0165681 A1 | 6/2015 | Fish |
| 2015/0165683 A1 | 6/2015 | Cheverton et al. |
| 2015/0165684 A1 | 6/2015 | Deane |
| 2015/0174658 A1 | 6/2015 | Ljungblad |
| 2015/0174822 A1 | 6/2015 | Huang |
| 2015/0177158 A1 | 6/2015 | Cheverton |
| 2015/0178286 A1 | 6/2015 | Dhollander |
| 2015/0185454 A1 | 7/2015 | Kalkbrenner |
| 2015/0197060 A1 | 7/2015 | Carr |
| 2015/0198052 A1 | 7/2015 | Pavlov |
| 2015/0210013 A1 | 7/2015 | Teulet |
| 2015/0246485 A1 | 9/2015 | Guenster |
| 2015/0251355 A1 | 9/2015 | Rehme |
| 2015/0258609 A1 | 9/2015 | Teulet |
| 2015/0268099 A1 | 9/2015 | Craig |
| 2015/0283610 A1 | 10/2015 | Ljungblad |
| 2015/0283611 A1 | 10/2015 | Takezawa |
| 2015/0283613 A1 | 10/2015 | Backlund |
| 2015/0283761 A1 | 10/2015 | Maeda |
| 2015/0290741 A1 | 10/2015 | Abe |
| 2015/0298211 A1 | 10/2015 | Abe |
| 2015/0298397 A1 | 10/2015 | Chen |
| 2015/0306667 A1 | 10/2015 | Yao |
| 2015/0306820 A1 | 10/2015 | Colin |
| 2015/0321422 A1 | 11/2015 | Boyer |
| 2015/0328839 A1 | 11/2015 | Willis |
| 2015/0331402 A1 | 11/2015 | Lin |
| 2015/0336330 A1 | 11/2015 | Herzog |
| 2015/0360418 A1 | 12/2015 | Shah |
| 2015/0367415 A1 | 12/2015 | Buller |
| 2015/0367416 A1 | 12/2015 | Buller |
| 2015/0367417 A1 | 12/2015 | Buller |
| 2015/0367418 A1 | 12/2015 | Buller |
| 2015/0367419 A1 | 12/2015 | Buller |
| 2015/0367446 A1 | 12/2015 | Buller |
| 2015/0367447 A1 | 12/2015 | Buller |
| 2015/0367448 A1 | 12/2015 | Buller |
| 2015/0367453 A1 | 12/2015 | Herzog |
| 2015/0367574 A1 | 12/2015 | Araie |
| 2015/0375456 A1 | 12/2015 | Cheverton |
| 2016/0001365 A1 | 1/2016 | Blanchet |
| 2016/0001401 A1 | 1/2016 | Dimter |
| 2016/0022336 A1 | 1/2016 | Bateman |
| 2016/0026337 A1 | 1/2016 | Wassvik |
| 2016/0026889 A1 | 1/2016 | Parkhomenko |
| 2016/0052057 A1 | 2/2016 | Xu |
| 2016/0052212 A1 | 2/2016 | Schmidt |
| 2016/0054115 A1 | 2/2016 | Snis |
| 2016/0054121 A1 | 2/2016 | Snis |
| 2016/0059310 A1 | 3/2016 | Junker |
| 2016/0059352 A1 | 3/2016 | Sparks |
| 2016/0067740 A1 | 3/2016 | Voris |
| 2016/0067778 A1 | 3/2016 | Liu |
| 2016/0067779 A1 | 3/2016 | Dautova |
| 2016/0082666 A1 | 3/2016 | De Pena |
| 2016/0082668 A1 | 3/2016 | Perret |
| 2016/0090848 A1 | 3/2016 | Engeli |
| 2016/0096318 A1 | 4/2016 | Bickel et al. |
| 2016/0107263 A1 | 4/2016 | Koerber |
| 2016/0114431 A1 | 4/2016 | Cheverton |
| 2016/0114432 A1 | 4/2016 | Ferrar |
| 2016/0114531 A1 | 4/2016 | Chuang |
| 2016/0114535 A1 | 4/2016 | Kritchman |
| 2016/0121399 A1 | 5/2016 | Buller |
| 2016/0121548 A1 | 5/2016 | Nauka |
| 2016/0129502 A1 | 5/2016 | Varetti |
| 2016/0129631 A1 | 5/2016 | Chen |
| 2016/0136730 A1 | 5/2016 | McMurtry |
| 2016/0136896 A1 | 5/2016 | Wighton |
| 2016/0144574 A1 | 5/2016 | Eilken |
| 2016/0151833 A1 | 6/2016 | Tsao |
| 2016/0151860 A1 | 6/2016 | Engeli |
| 2016/0154906 A1 | 6/2016 | Schmidt |
| 2016/0159010 A1 | 6/2016 | Perez |
| 2016/0179064 A1 | 6/2016 | Arthur |
| 2016/0184891 A1 | 6/2016 | Mironets |
| 2016/0185048 A1 | 6/2016 | Dave |
| 2016/0187272 A1 | 6/2016 | Ishii et al. |
| 2016/0193696 A1 | 7/2016 | McFarland |
| 2016/0193785 A1 | 7/2016 | Bell |
| 2016/0193790 A1 | 7/2016 | Shuck |
| 2016/0195427 A1* | 7/2016 | Vance .................. G01J 1/429 250/372 |
| 2016/0207109 A1 | 7/2016 | Buller |
| 2016/0214175 A1 | 7/2016 | Nordstrom |
| 2016/0221264 A1 | 8/2016 | Doherty |

(56) References Cited

U.S. PATENT DOCUMENTS

| | | |
|---|---|---|
| 2016/0228987 A1 | 8/2016 | Baudimont |
| 2016/0236279 A1 | 8/2016 | Ashton |
| 2016/0236414 A1 | 8/2016 | Reese |
| 2016/0236419 A1 | 8/2016 | Griffin |
| 2016/0241885 A1 | 8/2016 | Ström |
| 2016/0243721 A1 | 8/2016 | Tew |
| 2016/0246908 A1 | 8/2016 | Komzsik |
| 2016/0250717 A1 | 9/2016 | Kruger |
| 2016/0258045 A1 | 9/2016 | Carter, Jr. |
| 2016/0271698 A1 | 9/2016 | Schmidt |
| 2016/0271884 A1 | 9/2016 | Herzog |
| 2016/0271885 A1 | 9/2016 | Shi et al. |
| 2016/0279706 A1 | 9/2016 | Domrose |
| 2016/0279707 A1 | 9/2016 | Mattes |
| 2016/0284123 A1 | 9/2016 | Hare |
| 2016/0288254 A1 | 10/2016 | Pettit |
| 2016/0297006 A1 | 10/2016 | Buller |
| 2016/0297007 A1 | 10/2016 | Buller |
| 2016/0299996 A1 | 10/2016 | Huang |
| 2016/0300356 A1 | 10/2016 | Kitamura |
| 2016/0303687 A1 | 10/2016 | Ljungblad |
| 2016/0311025 A1 | 10/2016 | Kaneko |
| 2016/0318129 A1 | 11/2016 | Hu |
| 2016/0320236 A1 | 11/2016 | Fortin |
| 2016/0320771 A1 | 11/2016 | Huang |
| 2016/0321384 A1 | 11/2016 | Pal |
| 2016/0326880 A1 | 11/2016 | Slavens |
| 2016/0332384 A1 | 11/2016 | De Pena |
| 2016/0339639 A1 | 11/2016 | Chivel |
| 2016/0361874 A1 | 12/2016 | Park |
| 2016/0368215 A1 | 12/2016 | Miyano |
| 2017/0001371 A1 | 1/2017 | Sobue |
| 2017/0001379 A1 | 1/2017 | Long |
| 2017/0008126 A1 | 1/2017 | Long |
| 2017/0008776 A1 | 1/2017 | Zemmouri |
| 2017/0014902 A1 | 1/2017 | Tanaka |
| 2017/0015066 A1 | 1/2017 | Herrmann |
| 2017/0021420 A1 | 1/2017 | Buller |
| 2017/0021455 A1 | 1/2017 | Dallarosa |
| 2017/0036404 A1 | 2/2017 | Rengers |
| 2017/0056975 A1 | 3/2017 | Carter |
| 2017/0066052 A1 | 3/2017 | Abe |
| 2017/0066084 A1 | 3/2017 | Ladewig |
| 2017/0087769 A1 | 3/2017 | Lancaster-Larocque |
| 2017/0090461 A1 | 3/2017 | Chong |
| 2017/0100885 A1 | 4/2017 | Desimone |
| 2017/0102689 A1 | 4/2017 | Khajepour |
| 2017/0106603 A1 | 4/2017 | Pobihun |
| 2017/0123222 A1 | 5/2017 | Demuth |
| 2017/0129052 A1 | 5/2017 | Buller |
| 2017/0129184 A1 | 5/2017 | Buller et al. |
| 2017/0129185 A1 | 5/2017 | Buller |
| 2017/0136574 A1 | 5/2017 | Zenzinger |
| 2017/0136703 A1 | 5/2017 | Hayes |
| 2017/0144248 A1 | 5/2017 | Yoshimura |
| 2017/0144254 A1 | 5/2017 | Buller |
| 2017/0144374 A1 | 5/2017 | Ono |
| 2017/0144874 A1 | 5/2017 | Huebinger |
| 2017/0145586 A1 | 5/2017 | Xiao |
| 2017/0157704 A1 | 6/2017 | Ladewig |
| 2017/0157845 A1 | 6/2017 | Bihari |
| 2017/0165751 A1 | 6/2017 | Buller |
| 2017/0165752 A1 | 6/2017 | Buller |
| 2017/0165753 A1 | 6/2017 | Buller |
| 2017/0165754 A1 | 6/2017 | Buller |
| 2017/0165792 A1 | 6/2017 | Buller |
| 2017/0173883 A1 | 6/2017 | Gray |
| 2017/0176979 A1 | 6/2017 | Lalish |
| 2017/0189963 A1 | 7/2017 | Buller |
| 2017/0216917 A1 | 8/2017 | Zhang |
| 2017/0217095 A1 | 8/2017 | Buller |
| 2017/0225198 A1 | 8/2017 | Nevarez |
| 2017/0227408 A1 | 8/2017 | Helvajian |
| 2017/0232515 A1 | 8/2017 | Demuth |
| 2017/0239719 A1 | 8/2017 | Buller |
| 2017/0239720 A1 | 8/2017 | Levin |
| 2017/0239721 A1 | 8/2017 | Buller |
| 2017/0239752 A1* | 8/2017 | Buller ............... B23K 26/034 |
| 2017/0239891 A1 | 8/2017 | Buller |
| 2017/0239892 A1 | 8/2017 | Buller |
| 2017/0246810 A1 | 8/2017 | Gold |
| 2017/0252975 A1 | 9/2017 | Park |
| 2017/0259337 A1 | 9/2017 | Furukawa |
| 2017/0259502 A1 | 9/2017 | Chapiro |
| 2017/0259504 A1 | 9/2017 | Lin |
| 2017/0266878 A1 | 9/2017 | Furukawa |
| 2017/0266887 A1 | 9/2017 | Roviaro |
| 2017/0274589 A1 | 9/2017 | Wu |
| 2017/0282245 A1 | 10/2017 | Yasuda |
| 2017/0282294 A1 | 10/2017 | Uchida |
| 2017/0291372 A1 | 10/2017 | Milshtein |
| 2017/0297110 A1 | 10/2017 | Echigo |
| 2017/0304894 A1 | 10/2017 | Buller |
| 2017/0304944 A1 | 10/2017 | Symeonidis |
| 2017/0305140 A1 | 10/2017 | Wüst |
| 2017/0320265 A1 | 11/2017 | Baumann |
| 2017/0333994 A1 | 11/2017 | Schmitt |
| 2017/0334024 A1 | 11/2017 | Buller |
| 2017/0341143 A1 | 11/2017 | Abe |
| 2017/0341183 A1 | 11/2017 | Buller |
| 2017/0341299 A1 | 11/2017 | Kniola |
| 2017/0341307 A1 | 11/2017 | Xavier |
| 2017/0348771 A1 | 12/2017 | Kawada |
| 2017/0355146 A1 | 12/2017 | Buller |
| 2017/0355147 A1 | 12/2017 | Buller |
| 2017/0368753 A1 | 12/2017 | Yang et al. |
| 2018/0001553 A1 | 1/2018 | Buller |
| 2018/0001556 A1 | 1/2018 | Buller |
| 2018/0001557 A1 | 1/2018 | Buller |
| 2018/0015670 A1 | 1/2018 | Gu |
| 2018/0021855 A1 | 1/2018 | De Lajudie |
| 2018/0029126 A1 | 2/2018 | Ng |
| 2018/0029298 A1 | 2/2018 | Takaya et al. |
| 2018/0056391 A1 | 3/2018 | Buller |
| 2018/0056392 A1 | 3/2018 | Ichijo |
| 2018/0071986 A1 | 3/2018 | Buller |
| 2018/0093373 A1 | 4/2018 | Niederberger |
| 2018/0093416 A1 | 4/2018 | Prexler |
| 2018/0093418 A1 | 4/2018 | Lappas |
| 2018/0093419 A1 | 4/2018 | Lappas |
| 2018/0095450 A1 | 4/2018 | Lappas |
| 2018/0099454 A1 | 4/2018 | Hümmeler |
| 2018/0104892 A1 | 4/2018 | Herzog |
| 2018/0111193 A1 | 4/2018 | Romano |
| 2018/0111194 A1 | 4/2018 | Buller |
| 2018/0111195 A1 | 4/2018 | Romano |
| 2018/0111196 A1 | 4/2018 | Brezoczky |
| 2018/0111197 A1 | 4/2018 | Romano |
| 2018/0111198 A1 | 4/2018 | Anatolii |
| 2018/0111319 A1 | 4/2018 | Brezoczky |
| 2018/0111320 A1 | 4/2018 | Zhao |
| 2018/0117837 A1 | 5/2018 | Reese |
| 2018/0117845 A1 | 5/2018 | Buller |
| 2018/0126460 A1 | 5/2018 | Murphree |
| 2018/0126461 A1 | 5/2018 | Buller |
| 2018/0126462 A1 | 5/2018 | Murphree |
| 2018/0126629 A1 | 5/2018 | Staal |
| 2018/0126649 A1 | 5/2018 | Romano |
| 2018/0126650 A1 | 5/2018 | Murphree |
| 2018/0133635 A1 | 5/2018 | Hofmann |
| 2018/0133801 A1 | 5/2018 | Buller |
| 2018/0133956 A1 | 5/2018 | Buller |
| 2018/0133975 A1 | 5/2018 | Zhao |
| 2018/0141126 A1 | 5/2018 | Buller |
| 2018/0154442 A1 | 6/2018 | Milshtein |
| 2018/0154443 A1 | 6/2018 | Milshtein |
| 2018/0161875 A1 | 6/2018 | Buller |
| 2018/0178286 A1 | 6/2018 | Martin |
| 2018/0178292 A1 | 6/2018 | Berggren |
| 2018/0185893 A1 | 7/2018 | Joseph |
| 2018/0185915 A1 | 7/2018 | Beauchamp |
| 2018/0185961 A1 | 7/2018 | Meidani |
| 2018/0186067 A1* | 7/2018 | Buller ............... B22F 12/90 |
| 2018/0186079 A1 | 7/2018 | Xavier |

(56) References Cited

U.S. PATENT DOCUMENTS

| | | | |
|---|---|---|---|
| 2018/0186080 A1 | 7/2018 | Milshtein | |
| 2018/0186081 A1 | 7/2018 | Milshtein | |
| 2018/0186082 A1* | 7/2018 | Randhawa | B22F 12/44 |
| 2018/0207721 A1 | 7/2018 | Schlick | |
| 2018/0207722 A1 | 7/2018 | Feldmann | |
| 2018/0221948 A1 | 8/2018 | Rowland | |
| 2018/0236550 A1 | 8/2018 | Herzog | |
| 2018/0236714 A1 | 8/2018 | Thelakkadan | |
| 2018/0244034 A1 | 8/2018 | Sutcliffe | |
| 2018/0250744 A1 | 9/2018 | Symeonidis | |
| 2018/0250745 A1 | 9/2018 | Spink | |
| 2018/0250746 A1 | 9/2018 | Symeonidis | |
| 2018/0250771 A1 | 9/2018 | Brown | |
| 2018/0250772 A1 | 9/2018 | Symeonidis | |
| 2018/0250773 A1 | 9/2018 | Symeonidis | |
| 2018/0250774 A1 | 9/2018 | Symeonidis | |
| 2018/0250775 A1 | 9/2018 | Spink | |
| 2018/0281067 A1 | 10/2018 | Small | |
| 2018/0281236 A1 | 10/2018 | Elgar | |
| 2018/0281237 A1 | 10/2018 | Frechman | |
| 2018/0281282 A1 | 10/2018 | Elgar | |
| 2018/0281283 A1 | 10/2018 | Frechman | |
| 2018/0281284 A1 | 10/2018 | Elgar | |
| 2018/0297114 A1 | 10/2018 | Preston et al. | |
| 2018/0318928 A1 | 11/2018 | Christiansen | |
| 2018/0319150 A1 | 11/2018 | Buller | |
| 2018/0326485 A1 | 11/2018 | Brown | |
| 2018/0326488 A1 | 11/2018 | Lappas | |
| 2018/0341248 A1* | 11/2018 | Mehr | B22F 10/38 |
| 2018/0361509 A1 | 12/2018 | Reznik | |
| 2019/0022944 A1 | 1/2019 | Döhler | |
| 2019/0022946 A1 | 1/2019 | Jones et al. | |
| 2019/0054696 A1 | 2/2019 | Alonso | |
| 2019/0061002 A1 | 2/2019 | Symeonidis | |
| 2019/0118263 A1 | 4/2019 | Buller | |
| 2019/0118286 A1 | 4/2019 | Sugatani | |
| 2019/0118481 A1 | 4/2019 | Brown | |
| 2019/0134708 A1* | 5/2019 | Engel | B22F 12/70 |
| 2019/0134747 A1 | 5/2019 | Herzog | |
| 2019/0143412 A1 | 5/2019 | Buller | |
| 2019/0154290 A1* | 5/2019 | Kim | B01D 46/0032 |
| 2019/0160755 A1* | 5/2019 | Blasco | G05B 19/41875 |
| 2019/0176402 A1* | 6/2019 | Hofmann | B22F 12/53 |
| 2019/0230248 A1 | 7/2019 | Mizes et al. | |
| 2019/0232429 A1 | 8/2019 | Buller | |
| 2019/0278254 A1* | 9/2019 | Kumar | G06Q 30/0283 |
| 2019/0291184 A1 | 9/2019 | Buller | |
| 2019/0324439 A1* | 10/2019 | Cella | G05B 19/41865 |
| 2019/0366638 A1 | 12/2019 | Buller | |
| 2019/0375010 A1 | 12/2019 | Richardson | |
| 2019/0381736 A1 | 12/2019 | Jensen | |
| 2020/0004255 A1 | 1/2020 | Mohammadiha | |
| 2020/0039000 A1 | 2/2020 | Sweetland | |
| 2020/0139631 A1 | 5/2020 | Buller | |
| 2020/0159466 A1* | 5/2020 | Mosko | G06F 3/126 |
| 2020/0192324 A1* | 6/2020 | Asai | G05B 19/406 |
| 2020/0269500 A1 | 8/2020 | Pieger | |
| 2020/0298495 A1* | 9/2020 | Manousakis | G06Q 10/08 |
| 2020/0406545 A1 | 12/2020 | Schmale | |
| 2021/0039318 A1 | 2/2021 | Monaco | |
| 2021/0138397 A1 | 5/2021 | Schulz-Sciberras | |
| 2021/0178406 A1 | 6/2021 | Ringwald | |
| 2021/0370403 A1 | 12/2021 | Narita | |
| 2022/0118513 A1 | 4/2022 | Kleinhans | |
| 2022/0297186 A1 | 9/2022 | Buller | |
| 2022/0365511 A1* | 11/2022 | Perez | G05B 19/4099 |
| 2023/0030232 A1 | 2/2023 | Buller et al. | |
| 2024/0051062 A1 | 2/2024 | Symeonidis | |
| 2024/0051231 A1 | 2/2024 | Buller | |
| 2024/0058868 A1 | 2/2024 | Buller | |
| 2024/0059019 A1 | 2/2024 | Milshtein | |
| 2024/0083119 A1 | 3/2024 | Coulier | |

FOREIGN PATENT DOCUMENTS

| | | | |
|---|---|---|---|
| CN | 1476362 | A | 2/2004 |
| CN | 1648802 | A | 8/2005 |
| CN | 1648802 | A | 8/2005 |
| CN | 101835554 | A | 9/2010 |
| CN | 101835554 | A | 9/2010 |
| CN | 102076456 | A | 5/2011 |
| CN | 102076456 | A | 5/2011 |
| CN | 102549178 | A | 7/2012 |
| CN | 102695476 | A | 9/2012 |
| CN | 102695476 | A | 9/2012 |
| CN | 103341625 | A | 10/2013 |
| CN | 103341625 | A | 10/2013 |
| CN | 103392153 | A | 11/2013 |
| CN | 103392153 | A | 11/2013 |
| CN | 103561891 | A | 2/2014 |
| CN | 103561891 | A | 2/2014 |
| CN | 103611934 | A | 3/2014 |
| CN | 103611934 | A | 3/2014 |
| CN | 103612393 | A | 3/2014 |
| CN | 103612393 | A | 3/2014 |
| CN | 103629198 | A | 3/2014 |
| CN | 103629198 | A | 3/2014 |
| CN | 103676588 | A | 3/2014 |
| CN | 103676588 | A | 3/2014 |
| CN | 103785835 | | 5/2014 |
| CN | 203635913 | U | 6/2014 |
| CN | 203635913 | U | 6/2014 |
| CN | 103917348 | A | 7/2014 |
| CN | 103917348 | A | 7/2014 |
| CN | 103990798 | | 8/2014 |
| CN | 104260347 | | 1/2015 |
| CN | 104260357 | | 1/2015 |
| CN | 204136439 | U | 2/2015 |
| CN | 104589647 | | 5/2015 |
| CN | 204842978 | | 12/2015 |
| CN | 105383059 | | 3/2016 |
| CN | 105904729 | A | 8/2016 |
| CN | 105904729 | A | 8/2016 |
| CN | 105921747 | A | 9/2016 |
| CN | 105921747 | A | 9/2016 |
| CN | 106077625 | | 11/2016 |
| CN | 106735196 | | 5/2017 |
| CN | 106815439 | A * | 6/2017 |
| CN | 206316377 | | 7/2017 |
| CN | 107049538 | | 8/2017 |
| CN | 206501429 | | 9/2017 |
| CN | 206578297 | | 10/2017 |
| CN | 107340027 | | 11/2017 |
| CN | 107486558 | | 12/2017 |
| CN | 107891148 | | 4/2018 |
| CN | 108422661 | | 8/2018 |
| CN | 108422667 | | 8/2018 |
| CN | 108453255 | | 8/2018 |
| CN | 108746620 | | 11/2018 |
| CN | 108940841 | | 12/2018 |
| CN | 208646058 | | 3/2019 |
| CN | 110548872 | | 12/2019 |
| CN | 210080723 | | 2/2020 |
| CN | 210211384 | | 3/2020 |
| CN | 212945269 | U | 4/2021 |
| CN | 113634770 | A | 11/2021 |
| CN | 214774026 | | 11/2021 |
| DE | 4300478 | C1 | 8/1994 |
| DE | 4300478 | C1 | 8/1994 |
| DE | 19649865 | C1 | 2/1998 |
| DE | 19939616 | A1 | 3/2001 |
| DE | 19939616 | A1 | 3/2001 |
| DE | 102004061836 | A1 | 7/2006 |
| DE | 102004061836 | A1 | 7/2006 |
| DE | 102007029142 | A1 | 1/2009 |
| DE | 102007029142 | A1 | 1/2009 |
| DE | 102004057866 | B4 | 6/2010 |
| DE | 102004057866 | B4 | 6/2010 |
| DE | 102008051478 | A1 | 6/2010 |
| DE | 102009015130 | A1 | 10/2010 |
| DE | 102009015130 | A1 | 10/2010 |
| DE | 102009036153 | A1 | 2/2011 |

(56) References Cited

FOREIGN PATENT DOCUMENTS

| | | |
|---|---|---|
| DE | 102009036153 A1 | 2/2011 |
| DE | 102009043317 A1 | 3/2011 |
| DE | 102009051479 A1 | 5/2011 |
| DE | 102010048335 A1 | 4/2012 |
| DE | 102010048335 A1 | 4/2012 |
| DE | 102011112581 A1 | 3/2013 |
| DE | 102011112581 A1 | 3/2013 |
| DE | 202013009787 U1 | 12/2013 |
| DE | 202013009787 U1 | 12/2013 |
| DE | 102013208651 A1 | 11/2014 |
| DE | 102013208651 A1 | 11/2014 |
| DE | 102013223411 A1 | 5/2015 |
| DE | 102013223411 A1 | 5/2015 |
| DE | 102014000022 A1 | 7/2015 |
| DE | 102014000022 A1 | 7/2015 |
| DE | 102014204528 A1 | 9/2015 |
| DE | 102014204528 A1 | 9/2015 |
| DE | 102014010932 A1 | 1/2016 |
| DE | 102014010932 A1 | 1/2016 |
| DE | 102015005780 A1 | 12/2016 |
| DE | 102015005780 A1 | 12/2016 |
| DE | 102015211538 A1 | 12/2016 |
| DE | 102016225124 | 6/2017 |
| DE | 102016013041 | 5/2018 |
| EP | 0296818 B1 | 4/1993 |
| EP | 0296818 B1 | 4/1993 |
| EP | 0690780 A1 | 1/1996 |
| EP | 0861927 A1 | 9/1998 |
| EP | 1151849 A1 | 11/2001 |
| EP | 1348781 A1 | 10/2003 |
| EP | 1424158 A1 | 6/2004 |
| EP | 1466718 A2 | 10/2004 |
| EP | 1466718 A2 | 10/2004 |
| EP | 1775104 A1 | 4/2007 |
| EP | 1793979 A2 | 6/2007 |
| EP | 1622086 B1 | 9/2008 |
| EP | 1622086 B1 | 9/2008 |
| EP | 1992709 A1 | 11/2008 |
| EP | 1992709 A1 | 11/2008 |
| EP | 2277687 A1 | 1/2011 |
| EP | 2277687 A1 | 1/2011 |
| EP | 2335848 A1 | 6/2011 |
| EP | 2361704 A1 | 8/2011 |
| EP | 2361704 A1 | 8/2011 |
| EP | 2515282 | 10/2012 |
| EP | 2522446 A1 | 11/2012 |
| EP | 2522446 A1 | 11/2012 |
| EP | 2583773 A2 | 4/2013 |
| EP | 2583773 A2 | 4/2013 |
| EP | 2620241 A1 | 7/2013 |
| EP | 2620241 A1 | 7/2013 |
| EP | 2774703 A1 | 9/2014 |
| EP | 2789413 A1 | 10/2014 |
| EP | 2789413 A1 | 10/2014 |
| EP | 2832473 A1 | 2/2015 |
| EP | 2832473 A1 | 2/2015 |
| EP | 2832474 A1 | 2/2015 |
| EP | 2832474 A1 | 2/2015 |
| EP | 2873751 A1 | 5/2015 |
| EP | 2873751 A1 | 5/2015 |
| EP | 2992942 A1 | 3/2016 |
| EP | 2992942 A1 | 3/2016 |
| EP | 3127635 A1 | 2/2017 |
| EP | 3127635 A1 | 2/2017 |
| EP | 3165303 A1 | 5/2017 |
| EP | 3165303 A1 | 5/2017 |
| EP | 3170593 A1 | 5/2017 |
| EP | 3208077 A1 | 8/2017 |
| EP | 3208077 A1 | 8/2017 |
| EP | 3263316 A1 | 1/2018 |
| EP | 3263316 A1 | 1/2018 |
| EP | 3428585 | 1/2019 |
| EP | 3263316 B1 | 2/2019 |
| EP | 3263316 B1 | 2/2019 |
| EP | 3441213 A1 | 2/2019 |
| EP | 3237177 | 5/2019 |
| EP | 2992942 | 6/2019 |
| EP | 3650204 A1 | 5/2020 |
| EP | 3822001 | 5/2021 |
| EP | 3939738 | 1/2022 |
| GB | 1018656 A | 1/1966 |
| GB | 1018656 A | 1/1966 |
| GB | 2515287 A | 12/2014 |
| GB | 2515287 A | 12/2014 |
| JP | S6237109 A | 2/1987 |
| JP | S6261617 | 3/1987 |
| JP | H06503764 A | 4/1994 |
| JP | 2001009921 A | 1/2001 |
| JP | 2001009921 A | 1/2001 |
| JP | 2001277368 A | 10/2001 |
| JP | 2001334581 A | 12/2001 |
| JP | 2003502184 A | 1/2003 |
| JP | 2003502184 A | 1/2003 |
| JP | 2003245981 A | 9/2003 |
| JP | 2003245981 A | 9/2003 |
| JP | 2004143581 A | 5/2004 |
| JP | 2004143581 A | 5/2004 |
| JP | 2005335203 A | 12/2005 |
| JP | 2006150977 A | 6/2006 |
| JP | 2006150977 A | 6/2006 |
| JP | 2007111989 A | 5/2007 |
| JP | 2007536130 A | 12/2007 |
| JP | 2008291318 A | 12/2008 |
| JP | 2008291318 A | 12/2008 |
| JP | 2008302607 A | 12/2008 |
| JP | 2008302607 A | 12/2008 |
| JP | 2009001900 A | 1/2009 |
| JP | 2009001900 A | 1/2009 |
| JP | 2009512579 A | 3/2009 |
| JP | 2009512579 A | 3/2009 |
| JP | 2012502178 A | 1/2012 |
| JP | 2012502178 A | 1/2012 |
| JP | 2012213971 A | 11/2012 |
| JP | 2012213971 A | 11/2012 |
| JP | 2014227587 A | 12/2014 |
| JP | 2014227587 A | 12/2014 |
| JP | 2016502603 A | 1/2016 |
| JP | 2016540109 A | 12/2016 |
| JP | 2017137563 A | 8/2017 |
| JP | 2017137563 A | 8/2017 |
| KR | 20160059726 A | 5/2016 |
| KR | 20160059726 A | 5/2016 |
| KR | 20160076708 A | 7/2016 |
| KR | 20160076708 A | 7/2016 |
| KR | 20180043855 | 4/2018 |
| KR | 20180098741 A | 9/2018 |
| KR | 20190028366 | 3/2019 |
| KR | 102032888 | 10/2019 |
| KR | 20200028935 | 3/2020 |
| NO | 317085 B1 | 8/2004 |
| NO | 317085 B1 | 8/2004 |
| RU | 2524467 | 7/2014 |
| SE | 524467 C2 | 8/2004 |
| SE | 524467 C2 | 8/2004 |
| TW | 201634234 | 10/2016 |
| WO | 9208592 A1 | 5/1992 |
| WO | WO-9208592 A1 | 5/1992 |
| WO | 9511100 A1 | 4/1995 |
| WO | WO-9511100 A1 | 4/1995 |
| WO | WO-9511101 A1 | 4/1995 |
| WO | 9529387 | 11/1995 |
| WO | 9711837 A1 | 4/1997 |
| WO | WO-9711837 A1 | 4/1997 |
| WO | 9828124 A2 | 7/1998 |
| WO | WO-9828124 A2 | 7/1998 |
| WO | 9933641 A1 | 7/1999 |
| WO | WO-9933641 A1 | 7/1999 |
| WO | 0102160 A1 | 1/2001 |
| WO | WO-0102160 A1 | 1/2001 |
| WO | 0177988 A2 | 10/2001 |
| WO | WO-0177988 A2 | 10/2001 |
| WO | 2004005014 A2 | 1/2004 |
| WO | 2004037469 A1 | 5/2004 |
| WO | WO-2004037469 A1 | 5/2004 |

(56) References Cited

FOREIGN PATENT DOCUMENTS

| | | |
|---|---|---|
| WO | WO-2004039531 A2 | 5/2004 |
| WO | WO-2005099635 A1 | 10/2005 |
| WO | 2006066939 A1 | 6/2006 |
| WO | WO-2006066939 A1 | 6/2006 |
| WO | 2008028443 A2 | 3/2008 |
| WO | WO-2008028443 A2 | 3/2008 |
| WO | 2008049384 A1 | 5/2008 |
| WO | WO-2008049384 A1 | 5/2008 |
| WO | 2008064620 A1 | 6/2008 |
| WO | 2008067496 A2 | 6/2008 |
| WO | 2008074287 A1 | 6/2008 |
| WO | WO-2008064620 A1 | 6/2008 |
| WO | WO-2008067496 A2 | 6/2008 |
| WO | WO-2008074287 A1 | 6/2008 |
| WO | 2008096105 A1 | 8/2008 |
| WO | WO-2008096105 A1 | 8/2008 |
| WO | 2008128502 A2 | 10/2008 |
| WO | WO-2008128502 A2 | 10/2008 |
| WO | 2009015619 A2 | 2/2009 |
| WO | WO-2009015619 A2 | 2/2009 |
| WO | 2009096750 A2 | 8/2009 |
| WO | WO-2009096750 A2 | 8/2009 |
| WO | 2010026396 A2 | 3/2010 |
| WO | WO-2010026396 A2 | 3/2010 |
| WO | WO-2010027317 A1 | 3/2010 |
| WO | 2010099036 A1 | 9/2010 |
| WO | 2010115588 A2 | 10/2010 |
| WO | WO-2010115588 A2 | 10/2010 |
| WO | WO-2011020912 A2 | 2/2011 |
| WO | WO-2011036087 A1 | 3/2011 |
| WO | WO-2011066989 A1 | 6/2011 |
| WO | 2013092997 A1 | 6/2013 |
| WO | WO-2013092997 A1 | 6/2013 |
| WO | WO-2013113372 A1 | 8/2013 |
| WO | 2013160188 A1 | 10/2013 |
| WO | WO-2013160188 A1 | 10/2013 |
| WO | 2013167903 A1 | 11/2013 |
| WO | WO-2013167903 A1 | 11/2013 |
| WO | 2013178825 A2 | 12/2013 |
| WO | 2013179017 A1 | 12/2013 |
| WO | 2013189473 A1 | 12/2013 |
| WO | WO-2013178825 A2 | 12/2013 |
| WO | WO-2013179017 A1 | 12/2013 |
| WO | WO-2013189473 A1 | 12/2013 |
| WO | 2014023657 A1 | 2/2014 |
| WO | WO-2014023657 A1 | 2/2014 |
| WO | 2014042970 A1 | 3/2014 |
| WO | 2014044589 A1 | 3/2014 |
| WO | WO-2014042970 A1 | 3/2014 |
| WO | WO-2014044589 A1 | 3/2014 |
| WO | 2014049159 A1 | 4/2014 |
| WO | WO-2014049159 A1 | 4/2014 |
| WO | 2014083292 A1 | 6/2014 |
| WO | WO-2014083292 A1 | 6/2014 |
| WO | 2014118783 A1 | 8/2014 |
| WO | 2014120991 A1 | 8/2014 |
| WO | WO-2014118783 A1 | 8/2014 |
| WO | WO-2014120991 A1 | 8/2014 |
| WO | 2014135136 A1 | 9/2014 |
| WO | 2014138386 A1 | 9/2014 |
| WO | 2014144255 A2 | 9/2014 |
| WO | 2014144360 A2 | 9/2014 |
| WO | 2014144482 A1 | 9/2014 |
| WO | 2014144630 A1 | 9/2014 |
| WO | WO-2014135136 A1 | 9/2014 |
| WO | WO-2014144255 A2 | 9/2014 |
| WO | WO-2014144360 A2 | 9/2014 |
| WO | WO-2014144482 A1 | 9/2014 |
| WO | WO-2014144630 A1 | 9/2014 |
| WO | 2014176536 A1 | 10/2014 |
| WO | 2014193406 A1 | 12/2014 |
| WO | WO-2014193406 A1 | 12/2014 |
| WO | 2015020939 | 2/2015 |
| WO | 2015023612 A2 | 2/2015 |
| WO | 2015025171 A2 | 2/2015 |
| WO | WO-2015020939 A1 | 2/2015 |
| WO | WO-2015023612 A2 | 2/2015 |
| WO | WO-2015025171 A2 | 2/2015 |
| WO | 2015034362 A1 | 3/2015 |
| WO | 2015040433 A2 | 3/2015 |
| WO | WO-2015034362 A1 | 3/2015 |
| WO | WO-2015040433 A2 | 3/2015 |
| WO | 2015051915 A1 | 4/2015 |
| WO | 2015053946 A1 | 4/2015 |
| WO | WO-2015051915 A1 | 4/2015 |
| WO | WO-2015053946 A1 | 4/2015 |
| WO | WO-2015077077 A1 | 5/2015 |
| WO | 2015082677 A1 | 6/2015 |
| WO | 2015091813 | 6/2015 |
| WO | WO-2015082677 A1 | 6/2015 |
| WO | WO-2015106836 A1 | 7/2015 |
| WO | 2015151865 A1 | 10/2015 |
| WO | WO-2015151865 A1 | 10/2015 |
| WO | 2015173355 | 11/2015 |
| WO | 2015176709 A1 | 11/2015 |
| WO | WO-2015176709 A1 | 11/2015 |
| WO | 2015183796 A1 | 12/2015 |
| WO | 2015196149 A1 | 12/2015 |
| WO | WO-2015196149 A1 | 12/2015 |
| WO | 2016026852 A1 | 2/2016 |
| WO | 2016026853 A1 | 2/2016 |
| WO | WO-2016022336 A2 | 2/2016 |
| WO | WO-2016026852 A1 | 2/2016 |
| WO | WO-2016026853 A1 | 2/2016 |
| WO | WO-2016049621 A1 | 3/2016 |
| WO | 2016055523 A1 | 4/2016 |
| WO | WO-2016055523 A1 | 4/2016 |
| WO | 2016075025 A1 | 5/2016 |
| WO | 2016075026 A1 | 5/2016 |
| WO | 2016077250 A1 | 5/2016 |
| WO | 2016079494 A2 | 5/2016 |
| WO | WO-2016075025 A1 | 5/2016 |
| WO | WO-2016075026 A1 | 5/2016 |
| WO | WO-2016077250 A1 | 5/2016 |
| WO | 2016094827 A1 | 6/2016 |
| WO | WO-2016094827 A1 | 6/2016 |
| WO | 2016113253 A1 | 7/2016 |
| WO | WO-2016113253 A1 | 7/2016 |
| WO | 2016169768 A1 | 10/2016 |
| WO | WO-2016169768 A1 | 10/2016 |
| WO | 2016196223 A1 | 12/2016 |
| WO | 2016196382 A1 | 12/2016 |
| WO | WO-2016196223 A1 | 12/2016 |
| WO | WO-2016196382 A1 | 12/2016 |
| WO | 2017011456 A1 | 1/2017 |
| WO | 2017015217 A2 | 1/2017 |
| WO | WO-2017011456 A1 | 1/2017 |
| WO | WO-2017015217 A2 | 1/2017 |
| WO | 2017039858 A1 | 3/2017 |
| WO | 2017040675 | 3/2017 |
| WO | WO-2017039858 A1 | 3/2017 |
| WO | 2017054842 A1 | 4/2017 |
| WO | WO-2017054842 A1 | 4/2017 |
| WO | 2017079091 A1 | 5/2017 |
| WO | WO-2017079091 A1 | 5/2017 |
| WO | 2017100695 A1 | 6/2017 |
| WO | WO-2017100695 A1 | 6/2017 |
| WO | 2017118569 A1 | 7/2017 |
| WO | WO-2017118569 A1 | 7/2017 |
| WO | WO-2017118806 A1 | 7/2017 |
| WO | 2017143077 A1 | 8/2017 |
| WO | WO-2017143077 A1 | 8/2017 |
| WO | 2017179001 A1 | 10/2017 |
| WO | WO-2017179001 A1 | 10/2017 |
| WO | WO-2017189982 A1 | 11/2017 |
| WO | WO-2017196344 A1 | 11/2017 |
| WO | WO-2017201120 A1 | 11/2017 |
| WO | 2018005439 A1 | 1/2018 |
| WO | WO-2018005439 | 1/2018 |
| WO | 2018064349 A1 | 4/2018 |
| WO | 2018075741 A1 | 4/2018 |
| WO | WO-2018064349 A1 | 4/2018 |
| WO | WO-2018075741 A1 | 4/2018 |
| WO | 2018106586 A1 | 6/2018 |

(56) References Cited

FOREIGN PATENT DOCUMENTS

| | | |
|---|---|---|
| WO | WO-2018106586 A1 | 6/2018 |
| WO | 2018128695 A2 | 7/2018 |
| WO | 2018129089 A1 | 7/2018 |
| WO | WO-2018128695 A2 | 7/2018 |
| WO | WO-2018129089 A1 | 7/2018 |
| WO | 2018160807 A1 | 9/2018 |
| WO | WO-2018160807 A1 | 9/2018 |
| WO | 2018183396 A1 | 10/2018 |
| WO | WO-2018183396 A1 | 10/2018 |
| WO | 2018202305 | 11/2018 |
| WO | 2018202307 | 11/2018 |
| WO | 2018231664 | 12/2018 |
| WO | 2019057523 | 3/2019 |
| WO | 2019076705 | 4/2019 |
| WO | WO-2019070644 A2 | 4/2019 |
| WO | 2019086231 | 5/2019 |
| WO | WO-2019090377 A1 * | 5/2019 |
| WO | 2019173000 A1 | 9/2019 |
| WO | WO-2019173000 | 9/2019 |
| WO | 2019195062 A1 | 10/2019 |
| WO | 2019205181 | 10/2019 |
| WO | WO-2019195062 A1 | 10/2019 |
| WO | WO-2019209310 A1 | 10/2019 |
| WO | 2019212520 | 11/2019 |
| WO | 2020006468 | 1/2020 |
| WO | WO-2020006468 A1 | 1/2020 |
| WO | 2020033124 A1 | 2/2020 |
| WO | WO-2020033124 A1 | 2/2020 |
| WO | 2020083531 | 4/2020 |
| WO | WO-2020072986 A1 | 4/2020 |
| WO | 2020146416 A2 | 7/2020 |
| WO | 2021021469 A1 | 2/2021 |
| WO | WO-2021021469 A1 | 2/2021 |
| WO | WO-2021061118 A1 | 4/2021 |
| WO | 2021092646 | 5/2021 |
| WO | 2021151938 | 8/2021 |

OTHER PUBLICATIONS

PCT International Search Report and Written Opinion, Application No. PCT/US2020/042596, dated Nov. 3, 2020.
International Search Report and Written Opinion for PCT/US2020/042596 dated Nov. 3, 2020.
Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.
Arcam EBM at Sirris Belgium. Uploaded Jun. 17, 2010. 2 pages. https://www.youtube.com/watch?v=nR7EtduqVYw&list=PLD7ckJoR_KR6ua0GOMIyJ1mpCKh342iLI.
Barriobero-Vila et al. Inducing Stable α + β Microstructures during Selective Laser Melting of Ti—6Al—4V Using Intensified Intrinsic Heat Treatments. Materials (Basel). vol. 10, No. 3, Mar. 2017, 14 pages.
Bremen et al. Selective Laser Melting. Laser Technik Journal. vol. 9, No. 2, Apr. 2012. 6 pages.
Co-pending U.S. Appl. No. 16/137,295, inventor Buller; Benyamin, filed Sep. 20, 2018.
Co-pending U.S. Appl. No. 16/248,665, inventor Buller; Benyamin, filed Jan. 15, 2019.
Co-pending U.S. Appl. No. 16/253,103, inventor Buller; Benyamin, filed Jan. 21, 2019.
Co-pending U.S. Appl. No. 16/291,759, inventors Buller; Benyamin et al., filed Mar. 4, 2019.
Co-pending U.S. Appl. No. 16/351,030, inventors Buller; Benyamin et al., filed Mar. 12, 2019.
Co-pending U.S. Appl. No. 16/450,853, inventors Buller; Benyamin et al., filed Jun. 24, 2019.
Co-pending U.S. Appl. No. 16/505,520, inventor Buller; Benyamin, filed Jul. 8, 2019.
Co-pending U.S. Appl. No. 16/550,088, inventors Buller; Benyamin et al., filed Aug. 23, 2019.
Co-pending U.S. Appl. No. 16/591,549, inventors Buller; Benyamin et al., filed Oct. 2, 2019.
Co-pending U.S. Appl. No. 16/653,933, inventors Buller; Benyamin et al., filed Oct. 15, 2019.
Co-pending U.S. Appl. No. 16/662,764, inventors Buller; Benyamin et al., filed Oct. 24, 2019.
Co-pending U.S. Appl. No. 16/686,045, inventors Lappas; Tasso et al., filed Nov. 15, 2019.
Co-pending U.S. Appl. No. 16/694,963, inventors Buller; Benyamin et al., filed Nov. 25, 2019.
Co-pending U.S. Appl. No. 16/709,887, inventors Buller; Benyamin et al., filed Dec. 10, 2019.
Co-pending U.S. Appl. No. 16/714,638, inventors Buller; Benyamin et al., filed Dec. 13, 2019.
Co-pending U.S. Appl. No. 16/783,490, inventors Buller; Benyamin et al., filed Feb. 6, 2020.
Co-pending U.S. Appl. No. 16/789,905, inventors Buller; Benyamin et al., filed Feb. 13, 2020.
Co-pending U.S. Appl. No. 16/820,459, inventors Buller; Benyamin et al., filed Mar. 16, 2020.
Co-pending U.S. Appl. No. 16/825,696, inventors Lappas; Tasso et al., filed Mar. 20, 2020.
Co-pending U.S. Appl. No. 16/841,161, inventors Buller; Benyamin et al., filed Apr. 6, 2020.
Co-pending U.S. Appl. No. 16/843,725, inventors Buller; Benyamin et al., filed Apr. 8, 2020.
Co-pending U.S. Appl. No. 16/872,714, inventors Buller; Benyamin et al., filed May 12, 2020.
Co-pending U.S. Appl. No. 16/876,608, filed May 18, 2020.
Co-pending U.S. Appl. No. 16/877,029, filed May 18, 2020.
Co-pending U.S. Appl. No. 16/883,262, inventors Buller; Benyamin et al., filed May 26, 2020.
Co-pending U.S. Appl. No. 16/917,927, inventors Buller; Benyamin et al., filed Jul. 1, 2020.
Co-pending U.S. Appl. No. 16/917,933, filed Jul. 1, 2020.
Co-pending U.S. Appl. No. 16/917,937, inventors Buller; Benyamin et al., filed Jul. 1, 2020.
Co-pending U.S. Appl. No. 16/933,188, inventors Christiansen; Daniel et al., filed Jul. 20, 2020.
Co-pending U.S. Appl. No. 16/939,847, inventors Buller; Benyamin et al., filed Jul. 27, 2020.
Co-pending U.S. Appl. No. 17/009,608, inventors Buller; Benyamin et al., filed Sep. 1, 2020.
Co-pending U.S. Appl. No. 17/011,950, inventors Buller; Benyamin et al., filed Sep. 3, 2020.
Co-pending U.S. Appl. No. 29/653,429, inventors Coulier; Pieter et al., filed Jun. 14, 2018.
EOS. Direct Metal Laser Sintering Published Aug. 22, 2012. https://www.youtube.com/watch?v=cRE-Pzl6uZA.
EP15809160.3 European Search Report dated Aug. 7, 2018.
EP15866668.5 European Search Report dated Aug. 7, 2018.
EP16862767.7 European Search Report dated Jun. 26, 2019.
EP16874003.3 Extended European Search Report dated Oct. 10, 2019.
EP17178143.8 Notice of Opposition dated Nov. 19, 2019.
EP18209400.3 European Search Report dated May 7, 2019.
European Search Report and Search Opinion dated Nov. 30, 2017 for European Patent Application No. EP17178143.8.
Ex Parte Quayle Action dated Apr. 19, 2017 for U.S. Appl. No. 15/374,821.
Extended European Search Report dated Jul. 7, 2017 for European Patent Application No. EP17156707.6.
Gibson, et al. Additive Manufacturing Technologies, Springer 2010, ISBN978-1-4419-1119-3 (Print 978-1-4419-1120-9 (Online). Published: Dec. 14, 2009. 472 pages. pp. 27-31, 98- 99, 264-267, 295, 382-383.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol; Aug. 15, 2015; vol. 33, No. 16, pp. 3419-3425.

(56) References Cited

OTHER PUBLICATIONS

International Search Report and Written Opinion dated Jan. 16, 2017 for International PCT Patent Application No. PCT/US2016/059781.
International Search Report and Written Opinion dated Feb. 12, 2018 for International PCT Patent Application No. PCT/US2017/057340.
International Search Report and Written Opinion dated Feb. 14, 2017 for International PCT Patent Application No. PCT/US2016/042818.
International Search Report and Written Opinion dated Feb. 19, 2016 for International PCT Patent Application No. PCT/US2015/059790.
International Search Report and Written Opinion dated Apr. 5, 2017 for International PCT Patent Application No. PCT/US2016/066000.
International search report and written opinion dated Apr. 11, 2016 for PCT/US2015/065297.
International Search Report and Written Opinion dated May 18, 2017 for International PCT Patent Application No. PCT/US2017/018191.
International Search Report and Written Opinion dated Aug. 30, 2017 for International PCT Patent Application No. PCT/US2017/039422.
International Search Report and Written Opinion dated Sep. 20, 2016 for International PCT Patent Application No. PCT/US2016/034454.
International search report and written opinion dated Sep. 20, 2016 for PCT/US2016/034454.
International Search Report and Written Opinion dated Oct. 18, 2016 for International PCT Patent Application No. PCT/US2016/041895.
International search report and written opinion dated Oct. 30, 2015 for PCT Application No. US2015/036802.
International search report and written opinion dated Sep. 13, 2016 for PCT Application No. US-2016034857.
IUPAC. "Inert gas". IUPAC Compendium of Chemical Terminology. Published Feb. 24, 2014. http://goldbook.iupac.org/html/l/103027.html.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).
Laser Engineered Net Shaping (Lens) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Moridi, et al. Cold spray coating: review of material systems and future perspectives. Surface engineering. Jun. 2014; 36(6):36*-395.
Mumatz, et al. A Method to Eliminate Anchors/Supports from Directly Laser Melted Metal Powder Bed Processes. Aug. 2011, Additive Manufacturing Research Group, Wolfson School of Mechanical Engineering, Loughborough University, pp. 55-64.
NETFABB-Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of Allowability dated Oct. 17, 2017 for U.S. Appl. No. 14/744,910.
Notice of allowance dated Jan. 5, 2017 for U.S. Appl. No. 15/085,884.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of Allowance dated Aug. 7, 2017 for U.S. Appl. No. 14/744,910.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 8, 2017 for U.S. Appl. No. 15/435,128.
Notice of Allowance dated Dec. 9, 2016 for U.S. Appl. No. 15/188,939.
Notice of Allowance dated Dec. 11, 2017 for U.S. Appl. No. 15/435,120.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office Action dated Jan. 2, 2018 for U.S. Appl. No. 15/288,251.
Office action dated Jan. 7, 2016 for U.S. Appl. No. 14/744,859.
Office action dated Jan. 11, 2016 for U.S. Appl. No. 14/745,032.
Office Action dated Jan. 24, 2018 for U.S. Appl. No. 15/615,004.
Office Action dated Jan. 25, 2018 for U.S. Appl. No. 15/634,727.
Office Action dated Feb. 7, 2017 for U.S. Appl. No. 14/744,988.
Office Action dated Feb. 7, 2018 for U.S. Appl. No. 15/614,979.
Office Action dated Feb. 7, 2018 for U.S. Appl. No. 15/719,229.
Office Action dated Feb. 8, 2017 for U.S. Appl. No. 14/744,859.
Office action dated Feb. 10, 2016 for U.S. Appl. No. 14/744,910.
Office Action dated Feb. 14, 2018 for U.S. Appl. No. 15/634,228.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office Action dated Mar. 7, 2017 for U.S. Appl. No. 15/399,712.
Office Action dated Mar. 7, 2018 for U.S. Appl. No. 15/399,186.
Office action dated Mar. 10, 2016 for U.S. Appl. No. 14/744,675.
Office Action dated Mar. 23, 2017 for U.S. Appl. No. 15/399,186.
Office Action dated Apr. 28, 2017 for U.S. Appl. No. 15/374,616.
Office Action dated Jun. 15, 2017 for U.S. Appl. No. 15/288,251.
Office action dated Jun. 29, 2016 for U.S. Appl. No. 14/744,859.
Office Action dated Jun. 29, 2017 for U.S. Appl. No. 15/435,128.
Office action dated Jul. 1, 2016 for U.S. Appl. No. 14/745,032.
Office Action dated Jul. 3, 2017 for U.S. Appl. No. 15/435,120.
Office action dated Jul. 19, 2016 for U.S. Appl. No. 15/085,884.
Office action dated Jul. 21, 2016 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office action dated Aug. 25, 2016 for U.S. Appl. No. 14/744,988.
Office Action dated Aug. 25, 2017 for U.S. Appl. No. 15/339,712.
Office action dated Sep. 10, 2015 for U.S. Appl. No. 14/744,675.
Office Action dated Sep. 11, 2017 for U.S. Appl. No. 15/374,821.
Office action dated Sep. 13, 2016 for U.S. Appl. No. 15/188,939.

(56) References Cited

OTHER PUBLICATIONS

Office Action dated Sep. 15, 2017 for U.S. Appl. No. 15/374,616.
Office Action dated Sep. 18, 2017 for U.S. Appl. No. 15/634,228.
Office action dated Oct. 2, 2015 for U.S. Appl. No. 14/744,955.
Office Action dated Oct. 19, 2017 for U.S. Appl. No. 15/399,186.
Office action dated Nov. 1, 2016 for U.S. Appl. No. 15/085,884.
Office action dated Nov. 12, 2015 for U.S. Appl. No. 14/745,108.
Office Action dated Nov. 16, 2017 for U.S. Appl. No. 15/634,267.
Office action dated Nov. 18, 2016 for U.S. Appl. No. 15/188,939.
Office Action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. Lens 850R 3D Printer for Structural Metals. Optomec. YouTube—Web. Published on Jun. 3, 2012. 3 pages. URL: https://www.youtube.com/watch?v=mkUVURLkxS4.
PCT/US2017/060035 International Search Report and Written Opinion dated Jul. 20, 2018.
PCT/US2017/064474 International Search Report and Written Opinion dated Apr. 30, 2018.
PCT/US2018/012250 International Search Report and Written Opinion dated Apr. 30, 2018.
PCT/US2018/020406 International Search Report and Written Opinion dated Jun. 28, 2018.
PCT/US2018/024667 International Search Report and Written Opinion dated Jul. 17, 2018.
PCT/US2019/014635 International Search Report and Written Opinion dated May 13, 2019.
PCT/US2019/024402 International Search Report and Written Opinion dated Aug. 6, 2019.
PCT/US2019/042637 International Search Report dated Nov. 6, 2019.
PCT/US2019/054837 International Search Report dated Jan. 23, 2020.
PCT/US2020/012616 Search Report & Written Opinion dated Jun. 30, 2020.
Rhinehart, R.R. §2.13 Control Theory: Mode-Based Control, in Bela G. Liptak, Instrument Engineers' Handbook, vol. 2: Process Control and Optimization, 209-213. CRC Press; 4 edition (Sep. 29, 2005). ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Sandvik Materials Technology website. Accessed Nov. 14, 2014. http://www.smt.sandvik.com/en/products/metal-powder/additive-manufacturing/.
Selective Laser Sintering (SLS) Process at Loughborough University. Published May 4, 2015. 2 pages. https://www.youtube.com/watch?v=0077VKDB891.
Sloan, Jeff. Tidal turbine blade toughened for turbulent sea salt. Jan. 16, 2013, obtained from https://web.archive.org/web/20130116115034/https://www.compositesworld.com/articles/tidal-turbine-blade-toughened-for-turbulent-salt-sea (Year: 2013).
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
U.S. Appl. No. 14/493,454 Office Action dated Mar. 16, 2020.
U.S. Appl. No. 15/808,777 dated Feb. 6, 2020.
Wilkes, et al. Emerald Article: Additive manufacturing of ZrO2—Al2O3 ceramic components by selective laser melting. Rapid Prototyping Journal, vol. 19, Issue 1, Aug. 7, 2012.
3D Printers. 3D Systems. https://www.3dsystems.com/3d-printers. Web page cached Jun. 23, 2013. 7 pages.
Concept Laser M2 Series 5. GE Additive. https://www.ge.com/additive/additive-manufacturing/machines/m2series5. Web page first crawled by Wayback Machine (https://archive.org/web/) May 29, 2020. Related press release published Nov. 19, 2019 at https://www.ge.com/additive/press-releases/ge-additive-unveils-new-concept-laser-m2-series-5. 10 pages.
Co-pending U.S. Appl. No. 16/431,232, inventor Buller; Benyamin, filed Jun. 4, 2019.
Co-pending U.S. Appl. No. 16/439,614, inventors Milshtein; Erel et al., filed Jun. 12, 2019.
Co-pending U.S. Appl. No. 16/506,911, inventor Romano; Richard Joseph, filed Jul. 9, 2019.
Co-pending U.S. Appl. No. 16/516,148, inventors Symeonidis; Kimon et al., filed Jul. 18, 2019.
Co-pending U.S. Appl. No. 16/557,965, inventors Symeonidis; Kimon et al., filed Aug. 30, 2019.
Co-pending U.S. Appl. No. 16/578,190, inventors Milshtein; Erel et al., filed Sep. 20, 2019.
Co-pending U.S. Appl. No. 16/586,849, inventor Buller; Benyamin, filed Sep. 27, 2019.
Co-pending U.S. Appl. No. 16/657,980, inventors Elgar; Yacov et al., filed Oct. 18, 2019.
Co-pending U.S. Appl. No. 16/662,933, inventors Romano; Richard Joseph et al., filed Oct. 24, 2019.
Co-pending U.S. Appl. No. 16/696,094, inventors Symeonidis; Kimon et al., filed Nov. 26, 2019.
Co-pending U.S. Appl. No. 16/716,414, inventors Buller; Benyamin et al., filed Dec. 16, 2019.
Co-pending U.S. Appl. No. 16/721,294, inventors Symeonidis; Kimon et al., filed Dec. 19, 2019.
Co-pending U.S. Appl. No. 16/749,430, inventors Milshtein; Erel et al., filed Jan. 22, 2020.
Co-pending U.S. Appl. No. 16/784,175, inventors Elgar; Yacov et al., filed Feb. 6, 2020.
Co-pending U.S. Appl. No. 16/790,129, inventors Romano; Richard Joseph et al., filed Feb. 13, 2020.
Co-pending U.S. Appl. No. 16/793,257, inventor Buller; Benyamin, filed Feb. 18, 2020.
Co-pending U.S. Appl. No. 16/820,493, inventors Symeonidis; Kimon et al., filed Mar. 16, 2020.
Co-pending U.S. Appl. No. 17/695,092, inventors Elgar; Yakov et al., filed Mar. 15, 2022.
Co-pending U.S. Appl. No. 17/699,544, inventors Buller; Benyamin et al., filed Mar. 21, 2022.
Co-pending U.S. Appl. No. 17/849,866, inventors Buller; Benyamin et al., filed Jun. 27, 2022.
Co-pending U.S. Appl. No. 17/861,015, inventors Buller; Benyamin et al., filed Jul. 8, 2022.
Co-pending U.S. Appl. No. 17/887,394, inventors Coulier; Pieter et al., filed Aug. 12, 2022.
Definition of Active. Merriam-Webster. Published Nov. 3, 2017. Accessed Aug. 16, 2022 at URL: https://www.merriam-webster.com/dictionary/active. 9 pages.
Definition of Passive. Merriam-Webster. First viewed Aug. 16, 2022 at URL: https://www.merriam-webster.com/dictionary/passive?pronunciation&lang=en_us&dir=p&file=passiv03. 9 pages.
DMP Factory 350 and DMP Factory 350 Dual. 3D Systems. https://www.3dsystems.com/3d-printers/dmp-factory-350. Web page cached Nov. 13, 2018. 13 pages.
EP21185947.5 Extended European Search Report dated Jan. 21, 2022.
Flashforge Adventurer 3C FDM 3D Printer. https://www.flashforgeshop.com/product/flashforge-adventurer-3c-3d-printer?cID=31. Webpage https://www.flashforgeshop.com/cached Nov. 8, 2019. 13 pages.
Glowforge 3D Laser Printer. Glowforge. https://glowforge.com/products. Sub-page first cached May 15, 2019. 17 pages.
Meiners. Direktes Selektives Laser Sintemn einkomponentiger metallischer Werkstoffe. Dissertation. 133 pages (1999). With English translation.
Patent Cooperation Treaty PCT Third Party Observation, PCT Administrative Instructions Part 8. Application No. PCT/US2020/042596. Submitted Nov. 19, 2021. 7 pages.
PCT/US2020/042596 Search Report & Written Opinion dated Nov. 3, 2020.
RenAM 500 metal additive manufacturing (3D printing) systems. Renishaw. https://www.renishaw.com/en/renam-500-metal-additive-manufacturing-3d-printing-systems--37011. Web page first cached Nov. 17, 2021. 10 pages.

(56) References Cited

OTHER PUBLICATIONS

SLM®280 2.0. SLM Solutions. https://www.slm-solutions.com/products-and-solutions/machines/slm-280/. First cached Nov. 14, 2016. 7 pages.
Third Party Observations concerning the International Patent Application PCT/US2020/042596, published as WO 2021/021469A1. Submitted Nov. 19, 2021. 20 pages.
U.S. Appl. No. 15/909,783 Notice of Allowance dated Oct. 26, 2020.
U.S. Appl. No. 16/245,183 Office Action dated Jan. 6, 2021.
U.S. Appl. No. 29/653,429 Office Action dated Apr. 9, 2021.
U.S. Appl. No. 29/653,429 Office Action dated Dec. 15, 2021.
U.S. Appl. No. 29/653,429 Office Action dated Jun. 9, 2022.
Bugatti Chiron Titanium brake caliper 3D printed on SLM Solutions. Video. Multistation Digital Manufacturing. https://www.youtube.com/watch?v=SRA5CFLYKUQ. Feb. 8, 2018. 3 pages.
Co-pending U.S. Appl. No. 17/988,912, inventors Buller; Benyamin et al., filed Nov. 17, 2022.
Definition of "for". Merriam-Webster. Retrieved Aug. 25, 2022 at URL: https://www.merriam-webster.com/dictionary/for. 22 pages.
EP19869567.8 Extended European Search Report dated May 23, 2022.
Fit AG & SLM Solutions (German). Video. SLM Solutions Group AG. https://www.youtube.com/watch?v=xOoRL_IHfcg. Nov. 16, 2016. With English translation of transcript. 10 pages.
Free Float. Website. SLM Solutions. https://freefloat.sim-solutions.com/. Jun. 23, 2021.10 pages.
Mani et al. NISTIR 8036. Measurement Science Needs for Real-time Control of Additive Manufacturing Powder Bed Fusion Processes. National Institute of Standards and Technology (NIST), Feb. 2015. 50 pages. Retrieved Mar. 20, 2023 at URL: http://nvlpubs.nist.gov/nistpubs/ir/2015/NIST.IR.8036.pdf.
PCT/US2019/042637 International Search Report and Written Opinion dated Nov. 6, 2019.
SLM NXG XII 600. Website. SLM Solutions. https://www.slm-pushing-the-limits.com/. Oct. 15, 2020. 59 pages.
SLM Solutions NXG XII 600 Digital Launch. Video. SLM Solutions Group AG. https://www.youtube.com/watch?v=cPckZZTO1fc. Mar. 11, 2021. 12 pages.
SLM®—Selective Laser Melting Technology—The Elements (english). Video. SLM Solutions Group AG. https://www.youtube.com/watch?v=R5WCyafMPLs. Nov. 23, 2017. 5 pages.
Bansal et al. Experimental and Theoretical Analysis of Scanning Laser Epitaxy Applied to Nickel-Based Superalloys. Woodruff School of Mechanical Engineering, Georgia Institute of Technology Atlanta, GA. 2011 International Solid Freeform Fabrication Symposium (2011). 8 pages. Retrieved at URL: https://repositories.lib.utexas.edu/bitstream/handle/2152/88372/2011-38-Bansal.pdf?sequence=2&isAllowed=y.
Baufeld et al. Additive manufacturing of Ti—6Al—4V components by shaped metal deposition: Microstructure and mechanical properties. Materials and Design 31 (2010) S106-S111. Available online Nov. 20, 2009.
Baufeld et al. Wire based additive layer manufacturing: Comparison of microstructure and mechanical properties of Ti—6Al—4V components fabricated by laser-beam deposition and shaped metal deposition. Journal of Materials Processing Technology 211 (2011) 1146-1158. Available online Feb. 1, 2011.
Brenne et al. Additively manufactured cellular structures: Impact of microstructure and local strains on the monotonic and cyclic behavior under uniaxial and bending load. Journal of Materials Processing Technology 213 (2013) 1558-1564. Available online Mar. 21, 2013.
Campbell. Complete Casting Handbook, vol. 2, pp. 1013-1023 (2011).
Cheng et al. Multi-objective optimization of part-building orientation in stereolithography. Rapid Prototyping Journal, vol. 1, No. 4, pp. 12-23 (1995).
EP19824678.7 Extended European Search Report dated Feb. 28, 2022.
EP19847082.5 Extended European Search Report dated Apr. 5, 2022.
EP20846570.8 Partial Supplementary European Search Report dated Jul. 6, 2023.
EP23157096.1 Extended European Search Report dated Jun. 19, 2023.
Extended European Search Report, EP13194232.8, SLM Solutions GmbH, dated Mar. 17, 2014.
Gorny et al. In situ characterization of the deformation and failure behavior of non-stochastic porous structures processed by selective laser melting. Materials Science and Engineering A 528 (2011) 7962-7967. Available online Jul. 22, 2011.
Hunt. Steady state columnar and equiaxed growth of dendrites and eutectic. Materials Science and Engineering, vol. 65, pp. 75-83 (1984).
Ilschner et al. Werkstoffwissenschaften und Fertigungstechnik, Springer Verlag, 2010. With English machine translation.
International Search Report and Written Opinion , PCT/EP2013/053946, SLM Solutions GmbH, dated Nov. 18, 2013.
International Search Report and Written Opinion dated Jan. 9, 2018 for International PCT Patent Application No. PCT/2017/054043.
Kanagarajah et al. Inconel 939 processed by selective laser melting: Effect of microstructure and temperature on the mechanical properties under static and cyclic loading. Materials Science & Engineering A 588 (2013) 188-195. Available online Sep. 14, 2013.
Leuders et al. On the mechanical behaviour of titanium alloy TiAl6V4 manufactured by selective laser melting: Fatigue resistance and crack growth performance. International Journal of Fatigue 48 (2013) 300-307. Available online Nov. 29, 2012.
Levy et al. Rapid Manufacturing and Rapid Tooling with Layer Manufacturing (LM) Technologies, State of the Art and Future Perspectives. CIRP Annals, vol. 52, Issue 2, pp. 589-609 (2003).
Liu et al. The effect of laser scanning path on microstructures and mechanical properties of laser solid formed nickel-base superalloy Inconel 718. Journal of Alloys and Compounds 509 (2011) 4505-4509. Available online Dec. 3, 2010.
Murr et al. Characterization of titanium aluminide alloy components fabricated by additive manufacturing using electron beam melting. Acta Materialia 58 (2010) 1887-1894. Available online Dec. 21, 2009.
Murr et al. Metal Fabrication by Additive Manufacturing Using Laser and Electron Beam Melting Technologies. J. Mater. Sci. Technol., 2012, 28(1), 1-14.
Niendorf et al. Functionally Graded Alloys Obtained by Additive Manufacturing. Advanced Engineering Materials, vol. 16, No. 7, pp. 857-861 (2014).
Niendorf et al. Highly Anisotropic Steel Processed by Selective Laser Melting. Metall and Materi Trans B (2013) 44:794-796. Article published online May 29, 2013.
Niendorf et al. Labelling additively manufactured parts by microstructural gradation—advanced copy-proof design. Rapid Prototyping Journal, vol. 22 No. 4, pp. 630-635 (Jun. 20, 2016).
Niendorf et al. Lattice Structures Manufactured by SLM: On the Effect of Geometrical Dimensions on Microstructure Evolution During Processing. Metallurgical and Materials Transactions B, vol. 45B, pp. 1181-1185 (Aug. 2014).
Niendorf et al. Monitoring the fatigue-induced damage evolution in ultrafine-grained interstitial-free steel utilizing digital image correlation. Materials Science and Engineering A 517 (2009) 225-234.
Niendorf et al. Steel showing twinning-induced plasticity processed by selective laser melting—An additively manufactured high performance material. Material Characterization 85 (2013) 57-63.
Niendorf et al. The Deformation Behavior of Functionally Graded TWIP Steel under Monotonic Loading at Ambient Temperature. Mater. Res. Lett. 2013, vol. 1, No. 2, 96-101. Published online Mar. 19, 2013.
Notification of Reasons for Refusal, JP2015-559427, dated Aug. 23, 2016. With machine translation.
Notification of the Second Office Action, CN201380073909.3, dated Sep. 19, 2016. With machine translation.
Over. Generative Fertigung von Bauteilen aus Werkzeugstahl X38CrMoV5-1 und Titan TiAl6V4 mit "Selective Laser Melting". Dissertation. 2003. 151 pages. With machine translation.

(56) References Cited

OTHER PUBLICATIONS

PCT/US2022/052902 International Search Report and Written Opinion dated Apr. 28, 2023.
Rehme. Cellular Design for Laser Freeform Fabrication. PhD Thesis. Hamburg University of Technology, CuvillierVerlag, Goettingen, 2010. 303 pages.
Riemer et al. On the fatigue crack growth behavior in 316L stainless steel manufactured by selective laser melting. Engineering Fracture Mechanics 120 (2014) 15-25.
State Intellectual Property Office of P.R. China , First Office Action , CN201380073909.3 , dated Mar. 28, 2016. With machine translation.
Thijs et al. Fine-structured aluminium products with controllable texture by selective laser melting of pre-alloyed AlSi10Mg powder. Acta Materialia 61 (2013) 1809-1819. Available online Dec. 28, 2012.
Thijs et al. Strong morphological and crystallographic texture and resulting yield strength anisotropy in selective laser melted tantalum. Acta Materialia 61 (2013) 4657-4668. Available online May 9, 2013.
Yasa et al. Microstructural investigation of Selective Laser Melting 316L stainless steel parts exposed to laser re-melting. Procedia Engineering 19 (2011) 389-395.
U.S. Appl. No. 15/634,267 Office Action dated Apr. 3, 2018.
U.S. Appl. No. 15/634,267 Office Action dated Sep. 6, 2018.
U.S. Appl. No. 15/668,662 Office Action dated Oct. 1, 2020.
U.S. Appl. No. 15/719,084 Office Action dated Jul. 12, 2018.
U.S. Appl. No. 15/719,133 Office Action dated Mar. 28, 2018.
U.S. Appl. No. 15/808,434 Office Action dated Feb. 21, 2020.
U.S. Appl. No. 15/830,421 Office Action dated Jul. 26, 2018.
U.S. Appl. No. 15/855,744 Office Action dated Apr. 27, 2018.
U.S. Appl. No. 15/861,561 Office Action dated Jun. 16, 2020.
U.S. Appl. No. 15/886,544 Office Action dated May 14, 2020.
U.S. Appl. No. 15/886,544 Office Action dated Sep. 6, 2019.
U.S. Appl. No. 15/893,523 Notice of Allowance dated Jul. 25, 2018.
U.S. Appl. No. 15/893,523 Notice of Allowance dated Jun. 15, 2018.
U.S. Appl. No. 15/909,396 Office Action dated Aug. 22, 2019.
U.S. Appl. No. 15/909,396 Office Action dated Mar. 5, 2020.
U.S. Appl. No. 15/909,406 Notice of Allowance dated Apr. 4, 2019.
U.S. Appl. No. 15/909,783 Ex Parte Quayle dated Apr. 29, 2020.
U.S. Appl. No. 15/909,826 Notice of Allowance dated Aug. 30, 2018.
U.S. Appl. No. 15/937,812 Office Action dated Feb. 7, 2019.
U.S. Appl. No. 16/025,915 Office Action dated Nov. 2, 2020.
U.S. Appl. No. 16/030,795 Office Action dated Dec. 21, 2020.
U.S. Appl. No. 16/125,644 Office Action dated Mar. 13, 2020.
U.S. Appl. No. 16/177,090 Office Action dated Apr. 13, 2020.
U.S. Appl. No. 16/404,579 Office Action dated Oct. 16, 2020.
U.S. Appl. No. 16/419,912 Office Action dated Dec. 23, 2021.
U.S. Appl. No. 16/419,912 Office Action dated Jun. 22, 2022.
U.S. Appl. No. 16/419,912 Office Action dated Sep. 29, 2022.
U.S. Appl. No. 17/584,881 Office Action dated May 8, 2023.
U.S. Appl. No. 29/653,429 Office Action dated Oct. 7, 2020.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484, DOI 10.1007/s00170-012-4271-4. Published online: Jun. 16, 2012.
Wilkes, et al. Emerald Artide: Additive manufacturing of Zr02—Al203 ceramic components by selective laser melting. Rapid Prototyping Journal, vol. 19, Issue 1, Aug. 7, 2012. 13 pages.
Wohlfart, Michael. Can you Build a 100 mm Support-free Horizontal Disk? Linkedin. Web article. Published Mar. 11, 2019. 14 pages. URL: https://www.linkedin.com/pulse/can-you-build-100-mm-support-free-horizontal-disk- michael-wohlfart/>.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008.10 pages.
Xu et al. In situ tailoring microstructure in additively manufactured Ti—6Al—4V for superior mechanical performance. Acta Materialia. Volume 125, Feb. 15, 2017, pp. 390-400.
Yin. Accurately quantifying process-relevant powder properties for AMPM applications. Freeman Technology. May 2014. 39 pages.
Co-pending U.S. Appl. No. 16/917,927, inventors Buller; Benyamin et al., filed Jul. 1, 2020. 222 pages.
Co-pending U.S. Appl. No. 16/917,933, filed Jul. 1, 2020. 166 pages.
Co-pending U.S. Appl. No. 16/917,937, inventors Buller; Benyamin et al., filed Jul. 1, 2020. 210 pages.
Co-pending U.S. Appl. No. 16/933,188, inventors Christiansen; Daniel et al., filed Jul. 20, 2020. 202 pages.
Co-pending U.S. Appl. No. 16/939,847, inventors Buller; Benyamin et al., filed Jul. 27, 2020. 148 pages.
Co-pending U.S. Appl. No. 17/009,608, inventors Buller; Benyamin et al., filed Sep. 1, 2020. 155 pages.
Co-pending U.S. Appl. No. 17/011,950, inventors Buller; Benyamin et al., filed Sep. 3, 2020. 160 pages.
Co-pending U.S. Appl. No. 17/022,334, filed Sep. 16, 2020. 161 pages.
Co-pending U.S. Appl. No. 15/435,110, filed Feb. 16, 2017.
Co-pending U.S. Appl. No. 15/435,120, filed Feb. 16, 2017.
Co-pending U.S. Appl. No. 15/435,128, filed Feb. 16, 2017.
Co-pending U.S. Appl. No. 16/253,103, filed Jan. 21, 2019. 10 pages.
Co-pending U.S. Appl. No. 16/843,725, filed Apr. 8, 2020. 10 pages.
Co-pending U.S. Appl. No. 16/857,453, filed Apr. 24, 2020. 10 pages.
Co-pending U.S. Appl. No. 16/872,646, filed May 12, 2020. 9 pages.
Co-pending U.S. Appl. No. 17/020,714, filed Sep. 14, 2020. 8 pages.
Co-pending U.S. Appl. No. 16/917,927, filed Jul. 1, 2020. 10 pages.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer; 2008 edition (Nov. 26, 2007).561 pages. DOI: 10.1007/978-0-387-72344-0.
Das et al. Producing metal parts with selective laser sintering/hot isostatic pressing. JOM; Dec. 1998, vol. 50, Issue 12, pp. 17-20.
David et al. Welding: Solidification and microstructure. The Journal of The Minerals, Metals & Materials Society (TMS). Jun. 2003, vol. 55, Issue 6, pp. 14-20.
De Dietrich Process Systems, Inc. Powder Pump™. Product Brochure. Created Jul. 3, 2012. 2 pages.
Direct Manufacturing: ARCAM. Uploaded on Jun. 6, 2011. 2 pages, https://www.youtube.com/watch?v=M_qSnjKN7f8.
Doxygen. CGAL 4.11.1—Kinetic Data Structures. User Manual. Web. Published Apr. 8, 2006. 4 pages. URL:<https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA. 3 pages.
EP15809160.3 European Search Report dated Aug. 7, 2018. 11 pages.
EP15866668.5 European Search Report dated Aug. 7, 2018. 10 pages.
EP16862767.7 European Search Report dated Jun. 26, 2019. 9 pages.

(56) References Cited

OTHER PUBLICATIONS

EP16874003.3 Extended European Search Report dated Oct. 10, 2019. 10 pages.
EP17156707.6 EP Office Action dated Apr. 29, 2020.
EP17178143.8 Notice of Opposition dated Nov. 19, 2019. 3 pages.
EP18209400.3 European Search Report dated May 7, 2019. 6 pages.
European Search Report and Search Opinion dated Nov. 30, 2017 for European Patent Application No. EP17178143.8. 5 pages.
Everton et al. Review of in-situ process monitoring and in-situ metrology for metal additive manufacturing. Materials and Design 95 (2016) 431-445.
Ex Parte Quayle Action dated Apr. 19, 2017 for U.S. Appl. No. 15/374,821. 6 pages.
Extended European Search Report dated Jul. 7, 2017 for European Patent Application No. EP17156707.6. 9 pages.
*Formlabs* v. *DWS*. Civil Action filed on Jun. 29, 2018 in the United States Court for the Eastern District of Virginia. Case No. 1:18-cv-00810-CMH-IDD. 13 pages.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.
Gebhardt. Generative Fertigungsverfahren: Rapid Prototyping—Rapid Tooling—Rapid Manufacturing. Carl Hanser Verlag, Munchen, cover page, inside cover page, and p. 121 (2007). With English translation of p. 121. 5 pages total.
Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson et al. Additive Manufacturing Technologies. Springer. Jan. 2010. 472 pages.
Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Gibson, et al. Additive Manufacturing Technologies, Springer 2010. Chapter 5, pp. 103-142. ISBN978-1-4419-1119-3 (Print978-1-4419-1120-9 (Online). Published: Dec. 14, 2009.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Gu et al. Laser Additive manufacturing of metallic components: materials, processes and mechanisms. International Materials Reviews 57(3):133-164 (2012).
Hauser, et al. Further Developments in Process Mapping and modelling in direct metal selective laser melting. Aug. 2004, 15th solid Free Form Fabrication Proceedings. Austin, Texas, pp. 448-459.
Hu et al. Experimental and numerical modeling of buckling instability of laser sheet forming. International Journal of Machine Tools & Manufacture, 42, Oct. 2002, pp. 1427-1439.
Hu, et al. Computer simulation and experimental investigation of sheet metal bending using laser beam scanning. International Journal of Machine Tools and Manufacture, 41, Mar. 2001, pp. 589-607.
Co-pending U.S. Appl. No. 16/183,557, filed Nov. 7, 2018. 9 pages.
Co-pending U.S. Appl. No. 16/195,810, filed Nov. 19, 2018. 10 pages.
Co-pending U.S. Appl. No. 16/245,183, filed Jan. 10, 2019. 9 pages.
Co-pending U.S. Appl. No. 16/248,665, filed Jan. 15, 2019. 8 pages.
Co-pending U.S. Appl. No. 16/291,759, filed Mar. 4, 2019. 37 pages.
Co-pending U.S. Appl. No. 16/351,030, filed Mar. 12, 2019. 202 pages.
Co-pending U.S. Appl. No. 16/404,579, filed May 6, 2019. 9 pages.
Co-pending U.S. Appl. No. 16/419,912, filed May 22, 2019. 10 pages.
Co-pending U.S. Appl. No. 16/449,965, filed Jun. 24, 2019. 37 pages.
Co-pending U.S. Appl. No. 16/450,853, filed Jun. 24, 2019. 202 pages.
Co-pending U.S. Appl. No. 16/505,520, filed Jul. 8, 2019. 149 pages.
Co-pending U.S. Appl. No. 16/542,208, filed Aug. 15, 2019. 52 pages.
Co-pending U.S. Appl. No. 16/550,088, filed Aug. 23, 2019.
Co-pending U.S. Appl. No. 16/578, 190, filed Sep. 20, 2019.
Co-pending U.S. Appl. No. 16/591,549, filed Oct. 2, 2019.
Co-pending U.S. Appl. No. 16/653,933, filed Oct. 15, 2019.
Co-pending U.S. Appl. No. 16/657,980, filed Oct. 18, 2019, Elgar et al.
Co-pending U.S. Appl. No. 16/662,764, filed Oct. 24, 2019.
Co-pending U.S. Appl. No. 16/686,045, filed Nov. 15, 2019.
Co-pending U.S. Appl. No. 16/694,963, filed Nov. 25, 2019.
Co-pending U.S. Appl. No. 16/709,887, filed Dec. 10, 2019.
Co-pending U.S. Appl. No. 16/714,638, filed Dec. 13, 2019.
Co-pending U.S. Appl. No. 16/719,679, filed Dec. 18, 2019.
Co-pending U.S. Appl. No. 16/783,490, filed Feb. 6, 2020.
Co-pending U.S. Appl. No. 16/789,905, filed Feb. 13, 2020.
Co-pending U.S. Appl. No. 16/820,459, filed Mar. 16, 2020.
Co-pending U.S. Appl. No. 16/825,696, filed Mar. 20, 2020.
Co-pending U.S. Appl. No. 17/584,881, filed Jan. 26, 2022, Buller et al.
Co-pending U.S. Appl. No. 17/986,814, filed Nov. 14, 2022, Buller et al.
Co-pending U.S. Appl. No. 18/071,960, filed Nov. 30, 2022, Brown et al.
Co-pending U.S. Appl. No. 18/234, 115, filed Aug. 15, 2023, Korepanov et al.
Co-pending U.S. Appl. No. 18/234,997, filed Aug. 17, 2023, Tralongo et al.
Co-pending U.S. Appl. No. 18/367,254, filed Sep. 12, 2023, Buller et al.
Co-pending U.S. Appl. No. 29/653,429, filed Jun. 14, 2018.
Co-pending U.S. Appl. No. 16/248,665, inventor Buller; Benyamin, filed Jan. 15, 2019. 52 pages.
Co-pending U.S. Appl. No. 16/253,103, inventor Buller; Benyamin, filed Jan. 21, 2019. 195 pages.
Co-pending U.S. Appl. No. 16/590,868, filed Oct. 2, 2019. 37 pages.
Co-pending U.S. Appl. No. 16/749,899, filed Jan. 22, 2020. 46 pages.
Co-pending U.S. Appl. No. 16/841,161, inventors Buller; Benyamin et al., filed Apr. 6, 2020. 231 pages.
Co-pending U.S. Appl. No. 16/843,725, inventors Buller; Benyamin et al., filed Apr. 8, 2020. 221 pages.
Co-pending U.S. Appl. No. 16/846,058, inventors Buller; Benyamin et al., filed Apr. 10, 2020. 211 pages.
Co-pending U.S. Appl. No. 16/857,453, inventors Buller; Benyamin et al., filed Apr. 24, 2020. 210 pages.
Co-pending U.S. Appl. No. 16/866,949, inventors Milshtein; Erel et al., filed May 5, 2020. 227 pages.
Co-pending U.S. Appl. No. 16/872,646, inventors Buller; Benyamin et al., filed May 12, 2020. 46 pages.
Co-pending U.S. Appl. No. 16/872,714, inventors Buller; Benyamin et al., filed May 12, 2020. 196 pages.
Co-pending U.S. Appl. No. 16/876,608, filed May 18, 2020. 155 pages.
Co-pending U.S. Appl. No. 16/877,029, filed May 18, 2020. 213 pages.
Co-pending U.S. Appl. No. 16/883,262, inventors Buller; Benyamin et al., filed May 26, 2020. 160 pages.
Co-pending U.S. Appl. No. 16/890,895, inventor Buller; Benyamin, filed Jun. 2, 2020. 158 pages.
Co-pending U.S. Appl. No. 15/634,727, filed Jun. 27, 2017.
Co-pending U.S. Appl. No. 15/668,662, filed Aug. 3, 2017. 9 pages.
Co-pending U.S. Appl. No. 15/719,084, filed Sep. 28, 2017. 8 pages.
Co-pending U.S. Appl. No. 15/719,133, filed Sep. 28, 2017. 9 pages.
Co-pending U.S. Appl. No. 15/719,229, filed Sep. 28, 2017. 9 pages.

(56) References Cited

OTHER PUBLICATIONS

Co-pending U.S. Appl. No. 15/788,364, filed Oct. 19, 2017. 9 pages.
Co-pending U.S. Appl. No. 15/788,418, filed Oct. 19, 2017. 9 pages.
Co-pending U.S. Appl. No. 15/788,463, filed Oct. 19, 2017. 9 pages.
Co-pending U.S. Appl. No. 15/788,495, filed Oct. 19, 2017. 9 pages.
Co-pending U.S. Appl. No. 15/788,532, filed Oct. 19, 2017. 9 pages.
Co-pending U.S. Appl. No. 15/788,568, filed Oct. 19, 2017. 9 pages.
Co-pending U.S. Appl. No. 15/788,662, filed Oct. 19, 2017. 9 pages.
Co-pending U.S. Appl. No. 15/803,675, filed Nov. 3, 2017. 11 pages.
Co-pending U.S. Appl. No. 15/803,683, filed Nov. 3, 2017. 10 pages.
Co-pending U.S. Appl. No. 15/803,686, filed Nov. 3, 2017. 9 pages.
Co-pending U.S. Appl. No. 15/803,688, filed Nov. 3, 2017. 9 pages.
Co-pending U.S. Appl. No. 15/803,692, filed Nov. 3, 2017. 9 pages.
Co-pending U.S. Appl. No. 15/808,434, filed Nov. 9, 2017. 10 pages.
Co-pending U.S. Appl. No. 15/808,777, filed Nov. 9, 2017. 9 pages.
Co-pending U.S. Appl. No. 15/830,421, filed Dec. 4, 2017. 9 pages.
Co-pending U.S. Appl. No. 15/830,470, filed Dec. 4, 2017. 9 pages.
Co-pending U.S. Appl. No. 15/853,700, filed Dec. 22, 2017. 9 pages.
Co-pending U.S. Appl. No. 15/855,744, filed Dec. 27, 2017. 8 pages.
Co-pending U.S. Appl. No. 15/861,544, filed Jan. 3, 2018. 9 pages.
Co-pending U.S. Appl. No. 15/861,548, filed Jan. 3, 2018. 9 pages.
Co-pending U.S. Appl. No. 15/861,553, filed Jan. 3, 2018. 9 pages.
Co-pending U.S. Appl. No. 15/861,561, filed Jan. 3, 2018. 8 pages.
Co-pending U.S. Appl. No. 15/870,561, filed Jan. 12, 2018. 9 pages.
Co-pending U.S. Appl. No. 15/871,763, filed Jan. 15, 2018. 8 pages.
Co-pending U.S. Appl. No. 15/873,832, filed Jan. 17, 2018. 10 pages.
Co-pending U.S. Appl. No. 15/886,544, filed Feb. 1, 2018. 8 pages.
Co-pending U.S. Appl. No. 15/893,523, filed Feb. 9, 2018. 9 pages.
Co-pending U.S. Appl. No. 15/909,388, filed Mar. 1, 2018. 10 pages.
Co-pending U.S. Appl. No. 15/909,396, filed Mar. 1, 2018. 9 pages.
Co-pending U.S. Appl. No. 15/909,406, filed Mar. 1, 2018. 10 pages.
Co-pending U.S. Appl. No. 15/909,783, filed Mar. 1, 2018. 9 pages.
Co-pending U.S. Appl. No. 15/909,784, filed Mar. 1, 2018. 11 pages.
Co-pending U.S. Appl. No. 15/909,806, filed Mar. 1, 2018. 9 pages.
Co-pending U.S. Appl. No. 15/909,809, filed Mar. 1, 2018. 9 pages.
Co-pending U.S. Appl. No. 15/909,826, filed Mar. 1, 2018. 11 pages.
Co-pending U.S. Appl. No. 15/937,778, filed Mar. 27, 2018.
Co-pending U.S. Appl. No. 15/937,790, filed Mar. 27, 2018.
Co-pending U.S. Appl. No. 15/937,798, filed Mar. 27, 2018.
Co-pending U.S. Appl. No. 15/937,812, filed Mar. 27, 2018.
Co-pending U.S. Appl. No. 15/937,817, filed Mar. 27, 2018.
Co-pending U.S. Appl. No. 16/030,795, filed Jul. 9, 2018. 10 pages.
Co-pending U.S. Appl. No. 16/031,896, filed Jul. 10, 2018. 10 pages.
Co-pending U.S. Appl. No. 16/125,644, filed Sep. 7, 2018. 10 pages.
Co-pending U.S. Appl. No. 16/137,295, filed Sep. 20, 2018. 8 pages.
Co-pending U.S. Appl. No. 16/177,090, filed Oct. 31, 2018. 11 pages.
"Active", definition by the Merriam-Webster dictionary at https://www.merriam-webster.com/dictionary/active published Nov. 3, 2017. 9 pages.
Adam, et al. Design for additive manufacturing—element transitions and aggregated structures. CIRP Journal of Manufacturing Science and Technology. Nov. 2014; 7:20-28.
Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.
Anusci, Victor. Aerosint Is Developing the First Commercial Multi-powder SLS 3d Printer. 3D Printing Media Network. Web. Published Jan. 28, 2018. 4 pages. URL: <https://www.3dprintingmedia.network/aerosint-multi-powder-SLS-3d-printer/>.
Arcam AB (Arcm.St) (AMAVF). Powder Removal from 3D Structures. Posted Thursday, Apr. 23, 2015 11:23:59 AM. 4 pages. http://investorshub.advfn.com/boards/read_msg.aspx?message_id=113029094.
Arcam EBM at Sirris Belgium. Uploaded Jun. 17, 2010. 2 pages. https://www.youtube.com/watch?v=nR7EtduqVYw&list=PLD7ckJoR KR6uaOGOMlyJ1mpCKh3 42il_I.
Arnet et al. Extending Laser Bending for the Generation of Convex Shapes. Proc. Instn. Mech. Engrs., vol. 209, Dec. 1, 1995, pp. 433-442.
Ashby, Mike. Teach Yourself: Phase Diagrams and Phase Transformations. 5th Edition, Mar. 2009, Cambridge. 55 pages.
Barriobero-Vila et al. Inducing Stable a + p Microstructures during Selective Laser Melting of Ti—6Al—4V Using Intensified Intrinsic Heat Treatments. Materials (Basel). vol. 10, No. 3, Mar. 2017, 14 pages.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Betriebsanleitung (Operating Manual). Selective Laser Melting-Anlage. SLM® 125HL. Slm Solutions, pp. 1-6, pp. 43-49, 53, 68, 69, 84-87, and 92 (Jun. 1, 2015). 21 pages total. With English translation.
Bohnet, M. Advances in the Design of Pneumatic Conveyors. International Chemical Engineering, vol. 25, No. 3, Jul. 1985, pp. 387-405.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
Bremen et al. Selective Laser Melting. Laser Technik Journal 9(2); Apr. 2012. 6 pages.
Calvert, Jack G. Glossary of Atmospheric Chemistry Terms (Recommendations 1990). Pure &Appl. Chem., vol. 62, No. 11, Jan. 1, 1990, pp. 2167-2219.
Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.
Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.
Co-pending International PCT Patent Application No. PCT/US17/39422, filed Jun. 27, 2017. 3 pages.
Co-pending PCT patent application No. PCT/US2019/024402, filed on Mar. 27, 2019.
Co-pending U.S. Appl. No. 14/967,118, filed Dec. 11, 2015. 7 pages.
Co-pending U.S. Appl. No. 15/085,884, filed Mar. 30, 2016. 9 pages.
Co-pending U.S. Appl. No. 15/188,885, filed Jun. 21, 2016. 10 pages.
Co-pending U.S. Appl. No. 15/188,939, filed Jun. 21, 2016. 9 pages.
Co-pending U.S. Appl. No. 15/288,251, filed Oct. 7, 2016. 9 pages.
Co-pending U.S. Appl. No. 15/339,712, filed Oct. 31, 2016. 19 pages.
Co-pending U.S. Appl. No. 15/339,759, filed Oct. 31, 2016. 150 pages.

(56) References Cited

OTHER PUBLICATIONS

Co-pending U.S. Appl. No. 15/339,775, filed Oct. 31, 2016. 148 pages.
Co-pending U.S. Appl. No. 15/374,318, filed Dec. 9, 2016. 188 pages.
Co-pending U.S. Appl. No. 15/374,442, filed Dec. 9, 2016. 189 pages.
Co-pending U.S. Appl. No. 15/374,535, filed Dec. 9, 2016. 189 pages.
Co-pending U.S. Appl. No. 15/374,616, filed Dec. 9, 2016. 188 pages.
Co-pending U.S. Appl. No. 15/374,821, filed Dec. 9, 2016. 30 pages.
Co-pending U.S. Appl. No. 15/399,186, filed Jan. 5, 2017. 214 pages.
Co-pending U.S. Appl. No. 15/435,065, filed Feb. 16, 2017. 223 pages.
Co-pending U.S. Appl. No. 15/435,078, filed Feb. 16, 2017. 224 pages.
Co-pending U.S. Appl. No. 15/435,090, filed Feb. 16, 2017. 223 pages.
Co-pending U.S. Appl. No. 15/435,110, filed Feb. 16, 2017. 223 pages.
Co-pending U.S. Appl. No. 15/435,120, filed Feb. 16, 2017. 222 pages.
Co-pending U.S. Appl. No. 15/435,128, filed Feb. 16, 2017. 223 pages.
Co-pending U.S. Appl. No. 15/436,558, filed Feb. 17, 2017. 212 pages.
Co-pending U.S. Appl. No. 15/490,219, filed Apr. 18, 2017. 10 pages.
Co-pending U.S. Appl. No. 15/614,979, filed Jun. 6, 2017. 8 pages.
Co-pending U.S. Appl. No. 15/615,004, filed Jun. 6, 2017. 8 pages.
Co-pending U.S. Appl. No. 15/615,029, filed Jun. 6, 2017.
Co-pending U.S. Appl. No. 15/634,228, filed Jun. 27, 2017.
Co-pending U.S. Appl. No. 15/634,267, filed Jun. 27, 2017.
Co-pending U.S. Appl. No. 15/634,666, filed Jun. 27, 2017.
U.S. Appl. No. 15/374,821 Notice of Allowance dated Apr. 4, 2018.
U.S. Appl. No. 15/399,186 Notice of Allowance dated Dec. 20, 2018.
U.S. Appl. No. 15/399,186 Notice of Allowance dated Sep. 17, 2018.
U.S. Appl. No. 15/435,078 Notice of Allowance dated Aug. 21, 2019.
U.S. Appl. No. 15/435,078 Notice of Allowance dated Jul. 10, 2019.
U.S. Appl. No. 15/435,078 Notice of Allowance dated May 20, 2019.
U.S. Appl. No. 15/435,078 Notice of Allowance dated Sep. 4, 2019.
U.S. Appl. No. 15/435,078 Office Action dated Aug. 16, 2018.
U.S. Appl. No. 15/435,078 Office Action dated Jan. 10, 2019.
U.S. Appl. No. 15/435,090 Office Action dated May 18, 2018.
U.S. Appl. No. 15/435,110 Notice of Allowance dated Dec. 20, 2018.
U.S. Appl. No. 15/436,558 Notice of Allowance dated Aug. 21, 2019.
U.S. Appl. No. 15/436,558 Office Action dated May 23, 2019.
U.S. Appl. No. 15/479,531 Office Action dated Jan. 9, 2019.
U.S. Appl. No. 15/490,219 Notice of Allowance dated Apr. 10, 2019.
U.S. Appl. No. 15/523,524 Office Action dated Jun. 7, 2019.
U.S. Appl. No. 15/614,979 Office Action dated Nov. 5, 2018.
U.S. Appl. No. 15/615,004 Office Action dated Jun. 8, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,228 Office Action dated Jun. 14, 2018.
U.S. Appl. No. 15/634,267 Notice of Allowance dated Dec. 28, 2018.
U.S. Appl. No. 15/634,666 Office Action dated Oct. 18, 2018.
U.S. Appl. No. 15/634,727 Notice of Allowance dated Feb. 7, 2019.
U.S. Appl. No. 15/634,727 Office Action dated May 25, 2018.
U.S. Appl. No. 15/634,727 Office Action dated Sep. 20, 2018.
U.S. Appl. No. 15/719,084 Office Action dated Feb. 8, 2019.
U.S. Appl. No. 15/719,133 Office Action dated Sep. 24, 2018.
U.S. Appl. No. 15/719,229 Office Action dated May 16, 2019.
U.S. Appl. No. 15/719,229 Office Action dated Oct. 5, 2018.
U.S. Appl. No. 15/788,418 Office Action dated Jul. 8, 2019.
U.S. Appl. No. 15/788,495 Office Action dated Oct. 3, 2018.
U.S. Appl. No. 15/803,683 Office Action dated Jun. 19, 2019.
U.S. Appl. No. 15/803,686 Notice of Allowance dated Feb. 19, 2019.
U.S. Appl. No. 15/803,686 Office Action dated Sep. 19, 2018.
U.S. Appl. No. 15/803,688 Office Action dated Sep. 20, 2018.
U.S. Appl. No. 15/808,777 Office Action dated Feb. 6, 2020.
U.S. Appl. No. 15/830,421 Office Action dated Nov. 13, 2018.
U.S. Appl. No. 15/830,470 Office Action dated Jul. 5, 2018.
U.S. Appl. No. 15/853,700 Office Action dated Apr. 6, 2018.
U.S. Appl. No. 15/853,700 Office Action dated Sep. 11, 2018.
U.S. Appl. No. 15/855,744 Notice of Allowance dated Feb. 15, 2019.
U.S. Appl. No. 15/855,744 Office Action dated Nov. 19, 2018.
U.S. Appl. No. 15/861,544 Office Action dated Feb. 15, 2019.
U.S. Appl. No. 15/861,544 Office Action dated Jul. 11, 2019.
U.S. Appl. No. 15/861,548 Office Action dated Sep. 6, 2018.
U.S. Appl. No. 15/861,553 Office Action dated Aug. 7, 2018.
U.S. Appl. No. 15/861,553 Office Action dated Dec. 14, 2018.
U.S. Appl. No. 15/870,561 Office Action dated Jun. 15, 2018.
Proto Labs. Direct Metal Laser Sintering (DMLS). Published Sep. 10, 2014. https://www.protolabs.com/additive-manufacturing/direct-metal-laser-sintering, 2 pages.
Rhinehart, R.R. §2.13 Control Theory: Mode-Based Control, in Bela G. Liptak, Instrument Engineers' Handbook, vol. 2: Process Control and Optimization, 209-213. CRC Press; 4 editior (Sep. 29, 2005).ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015). 6 pages.
RP Photonics Consulting GmbH. Definition of "Optical Intensity". Encyclopedia of Laser Physics and Technology. Jun. 2012. 3 pages. URL: <https://www.rp-photonics.com/optical_intensity.html>.
Ryan et al. Fabrication methods of porous metals for use in orthopaedic applications. Biomaterials. May 2006; vol. 27, Issue 13, pp. 2651-2670.
Salvati et al. An Investigation of Residual Stress Gradient Effects in FIB-DIC Micro-Ring-Core Analysis. Proceedings of the International MultiConference of Engineers and Computer Scientists 2015 vol. II, IMECS 2015, Hong Kong, Mar. 18-20, 2015. 4 pages.
Sandvik Materials Technology website. Accessed Nov. 14, 2014. http://www.smt.sandvik.com/en/products/metal-powder/additive-manufacturing/. 2 pages.
Saunders, Marc. Real-time AM monitoring opens up new process control opportunities. Web: LinkedIn. Published on Jan. 3, 2018. 12 pages. URL:<https://www.linkedin.com/pulse/real-time-am-monitoring-opens-new-process-control-marc-saunders/>.
Schott. TIE-19: Temperature Coefficient of the Refractive Index. Technical Information: Advanced Optics. Schott AG. Jul. 2016. 10 pages.
Schott. TIE-19: Temperature Coefficient of the Refractive Index. Technical Information: Advanced Optics. Schott North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Shen et al. An analytical model for estimating deformation in laser forming. Computational Materials Science, 37, Oct. 2006, pp. 593-598.
Shen et al. Modelling of laser forming—An review. Computational Materials Science 46, Oct. 2009, pp. 834-840.

(56) References Cited

OTHER PUBLICATIONS

SLM Solutions GmbH, Operating Manual, Selective Laser Melting System, SLM 125, 2015.
Sloan, Jeff. Tidal turbine blade toughened for turbulent sea salt, CompositesWorld (Nov. 30, 2012). Retrieved web page archived Jan. 16, 2013. Retrieved on Apr. 9, 2020 from https://web.archive.org/web/20130116115034/https ://www. compositesworld.com/articles/tidal-turbine-blade-toughened-for-turbulent-salt-sea. 7 pages.
Spears, et al. In-process sensing in selective laser melting (SLM) additive manufacturing. Integrating Materials and Manufacturing Innovation. Feb. 11, 2016; 5:2. DOI: 10.1186/S40192-016-0045-4. 25 pages.
Strano, et al. A new approach to the design and optimisation of support structures in additive manufacturing. Int J Adv Manuf Technol (2013) 66:1247-1254, DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.
The extended European Search report, Application No. 20846570.8, dated Oct. 11, 2023.
Third Party Observations concerning the International Application PCT/US2021/035350, published as WO 2021/247640, dated Dec. 8, 2022. 6 pages.
Thomas Niendorf et al., "Highly Anisotropic Steel Processed by Selective Laser Melting", Metallurgical and Materials Transactions, vol. 44B, Aug. 2013, 5 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm ?objectgroup_id=7794>.
U.S. Appl. No. 15/803,686 Notice of Allowance dated Jan. 23, 2020.
U.S. Appl. No. 15/861,544 Notice of Allowance dated Feb. 4, 2020.
U.S. Appl. No. 15/873,832 Office Action dated Jun. 12, 2020.
U.S. Appl. No. 16/195,810 Notice of Allowance dated Apr. 8, 2020.
U.S. Appl. No. 16/195,810 Notice of Allowance dated May 11, 2020.
U.S. Appl. No. 14/744,675, filed Jun. 19, 2015, Buller et al.
U.S. Appl. No. 14/744,859, filed Jun. 19, 2015 Buller et al.
U.S. Appl. No. 14/744,910, filed Jun. 19, 2015 Buller et al.
U.S. Appl. No. 14/744,955, filed Jun. 19, 2015 Buller et al.
U.S. Appl. No. 14/744,988, filed Jun. 19, 2015 Buller et al.
U.S. Appl. No. 14/745,032, filed Jun. 19, 2015 Buller et al.
U.S. Appl. No. 14/745,081, filed Jun. 19, 2015 Buller et al.
U.S. Appl. No. 14/745,108, filed Jun. 19, 2015 Buller et al.
U.S. Appl. No. 15/188,885 Notice of Allowance dated Jul. 29, 2019.
U.S. Appl. No. 15/188,885 Office Action dated Apr. 9, 2019.
U.S. Appl. No. 15/339,712 Notice of Allowance dated Jul. 10, 2018.
U.S. Appl. No. 15/339,712 Notice of Allowance dated Jun. 18, 2018.
U.S. Appl. No. 15/339,712 Notice of Allowance dated May 23, 2018.
U.S. Appl. No. 15/339,712 Office Action dated Jan. 10, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/374,616 Office Action dated Aug. 15, 2018.
U.S. Appl. No. 15/374,616 Office Action dated Mar. 26, 2018.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.

Netfabb-Professional 5.2, User Manual, Netfabb GmbH 2014, Version: Jul. 29, 2014, Chapter 6: sections 6.1, 6.3, Chapter 7: section 7.7, Chapter 9: section 9.6. 237 pages.
Notice of Allowability dated Oct. 17, 2017 for U.S. Appl. No. 14/744, 910. 6 pages.
Notice of Allowance (second) dated Apr. 6, 2017 for U.S. Appl. No. 15/339,759. 4 pages.
Notice of Allowance dated Jan. 12, 2018 for U.S. Appl. No. 15/435,128. 5 pages.
Notice of Allowance dated Feb. 6, 2018 for U.S. Appl. No. 15/374,821. 5 pages.
Notice of Allowance dated Feb. 28, 2018 for U.S. Appl. No. 15/374,821. 11 pages.
Notice of allowance dated Aug. 10, 2016 for U.S. Appl. No. 14/967,118. 5 pages.
Notice of Allowance dated Aug. 7, 2017 for U.S. Appl. No. 14/744,910. 9 pages.
Notice of Allowance dated Dec. 11, 2017 for U.S. Appl. No. 15/435,120. 7 pages.
Notice of allowance dated Dec. 14, 2015 for U.S. Appl. No. 14/745,081. 3 pages.
Notice of allowance dated Dec. 15, 2015 for U.S. Appl. No. 14/745,081. 3 pages.
Notice of Allowance dated Dec. 8, 2017 for U.S. Appl. No. 15/435,128. 4 pages.
Notice of Allowance dated Dec. 9, 2016 for U.S. Appl. No. 15/188,939. 8 pages.
Notice of Allowance dated Feb. 16, 2018 for U.S. Appl. No. 15/435,120. 2 pages.
Notice of Allowance dated Feb. 21, 2018 for U.S. Appl. No. 15/435,128. 5 pages.
Notice of Allowance dated Feb. 6, 2018 for U.S. Appl. No. 15/374,821. 4 pages.
Notice of Allowance dated Jan. 12, 2018 for U.S. Appl. No. 15/435,120. 5 pages.
Notice of allowance dated Jan. 5, 2017 for U.S. Appl. No. 15/085,884. 10 pages.
Notice of allowance dated Jun. 20, 2016 for U.S. Appl. No. 14/744,675. 2 pages.
Notice of allowance dated Mar. 1, 2016 for U.S. Appl. No. 14/745,108. 7 pages.
Notice of Allowance dated Mar. 16, 2017 for U.S. Appl. No. 15/339,775. 7 pages.
Notice of Allowance dated Mar. 20, 2017 for U.S. Appl. No. 15/339,759. 8 pages.
Notice of allowance dated May 11, 2016 for U.S. Appl. No. 14/744,955. 9 pages.
Notice of allowance dated May 25, 2016 for U.S. Appl. No. 14/744,675. 7 pages.
Notice of allowance dated Nov. 30, 2015 for U.S. Appl. No. 14/745,081. 3 pages.
Notice of allowance dated Sep. 17, 2015 for U.S. Appl. No. 14/745,081. 6 pages.
Notice of allowance dated Sep. 28, 2015 for U.S. Appl. No. 14/745,081. 2 pages.
Notice of allowance dated Sep. 6, 2016 for U.S. Appl. No. 14/745,032. 8 pages.
Office Action (Non-Final Rejection) dated Sep. 22, 2023 for U.S. Appl. No. 17/695,092 (pp. 1-10).
Office Action (Non-Final Rejection) dated Oct. 25, 2023 for U.S. Appl. No. 17/849,866 (pp. 1-13).
Office Action (Non-Final Rejection) dated Oct. 25, 2023 for U.S. Appl. No. 17/991,878 (pp. 1-11).
Office action dated Jan. 7, 2016 for U.S. Appl. No. 14/744,859. 19 pages.
Office Action dated Feb. 7, 2017 for U.S. Appl. No. 15/399,712. 7 pages.
Office Action dated Feb. 7, 2018 for U.S. Appl. No. 15/614,979. 67 pages.
Office Action dated Feb. 7, 2018 for U.S. Appl. No. 15/719,229. 21 pages.
Office Action dated Aug. 2, 2017 for U.S. Appl. No. 15/435,090. 52 pages.

(56) References Cited

OTHER PUBLICATIONS

Office Action dated Dec. 8, 2017 for U.S. Appl. No. 15/435,090. 6 pages.
Office Action dated Apr. 28, 2017 for U.S. Appl. No. 15/374,616. 22 pages.
Office Action dated Aug. 18, 2017 for U.S. Appl. No. 15/374,318. 10 pages.
Office Action dated Aug. 2, 2017 for U.S. Appl. No. 15/435,090. 6 pages.
Office action dated Aug. 25, 2016 for U.S. Appl. No. 14/744,988. 17 pages.
Office Action dated Aug. 25, 2017 for U.S. Appl. No. 15/339,712. 7 pages.
Office Action dated Dec. 15, 2017 for U.S. Appl. No. 15/435,110. 20 pages.
Office Action dated Dec. 8, 2017 for U.S. Appl. No. 15/435,090. 17 pages.
Office action dated Feb. 10, 2016 for U.S. Appl. No. 14/744,910. 17 pages.
Office Action dated Feb. 14, 2018 for U.S. Appl. No. 15/634,228. 28 pages.
Office action dated Feb. 16, 2016 for U.S. Appl. No. 14/744,955. 7 pages.
Office Action dated Feb. 7, 2017 for U.S. Appl. No. 14/744,988. 6 pages.
Office Action dated Feb. 7, 2018 for U.S. Appl. No. 15/614,979. 12 pages.
Hubbard, ed. The Handbook of Surface Imaging and Visualization, cover sheets and pp. 39-40, CRC Press (1995).
Hussein. The development of Lightweight Cellular Structures for Metal Additive Manufacturing. Nov. 2013, thesis of University of Exeter, pp. 1-228.
integrativemodeling.org. IMP, the Integrative Modeling Platform. Web. Published Jul. 26, 2013.1 page. URL:< https://integrativemodeling.org/>.
International search report and written opinion dated Sep. 20, 2016 for PCT/US2016/034454. 12 pages.
International search report and written opinion dated Apr. 11, 2016 for PCT/US2015/065297. 17 pages.
International Search Report and Written Opinion dated Apr. 5, 2017 for International PCT Patent Application No. PCT/US2016/066000. 11 pages.
International Search Report and Written Opinion dated Aug. 30, 2017 for International PCT Patent Application No. PCT/US2017/039422. 164 pages.
International Search Report and Written Opinion dated Feb. 12, 2018 for International PCT Patent Application No. PCT/US2017/057340. 25 pages.
International Search Report and Written Opinion dated Feb. 14, 2017 for International PCT Patent Application No. PCT/US2016/042818. 14 pages.
International search report and written opinion dated Feb. 19, 2016 for PCT/US2015/059790. 11 pages.
International Search Report and Written Opinion dated Jan. 16, 2017 for International PCT Patent Application No. PCT/US2016/059781. 12 pages.
International Search Report and Written Opinion dated May 18, 2017 for International PCT Patent Application No. PCT/US2017/018191. 17 pages.
International Search Report and Written Opinion dated Oct. 18, 2016 for International PCT Patent Application No. PCT/US2016/041895. 9 pages.
International search report and written opinion dated Oct. 30, 2015 for PCT Application No. US2015/036802. 19 pages.
International search report and written opinion dated Sep. 13, 2016 for PCT Application No. US-2016034857. 13 pages.
International search report and written opinion dated Sep. 19, 2016 for PCT Application No. PCT/US2016/034857. 13 pages.
International Search Report and Written Opinion dated Sep. 20, 2016 for International PCT Patent Application No. PCT/US2016/034454. 12 pages.
International Search Report and Written Opinion issued in App. No. PCT/US2022/052322, dated Apr. 14, 2023, 10 pages.
International Search Report and Written Opinion, Application No. PCT/US2022/052902, dated Dec. 14, 2022.
International Search Report issued in App. No. PCT/US2022/051107, dated Apr. 7, 2023, 13 pages.
International Search Report issued in App. No. PCT/US2022/051736, dated Apr. 10, 2023, 8 pages.
IUPAC. "Inert gas". IUPAC Compendium of Chemical Terminology. Published Feb. 24, 2014.< http://goldbook.iupac.Org/html/l/l03027.html. 1 page.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kant et al. An integrated FEM-ANN model for laser bending process with inverse estimation of absorptivity. Mechanics of Advanced Materials and Modern Processes. Dec. 2015, vol. 1, No. 6, 12 pages.
Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.
Korean 1st Notice of Preliminary Rejection, Application No. 10-2022-7006494, dated Aug. 5, 2022.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1) 7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015). 4 pages.
Kumar. Powder deposition and sintering for a two-powder approach to solid freeform fabrication. Department of Mechanical Engineering, University of Florida. Aug. 1998; 169-173.
Laser Engineered Net Shaping (Lens) 850-R system overview. System features and example application video clips. Published Jun. 3, 2012. https://www.youtube.com/watch?v=mkUVURLkxS4. 2 pages.
Leirvag. Additive Manufacturing for Large Products. Feb. 2013, thesis. Norwegian University of Science and Technology. 76 pages.
Lu et al. Chapter 6: Metal-Based System via Laser Melting. Laser-Induced Materials and Processes for Rapid Prototyping. Kluwer Acad. Publ., USA, pp. 143-186 (2001).
Lyckfeldt. Powder rheology of steel powders for additive manufacturing. Swerea IVF. Oct. 24, 2013. 1 page.

(56) References Cited

OTHER PUBLICATIONS

Maji et al. Finite Element Analysis and Experimental Investigations on Laser Bending of AISI304 Stainless Steel Sheet. Procedia Engineering 64, Dec. 2013, pp. 528-535.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE2014, Jul. 2-4, 2014, London, U.K. 6 pages.
Meiners. Direktes Selektives Laser Sintemn einkomponentiger metallischer Werkstoffe. Dissertation. Abstract Only (1999). Wth English translation.
Mercelis. Residual stresses in selective laser sintering and selective laser melting. Rapid Prototyping Journal, vol. 12, Issue 5, pp. 254-265 (2006).
Merriam-Webster. Definition of "reservoir". Retrieved Dec. 21, 2017. 13 pages. URL:<https://merriam-webster.com/dictionary/reservoir>. ?
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):369-395.
Office Action dated Feb. 8, 2017 for U.S. Appl. No. 14/744,859. 12 pages.
Office action dated Jan. 11, 2016 for U.S. Appl. No. 14/745,032. 22 pages.
Office Action dated Jan. 2, 2018 for U.S. Appl. No. 15/288,251. 30 pages.
Office Action dated Jan. 24, 2018 for U.S. Appl. No. 15/615,004. 16 pages.
Office Action dated Jan. 25, 2018 for U.S. Appl. No. 15/634,727. 9 pages.
Office action dated Jan. 7, 2016 for U.S. Appl. No. 14/744,859. 20 pages.
Office Action dated Jan. 31, 2023 for Japanese Application No. 2021-204515, translation 2 pages.
Office action dated Jul. 1, 2016 for U.S. Appl. No. 14/745,032. 10 pages.
Office action dated Jul. 19, 2016 for U.S. Appl. No. 15/085,884. 26 pages.
Office action dated Jul. 21, 2016 for U.S. Appl. No. 14/744,910. 15 pages.
Office Action dated Jul. 28, 2017 for U.S. Appl. No. 14/744,988. 13 pages.
Office Action dated Jul. 3, 2017 for U.S. Appl. No. 15/435,120. 6 pages.
Office Action dated Jun. 15, 2017 for U.S. Appl. No. 15/288,251. 13 pages.
Office action dated Jun. 29, 2016 for U.S. Appl. No. 14/744,859. 16 pages.
Office Action dated Jun. 29, 2017 for U.S. Appl. No. 15/435,128. 6 pages.
Office action dated Mar. 10, 2016 for U.S. Appl. No. 14/744,675. 15 pages.
Office Action dated Mar. 23, 2017 for U.S. Appl. No. 15/399,186. 15 pages.
Office action dated Mar. 4, 2016 for U.S. Appl. No. 14/744,988. 18 pages.
Office Action dated Mar. 6, 2017 for U.S. Appl. No. 14/744,910. 12 pages.
Office action dated Mar. 7, 2017 for U.S. Appl. No. 15/339,712. 11 pages.
Office Action dated Mar. 7, 2018 for U.S. Appl. No. 15/399,186. 32 pages.
Office action dated Nov. 1, 2016 for U.S. Appl. No. 15/085,884. 27 pages.
Office action dated Nov. 12, 2015 for U.S. Appl. No. 14/745,108. 16 pages.
Office Action dated Nov. 16, 2017 for U.S. Appl. No. 15/634,267. 10 pages.
Office action dated Nov. 18, 2016 for U.S. Appl. No. 15/188,939. 15 pages.
Office Action dated Nov. 27, 2017 for U.S. Appl. No. 15/374,318. 10 pages.
Office Action dated Oct. 19, 2017 for U.S. Appl. No. 15/399,186. 19 pages.
Office action dated Oct. 2, 2015 for U.S. Appl. No. 14/744,955. 7 pages.
Office action dated Sep. 10, 2015 for U.S. Appl. No. 14/744,675. 17 pages.
Office Action dated Sep. 11, 2017 for U.S. Appl. No. 15/374,821. 12 pages.
Office action dated Sep. 13, 2016 for U.S. Appl. No. 15/188,939. 8 pages.
Office Action dated Sep. 15, 2017 for U.S. Appl. No. 15/374,616. 24 pages.
Office Action dated Sep. 18, 2017 for U.S. Appl. No. 15/634,228. 17 pages.
Optomec. Lens 850R 3D Printer for Structual Metals. Optomec. YouTube—Web. Published on Jun. 3, 2012. 3 pages. URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
PCT International Search Report and Written Opinion, Application No. PCT/US2023/013522, dated Jun. 15, 2023.
PCT International Search Report and Written Opinion, Application No. PCT/US2023/021231, dated Oct. 17, 2023.
PCT International Search Report and Written Opinion, Application No. PCT/US2023/024161, dated Oct. 12, 2023.
PCT International Search Report and Written Opinion, Application No. PCT/US2023/026649, dated Oct. 23, 2023.
PCT International Search Report and Written Opinion, Application No. PCT/US2023/029876, dated Dec. 4, 2023.
PCT/US2017/060035 International Search Report and Written Opinion dated Jul. 20, 2018. 13 pages.
PCT/US2017/064474 International Search Report and Written Opinion dated Apr. 30, 2018. 14 pages.
PCT/US2018/012250 International Search Report and Written Opinion dated Apr. 30, 2018. 15 pages.
PCT/US2018/020406 International Search Report and Written Opinion dated Jun. 28, 2018. 12 pages.
PCT/US2018/024667 International Search Report and Written Opinion dated Jul. 17, 2018. 14 pages.
PCT/US2019/014635 International Search Report and Written Opinion dated May 13, 2019. 13 pages.
PCT/US2019/024402 International Search Report and Written Opinion dated Aug. 6, 2019. 11 pages.
PCT/US2019/039909 International Search Report dated Oct. 23, 2019.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
U.S. Appl. No. 15/870,561 Office Action dated Nov. 19, 2018.
U.S. Appl. No. 15/871,763 Notice of Allowance dated Aug. 15, 2018.
U.S. Appl. No. 15/871,763 Notice of Allowance dated Nov. 5, 2018.
U.S. Appl. No. 15/871,763 Notice of Allowance dated Sep. 17, 2018.
U.S. Appl. No. 15/871,763 Office Action dated Apr. 19, 2018.
U.S. Appl. No. 15/886,544 Office Action dated Aug. 27, 2018.

(56) References Cited

OTHER PUBLICATIONS

U.S. Appl. No. 15/886,544 Office Action dated Mar. 21, 2019.
U.S. Appl. No. 15/893,523 Notice of Allowance dated May 7, 2018.
U.S. Appl. No. 15/909,388 Office Action dated Dec. 14, 2018.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,406 Notice of Allowance dated May 6, 2019.
U.S. Appl. No. 15/909,406 Office Action dated Aug. 27, 2018.
U.S. Appl. No. 15/909,784 Notice of Allowance dated Jun. 27, 2019.
U.S. Appl. No. 15/909,784 Notice of Allowance dated Mar. 27, 2019.
U.S. Appl. No. 15/909,784 Office Action dated Jan. 18, 2019.
U.S. Appl. No. 15/909,784 Office Action dated Jul. 13, 2018.
U.S. Appl. No. 15/909,806 Office Action dated Aug. 13, 2018.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,809 Notice of Allowance dated Jun. 19, 2019.
U.S. Appl. No. 15/909,809 Notice of Allowance dated May 31, 2019.
U.S. Appl. No. 15/909,809 Office Action dated Aug. 10, 2018.
U.S. Appl. No. 15/909,826 Notice of Allowance dated Jul. 1, 2019.
U.S. Appl. No. 15/909,826 Office Action dated Feb. 13, 2019.
U.S. Appl. No. 15/909,826 Office Action dated May 2, 2018.
U.S. Appl. No. 15/937,778 Office Action dated Feb. 12, 2019.
U.S. Appl. No. 15/937,778 Office Action dated Sep. 21, 2018.
U.S. Appl. No. 15/937,790 Office Action dated Jan. 31, 2019.
U.S. Appl. No. 15/937,790 Office Action dated Sep. 25, 2018.
U.S. Appl. No. 15/937,798 Notice of Allowance dated Jun. 12, 2019.
U.S. Appl. No. 15/937,798 Office Action dated Mar. 7, 2019.
U.S. Appl. No. 15/937,798 Office Action dated Oct. 26, 2018.
U.S. Appl. No. 15/937,812 Office Action dated Sep. 7, 2018.
U.S. Appl. No. 15/937,817 Office Action dated Nov. 23, 2018.
U.S. Appl. No. 16/195,810 Office Action dated Dec. 27, 2019.
U.S. Appl. No. 17/695,092, Office Action, dated Apr. 18, 2023.
U.S. Appl. No. 17/695,092, Office Action, dated Sep. 22, 2023.
U.S. Appl. No. 16/419,912, Notice of Allowance, dated Feb. 24, 2023.
U.S. Appl. No. 15/339,712 Notice of Allowance dated Jul. 24, 2018.
U.S. Appl. No. 15/374,442 Notice of Allowance dated Oct. 3, 2018.
U.S. Appl. No. 15/374,535 Notice of Allowance dated Sep. 24, 2018.
U.S. Appl. No. 15/374,616 Notice of Allowance dated Apr. 2, 2019.
U.S. Appl. No. 15/435,065 Office Action dated Aug. 16, 2018.
U.S. Appl. No. 15/435,110 Notice of Allowance dated Sep. 25, 2018.
U.S. Appl. No. 15/435,110 Office Action dated Apr. 19, 2018.
U.S. Appl. No. 15/490,219 Office Action dated Oct. 12, 2018.
U.S. Appl. No. 15/614,979 Office Action dated Jun. 8, 2018.
U.S. Appl. No. 15/615,029 Office Action dated Apr. 30, 2020.
U.S. Appl. No. 15/634,228 Notice of Allowance dated Feb. 20, 2019.
3D_measurement_Tech_by_Structured_light_Using_Stripe-Edge_Based_Gray_Code, Frankowski et al: (Feb. 14, 2009) (Year: 2009).
Notice of Allowance dated Feb. 21, 2024, U.S. Appl. No. 17/695,092.
Office Action (Final Rejection) dated Apr. 10, 2024 for U.S. Appl. No. 17/849,866 (pp. 1-14).
Office Action (Non-Final Rejection) dated Apr. 3, 2024 for U.S. Appl. No. 17/876,797 (pp. 1-10).

\* cited by examiner

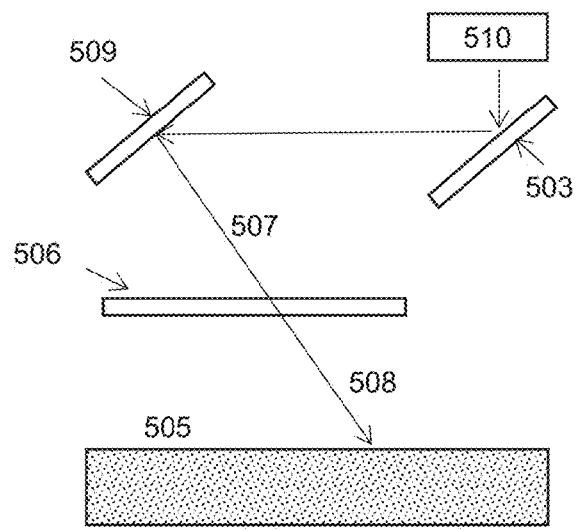
FIG. 5A
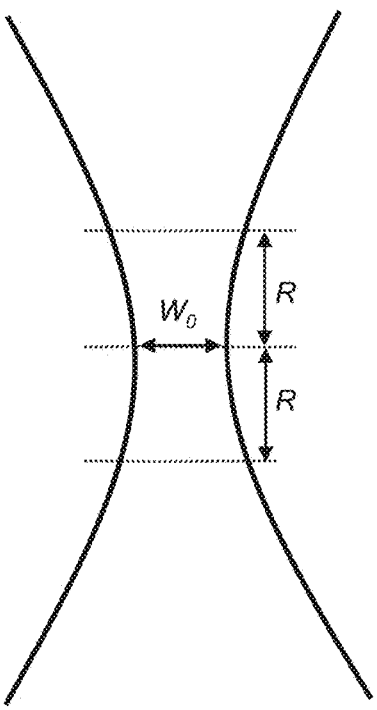
FIG. 5B
FIG. 5C
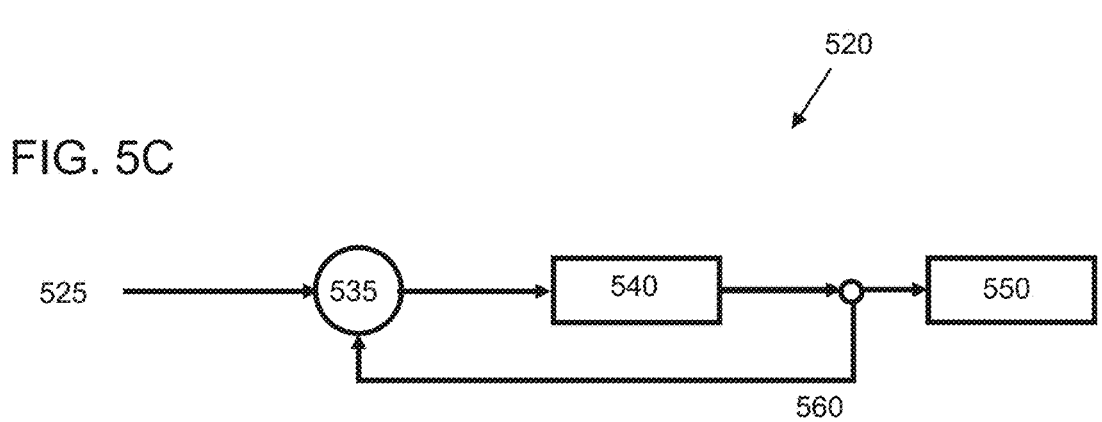

611

613

615

610

612

614

616

QUALITY ASSURANCE IN FORMATION OF THREE-DIMENSIONAL OBJECTS

CROSS-REFERENCE

This application is a continuation of PCT/US20/42596 filed Jul. 17, 2020, which claims the benefit of U.S. Provisional Patent Application No. 62/879,048, filed Jul. 26, 2019, which is incorporated herein by reference in its entirety.

BACKGROUND

Three-dimensional (3D) printing (e.g., additive manufacturing) is a process for making a three-dimensional object of any shape from a design. The design may be in the form of a data source, such as an electronic data source, or may be in the form of a hard copy. The hard copy may be a two-dimensional representation of a 3D object. The data source may be an electronic 3D model. 3D forming (e.g., printing) may be accomplished through an additive process in which successive layers of material are laid down one on top of another. This process may be controlled (e.g., computer controlled, manually controlled, or both). A manufacturing device that is suitable for 3D forming can be an industrial robot.

3D printing can generate custom parts. A variety of materials can be used in a 3D printing process including elemental metal, metal alloy, ceramic, elemental carbon, or polymeric material. In some 3D printing processes (e.g., additive manufacturing), a first layer of hardened material is formed, and thereafter successive layers of hardened material are added one by one, wherein each new layer of hardened material is added on a pre-formed layer of hardened material, until the entire designed three-dimensional structure (3D object) is layer-wise materialized.

3D models may be generated with a computer aided design package, via a 3D scanner, or manually. The modeling process of preparing geometric data for 3D computer graphics may be similar to those of the plastic arts, such as sculpting or animating. 3D scanning is a process of analyzing and collecting digital data on the shape and appearance of a real object (e.g., real-life object). Based on these data, 3D models of the scanned object can be produced.

Many additive processes are currently available for 3D printing. They may differ in the manner layers are deposited and/or formed to create the materialized structure. They may vary in the material(s) that are used to generate the designed structure. Some methods melt and/or soften material to produce the layers. Examples of 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, and/or metal) are cut to shape and joined together.

At times, failure of (i) a manufacturing mechanism (e.g., printer) and/or (ii) process for forming a 3D object may be difficult to predict, observe, and/or quantify, e.g., in real time. Prediction, observation, and/or quantification of such failure may allow remedy (e.g., before, during, and/or after formation of the 3D object) of (i) the manufacturing mechanism and/or (ii) process for forming a 3D object.

SUMMARY

The present disclosure describes methods, apparatuses, systems, and non-transitory computer readable media that assist in prediction, observation, and/or quantification, (e.g., in real time) of failures in (i) a manufacturing mechanism and/or (ii) a process for forming one or more 3D objects.

The operations of any of the methods, non-transitory computer readable media, and/or controller directions described herein can be in any order. At least two of the operation in any of the methods, non-transitory computer readable media, and/or controller(s) can be performed simultaneously.

In an aspect, a method for assuring quality in printing at least one three-dimensional object comprises: (a) analyzing data collected from a first sensor to identify any first deviation from a first expected value, which first sensor is configured to sense a first aspect of printing the at least one three-dimensional object; (b) analyzing data collected from a second sensor to identify any second deviation from a second expected value, which second sensor is configured to sense a second aspect of printing the at least one three-dimensional object; and (c) assessing the quality of printing the at least one three-dimensional object considering the first deviation and the second deviation.

In some embodiments, operations (a) and (b) are performed sequentially. In some embodiments, at least a portion of operations (a) and (b) are performed simultaneously. In some embodiments, the first aspect and/or the second aspect comprises a key variable of printing the at least one three-dimensional object. In some embodiments, assessing the quality of printing comprises considering historical data. In some embodiments, assessing the quality of printing comprises considering external data, and wherein the external data is data collected externally to a printer utilized for printing the at least one three-dimensional object. In some embodiments, assessing the quality of printing comprises considering at least one characteristic of the at least one three-dimensional object. In some embodiments, the at least one characteristic of the at least one three-dimensional object comprises a dimensional accuracy, a material makeup, porosity, material phase, crystal structure, tensile stress, strength, or surface roughness. In some embodiments, the method further comprises providing compliance and/or quality certification data for the at least one three-dimensional object. In some embodiments, the first aspect and/or the second aspect comprises a key variable of printing the at least one three-dimensional object. In some embodiments, the key variable relate to: an environment of printing the at least one three-dimensional object, pre-transformed material from which the at least one three-dimensional object is formed, a target surface at which the pre-transformed material is transformed to form the at least one three-dimensional object, a transforming agent that transforms the pre-transformed material to a transformed material to form the at least one three-dimensional object, and/or any optical component utilized in printing the at least one three-dimensional object. In some embodiments, the data collected by the first sensor and/or second sensor is collected passively. In some embodiments, the data collected by the first sensor and/or second sensor is collected actively. In some embodiments, the data collected by the first sensor and/or second sensor is collected situ and/or in real time during printing of the at least one three-dimensional object. In some embodiments, the data collected by the first sensor and/or second sensor is collected situ and/or in real time during performance of processes dedicated to assurance of the quality of the printing. In some embodiments, the at least one three-dimensional object comprises a plurality of layers, and wherein assessing the quality of printing the at least one three-dimensional object considering any first deviation and any second deviation for at least two of the plurality of layers. In some embodiments, the method further comprises finding and/or utilizing a relationship between at least two of: (i) the first expected value, (ii) data collected by the first sensor, (iii) the first deviation from the first expected value, (iv) the second expected value, (v) data collected by the second sensor, (vi) the second deviation from the second expected value, and (vii) at least one characteristic of the at least one three-dimensional object.

In another aspect, a non-transitory computer-readable medium for assuring quality in printing at least one three-dimensional object, which non-transitory computer-readable medium has saved instructions, that when read by a processor, executes operations comprising: (a) analyzing data collected from a first sensor to identify any first deviation from a first expected value, which first sensor is configured to sense a first aspect of printing the at least one three-dimensional object; (b) analyzing data collected from a second sensor to identify any second deviation from a second expected value, which second sensor is configured to sense a second aspect of printing the at least one three-dimensional object; and (c) assessing the quality of printing the at least one three-dimensional object considering the first deviation and the second deviation.

In some embodiments, the non-transitory computer readable medium comprises, or is operatively coupled to a database incorporating the data collected from the first sensor and/or the data collected from the second sensor. In some embodiments, the non-transitory computer readable medium comprises, or is operatively coupled to a database incorporating historical data, and wherein assessing the quality of printing comprises considering historical data. In some embodiments, the non-transitory computer readable medium comprises, or is operatively coupled to, a database incorporating external data, wherein assessing the quality of printing comprises considering the external data, and wherein the external data is data collected externally to a printer utilized for printing the at least one three-dimensional object. In some embodiments, the first aspect and/or the second aspect comprises a key variable of printing the at least one three-dimensional object. In some embodiments, the key variable relate to: an environment of printing the at least one three-dimensional object, pre-transformed material from which the at least one three-dimensional object is formed, a target surface at which the pre-transformed material is transformed to form the at least one three-dimensional object, a transforming agent that transforms the pre-transformed material to a transformed material to form the at least one three-dimensional object, and/or any optical component utilized in printing the at least one three-dimensional object. In some embodiments, the non-transitory computer-readable medium has saved instructions, that when read by a processor, executes operations comprising: providing compliance and/or quality certification data for the at least one three-dimensional object. In some embodiments, the non-transitory computer-readable medium has saved instructions, that when read by a processor, executes operations comprising: finding and/or utilizing a relationship between at least two of: (i) the first expected value, (ii) data collected by the first sensor, (iii) the first deviation from the first expected value, (iv) the second expected value, (v) data collected by the second sensor, (vi) the second deviation from the second expected value, and (vii) at least one characteristic of the at least one three-dimensional object. In some embodiments, the at least one characteristic of the at least one three-dimensional object comprises a dimensional accuracy, a material makeup, porosity, material phase, crystal structure, tensile stress, strength, or surface roughness. In some embodiments, the data collected from the first sensor and/or the second sensor is time and location stamped. In some embodiments, the at least one three-dimensional object is printed layerwise, and wherein the location is layerwise. In some embodiments, the at least one three-dimensional object comprises a plurality of layers, and wherein assessing the quality of printing the at least one three-dimensional object considering any first deviation and any second deviation for at least two of the plurality of layers.

In another aspect, an apparatus for assuring quality of printing at least one three-dimensional object comprises one or more controllers that are configured to operatively couple to three-dimensional printer, which one or more controllers are configured to perform or direct performance of: (a) analysis of data collected from a first sensor to identify any first deviation from a first expected value, which first sensor is configured to sense a first aspect of printing the at least one three-dimensional object; (b) analysis of data collected from a second sensor to identify any second deviation from a second expected value, which second sensor is configured to sense a second aspect of printing the at least one three-dimensional object; and (c) assess quality of printing the at least one three-dimensional object considering the first deviation and the second deviation and generate a result.

In some embodiments, the one or more controllers are configured to direct the three-dimensional printer to print the at least one three-dimensional object based at least in part on the result. In some embodiments, the one or more controllers are operatively coupled to first sensor and to a second sensor, and wherein the one or more controllers are configured to direct collection of data from the first sensor and from the second sensor. In some embodiments, the one or more controllers are configured to perform, or direct performance of, assessment of the quality of printing comprises by considering historical data. In some embodiments, the one or more controllers are configured to perform, or direct performance of, assessment of the quality of printing comprises by considering external data, and wherein the external data is data collected externally to a printer utilized for printing the at least one three-dimensional object. In some embodiments, the one or more controllers comprise an electrical circuitry, an electrical socket, or an electrical outlet. In some embodiments, the first aspect and/or the second aspect comprises a key variable of printing the at least one three-dimensional object. In some embodiments, the key variable relate to: an environment of printing the at least one three-dimensional object, pre-transformed material from which the at least one three-dimensional object is formed, a target surface at which the pre-transformed material is transformed to form the at least one three-dimensional object, a transforming agent that transforms the pre-transformed material to a transformed material to form the at least one three-dimensional object, and/or any optical component utilized in printing the at least one three-dimensional object. In some embodiments, the one or more controllers are configured to perform, or direct performance of: providing compliance and/or quality certification data for the at least one three-dimensional object. In some embodiments, the one or more controllers are configured to perform, or direct performance of: finding and/or utilizing a relationship between at least two of: (i) the first expected value, (ii) data collected by the first sensor, (iii) the first deviation from the first expected value, (iv) the second expected value, (v) data collected by the second sensor, (vi) the second deviation from the second expected value, and (vii) at least one characteristic of the at least one three-dimensional object. In some embodiments, the at least one characteristic of the at least one three-dimensional object comprises a dimensional accuracy, a material makeup, porosity, material phase, crystal structure, tensile stress, strength, or surface roughness. In some embodiments, the first sensor and/or second sensor are passive. In some embodiments, the first sensor and/or second sensor are active. In some embodiments, the first sensor and/or second sensor configured to collect data in situ and/or in real time during printing of the at least one three-dimensional object. In some embodiments, the first sensor and/or second sensor configured to collect data in situ and/or in real time during performance of processes dedicated to assurance of the quality of the printing. In some embodiments, the at least one three-dimensional object comprises a plurality of layers, and wherein assessing the quality of printing the at least one three-dimensional object considering any first deviation and any second deviation for at least two of the plurality of layers.

In another aspect, a non-transitory computer-readable medium, comprises: machine-executable code that comprises commands according to any of the methods for processing the first file associated with instructions for forming at least one three-dimensional object as described herein (e.g., the methods described above).

Another aspect of the present disclosure provides a method that utilizes a system (and/or any component thereof) disclosed herein Another aspect of the present disclosure provides a method that utilizes an apparatus (and/or any component thereof) disclosed herein.

Another aspect of the present disclosure provides a method that utilizes an apparatus comprising a controller. In some embodiments, the method effectuates one or more operations of the controller. For example, the method may include one or more operations directed by the controller. For example, the method may include controlling one or more apparatuses, systems, and/or components thereof that are controlled by the controller, e.g., in a manner directed by the controller.

Another aspect of the present disclosure provides a method that utilizes a computer system comprising one or more computer processors and at least one non-transitory computer-readable medium coupled thereto. In some embodiments, the method effectuates one or more operations by the one or more computer processors. For example, the method may include operations executed by the one or more computer processors. For example, the method may include one or more operations that are embodied as machine-executable code that is stored by the non-transitory computer-readable medium. For example, the method may include controlling operations of the computer system upon execution of the machine-executable code, e.g., by the one or more computer processors.

Another aspect of the present disclosure provides a method that utilizes at least one non-transitory computer-readable medium comprising machine-executable code. In some embodiments, the method effectuates one or more operations by one or more computer processors. For example, the method may include operations executed by the one or more computer processors. For example, the method may include controlling operations of the one or more computer processors upon execution of the machine-executable code, e.g., that is stored by the at least one non-transitory computer-readable medium.

Another aspect of the present disclosure provides a system for effectuating the methods disclosed herein.

Another aspect of the present disclosure provides an apparatus for effectuating the methods disclosed herein.

Another aspect of the present disclosure provides an apparatus comprising a controller that directs effectuating one or more operations in the method disclosed herein, wherein the controller is operatively coupled to the apparatuses, systems, and/or mechanisms that it controls to effectuate the method.

Another aspect of the present disclosure provides an apparatus for printing one or more 3D objects comprises a controller that is programmed to direct a mechanism used in a 3D printing methodology to implement (e.g., effectuate) any of the method disclosed herein, wherein the controller is operatively coupled to the mechanism.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods above or elsewhere herein.

Another aspect of the present disclosure provides a non-transitory computer-readable medium comprising machine-executable code that, upon execution by one or more computer processors, implements any of the methods disclosed herein.

In another aspect, a non-transitory computer-readable medium comprises machine-executable code that, upon execution by one or more processors, implement any of the methods (e.g., the methods described above) for processing at least one file associated with instructions for forming at least one three-dimensional object.

In another aspect, a computer-implemented method for processing at least one file associated with instructions for forming at least one three-dimensional object, comprises any of the methods (e.g., the methods described above).

In another aspect, a computer software product, comprises: a non-transitory computer-readable medium storing program instructions that comprise commands according to any of the methods for processing the first file associated with instructions for forming at least one three-dimensional object as described herein (e.g., the methods described above).

In another aspect, one or more computer-readable non-transitory storage media embodying software that comprises: commands according to any of the methods for processing the first file associated with instructions for forming at least one three-dimensional object as described herein (e.g., the methods described above). Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig.," Figs.," "FIG." or "FIGs." herein), of which:

FIG. 5A schematically illustrates an optical setup; FIG. 5B schematically illustrates an energy beam; FIG. 5C schematically illustrates a control scheme;

Figure 1:
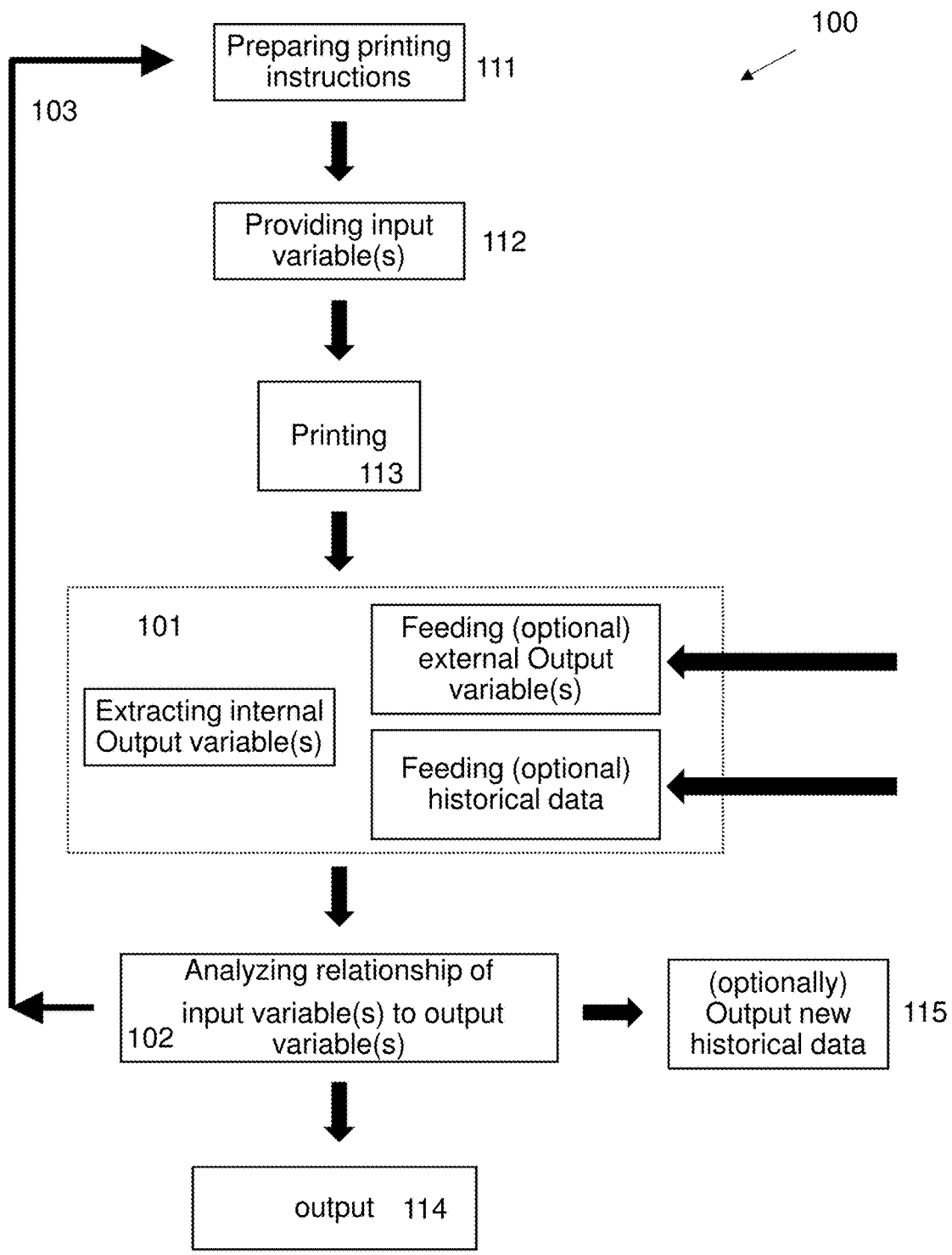
FIG. 1 illustrates a flowchart.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity, but may include the general class of which a specific example may be used for illustration. The terminology herein is used to describe specific embodiments of the invention, but their usage does not delimit the invention.

In some embodiments, disclosed herein are methods, apparatuses, systems, and computer readable media, that relate to compliance data and/or quality certification data of 3D object(s) and machinery utilized for their production.

The phrase "a three-dimensional object" as used herein may refer to "one or more three-dimensional objects," as applicable.

In some embodiments, the methods, apparatuses, systems, and computer readable media disclosed herein are concerned with whether the production machinery (e.g., 3D printer) is at a state at which it can form a 3D object according to requested specification(s) (e.g., within prescribed tolerance (s)). In some embodiments, the methods, apparatuses, systems, and computer readable media disclosed herein are concerned with whether the production machinery has a correct or incorrect (i) input variable state (e.g., value) and/or (ii) state of the input variable. At times, it is difficult to satisfy these concerns. In some embodiments, the methods, apparatuses, systems, and computer readable media disclosed herein satisfy these concerns at least in part.

In some embodiments, the methods, apparatuses, systems, and computer readable media disclosed herein are concerned with (i) whether one or more input variables related to the production machinery are in a correct state (e.g., prescribed or predetermined state), (ii) whether the one or more input variables are in an incorrect state, and (iii) what is the difference between any incorrect state of the one or more input variables and a correct state of the one or more input variables. At times, it is difficult to satisfy these concerns. In some embodiments, the methods, apparatuses, systems, and computer readable media disclosed herein satisfy these concerns at least in part.

In some embodiments, an accuracy of failure prediction in a three-dimensional object, (e.g., that may affect its performance for its intended purpose) may be increased as more variables indicate a deviation from their intended value (e.g., within a tolerance). For example, the failure prediction accuracy may increase as more key variables indicate a deviation from their intended value. In some embodiments, a collective deviation in the (respective) value of a plurality of (e.g., key) variables are a better prediction of failure than a deviation in value of a single (e.g., key) variable. In some embodiments, a (e.g., smaller) deviation in the (respective) value of a plurality of (e.g., key) variables are a better prediction of failure than a (e.g., larger) deviation in value of a single (e.g., key) variable. The better prediction may refer to an earlier prediction, more accurate prediction, and/or more reliable prediction. At least two of the values of the variables integrated to predict any failure may be given different importance (e.g., weight). At least two of the values of the variables integrated to predict any failure may have (e.g., substantially) the same importance (e.g., weight). The importance may vary dependent on the manufacturing machine and/or process.

In some embodiments, it may be difficult to know and/or account for the entire field of variables (e.g., input and/or output variables) taking part in forming the 3D object. In some embodiments, the field of variables of forming the 3D object is vast. At least partially for these reasons, it may be difficult to satisfy the concerns mentioned herein. It may be practical and/or otherwise beneficial (e.g., time and/or cost effective) to choose a subset of the field of variable. For example, it may be beneficial to choose key variables.

In some embodiments, at least one element of the production machinery provides its status at a certain time. That status may be recorded (e.g., and time stamped). The elements may be any component of the production machinery (e.g., a sensor). There may be at least one digit (e.g., less than ten), tens, hundreds, or thousands, of sensors in a production machinery. The component may be a mechanical, optical, and/or electronic, component.

In some embodiments, the one or more variables comprise one or more key variables. The key variable(s) are influential in an outcome of the 3D object(s) being formed. For example, a change in a key variable has a measurable signature in the formed 3D object. For example, a change in a key variable has a measurable signature in the 3D printing process. For example, a change in a key variable has a measurable signature in the production machinery (e.g., 3D printer). At times, monitoring the quality of the 3D object(s) formed (e.g., produced) is a way to measure if we account for all the key variables. The quality of the 3D object comprises surface quality, microstructure (e.g., metallurgical, composition, and/or crystal structure), porosity, or dimensional accuracy. The key variables may relate to the environment of the printing process, the pre-transformed material, the transforming agent (e.g., energy beam), any material bed utilized in the printing process, and/or any optical components utilized in the printing process.

In some embodiments, the methods, apparatuses, systems, and computer readable media disclosed herein are concerned with whether the forming process of the 3D object(s) (e.g., the 3D printing process) that is being executed is under control. For example, is the process proceeding as prescribed. For example, is the execution of components(s) of the production machinery proceeding as prescribed? For example, is the production process proceeding as prescribed? At times, it is difficult to satisfy these concerns. In some embodiments, the methods, apparatuses, systems, and computer readable media disclosed herein satisfy these concerns at least in part.

Described herein is a computer readable media. The computer readable media may comprise a database or a code executable by a processor. The database may comprise one or more process variables. The database may comprise at least one characteristic of a variable, comprising the variable (i) type, (ii) prescribed state, or (iii) actual state at a specific time (e.g., time stamped). The specific time may be before, during, and/or after the forming process of the 3D object (e.g., printing process). The database may be utilized for analysis, e.g., before, during and/or after printing the 3D object. For example, after a 3D object is produces, the database may be analyzed, e.g., as to the input and/or output variable(s). The input variable may or may not relate to the output variable. The database may facilitate estimation regarding whether the production machinery was at a requested state, how close was the actual state of the production machinery compared to the requested state (e.g., variable value), and/or what are any deviation (e.g., errors) in the production machinery (e.g., deviation in any of its components). The database may facilitate estimation regarding whether the process proceeded was as prescribed, how close was the actual process compared to the prescribed process and/or what are any deviation (e.g., errors) in the process (e.g., errors in any of its components). The database may facilitate estimation regarding whether the 3D object was produced as requested, how close was the produced 3D object compared to the requested 3D object and/or what are any deviation (e.g., errors) in the produced 3D object (e.g., composition, surface finish, porosity, stress, strain, harness, and/or dimensional accuracy).

In some embodiments, the one or more variables derive internally from the production machinery and/or process utilized for forming the 3D object. For example, a variable may relate to output data of a sensor operatively coupled to the manufacturing machinery. For example, a variable may relate to input data for a component of the production machinery (e.g., coordinates of a footprint of an energy beam on a target surface at a specific time). The processes performed during forming of the 3D object by the production machinery (e.g., 3D printer) may be referred to herein as "internal processes.

The phrase "a target surface" may refer to (1) a surface of a build plane (e.g., an exposed surface of a material bed), (2) an exposed surface of a platform, (3) an exposed surface of a 3D object (or a portion thereof), (4) any exposed surface adjacent to an exposed surface of the material bed, platform, or 3D object, and/or (5) any targeted surface. Targeted may be by at least one energy beam.

The term "operatively coupled" or "operatively connected" refers to a first mechanism that is coupled (or connected) to a second mechanism to allow the intended operation of the second and/or first mechanism, including a first mechanism that is in signal communication with a second mechanism. The term "configured to" refers to an object or apparatus that is (e.g., structurally) configured to bring about an intended result. The phrase "is/are structured," or "is/are configured," when modifying an article, refers to a structure of the article that is able to bring about the enumerated result.

In some embodiments, the one or more variables are external to the production machinery and/or process utilized for forming the 3D object. For example, the one or more variables may relate to test performed on the produced 3D object(s) to determine its one or more characteristics. The one or more characteristics of the 3D object comprise dimensional accuracy, mechanical property, microstructure, or functionality. The functionality may be tested using a functionality test that comprises computed tomography, microscopy, defectivity, or X-ray. The mechanical property may comprise stress or strain. The external variables may be provided by a customer. The external data may derive from any post-processing performed on the 3D object after its generation by the production machinery (e.g., 3D printer).

In some embodiments, the 3D object is devoid of surface features that are indicative of the use of a post printing process. In some embodiments, the 3D object is including surface features that are indicative of the use of a post printing process. The post printing process may comprise a trimming process (e.g., to trim auxiliary supports). The trimming process may comprise ablation by an energy beam (e.g., laser), mechanical, or chemical trimming. The trimming process may be an operation conducted after the completion of the 3D printing process (e.g., using the pre-transformed material). The trimming process may be a separate operation from the 3D printing process. The trimming may comprise cutting (e.g., using a piercing saw). The trimming can comprise polishing or blasting. The blasting can comprise solid blasting, gas blasting, or liquid blasting. The solid blasting can comprise sand blasting. The gas blasting can comprise air blasting. The liquid blasting can comprise water blasting. The blasting can comprise mechanical blasting. Further processing (e.g., post processing) may comprise polishing (e.g., sanding). For example, in some cases the generated 3D object can be retrieved from the manufacturing machinery (e.g., printer) and finalized without removal of transformed material and/or auxiliary features.

The internal and/or external variables may correlate. In some embodiments, the methods, apparatuses, systems, and computer readable media disclosed herein correlate the variable comprising the internal or internal variables. For example, a first set of one or more internal variables may correlate to a second set of one or more internal variables. For example, a first set of one or more external variables may correlate to a second set of one or more external variables. For example, a first set of one or more internal variables may correlate to a second set of one or more external variables.

In some embodiments, the methods, apparatuses, systems, and computer readable media disclosed herein may reveal any relationship between (i) deviations in (e.g., key) input variable(s), (ii) (e.g., key) output variable(s), and (ii) one or more characteristics of the formed 3D object.

In some embodiments, the methods, apparatuses, systems, and computer readable media disclosed herein may utilize combination of sensor data, and characterization techniques (e.g., energy beam motion and power sequences), to dynamically (e.g., in real time) characterize the state of manufacturing the 3D object. The characterization techniques may comprise process techniques.

FIG. 1 shows an example of various operations of a method 100 for printing at least a portion of a 3D object, including (a) preparation of printing instructions 111, (b) providing input variable(s) 112 to a production machinery (e.g., 3D printer) to form the least a portion of the 3D object (e.g., print the least a portion of the 3D object), which input variables can be recorded in a database; (c) forming (e.g., printing 113) the least a portion of the 3D object; (d) database recordation 101 of output variables comprising: internal variables, (optional) external variables, or (optional) historical variables (e.g., collected from prior 3D object forming operations); (e) analysis 102 of any relationship between input and output variables; (f) output 114 (e.g., to a user such as a customer); and (g) optionally generating new historical data 115 (e.g., based on the internal and/or external output variables in operation 101). An outcome of the relationship analysis in 102 may be utilized 103 in preparation of printing instructions for another portion of the 3D object in real time (e.g., as defined herein). An outcome of the relationship analysis in 102 may be utilized 103 in preparation of printing instructions for another portion of the 3D object in the instant printing cycle, for another 3D object in the instant printing cycle, and/or for another 3D object in another printing cycle. The operations of the method may be executed in any order. At least two operations of the method may be performed sequentially. At least a portion of two or more operations of the method may be performed simultaneously (e.g., in parallel). A non-transitory computer readable media may comprise saved instruction executing one or more operations of the method. One or more controllers may direct execution of one or more operations of the method. The method may be executed during and/or after formation of the 3D object(s). The internal variables in the database may comprise data collected in situ and/or in real time during formation of the 3D object. Data collected in situ may comprise data collected in the manufacturing machinery (e.g., in the 3D printing system), including in any of its components.

In some instances, the controller(s) can include (e.g., electrical) circuitry that is configured to generate output (e.g., voltage signals) for directing one or more aspects of the apparatuses (or any parts thereof) described herein. FIG. 5C shows a schematic example of a (e.g., automatic) controller (e.g., a control system, or a controller) 520 that is programmed or otherwise configured to facilitate formation of one or more 3D objects. The controller may comprise an electrical circuitry. The controller may comprise a connection to an electrical power. The controller (e.g., FIG. 5C, 520) can comprise a subordinate-controller 540 for controlling formation of at least one 3D object (e.g., FIG. 5C, 550). The controller may comprise one or more loop schemes (e.g., open loop, feed-forward loop and/or feedback loop). In the example of FIG. 5C, the controller optionally includes feedback control loop 560. The subordinate-controller may be an internal-controller. The controller (e.g., or subordinate controller) may comprise a proportion-integral-derivative (PID) loop. The subordinate-controller can be a second controller as part of the first controller. The subordinate-controller can be a linear controller. The controller may be configured to control one or more components of the forming tool. The controller may be configured to control a transforming agent generator (e.g., an energy source, a dispenser of the binding agent and/or reactive agent), a guidance mechanism (e.g., scanner and/or actuator), at least one component of a layer dispenser, a dispenser (e.g., of a pre-transformed material and/or a transforming agent), at least one component of a gas flow system, at least one component of a chamber in which the 3D object is formed (e.g., a door, an elevator, a valve, a pump, and/or a sensor). The controller may control at least one component of the forming apparatus such as the forming agent (e.g., transforming agent). For example, the controller (e.g., FIG. 5C, 520) may be configured to control (e.g., in real time, during at least a portion of the 3D printing) a controllable property comprising: (i) an energy beam power (e.g., delivered to the material bed), (ii) temperature at a position in the material bed (e.g., on the forming 3D object), (iii) energy beam speed, (iv) energy beam power density, (v) energy beam dwell time, (vi) energy beam irradiation spot (e.g., on the exposed surface of the material bed), (vii) energy beam focus (e.g., focus or defocus), or (viii) energy beam cross-section (e.g., beam waist). The controller (e.g., FIG. 5C, 520) may be configured to control (e.g., in real time, during at least a portion of the 3D printing) a controllable (e.g., binding and/or reactive agent) property comprising: (i) strength (e.g., reaction rate), (ii) volume (e.g., delivered to the material bed), (iii) density (e.g., on a location of the material bed), or (iv) dwell time (e.g., on the material bed). The controllable property may be a control variable. The control may be to maintain a target parameter (e.g., temperature) of one or more 3D objects being formed. The target parameter may vary in time (e.g., in real time) and/or in location. The location may comprise a location at the exposed surface of the material bed. The location may comprise a location at the top surface of the (e.g., forming) 3D object. The target parameter may correlate to the controllable property. The (e.g., input) target parameter may vary in time and/or location in the material bed (e.g., on the forming 3D object). The subordinate-controller may receive a pre-determined power per unit area (of the energy beam), temperature, and/or metrological (e.g., height) target value. For example, the subordinate-controller may receive a target parameter (e.g., FIG. 5C, 525) (e.g. temperature) to maintain at least one characteristic of the forming 3D object (e.g., dimension in a direction, and/or temperature). The controller can receive multiple (e.g., three) types of target inputs: (i) characteristic of the transforming agent (e.g., energy beam power), (ii) temperature, and (iii) geometry. Any of the target input may be user defined. The geometry may comprise geometrical object pre-print correction. The geometric information may derive from the 3D object (or a correctively deviated (e.g., altered) model thereof). The geometry may comprise geometric information of a previously printed portion of the 3D object (e.g., comprising a local thickness below a given layer, local build angle, local build curvature, proximity to an edge on a given layer, or proximity to layer boundaries). The geometry may be an input to the controller (e.g., via an open loop control scheme). Some of the target values may be used to form 3D forming instructions for generating the 3D object (e.g., FIG. 5C, 550). The forming instructions may be dynamically adjusted in real time. The controller may monitor (e.g., continuously) one or more signals from one or more sensors for providing feedback (e.g., FIG. 5C, 560). For example, the controller may monitor the energy beam power, temperature of a position in the material bed, and/or metrology (e.g., height) of a position on the target surface (e.g., exposed surface of a material bed). The position on the target surface may be of the forming 3D object. The monitor may be continuous or discontinuous. The monitor may be in real-time during the 3D printing. The monitor may be using the one or more sensors. The forming instructions may be dynamically adjusted in real time (e.g., using the signals from the one or more sensors). A variation between the target parameter and the sensed parameter may be used to estimate an error in the value of that parameter (e.g., FIG. 5C, 535). The variation (e.g., error) may be used by the subordinate-controller (e.g., FIG. 5C, 540) to adjust the forming instructions. The controller may control (e.g., continuously) one or more parameters (e.g., in real time). The controller may use historical data (e.g., for the parameters). The historical data may be of previously printed 3D objects, or of previously printed layers of the 3D object. Configured may comprise built, constructed, designed, patterned, or arranged. The hardware of the controller may comprise the control-model. The control-model may be linear or non-linear. For example, the control-model may be non-linear. The control-model may comprise linear or non-linear modes. The control-model may comprise free parameters which may be estimated using a characterization process. The characterization process may be before, during and/or after the 3D printing. The control-model may be wired to the controller. The control model can be configured into the controller (e.g., before and/or during the 3D printing). Examples of a controller, subordinate controller, and/or control-model can be found in patent application serial number PCT/US16/59781; patent application serial number PCT/US17/18191; patent application Ser. No. 15/435,065; patent application serial number EP17156707; and/or patent application serial number PCT/US17/54043; each of which is incorporated herein by reference in its entirety.

In some embodiments, a 3D forming (e.g., printing, or print) cycle refers to printing one or more 3D objects in a 3D printer, e.g., using one printing instruction batch. A 3D printing cycle may include printing one or more 3D objects above a (single) platform and/or in a material bed. A 3D printing cycle may include printing all layers of one or more 3D objects in a 3D printer. On the completion of a 3D printing cycle, the one or more objects may be removed from the 3D printer (e.g., by sealing and/or removing the build module from the printer) in a removal operation (e.g., simultaneously). During a printing cycle, the one or more objects may be printed in the same material bed, above the same platform, with the same printing system, at the same time span, using the same forming (e.g., printing) instructions, or any combination thereof. A print cycle may comprise printing the one or more objects layer-wise (e.g., layer-by-layer). A layer may have a layer height. A layer height may correspond to a height of (e.g., distance between) an exposed surface of a (e.g., newly) formed layer with respect to a (e.g., top) surface of a prior-formed layer. In some embodiments, the layer height is (e.g., substantially) the same for each layer of a print cycle (e.g., within a material bed). In some embodiments, at least two layers of a print cycle within a material bed have different layer heights. A printing cycle may comprise a collection (e.g., sum) of print operations. A print operation may comprise a print increment (e.g., deposition of a layer of pre-transformed material, and transformation of a portion thereof to form at least a portion of the 3D object). A forming (e.g., printing) cycle (also referred to herein as "build cycle") may comprise one or more forming (e.g., formation) laps. A forming lap may comprise the process of forming a formed (e.g., printed) layer in a layerwise deposition to form the 3D object. The printing-lap may be referred to herein as "build-lap" or "print-increment." In some embodiments, a printing cycle comprises one or more printing laps. The 3D printing lap may correspond with (i) depositing a (planar) layer of pre-transformed material (e.g., as a portion of a material bed) above a platform, and (ii) transforming at least a portion of the pre-transformed material (e.g., by a transforming agent such as at least one energy beam) to form a layer of a 3D objects above the platform (e.g., in the material bed). The printing cycle may comprise a plurality of laps to layerwise form the 3D object. The 3D printing cycle may correspond with (I) depositing a pre-transformed material toward a platform, and (II) transforming at least a portion of the pre-transformed material (e.g., by a transforming agent such as at least one energy beam) at or adjacent to the platform to form one or more 3D objects above the platform at the same time-window. An additional sequential layer (or portion thereof) can be added to a previous layer of a 3D object by transforming (e.g., fusing and/or melting) a fraction of pre-transformed material that is introduced (e.g., as a pre-transformed material stream) to the prior-formed layer of transformed material. At times, the platform supports a plurality of material beds and/or a plurality of 3D objects. One or more 3D objects may be formed in a single material bed during a printing cycle (e.g., having one or more print jobs). The transformation may connect transformed material of a given layer (e.g., formed during a printing lap) to a previously formed 3D object portion (e.g., of a previous printing lap). The transforming operation may comprise utilizing a transforming agent (e.g., an energy beam or a binder) to transform the pre-transformed (or re-transform the transformed) material. In some instances, the transforming agent is utilized to transform at least a portion of the material bed (e.g., utilizing any of the methods described herein).

In some embodiments, the variable database is stored on at least one server (comprising a memory). The stored database comprises data of the one or more variables. The database may be accessed and/or operatively coupled to a computer. The database may be operatively coupled (e.g., directly or indirectly) to at least one manufacturing machinery (e.g., printer). The database may be operatively coupled to (e.g., another) user computer. The user computer may comprise a non-transitory computer readable media (e.g., software) that manipulates at least a portion of the database. The user may be a customer. The non-transitory computer readable media may allow the user to view status of the one or more variable, any deviation in the one or more variables from an expected and/or prescribed state. The user may view a status of at least one aspect of the 3D object forming process. The user may view a status of at least one aspect of the production machinery (e.g., printer). The user may view a status of the formed 3D object (e.g., during its formation). The non-transitory computer readable media may alert the user in a deviation (e.g., above a threshold) in a variable. The threshold may be predetermined, or altered by the user (e.g., before, during, and/or after forming the 3D object). The non-transitory computer readable media may alert the user in a variable status that is in a prescribed and/or requested state (e.g., within a tolerance). The tolerance may be predetermined, or altered by the user (e.g., before, during, and/or after forming the 3D object). For example, a compliant value of the variable may be associated a symbol and/or color (e.g., green circle). For example, a non-compliant value of the variable may be associated a symbol and/or color (e.g., red circle). There may be a scale of non-compliance (e.g., slight, medium, and/or gross). For example, a medium non-compliant value of the variable may be associated a symbol and/or color (e.g., yellow circle), and a gross non-compliant value of the variable may be associated a symbol and/or color (e.g., red circle). Instead of a color and/or symbol, compliance and any non-compliance may be represented on scale as relative values.

Figure 2:
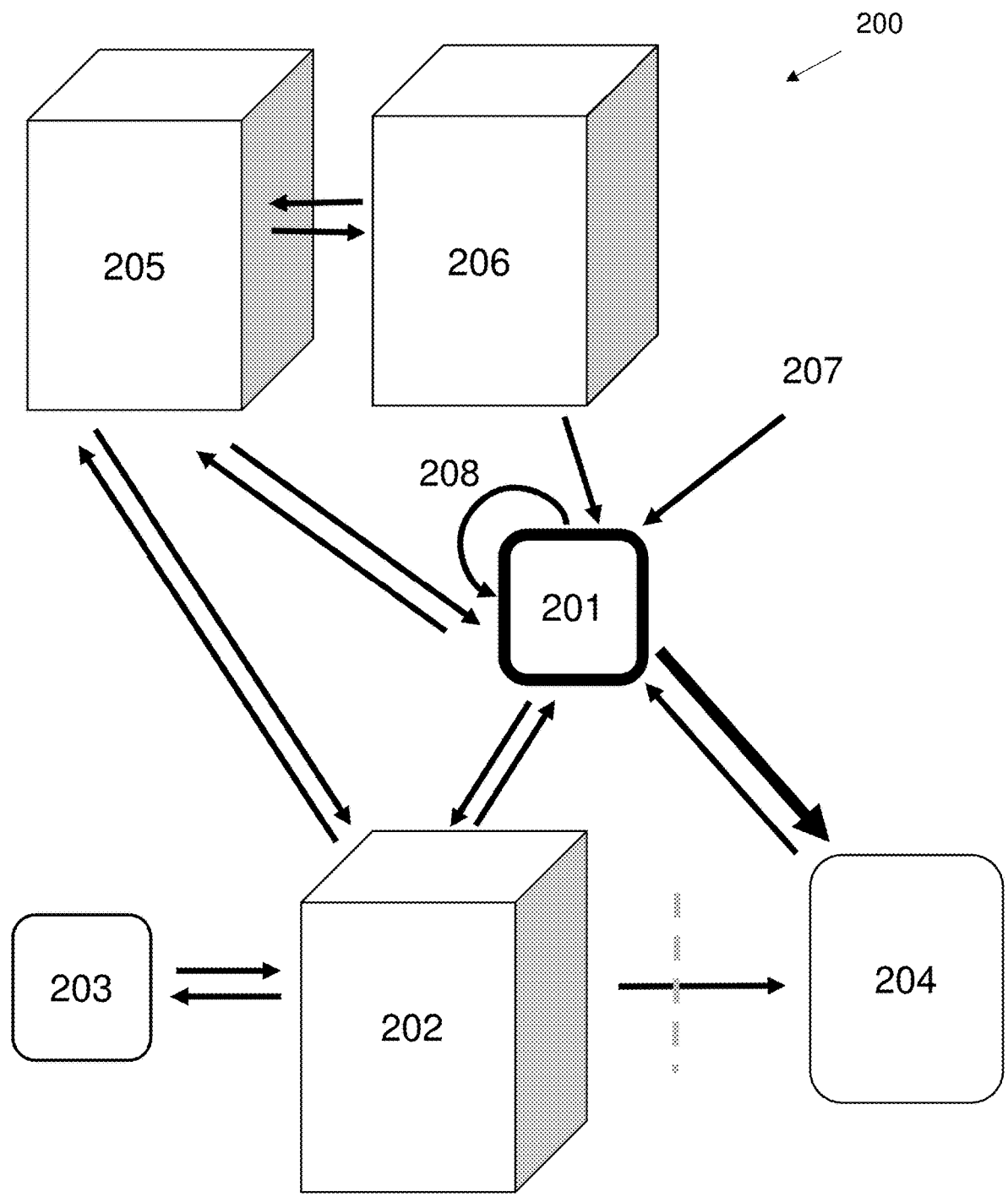
FIG. 2 schematically illustrates a system used in forming 3D object(s)

FIG. 2 shows an example of a system 200 for forming 3D object(s). In the example shown in FIG. 2, coupling of various components of the system is symbolized by arrows (e.g., designating communication direction, e.g., data flow). In the example shown in FIG. 2, a quality assurance (abbreviated herein as "QA") program 201 (e.g., embodied in a computer), is operatively coupled to a database 205 of internal (e.g., real-time) data, a database 206 of historical data, and to the manufacturing machinery (e.g., printer) 202. The database 205 of the internal data is operatively coupled to the manufacturing machinery 202. The QA program 201 may receive external input variables 207. The QA program 201 may output an analysis and/or status of at least a portion of a 3D object (e.g., during and/or after its formation) to a user 204 (e.g., to a processor of a user). The manufacturing machinery 202 may output any variable on another processor (e.g., 203). The QA program 201 may manipulate 208 the data used (e.g., while analyzing the data). The communication may be wired or wireless communication (or any other communication disclosed herein). The processor may be comprised in a computer, iPad, wearable device (e.g., watch), or cell phone. The processor may be any processor disclosed herein. At least two of the computer readable media disclosed herein can reside (e.g., at least in part) on the same machine, use the same memory, reside on the same motherboard, or use the same circuitry. At least two of the computer readable media disclosed herein can reside (e.g., at least in part) on different machines, different memories, reside on different motherboards, or use different circuitry. For example, the QA program and the internal data database can be operatively coupled to the same processor (e.g., reside on the same computer). The historical data and the real-time data can be integrated in the same database. The printer output processor and the processor on which the QA program resides, can be the same processor.

At times, conceptualization of a 3D object (e.g., design) begins with a rendering. The rendering may comprise a drawing and/or a geometric model. The geometric model may be a corporeal (e.g., real-world) model, and/or a virtual (e.g., software) model. The model may comprise at least one geometry and/or topology of the 3D object (e.g., FIG. 4, 401). The 3D object may be formed by one or more manufacturing processes (e.g., 3D printing). The one or more manufacturing processes may be controlled (e.g., manually and/or automatically). In some embodiments, a manufacturing process comprises a plurality of forming instructions that specify (e.g., a sequence of) operations to generate a (e.g., requested) 3D object. The forming instructions may command at least one apparatus of a manufacturing device in the formation of the requested 3D object. The forming instructions may be embodied in software and/or firmware. At times, a pre-formation application (e.g., stored on a non-transitory computer-readable medium) generates forming instructions data for forming at least one requested 3D object. The forming instructions may be generated while considering the requested 3D object (e.g., geometric model). The manufacturing device, when supplied with starting materials and upon execution of the forming instructions, may generate (e.g., a physical, real world manifestation of) the requested 3D object.

Three-dimensional printing (also "3D printing") generally refers to a process for generating a 3D object. The apparatuses, methods, controllers, and/or software described herein pertaining to generating (e.g., forming, or printing) a 3D object, pertain also to generating one or more 3D objects. For example, 3D printing may refer to sequential addition of material layers or joining of material layers (or parts of material layers) to form a 3D structure, in a controlled manner. The controlled manner may comprise manual or automated control. In the 3D printing process, the deposited material can be transformed (e.g., fused, sintered, melted, bound, or otherwise connected) to subsequently harden and/or form at least a portion of the 3D object. Fusing (e.g., sintering or melting) binding, or otherwise connecting the material is collectively referred to herein as transforming a pre-transformed material (e.g., powder material) into a transformed material. Fusing the material may include melting or sintering the material. Binding can comprise chemical bonding. Chemical bonding can comprise covalent bonding. Examples of 3D printing may include additive printing (e.g., layer by layer printing, or additive manufacturing). 3D printing may include layered manufacturing. 3D printing may include rapid prototyping. 3D printing may include solid freeform fabrication. The 3D printing may further comprise subtractive printing.

3D printing methodologies can comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition. 3D printing methodologies may comprise a binder that binds pre-transformed material (e.g., binding a powder). The binder may remain in the 3D object, or may be (e.g., substantially) absent from the 3D printing (e.g., due to heating, extracting, evaporating, and/or burning).

3D printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

"Pre-transformed material," as understood herein, is a material before it has been first transformed (e.g., once transformed) by an energy beam during the 3D printing process. The pre-transformed material may be a material that was, or was not, transformed prior to its use in the 3D printing process. The pre-transformed material may be a material that was partially transformed prior to its use in the 3D printing process. The pre-transformed material may be a starting material for the 3D printing process. The pre-transformed material may be liquid, solid, or semi-solid (e.g., gel). The pre-transformed material may be a particulate material. The particulate material may be a powder material. The powder material may comprise solid particles of material. The particulate material may comprise vesicles (e.g., containing liquid or semi-solid material). The particulate material may comprise solid or semi-solid material particles.

In some instances, it is desired to control the way at least a portion of a layer of hardened material is formed (e.g., as part of the 3D object). The layer of hardened material may comprise a plurality of melt pools. In some instances, it may be desired to control one or more characteristics of the melt pools that form the layer of hardened material. The characteristics may comprise a depth of a melt pool, a microstructure, or the repertoire of microstructures of the melt pool. The microstructure of the melt pool may comprise the grain (e.g., crystalline and/or metallurgical) structure, or grain structure repertoire that makes up the melt pool. The grain structure may be referred to herein as microstructure.

Fundamental length scale (abbreviated herein as "FLS") can refer to any suitable scale (e.g., dimension) of an object. For example, a FLS of an object may comprise a length, a width, a height, a diameter, a spherical equivalent diameter, or a diameter of a bounding sphere.

The FLS of the formed (e.g., printed) 3D object can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m or 1000 m. In some cases, the FLS of the printed 3D object may be between any of the afore-mentioned FLSs (e.g., from about 50 μm to about 1000 m, from about 120 μm to about 1000 m, from about 120 μm to about 10 m, from about 200 μm to about 1 m, or from about 150 μm to about 10 m). In some embodiments, the platform and/or enclosure is configured to accommodate at least one 3D object during its formation.

In some instances, the intended (e.g., requested) dimensions of the 3D object derive from a model design of the 3D object. The 3D object (e.g., solidified material) that is generated for the customer can have an average deviation value from the intended dimensions of at most about 0.5 microns (μm), 1 μm, 3 μm, 10 μm, 30 μm, 100 μm, 300 μm, or less. The deviation can be any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $Dv+L/K_{Dv}$, wherein Dv is a deviation value, L is the length of the 3D object in a specific direction, and $K_{Dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, or 300 μm. Dv can have any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{Dv}$ can have a value of at most about 3000, 2500, 2000, 1500, 1000, or 500. $K_{Dv}$ can have a value of at least about 500, 1000, 1500, 2000, 2500, or 3000. $K_{Dv}$ can have any value between the afore-mentioned values (e.g., from about 3000 to about 500, from about 1000 to about 2500, from about 500 to about 2000, from about 1000 to about 3000, or from about 1000 to about 2500).

In some embodiments, transforming comprises heating at least a portion of a target surface (e.g., exposed surface of a material bed), and/or a previously formed area of hardened material using at least one energy beam. An energy source may generate the energy beam. The energy source may be a radiative energy source. The energy source may be a dispersive energy source (e.g., a fiber laser). The energy source may generate a substantially uniform (e.g., homogenous) energy stream. The energy source may comprise a cross section (e.g., or a footprint) having a (e.g., substantially) homogenous fluence. The energy beam may have a spot size (e.g., footprint or cross-section) on a target surface. The spot size may have a FLS. The energy generated for transforming a portion of material (e.g., pre-transformed or transformed) by the energy source will be referred herein as the "energy beam." The energy beam may heat a portion of a 3D object (e.g., an exposed surface of the 3D object). The energy beam may heat a portion of the target surface (e.g., an exposed surface of the material bed, and/or a deeper portion of the material bed that is not exposed). A pre-transformed material may be directed to the target surface. The energy beam may heat a pre-transformed material on its way to the target surface. The target surface may comprise a pre-transformed material, a partially transformed material and/or a transformed material. The target surface may comprise a portion of the build platform, for example, a base (e.g., FIG. 3, 302). The target surface may comprise a (surface) portion of a 3D object. Heating by the energy beam may be substantially uniform across its footprint, e.g., on the target surface. In some embodiments, the energy beam takes the form of an energy stream emitted toward the target surface, e.g., in a step and repeat sequence (e.g., tiling sequence). In at least a portion of its trajectory with respect to the target surface, the energy beam may advance: continuously, in a pulsing sequence, or in a step-and repeat sequence. The energy source may comprise an array of energy sources, e.g., a light emitting diode (LED) array.

In some embodiments, the methods, systems, apparatuses, and/or software disclosed herein comprises controlling at least one characteristic of the layer of hardened material (or a portion thereof) that is at least a portion of the 3D object. The methods, systems, apparatuses, and/or software disclosed herein may comprise controlling the degree and/or manner of 3D object deformation. Control of 3D object deformation may comprise control of a direction and/or a magnitude of deformation. The control may be for at least a portion (e.g., all) of the 3D object. The control may be an in-situ and/or real-time control. The control may transpire during formation of the at least a portion of the 3D object. The control may comprise a closed loop or an open loop control scheme. The portion may be a surface, a melt pool, a plurality of melt pools, a layer, plurality (e.g., multiplicity) of layers, portion of a layer, and/or portion of a multiplicity of layers. The plurality of melt pools and/or layers may be at least of single digit or at least of double digit. The layer of hardened material of the 3D object may comprise a plurality of melt pools. The layers' characteristics may comprise planarity, curvature, or radius of curvature of the layer (or a portion thereof). The characteristics may comprise the thickness of the layer (or a portion thereof). The characteristics may comprise the smoothness (e.g., planarity) of the layer (or a portion thereof).

Figure 17:
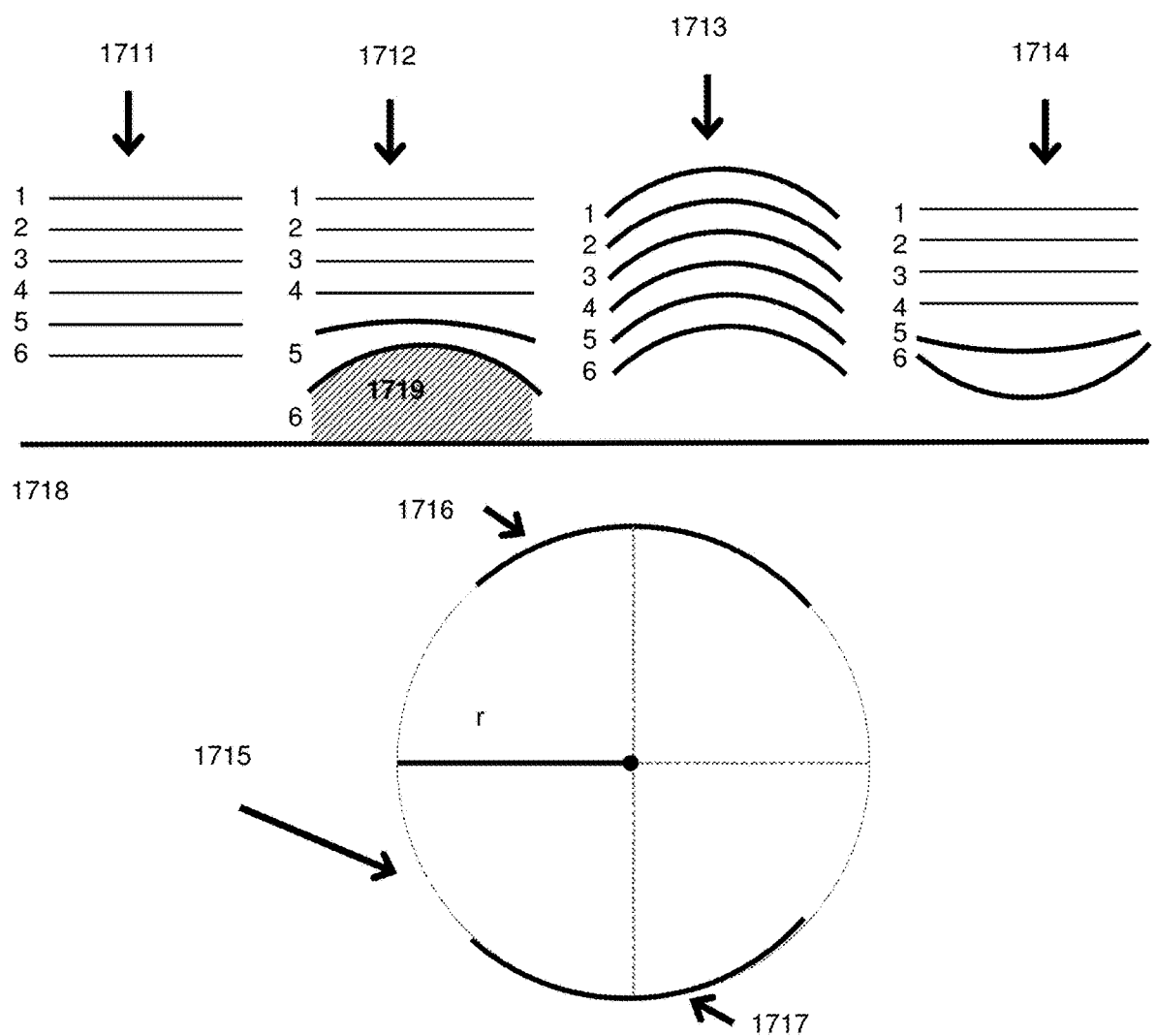
FIG. 17 schematically illustrates various vertical cross-sectional views of different 3D objects and portions thereof.

The one or more layers of hardened material of the 3D object may be substantially planar (e.g., flat). The planarity of the layer may be substantially uniform. The height of the layer at a position may be compared to an average plane. The average plane may be defined by a least squares planar fit of the top-most part of the surface of the layer of hardened material. The average plane may be a plane calculated by averaging the material height at each point on the top surface of the layer of hardened material. The deviation from any point at the surface of the planar layer of hardened material may be at most 20% 15%, 10%, 5%, 3%, 1%, or 0.5% of the height (e.g., thickness) of the layer of hardened material. The substantially planar one or more layers may have a large radius of curvature. FIG. 17 shows an example of a vertical cross section of a 3D object 1712 comprising planar layers (layers numbers 1-4) and non-planar layers 1719 (e.g., layers numbers 5-6) that have a radius of curvature. In FIG. 17, 1711 is a 3D object comprising planner layers and 1713 is a 3D object comprising non-planar layers having the same radius of curvature. FIGS. 17, 1716 and 1717 are superpositions of curved layer on a circle 1715 having a radius of curvature "r." The one or more layers may have a radius of curvature equal to the radius of curvature of the layer surface. The radius of curvature may equal infinity (e.g., when the layer is planar). The radius of curvature of the layer surface (e.g., all the layers of the 3D object) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of the layer surface (e.g., all the layers of the 3D object) may have any value between any of the afore-mentioned values of the radius of curvature (e.g., from about 10 cm to about 90 m, from about 50 cm to about 10 m, from about 5 cm to about 1 m, from about 50 cm to about 5 m, from about 5 cm to infinity, or from about 40 cm to about 50 m). In some embodiments, a layer with an infinite radius of curvature is a layer that is planar. In some examples, the one or more layers may be included in a planar section of the 3D object, or may be a planar 3D object (e.g., a flat plane). In some instances, part of at least one layer within the 3D object has the radius of curvature mentioned herein.

"Real time" as understood herein may be during at least a portion of the forming (e.g., printing) of a 3D object. Real time may be during a print operation. Real time may be during a formation (e.g., print) cycle. Real time may comprise during formation of: a 3D object, a layer of hardened material as a portion of the 3D object, at least at least a single-digit number of layers of the 3D object, at least a layer of the 3D object, a hatch line, at least a single-digit number of melt pools, or a melt pool.

In some embodiments, at least one (e.g., each) energy source of the 3D forming (e.g., printing) system is able to transform (e.g., print) at a throughput of at least about 6 cubic centimeters of material per hour (cc/hr), 12 cc/hr, 35 cc/hr, 50 cc/hr, 120 cc/hr, 480 cc/hr, 600 cc/hr, 1000 cc/hr, or 2000 cc/hr. The at least one energy source may print at any rate within a range of the aforementioned values (e.g., from about 6 cc/hr to about 2000 cc/hr, from about 6 cc/hr to about 120 cc/hr, or from about 120 cc/hr to about 2000 cc/hr).

In some embodiments, the forming process of the 3D object is a 3D printing process. In a 3D printing process, a dispenser may deposit the binder and/or the reactive species, e.g., through an opening in the dispenser. An energy source may generate the energy beam. A dispenser may deposit the pre-transformed material, e.g., to form a material bed. In some embodiments, the 3D object is formed in a material bed. The material bed (e.g., powder bed) may comprise flowable material (e.g., powder), e.g., that remains flowable during the forming process (e.g., powder that is not compressed or pressurized). During formation of the one or more 3D objects, the material bed may exclude a pressure gradient. In some examples, the 3D object (or a portion thereof) may be formed in the material bed with diminished number of auxiliary supports and/or spaced apart auxiliary supports (e.g., spaced by at least about 2, 3, 5, 10, 40, or 60 millimeters). In some examples, the 3D object (or a portion thereof) may be formed in the material bed without being anchored (e.g., to the platform). For example, the 3D object may be formed without auxiliary supports.

In some embodiments, the transforming agent is dispensed through a material dispenser (e.g., binding dispenser). The dispenser may be any dispenser disclosed herein. The dispenser can be controlled (e.g., manually and/or automatically). The automatic control may be using one or more controllers that are operatively coupled to at least one component of the dispenser. The control may be before, during, and/or after the forming operation (e.g., printing). The dispenser may be translated using an actuator. The translation of the dispenser can utilize a scanner (e.g., an XY-stage). In some embodiments, the at least one 3D object is printed using a plurality of dispensers. In some embodiments, at least two dispensers dispense the same type of binder (e.g., comprising a binding agent). In some embodiments, at least two dispensers each dispense a different type of binder. In some embodiments, a binding agent is a polymer or resin. The binding agent can be organic or inorganic. The binding agent can be carbon based or silicon based.

In some examples the 3D object may be formed above a platform, e.g., without usage of a material bed. The 3D printing cycle may correspond with (I) depositing a pre-transformed material toward the platform, and (II) transforming at least a portion of the pre-transformed material (e.g., by at least one energy beam) at or adjacent to the platform (e.g., during deposition of the pre-transformed material towards the platform) to form one or more 3D objects disposed above the platform. An additional sequential layer (or part thereof) can be added to the previous layer of a 3D object by transforming (e.g., fusing and/or melting) a fraction of pre-transformed material that is introduced (e.g., as a pre-transformed material stream) to the prior-formed layer. The depositing in (i) and the transforming in (ii) may comprise a forming increment. A dispenser may deposit the pre-transformed material, e.g., through an opening of the dispenser. Examples of forming processes can be found in Patent Application serial number PCT/US18/ 20406, titled "THREE-DIMENSIONAL PRINTING OF THREE-DIMENSIONAL OBJECTS" that was filed Mar. 1, 2018, and in Patent Application Ser. No. U.S.62/654,190, titled "THREE-DIMENSIONAL PRINTING OF THREE-DIMENSIONAL OBJECTS" that was filed Apr. 6, 2018, each of which is incorporated herein by reference in its entirety.

In some embodiments, the manufacturing device provides an output, e.g., in the form of a (e.g., data) file, sensor data, and/or detector data. The data may be time stamped. The data may be location stamped (e.g., location within a layer, location of a layer as part of the 3D object). The location may be layerwise. The location may be according to a melt pool number. The data may be trackable. Data from any of the detectors and/or sensors may be recorded in the database. The data may be collected, transmitted, and/or recorded in situ and/or in real time.

One or more objects can be formed (e.g., printed) using one or more manufacturing devices (e.g., forming tools such as printers). In some embodiments, formation of the 3D object is monitored. Monitoring can comprise using one or more detectors that detect one or more outputs (e.g., thermal, optical, chemical and/or tactile signals). The detector can comprise a sensor. In some cases, monitoring is performed in real-time during formation of the one or more 3D objects. In some cases, monitoring is done before, during and/or after printing. The monitoring may use historical measurements (e.g., as an analytical tool and/or to set a threshold value). Monitoring of one or more aspects of formation can optionally be used to (e.g., directly) modify the forming instructions and/or adjust the one or more simulations of the forming process. The simulation may facilitate automatic designation of one or more thresholds for one or more variables. The simulation may facilitate designation of instructions to form the 3D printing process. For example, designation of one or more characteristic of the energy source and/or energy beam. For example, designation of instructions to one or more components of the manufacturing machinery (e.g., gas flow system, pre-transform material recycling system, pre-transformed material conveyance system, layer dispensing mechanism, platform actuator position). Monitoring of one or more aspects of formation of the 3D object(s) can optionally be used to (e.g., directly) modify the forming instructions and/or adjust the one or more simulations. For example, one or more thermal detectors may gather (e.g., real time) thermal signals (e.g., real time thermal signature curve) at and/or in a location in proximity to (e.g., vicinity of) an irradiation spot on the target surface during printing of a 3D object. The location in proximity to the irradiation spot may include an area of at least about 1, 1.5, 2, 2.5, 3, 3.5, 4, 4.5, 5, 5.5, 6, 6.5, 7, 7.5, 8, 8.5, 9, 9.5, or 10 FLS (e.g., diameter) of a melt pool. The location in proximity to the irradiation spot may include an area between any of the afore-mentioned values of irradiation spots. The thermal signals can be compared to a target thermal signal (e.g., target thermal signature curve) during the formation process. One or more characteristics of a transforming agent (e.g., energy beam) may be altered during formation of the 3D object to adjust the (e.g., real time) thermal signal to (e.g., substantially) match the target temperature. The alteration to the transforming process may comprise an alteration to (i) a transformation density (or transformation strength), (ii) a trajectory, (iii) a FLS of a footprint of the transforming agent on the target surface, (iv) a hatch spacing, (v) a scan speed, (vi) a scanning scheme (v) a dwell time of the transforming agent, as it progresses along a path along the target surface, or (vi) an intermission time of the transforming agent as it progresses along a path along the target surface. For example, the alteration may comprise an alteration to an energy beam (a) power density at the target surface, (b) wavelength, (c) cross section, (d) path, (e) irradiation spot size, (f) scan speed, (g) dwell time, (h) intermission time, or (i) power of the energy source generating the energy beam. Matching the target temperature may be to within a (e.g., pre-determined) tolerance. Data of any of these detectors may be stored (e.g., and time stamped) in the database.

Figure 3:
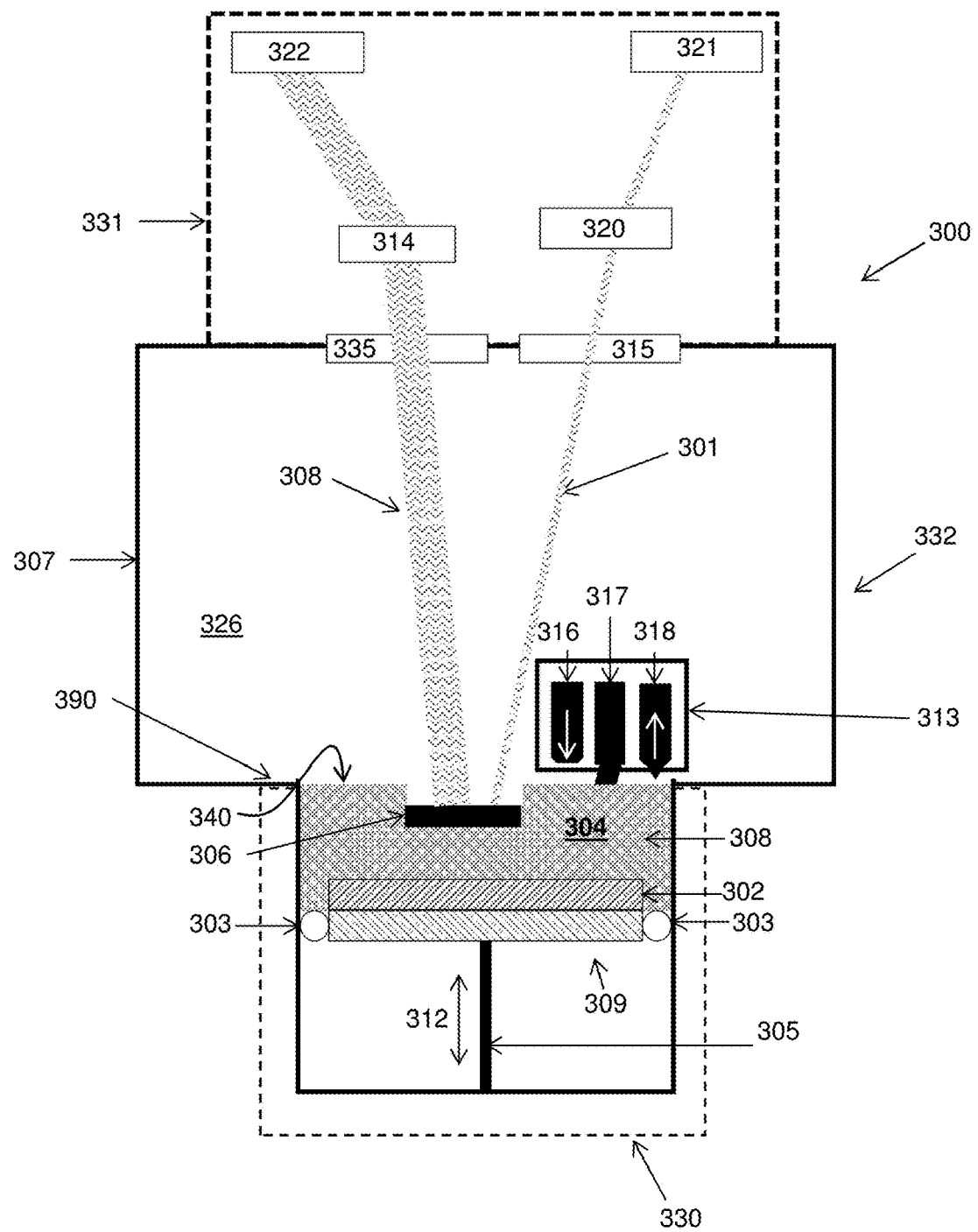
FIG. 3 shows a schematic cross-sectional view of a three-dimensional (3D) printing system and its components.

FIG. 3 shows an example of a 3D forming (e.g., 3D printing) system 300 and apparatuses, including a (e.g., first) energy source 321 that emits a (e.g., first) energy beam 301 and a (e.g., second) energy source 322 that emits a (e.g., second overlapping) energy beam 301. The 3D printing system may also be referred to herein as "3D printer." In the example of FIG. 3 the energy from energy source 321 travels through an (e.g., first) optical system 320 (e.g., comprising a scanner) and an optical window 315 to be incident upon a target surface 340 within an enclosure (e.g., comprising an atmosphere 326). The enclosure can comprise one or more walls that enclose the atmosphere. The target surface may comprise at least one layer of pre-transformed material (e.g., FIG. 3, 308) that is disposed adjacent to a platform (e.g., FIG. 3, 309). Adjacent can be above. In some embodiments, an elevator shaft (e.g., FIG. 3, 305) is configured to move the platform (e.g., vertically; FIG. 3, 312). The enclosure (e.g., 332) may including sub-enclosures comprising an optical chamber (e.g., 331), a processing chamber (e.g., 307), and a build module (e.g., 330). The platform may be separated from one or more walls (e.g., side walls) of the build module by a seal (e.g., FIG. 3, 303). The guidance system of the energy beam may comprise an optical system. FIG. 3 shows the energy from the energy source 322 travels through an optical system 314 (e.g., comprising a scanner) and an optical window 335 to impinge (e.g., be incident) upon the target surface 340. The energy from the (e.g., plurality of) energy source(s) may be directed through the same optical system and/or the same optical window. At times, energy (e.g., beam) from the same energy source is directed to form a plurality of energy beams by one or more optical systems. The target surface may comprise a (e.g., portion of) hardened material (e.g., FIG. 3, 306) formed via transformation of material within a material bed (e.g., FIG. 3, 304). In the example of FIG. 3, a layer forming device 313 includes a (e.g., powder) dispenser 316 (e.g., dispensing mechanism), a leveler 317 (e.g., leveling mechanism), and material removal mechanism 318. During printing, the 3D object (e.g., and the material bed) may be supported by a (e.g., movable) platform, which platform may comprise a base (e.g., FIG. 3, 302). The base may be detachable (e.g., after the printing). A hardened material may be anchored to the base (e.g., via supports and/or directly), or non-anchored to the base (e.g., floating anchorlessly in the material bed, e.g., suspended in the material bed). An optional thermal control unit (not shown) can be configured to maintain a local temperature (e.g., of the material bed and/or atmosphere). In some cases, the thermal control unit comprises a (e.g., passive or active) heating member. In some cases, the thermal control unit comprises a (e.g., passive or active) cooling member. The thermal control unit may comprise or be operatively coupled to a thermostat. The thermal control unit can be provided inside of a region where the 3D object is formed or adjacent to (e.g., above) a region (e.g., within the processing chamber atmosphere) where the 3D object is formed. The thermal control unit can be provided outside of a region (e.g., within the processing chamber atmosphere) where the 3D object is formed (e.g., at a predetermined distance).

In some embodiments, the transforming agent is an energy beam generated by an energy source. The energy beam is movable such that it can translate across (e.g., laterally) the top surface of the material bed, e.g., during the printing. The energy beam(s) and/or energy source(s) can be moved via at least one guidance system. The guidance system (e.g., guiding the energy beam) may comprise a scanner. The scanner may comprise a galvanometer scanner, a moving (e.g., rotating) polygon, a mechanical-stage (e.g., X-Y-stage), a piezoelectric device, a gimbal, or any combination of thereof. The scanner may comprise a mirror. The scanner may comprise a modulator. The scanner may comprise a polygonal mirror. The scanner can be the same scanner for two or more transforming agents or transforming agent generators (e.g., energy source or binder dispenser). At least two (e.g., each) transforming agents or transforming agent generators may have a separate scanner. At least two scanners may be operably coupled with a transforming agent or transforming agent generators. The systems and/or apparatuses disclosed herein may comprise one or more shutters (e.g., safety shutters). The energy source(s) may project energy using a DLP modulator, a one-dimensional scanner, a two-dimensional scanner, or any combination thereof. The transforming agent generator(s) can be stationary or translatable. The transforming agent generator(s) can translate vertically, horizontally, or in an angle (e.g., planar or compound angle).

A guidance system (e.g., optical guidance system. E.g., a scanner) and/or an energy source may be controlled manually and/or by at least one controller. For example, at least two guidance systems may be directed by the same controller. For example, at least one guidance system may be directed by its own (e.g., unique) controller. A plurality of controllers may be operatively coupled to each other, to the guidance system(s) (e.g., scanner(s)), and/or to the energy source(s). At least two of a plurality of energy beams may be directed towards the same position at the target surface, or to different positions at the target surface. One or more sensors may be disposed adjacent to the target surface. The one or more sensors may detect (i) a position and/or (ii) an effect, of a transforming agent (e.g., at a target surface). Data from the sensor(s) may be recorded in the database. The at least one guidance system may direct a position and/or a path of a transforming agent along the target surface. The at least one guidance system may consider a feedback from the one or more sensors. Data of the one or more systems may be stored in the database (e.g., and time-stamped). At least one of the one or more sensors may be disposed in an indirect view of the target surface. At least one of the one or more sensors may be disposed in a direct view of the target surface (e.g., a camera viewing the target surface). The one or more sensors may be configured to have a field of view of at least a portion of the target surface (e.g., an exposed surface of the material bed).

The term "adjacent" or "adjacent to," as used herein, includes 'next to', 'adjoining', 'in contact with,' and 'in proximity to.' In some instances, adjacent to may be 'above' or 'below.'

In some embodiments, at least one controller may direct the engagement and/or dis-engagement of the build module and/or of the optical chamber. The control may comprise automatic and/or manual control. The engagement of the build module with the processing chamber may be reversible. In some embodiments, the engagement of the build module with the processing chamber may be non-reversible (e.g., stable, or static). The FLS (e.g., width, depth, and/or height) of the processing chamber can be at least about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m, or 5 m. The FLS of the processing chamber can be at most about 50 millimeters (mm), 60 mm, 70 mm, 80 mm, 90 mm, 100 mm, 200 mm, 250 mm, 400 mm, 500 mm, 800 mm, 900 mm, 1 meter (m), 2 m, or 5 m. The FLS of the processing chamber can be between any of the afore-mentioned values (e.g., 50 mm to about 5 m, from about 250 mm to about 500 mm, or from about 500 mm to about 5 m). The build module, optical chamber, and/or processing chamber may comprise any (e.g., be formed of a) material comprising an organic (e.g., polymer or resin) or inorganic material (e.g., a salt, mineral, acid, base, or silicon-based compound). The build module and/or processing chamber may comprise any material disclosed herein (e.g., elemental metal, metal alloy, an allotrope of elemental carbon, ceramic, or glass). Examples of a controller and any of its components can be found in: patent application serial number PCT/US17/18191, titled "ACCURATE THREE-DIMENSIONAL PRINTING" that was filed on Feb. 16, 2017; U.S. patent application Ser. No. 15/435,065, titled "ACCURATE THREE-DIMENSIONAL PRINTING" that was filed on Feb. 16, 2017; and/or patent application serial number EP17156707, titled "ACCURATE THREE-DIMENSIONAL PRINTING" that was filed on Feb. 17, 2017; each of which is incorporated herein by reference in its entirety.

In some embodiments, debris (e.g., contaminants) may be produced during formation of the 3D object. The debris may comprise fumes, soot, small particles, dust, dirt, powder (e.g., that result from heating, melting, evaporation and/or other process transitions), or hardened material that did not form a part of the 3D object. The debris may reside in the manufacturing mechanism, e.g., in the processing chamber and/or in any passages (e.g., gas system, powder conveyance system). While optical elements in an optical system may be isolated (e.g., via a sealed enclosure, and/or enclosure tubes) and maintained in a substantially clean environment, one or more optical elements (e.g., an optical window) may remain at least partially exposed to an external environment (e.g., with respect to the optical system environment, for example, a processing chamber). An optical window may serve as an interface between an optical system and a processing chamber in a 3D printing system. A processing chamber of a 3D printing system may comprise contaminants (e.g., debris), which contaminants can travel and adhere to an optical element (e.g., an optical window), increasing a likelihood of a thermal lensing condition for the optical element. In some embodiments a (e.g., clean) gas can be directed toward an optical element, to provide gas purging (i) of optical element area and/or (ii) to protect the optical element area from debris. Systems for gas flow and/or gas purging can be any systems as disclosed in patent application number PCT/US17/60035 that is incorporated herein by reference in its entirety. In some embodiments, a pressurized clean gas is filtered through a filter (e.g., one or more HEPA filters), e.g., prior to reaching the optical element (e.g., optical window). In some embodiments, the one or more filters are configured to filter out particles having nanometer-scale (e.g., from about 10 nanometers (nm) to about 2000 nm) diameters.

Figure 4:
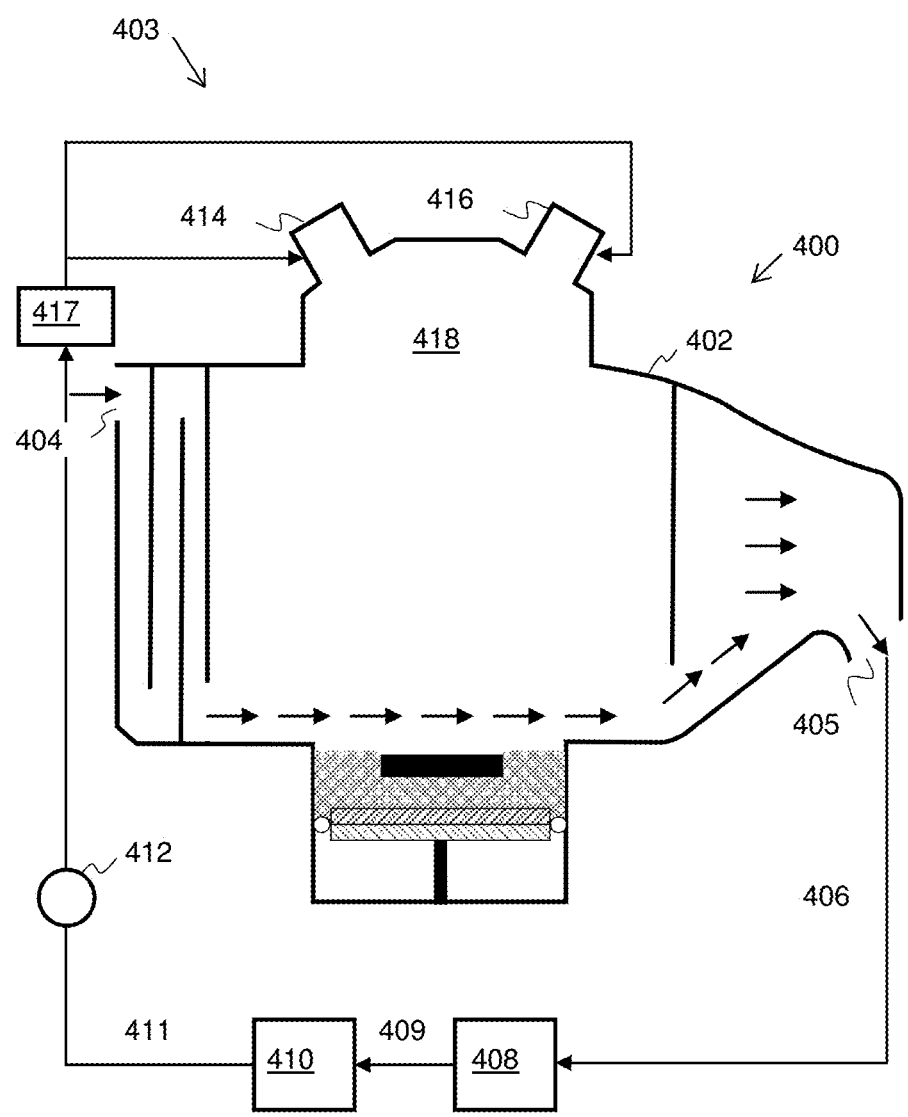
FIG. 4 shows a schematic cross-sectional view of a three-dimensional (3D) printing system and its components.

In some embodiments, the manufacturing mechanism (e.g., a 3D printing system) includes, or is operationally coupled to, one or more gas systems (e.g., gas recycling system). FIG. 4 shows a schematic side view of an example 3D printing system 400 that is coupled to a gas system 403 in accordance with some embodiments. 3D printing system 400 includes processing chamber 402, which includes gas inlet 404 and gas outlet 405. The gas system (e.g., 403) of a 3D printing system can be configured to recirculate the flow of gas from the gas outlet (e.g., 405) back into the processing chamber (e.g., 402) via the gas inlet (e.g., 404). Gas flow (e.g., 406) exiting the gas outlet can include solid and/or gaseous contaminants. In some embodiments, a filtration system (e.g., 408) filters out at least some of the solid and/or gaseous contaminants, thereby providing a clean gas (e.g., 409) (e.g., cleaner than gas flow 406). The filtration system can include one or more filters. The filters may comprise HEPA filters or chemical filters. The clean gas (e.g., 409) exiting the filtration system can be under relatively low pressure. The gas can be directed through a pump (e.g., 410), e.g., to regulate (e.g., increase) its relative pressure prior to entry to the processing chamber and/or optical chamber. Clean gas (e.g., 411) with a regulated pressure that exits the pump can be directed through one or more sensors (e.g., 412). Data of the sensor(s) may be recorded (e.g., and time stamped) in the database. The one or more sensors may comprise a flow meter, which can measure the flow (e.g., pressure) of the pressurized clean gas. The one or more sensors may comprise temperature, humidity, oil, or oxygen sensors. In some cases, the clean gas can have an ambient pressure or higher. The higher pressure may provide a positive pressure in the processing chamber (see example values of positive pressure described herein). A first portion of the clean gas can be directed through an inlet (e.g., 404) of a gas inlet portion of the enclosure, while a second portion of the clean gas can be directed to first and/or second window holders (e.g., 414 and 416) that provide gas purging of optical window areas, as described herein. The gas system can provide (e.g., clean) gas flow for the 3D printing system, as well as a secondary gas flow (e.g., window purging). In some embodiments, the pressurized clean gas is further filtered through a filter (e.g., 417 (e.g., one or more HEPA filters)) prior to reaching one or both of the window holders (e.g., 414 and 416). In some embodiments, the one or more filters (e.g., as part of filters 417 and/or filtration system 408) are configured to filter out particles having nanometer-scale (e.g., about 10 to 500 nm) diameters. In some embodiments, the gas recycling system alternatively or additionally provides clean gas to a recessed portion (e.g., 418) of the enclosure.

In some embodiments, the manufacturing device includes an optical system. The optical system may be used to control the one or more transforming agents (e.g., energy beams). The energy beams may comprise a single mode beam (e.g., Gaussian beam) or a multi-mode beam. The optical system may be coupled with or separate from an enclosure. The optical system may be enclosed in an optical enclosure (e.g., FIG. 3, 331). FIG. 5A shows an example of an optical system in which an energy beam is projected from the energy source 510, is deflected by two mirrors 503 and 509, and travels through an optical element 506 prior to reaching target 505 (e.g., an exposed surface of a material bed comprising a pre-transformed material and/or hardened or partially hardened material such as from a previous transformation operation). The optical system may comprise more than one optical element. In some cases, the optical element comprises an optical window (e.g., for transmitting the energy beam into the enclosure). In some embodiments, the optical element comprises a focus altering device, e.g., for altering (e.g., focusing or defocusing) an incoming energy beam (e.g., FIG. 5A, 507) to an outgoing energy beam (e.g., FIG. 5A, 508). The focus altering device may comprise a lens. In some embodiments, aspects of the optical system are controlled by one or more controllers of the printer. For example, one or more controllers may control one or more mirrors (e.g., of galvanometer scanners) that directs movement of the one or more energy beams in real time. Examples of various aspects of optical systems and their components can be found in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" international patent application number PCT/US17/64474, filed Dec. 4, 2017, titled "OPTICS, DETECTORS, AND THREE-DIMENSIONAL PRINTING;" and international patent application number PCT/US18/12250, filed Jan. 3, 2018, titled "OPTICS IN THREE-DIMENSIONAL PRINTING," each of which is entirely incorporated herein by reference.

In some cases, the optical system modifies a focus of the one or more energy beams at the target surface (or adjacent thereto, e.g., above or below the target surface to form a defocused beam spot at the target surface). In some embodiments, the energy beam is (e.g., substantially) focused at the target surface. In some embodiments, the energy beam is defocused at the target surface. An energy beam that is focused at the target surface may have a (e.g., substantially) minimum spot size at the target surface. An energy beam that is defocused at the target surface may have a spot size at the target surface that is (e.g., substantially) greater than the minimum spot size, for example, by a pre-determined amount. For example, a Gaussian energy beam that is defocused at the target surface can have spot size that is outside of a Rayleigh distance from the energy beams focus (also referred to herein as the beam waist). FIG. 5B shows an example profile of a Gaussian beam as a function of distance. The target surface of a focused energy beam may be within a Rayleigh distance (e.g., FIG. 5B, R) from the beam waist (e.g., FIG. 5B, $W_0$). In some embodiments, a focus shift of the footprint is monitored (e.g. and recorded in the database). Measuring a focus shift at different positions on the target surface (e.g., FIG. 8C, 845) may be repeated for one or more focal offsets (e.g., FIG. 8C, 835, 855, 825, 815, and 865).

In some embodiments, a target thermal signal (e.g., thermal threshold) is obtained from one or more simulations. The target signal may be a value, a set of values, or a function (e.g., a time dependent function). The one or more 3D objects may optionally be analyzed. In some embodiments, a target (e.g., thermal) signal is obtained from historical data of 3D objects (or portions thereof) that have been analyzed. In some embodiments, the object(s) or portion(s) thereof is analyzed using an inspection tool (e.g., optical camera, x-ray instrument, sensor, and/or a microscope). The microscope may comprise an optical, or an electron microscope. The microscope may comprise a scanning tunneling, scanning electron, or a transmission electron microscope. The measurement may be conducted using a method comprising X-ray tomography, tensile tester, fatigue tester, eStress system, or X-ray diffraction (XRD). The measurements may be conducted at ambient temperature (e.g., about 20° C. or about 25° C.). The surface roughness of the 3D object can be measured with a surface profilometer. In some cases, the analysis provides data concerning geometry of the object(s). In some cases, the analysis provides data concerning one or more material properties (e.g., porosity, surface roughness, grain structure, internal strain and/or chemical composition) of the object(s). The analysis data may be inserted into the database. In some embodiments, the analysis data is compared to actual, and/or to requested data (e.g., using the QA program). For example, an actual geometry of the printed object(s) may be compared with the geometry of the respective requested object(s). In some embodiments, the analysis data is used to adjust a simulation, a threshold, and/or an operation of one or more components of the manufacturing mechanism. The adjustment may be used (e.g., as historical data) in formation of subsequent object(s).

The 3D object can have various surface roughness profiles, which may be suitable for various applications. The surface roughness may be the deviations in the direction of the normal vector of a real surface, from its ideal form. The surface roughness may be measured as the arithmetic average of the roughness profile (hereinafter "Ra"). In some examples, the formed 3D object can have a Ra value of at most about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 2 µm, or 1 µm. The 3D object can have a Ra value between any of the afore-mentioned Ra values. The Ra values may be measured by a contact or by a non-contact method. The Ra values may be measured by a roughness tester and/or by a microscopy method (e.g., any microscopy method described herein). The measurements may be conducted at ambient temperatures (e.g., R.T.). The roughness may be measured by a contact or by a non-contact method. The roughness measurement may comprise one or more sensors (e.g., optical sensors). The roughness measurement may comprise a metrological measurement device (e.g., using metrological sensor(s)). The roughness may be measured using an electromagnetic beam (e.g., visible or IR).

Figure 6A:
FIG. 6A schematically illustrates various paths.
Figure 6A:
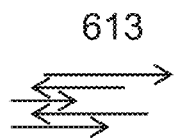
Figure 6A:
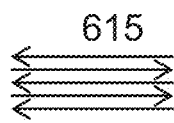
Figure 6A:
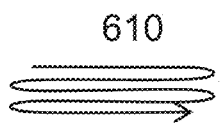
Figure 6A:
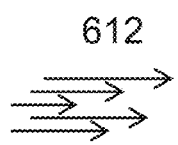
Figure 6A:
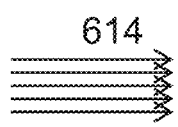
Figure 6A:
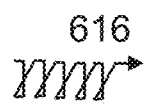
Figure 6B:
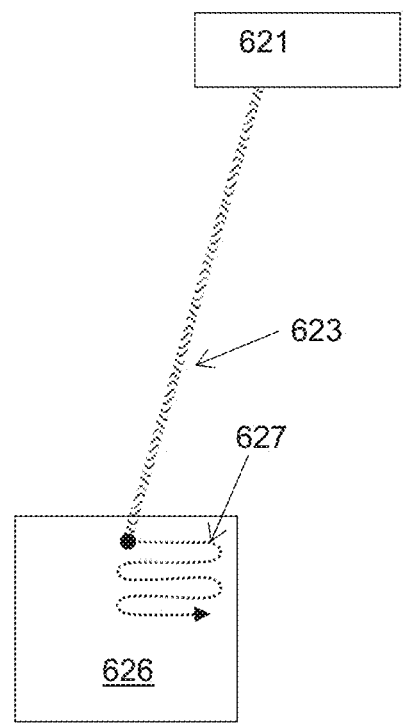
FIG. 6B schematically illustrates schematically illustrates irradiation of various targets.
Figure 6B:
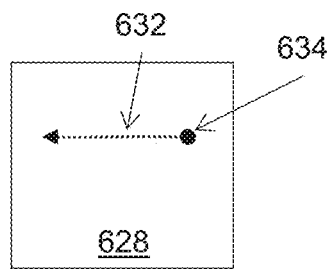
Figure 6B:
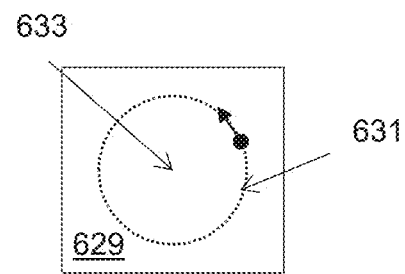

In some embodiments one or more variables are monitored and/or analyzed by the QA program. Variables may be measured directly (e.g., using a sensor), or indirectly (e.g., by performing pre-programmed operation). The pre-programmed operations (e.g., pre-designed or pre-defined operations) may be of any of the components of the manufacturing mechanism. For example, pre-programmed operations and/or characteristic(s) of a transforming agent (e.g., energy beam). The performance of the energy beam may be measured using a sensor. The sensor may comprise a thermal radiation sensor or a scattered light sensor. The energy beam may irradiate a target surface (e.g., powder or solid metal). The energy beam may irradiate a spot and/or follow a trajectory. Examples of various trajectories relative to a target surface are shown in FIG. 6B. The irradiation may be viewed by a sensor/detector (e.g., a camera), e.g., in situ and/or in real time. For example, gas flow may be measured directly using a sensor (e.g., gas type and/or concentration sensor, or gas flow sensor). The gas flow may be measured by inspecting any changes relating to the debris and/or sparks emitted during (and/or following, e.g., immediately following) transformation of the pre-transformed material to a transformed material by a transforming agent, e.g., by an energy beam (e.g., sparks emitted from a melt pool). The changes may comprise any directional and/or velocity change to emission of the debris and/or sparks. The energy beam may follow a procedure dedicated to a QA related procedure. For example, the energy beam may have characteristic that will emit an amount of debris and/or sparks. The process dedicated to the QA assessment may result in ejecting an amount of debris and/or sparks that exceeds the amount emitted by a (e.g., typical, or any) process utilized to form the 3D object. The process dedicated to the QA assessment may result in ejecting an amount (and/or type) of debris and/or sparks detectable by the detector (e.g., sensor). The amount of debris and/or sparks may be excessive relative to a process utilized to form a 3D object. The inspection may comprise use of an optical sensor (e.g., a camera, a spectrometer, or a point detector). The optical sensor may be disposed in the processing chamber. The optical system (e.g., including the optical sensor) may be enclosed in an optical enclosure. Examples of an optical enclosure system, and/or thermal lensing, can be found in Patent Application serial number PCT/US17/64474, titled "OPTICS, DETECTORS, AND THREE-DIMENSIONAL PRINTING" that was filed Dec. 4, 2017; in Patent Application serial number PCT/US18/12250, titled "OPTICS IN THREE-DIMENSIONAL PRINTING" that was filed Jan. 3, 2018, or in Patent Application serial number PCT/US19/14635, titled "CALIBRATIN IN THREE-DIMENSIONAL PRINTING" that was filed Jan. 22, 2019, each of which is incorporated herein by reference in its entirety.

The variables may relate to the environment surrounding the 3D object during its formation. The environment may comprise gaseous pressure, makeup, temperature, speed, flow direction, laminarity, turbulence, or optical density. The gaseous content of the environment may comprise any reactive species in the environment. The reactive species may react with the pre-transformed or transformed material before, during, and/or after formation of the 3D object. The gaseous content may comprise water, oxygen, inert, or residual gasses. The gaseous content may comprise relative concentration of various gasses in the environment (or any gradient thereof). The optical density may be measured by shining a beam through a volume of gas. The detector may oppose the irradiation position of the beam, or be at an angle relative to the irradiation direction of the beam (e.g., perpendicular to the irradiation direction). When the detector is at an angle, the detector may detect any scattering of the light by any debris particles suspended in the gas.

Figure 9:
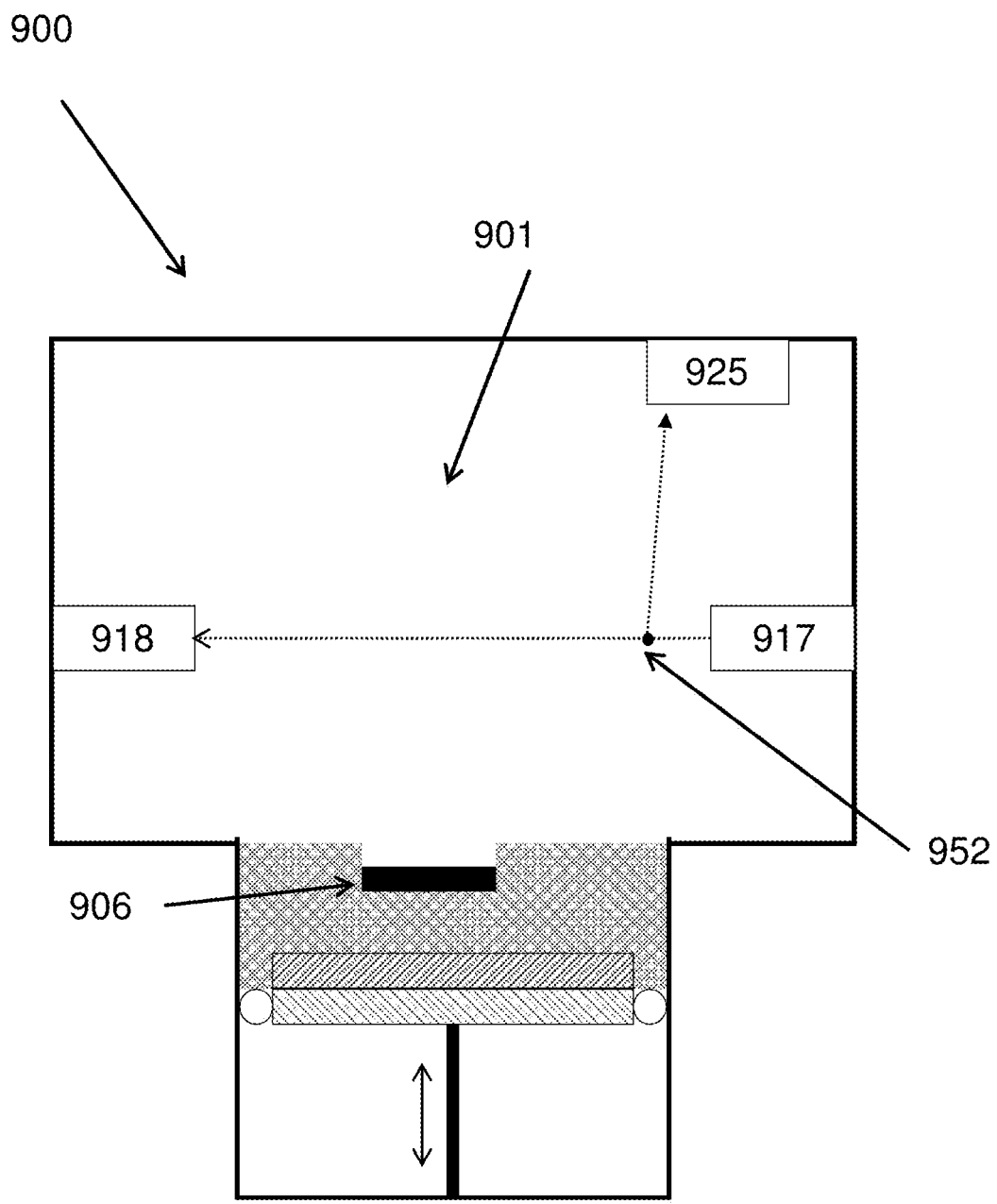
FIG. 9 shows a schematic cross-sectional view of a three-dimensional (3D) printing system and its components.
Figure 10A:
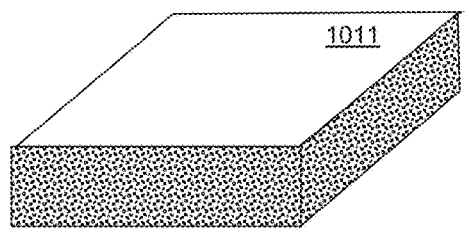
FIGS. 10A-10F schematically illustrate perspective views depicting various operations used in calibration.
Figure 10B:
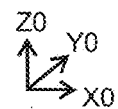
Figure 10B:
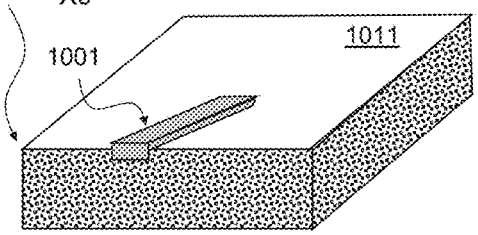
Figure 10C:
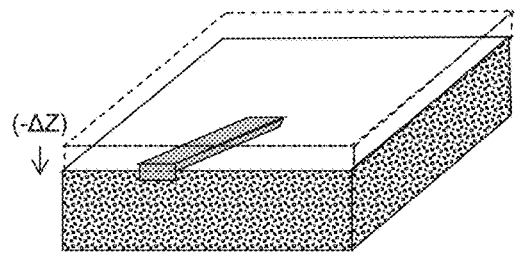
Figure 10D:
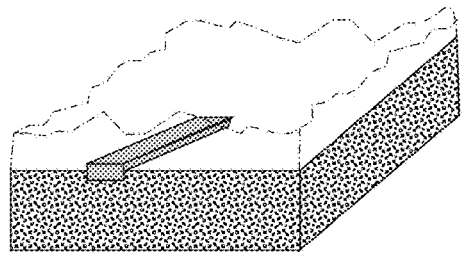
Figure 10E:
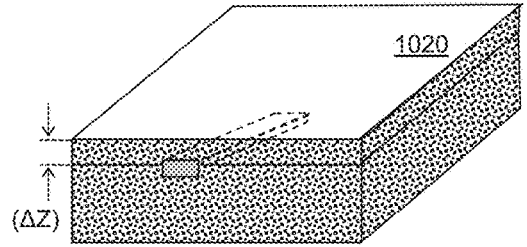
Figure 10F:
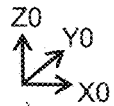
Figure 10F:
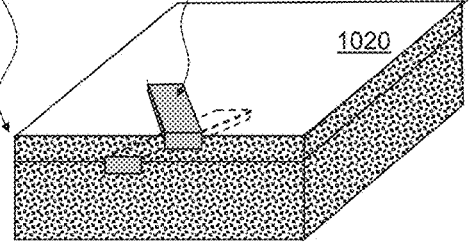

In some embodiments, a cleanliness of an atmosphere of the manufacturing apparatus may be monitored using one or more sensors. FIG. 9 shows an example of an atmosphere monitoring system. The atmosphere monitoring system may monitor the environment (comprising a gas) within 901 an enclosure of a manufacturing mechanism 900. The atmosphere monitoring system may comprise one or more beams (e.g., sound, charge, and/or electromagnetic beam such as a laser beam. E.g., FIG. 9, 1017). The beam may originate from an energy source 917 (e.g., emitter) and may be directed towards a detector (e.g. an optical detector. E.g., 918) that detects any alteration in the characteristics of the energy beam (e.g., the intensity and/or angle of the energy beam as compared to the emitted energy beam), and/or a detector 925 that detects any scattering of the beam, e.g., due to debris 952 ejected to the atmosphere during formation of at least a portion 906 of a 3D object. The emitted energy beam may be altered as it encounters a species (e.g., debris) in the atmosphere of the enclosure. Any deviation from the intensity of the emitted energy beam may serve as an indication of the cleanliness of the atmosphere within the enclosure. The system measuring the cleanliness of the atmosphere may further comprise a laser beam profiler.

In some embodiments, the transforming agent (e.g., energy beam) follows a path. The path may be followed during transformation of the pre-transformed material to the transformed material. The path may be followed during formation of at least a portion of the 3D object. The path may be followed during annealing of at least a portion of the 3D object. The path may be followed during execution of a procedure dedicated (e.g., unique for) assuring the quality of the 3D object (e.g., assuring quality of the process to form the 3D object, assuring quality (e.g., calibration) of the manufacturing mechanism). The path may comprise or substantially excludes a curvature. FIG. 6A shows various examples of paths. The scanning energy beam may travel in each of these types of paths. The path may substantially exclude a curvature (e.g., 612-615). The path may include a curvature (e.g., 610-611). The path may comprise hatching (e.g., 612-615). The hatching may be directed in the same direction (e.g., 612 or 614). Every adjacent hatching may be directed in an opposite direction (e.g., 613 or 615). The hatching may have the same length (e.g., 614 or 615). The hatching may have varied length (e.g., 612 or 613). The spacing between two adjacent path sections may be substantially identical (e.g., 610) or non-identical (e.g., 611). The path may comprise a repetitive feature (e.g., 610), or be substantially non-repetitive (e.g., 611). The path may comprise non-overlapping sections (e.g., 610), or overlapping sections (e.g., 616). The tile may comprise a spiraling progression (e.g., 616). The non-tiled sections of the target surface may be irradiated by the scanning energy beam in any of the path types described herein. A pattern (e.g., an irradiation pattern) may comprise a path.

FIG. 6B shows an example of a setup comprising an energy source 621 irradiating an energy beam 623 on a target surface 626 at position 625 following a serpentine irradiation path, and a measurement position 627, from which radiation 624 is emanating and captured by a detector (not shown). FIG. 6B shows also an example of an optional target surface 628 having a measurement position 632, and a linear irradiation path (e.g., 634). FIG. 6B shows also an example of an optional target surface 629 having a measurement position 633, and an irradiation path around it (e.g., 631). The target surface may be in a material bed. In some embodiments, a thermal lensing status of at least one component of the optical setup may be measured and identified in situ and/or in real time. The thermal lensing may be characterized optically (e.g., by measuring spot size and power density) and thermal response. In response to the identification, measures may be taken in response to a deviation from the requested spot size and power density. The identification may be used by the QA program. A maintenance procedure may be initiated (e.g., cooling the at least one component of the optical setup). At least one characteristic of the energy beam may be altered (e.g., increase energy source power, alter focus, alter translation speed). The alteration may be a dynamic alteration (e.g., dynamic compensation for the thermal lensing). The measure taken may be controlled (e.g., manually and/or automatically, e.g., by at least one controller), during and/or after the 3D printing.

For example, the variable may comprise alteration in an irradiation spot and/or pattern relative to a location in the enclosure and/or relative to a location of gas entry to the enclosure. For example, the transforming beam (e.g., energy beam) may irradiate a target surface to form an irradiated location comprising a pattern or a spot. The irradiated location may change with respect to its location in the enclosure. A sensor may detect the irradiated location on irradiation at one or more prescribed times after the irradiation. The QA program may monitor any change in the irradiated location (as associated with the sensor data).

Figure 8A:
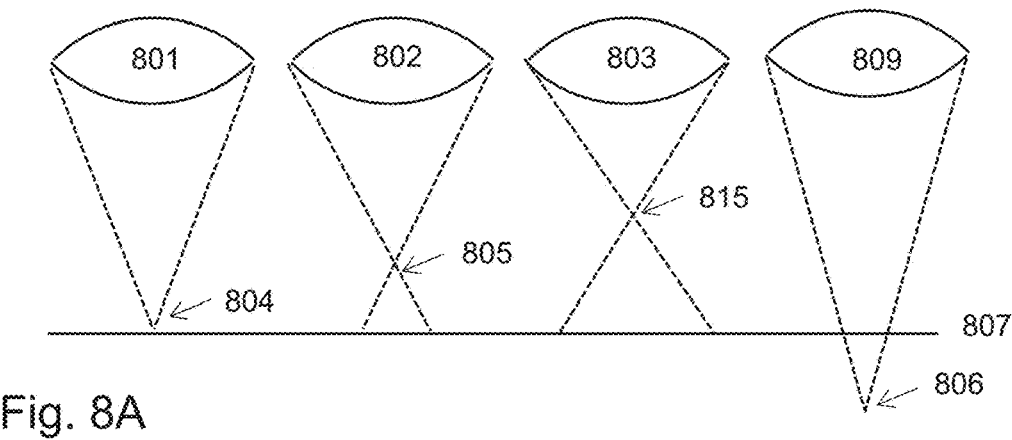
FIG. 8A schematically illustrates cross sectional view of beams shining through lenses.

A source of uncontrolled focus shift can be thermal lensing. The thermal lensing can result in a positive or negative shift in an optical property of an optical element experience thermal lensing. For example, the thermal lensing can result in an increase or decrease in the optical power of the one or more optical element (e.g., in case of a lens). As understood herein, thermal lensing is an effect wherein one or more optical properties of an optical element (e.g., a lens, window, mirror, and/or beam splitter) is altered in response to heating. The change in the optical property may be (e.g., manifested as) a change in the (e.g., nominal) focal length of the optical element. FIG. 8A shows an example of a first optical element 801 that does not experience thermal lensing, having a first beam traveling therethrough with a focal point 804 at a target surface 807; a second optical element 802 that experiences thermal lensing (e.g., resulting in an increased optical power with respect to 801) and a second beam traveling therethrough having a focal point 805 above the target surface 807; a third optical element 803 that experiences more thermal lensing (e.g., a further increase in optical power with respect to 802) and a third beam traveling therethrough having a focal point 815 above the target surface 807; and a fourth optical element 809 that experiences thermal lensing (e.g., resulting in a decreased optical power with respect to 801) and a fourth beam traveling therethrough having a focal point 806 below the target surface 807. The thermal lensing may result in a negative or positive effect (e.g., retracting or expanding the distance of the focal point from the optical element). In some embodiments, the optical setup is configured such that the focal point of the optical element devoid of thermal lensing is at the target surface. The heating can be induced by incident energy radiation (e.g., an energy beam) that interacts with the optical element. The change may be an intrinsic change in at least one material property of the optical element. The at least one material property may comprise an internal or a surface material property of the optical element. For example, an index of refraction of the optical element can change in response to heating. For example, the volume and/or shape of the optical element may change. For example, a surface property of the optical element may change (e.g., reflectivity). The change can be either an increase or a decrease in the at least one property. The change can include an aberration. The change may comprise a loss in the amount of radiation transmitted through the optical element. The change may comprise an alteration of (i) a position of a focal point of the energy beam, (ii) focus of the energy beam on the exposed surface, or (iii) spot size of the energy beam on the exposed surface. Once the incident energy is removed from contacting the optical element, the optical element may return to a non-thermal lensing condition. At times, once the incident energy is removed the optical element does not return to a non-thermal lensing condition. For example, one or more contaminants (e.g., soot, dirt, atmospheric particles, silicon-based compounds, organic compounds, and/or hydrocarbons) can be present (e.g., introduced) on a surface of the optical element (e.g., during lensing). A contaminant can cause a temporary, semi-permanent, or permanent thermal lensing effect in the optical element. Semi-permanent can refer to a contamination condition that persistently exhibits thermal lensing in an optical element, which thermal lensing subsides when the contamination is removed. Permanent can refer to a contamination condition that persistently exhibits thermal lensing in an optical element, which thermal lensing does not (e.g., completely) subside due to an inability to (e.g., completely) remove the contamination.

Figure 8B:
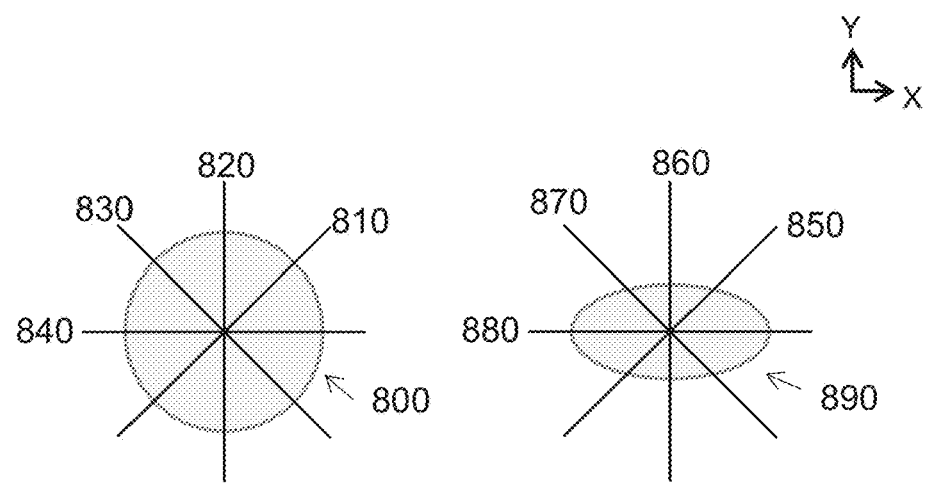
FIG. 8B schematically illustrate energy beam footprints.
Figure 8C:
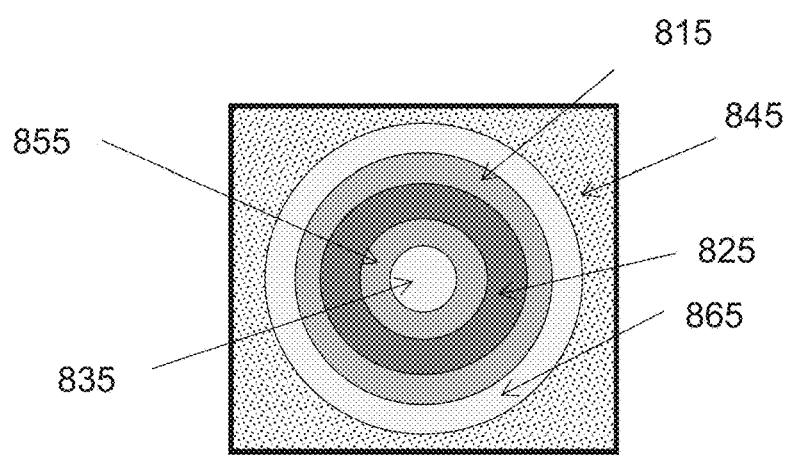
FIG. 8C schematically illustrates a footprint of an energy beam on a target surface.

In some embodiments, the circularity (e.g., astigmatism) of the energy beam footprint is measured and/or adjusted using a calibration system. The calibration structure may facilitate measurement of the power density distribution in at least one lateral direction (e.g., X and/or Y direction). FIG. 8B, shows an example of a top view of a footprint of an energy beam 800 that is circular, an X direction 840, a Y direction 820, and angular directions 810, and 830. FIG. 8B, shows an example of a top view of a footprint of an energy beam 890 that is elliptical, an X direction 880, a Y direction 860, and angular directions 850, and 870. The astigmatism calibration of the footprint may be performed using any of the calibration structures described herein.

In some embodiments, a calibration system is utilized to calibrate at least two of energy beam with respect to each other. The calibration system may comprise a detection system. The detection system may be configured to capture an image (and/or a video) of the target surface. The detection system may be operatively coupled with one or more apparatuses of the 3D printing system (e.g., a controller and/or optical system), and/or to the QA program. For example, the calibration system may be operatively coupled to the database. The detection system may be operable to capture images at various times during a calibration process. For example, the detection system may be operable to capture a first image following generation of a first set of alignment markers (e.g., a first alignment marker arrangement, a first subset of alignment markers). The first image may be an image of a first layer of pre-transformed material comprising alignment markers. The detection may be operable to capture a second image following generation of a second set of alignment markers (e.g., formed in a subsequent layer of pre-transformed material). The second image may be an image of a second layer of alignment markers.

At times, overlay compensation data are generated based on a direct comparison between (e.g., respective) alignment markers (e.g., arrangements) of the plurality of energy beams. For example, an overlay offset calibration may include generation of alignment marker (e.g., arrangement) by a first energy beam, and an image capture by a detection system (e.g., such as described herein). The overlay offset calibration may include (e.g., a subsequent) generation of alignment marker (e.g., arrangement) by a second (e.g., overlapping) energy beam, and an image capture by the detection system. The image of the (e.g., first) alignment marker arrangement and the (e.g., second) alignment marker arrangement may be compared (e.g., via image processing, as described herein), as depicted in example operations shown in FIGS. 10A-10F.

At times, an alignment marker arrangement includes alignment markers that are formed from one or more partial alignment markers (e.g., "partial markers"). A partial marker may correspond to an alignment marker that is split to form scale-independent (e.g., partial) markers. For example, the partial markers may correlate to each other at least one point. A first set of partial alignment markers may be generated on a first layer, and a second (e.g., corresponding) set of partial alignment markers may be generated on a second layer. A combination of partial markers may be used to form a (e.g., complete) alignment marker in an alignment marker arrangement. A combination of the first set and the second set of partial alignment markers may form the (e.g., complete) alignment marker arrangement. A combination of partial markers may reduce a variability in the combined alignment marker. A reduction in variability can be with respect to a shape, position (e.g., on the target surface), and/or a dimension of the combined alignment marker, as compared to a (e.g., full) alignment marker generated in one processing step.

As an example, a (e.g., first) partial marker may comprise a forward-slash ("/"). For example, a (e.g., second) partial marker may form a backslash ("\"). The first and the second partial markers may be combined to form a (e.g., complete) alignment marker (e.g., an "X" marker). The partial markers may form an arrangement that is (e.g., substantially) similar in form to the alignment marker arrangement (e.g., placement on a grid, pitch, and/or coherence length). The combination of the first and the second (e.g., arrangements of the) partial markers may be performed via image processing. The combination of the first and the second (e.g., arrangements of the) partial markers may be performed via superposition of their two respective images. The (e.g., image processing) combination may be based on data captured by a detection system (e.g., a still image and/or a video). A (e.g., complete) alignment marker that is formed from a combination of partial markers may advantageously reduce variability in the alignment marker. A source of variability an a (e.g., completely) generated alignment marker may be one or more regions of the alignment marker that overlap. For example, a center portion of an alignment marker (e.g., an "X") may be subject to two transformations (e.g., from overlapping build portions). For example: (a) a first layer of pre-transformed material (e.g., FIG. 10A, 1011) may be deposited above a platform; (b) a first partial marker (e.g., or first set of partial markers) may be formed (e.g., FIG. 10B, 1001) using transformation of respective areas of the layer by a first energy beam; (c) a first image of the first marker is taken by the detector; (d) a second layer of pre-transformed material may be deposited above the first layer (e.g., FIG. 10D); (e) a second marker (e.g., or a second set of partial markers) may be formed using transformation of respective areas of the layer by a second energy beam (e.g., FIG. 10F); (f) a second image of the second marker is taken by the detector; (g) superposition of the first image and the second image is performed to form a third image; and (h) the image of the markers (formed using the superposition) is analyzed. At times, only one marker (e.g., one set of markers) is generated; in that case, after operation (c) the image of the marker (or set thereof) is analyzed. The analysis may be with respect to a benchmark location (e.g., or grid of locations) and/or calibrated detector. In some embodiments, a guidance system causes an energy beam to generate corresponding partial alignment markers 1002 at the same XYZ position in the 3D printing system, but at different layers in the material bed (e.g., FIG. 10B, 1011 and FIG. 10F, 1020 shown as perspective views). The partial alignment markers may be generated at the same Z position as the platform on which the material bed is supported recedes between processing of subsequent layers (e.g., FIG. 10C, −ΔZ), and the prior layer of partial alignment markers may be (e.g., completely) covered (e.g., by using the layer dispensing system) (e.g., FIG. 10E). Therefore, separate layers (e.g., build layers) may be used for a (e.g., each) given set of partial alignment markers. In this manner the guidance system of the energy beam may be calibrated across its processing field using (e.g., combinations of) partial alignment markers formed at different material layers. Examples of guidance system and/or calibration of one or more energy beams (e.g., lasers), can be found in Patent Application serial number PCT/US19/14635, titled "CALIBRATIN IN THREE-DIMENSIONAL PRINTING" that was filed Jan. 22, 2019, which is incorporated herein by reference in its entirety.

In some embodiments, monitoring the one or more variables (e.g., plurality of variables) may aid in assessing the quality of the 3D object. The variables may comprise (internal) input variables, (internal) output variables, or external variables. The input variables and/or output variables may be in situ, in real time, and/or historical variables. Assessing the quality of the 3D object may comprise (i) whether a quality of the 3D object is compromised, (ii) in what way it is compromised (e.g., what any compromised aspects relating to the quality of the 3D object), or (iii) how much is it compromised (e.g., quantify the compromise). Quantifying the compromised may comprise quantifying at least one of the ways in which the 3D object is compromised. For example, quantifying one or more characteristics of the 3D object. One or more characteristics of the 3D object may comprise a dimensional accuracy, a material makeup, porosity, material phase, crystal structure, tensile stress, strength, or surface roughness.

In some embodiments, the alignment of the markers may aid in assessing the quality of the 3D object. An alignment of a plurality of transforming agents (e.g., energy beams) may be conducted prior to initiation of forming the 3D object. During formation, the alignment may drift and one or more of the transforming agents may deviate from alignment. Such deviation may result in a compromised 3D object (e.g., depending on the degree of deviation). The deviation may be detected during and/or after a forming cycle (e.g., for forming the 3D object). The deviation may be detected by forming alignment markers on at least a portion of the target surface (e.g., exposed surface of a material bed). For example, after the 3D object has been formed in a material bed, the material bed may be recoated for measuring the alignment (or misalignment) status of at least one of the transforming agents, and alignment markers may be formed. For example, during formation of the 3D object in a material bed, any portions of the exposed surface of the material bed that are not transformed (e.g., FIG. 14, 1409) to form a layer of the 3D object(s) (e.g., FIG. 14, 1408), may be utilized for measuring the alignment (or misalignment) status of at least one of the transforming agents. For example, during formation of the 3D object above a target surface (e.g., in a material bed), any portions laterally adjacent to the target surface (e.g., laterally adjacent to the exposed surface of the material bed, e.g., FIG. 14, 1410) may be utilized for measuring the alignment (or misalignment) status of at least one of the transforming agents. Measuring the alignment (or misalignment) status of at least one of the transforming agents may be conducted in real time and/or in situ during formation of the 3D object(s). Measuring the alignment (or misalignment) status of at least one of the transforming agents may be conducted before and/or after forming the 3D object(s). Measuring the alignment (or misalignment) status of at least one of the transforming agents may follow a procedure similar to the one shown in the example of FIGS. 10A-10F. The misalignment may comprise positional and/or any astigmatism distortion of an energy beam footprint on a target surface. Examples of alignment of one transforming agent(s), e.g., using alignment marker(s), can be found in Patent Application serial number PCT/US19/14635, titled "CALIBRATIN IN THREE-DIMENSIONAL PRINTING" that was filed Jan. 22, 2019, which is incorporated herein by reference in its entirety.

For example, the variable may relate to any settling of debris (e.g., soot) on a target surface. For example, any settling of debris on an exposed surface of the material bed (e.g., powder bed). Monitoring settling of the debris may comprise forming an irradiated location (by irradiating a pre-transformed material with an energy beam), which formation of the irradiated location generates an excess of debris. The irradiated location can be a spot or a pattern. The sensor may collect data from above the pattern, or at a prescribed distance(s) from the pattern (e.g., downstream or upstream). The sensor (e.g., optical sensor) may detect change in a characteristic of the target surface (e.g., exposed surface of the material bed). For example, a change in color, reflectivity, specularity, and/or scattering. For example, when the exposed surface comprises a rough powder (having greater scattering variability), once fine soot is accumulated on the exposed surface, the exposed surface becomes smoother (e.g., more planar, more uniform) as the soot is smaller (e.g., finer) than the powder. Once the soot is accumulated on the exposed powder surface, the exposed surface will have a smaller variability in beam scattering. Examples of detecting methods, apparatus, systems, detectors, sensors, and associated non-transitory computer readable media can be found in: international patent application serial number PCT/US17/18191 filed on Feb. 16, 2017, patent application serial number U.S. Ser. No. 15/435,065 filed on Feb. 16, 2017, patent application serial number EP17156707 filed on Feb. 17, 2017, or in international patent application number PCT/US18/12250 filed Jan. 3, 2018, each of which is incorporated herein by reference in its entirety.

The variables may relate to the pre-transformed material. The variables may relate to a material bed (e.g., a powder bed). For example, the variables may relate to an exposed surface of the material bed. For example, the variables may relate to a height, roughness, planarity, any streaks, or any short feed recoats, of the exposed surface of the material bed. In some embodiments, partial deposition (e.g., incomplete deposition) of a layer of pre-transformed material is referred to herein as "short feed recoat." For example, the variables may relate to a temperature of the pre-transformed material, the material bed, the exposed surface of the material bed, any position at the exposed surface of the material bed. For example, at a transformation position (e.g., irradiation position).

In some embodiments, at least a portion of the 3D object may protrude from the exposed surface of the material bed, e.g., during formation. The variables may relate to the protrusion of the at least the portion of the 3D object from the exposed surface of the material bed. For example, the variable may relate to a height difference between the protruding part and the exposed surface of the material bed. For example, the variable may relate to a thickness of pre-transformed material (e.g., powder) disposed on the protruding portion of the 3D object. The data relating to the protruding part may be derived topographical mapping. Topological mapping (e.g., using a Height Mapper) may comprise a mapping of at least one (e.g., every) point at the location and height, as compared to a plane. Examples of a topographical mapping can be found in: patent application serial number PCT/US17/18191, titled "ACCURATE THREE-DIMENSIONAL PRINTING" that was filed on Feb. 16, 2017; U.S. patent application Ser. No. 15/435,065, titled "ACCURATE THREE-DIMENSIONAL PRINTING" that was filed on Feb. 16, 2017; patent application serial number EP17156707, titled "ACCURATE THREE-DIMENSIONAL PRINTING" that was filed on Feb. 17, 2017;

or in international patent application number PCT/US18/12250, filed Jan. 3, 2018, titled "OPTICS IN THREE-DIMENSIONAL PRINTING;" each of which is incorporated herein by reference in its entirety.

Figure 7A:
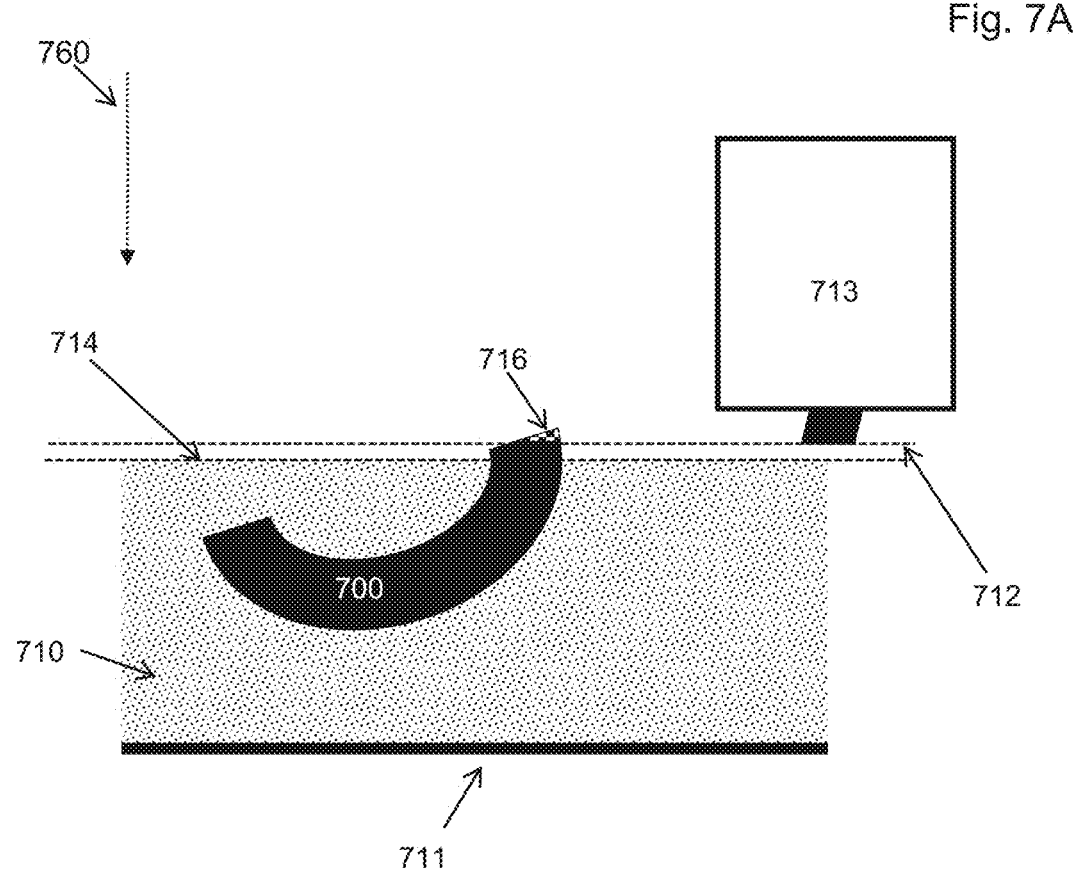
FIG. 7A schematically illustrates a vertical cross section of a 3D object in a portion of a manufacturing mechanism.

At times, it may be beneficial to know if and to what extend at least a portion of a 3D object protrudes from the exposed surface of a material bed. FIG. 7A shows an example of a 3D object 700 disposed in a material bed 710, which 3D object 700 has a portion 716 that protrudes from the exposed surface of the material bed 714. A leveler 713 may collide with a portion 716 of the 3D object that protrudes from the exposed surface of the material bed, as it exceeds a gap 712 between the leveler and the exposed surface of the material bed. In the example shown in FIG. 7A, numeral 760 designates a "global vector." The global vector may be (a) a (e.g., local) gravitational field vector, (b) a vector in a direction opposite to the direction of a layerwise 3D object formation, and/or (c) a vector normal to a surface of a platform that supports the 3D object, in a direction opposite to the 3D object.

Figure 7B:
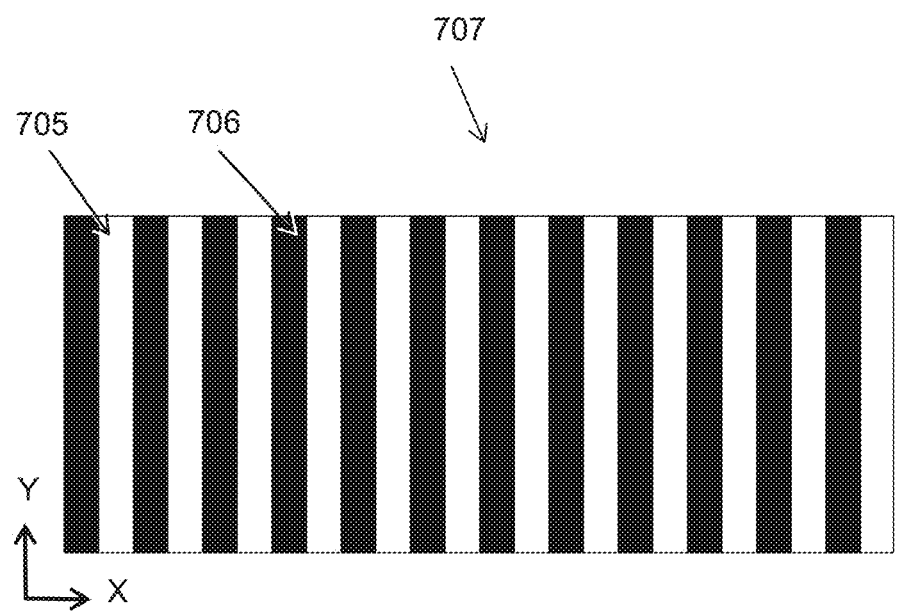
FIG. 7B schematically illustrates a lateral view of an irradiated target surface.

A sensor measuring the degree of protrusion of the at least a portion of the 3D object from the exposed surface of the material bed may comprise a pattern of light (e.g., pattern of dark and light portions). The pattern may change over time, e.g., in a predetermined and/or controlled manner. Any deviation from the pattern may be detected (e.g., by an optical detector). For example, any vertical deviation (e.g., attributed to a protrusion) from the target surface may be detected. The vertical deviation may be along the Z axis (e.g., as shown in FIG. 7B). FIG. 7B shown a top view example of a pattern of light 705 and dark 706 streaks irradiated on a target surface 707 (e.g., an exposed surface of a material bed). Examples of detection systems for protrusion of the 3D object from an exposed surface of a material bed can be found in: international patent application serial number PCT/US17/18191 filed on Feb. 16, 2017, U.S. patent application Ser. No. 15/435,065 filed on Feb. 16, 2017, patent application serial number EP17156707 filed on Feb. 17, 2017, or in international patent application number PCT/US18/12250 filed Jan. 3, 2018, each of which is incorporated herein by reference in its entirety.

The variable may relate to an optical element of the manufacturing mechanism and/or the performance of the optical element. For example, the variables may relate to a spot size (e.g., footprint size) of the energy beam on the target surface, power density at the target surface, spot uniformity, focus location, any thermal lensing, power density of the energy beam, spot (e.g., footprint) uniformity, any variation in the spot (e.g., spot stability), tail of optical spot, spot position, or relative positional offset of spots between multiple beams. The variables may comprise any blurring of an energy beam (e.g., a transforming beam or another beam utilized for testing).

In some embodiments, the QA program facilitates assessment whether the process of forming the 3D object is under expected control level, and/or what is the level of control of the forming (e.g., printing) process. Inspection of various items, metrics, and/or variables may be utilized to assess the (e.g., level of) control on the forming process. For example, the target surface, cleanliness of the atmosphere, and status of any optical components may allow such assessment. The target surface may be an exposed surface of a material bed. Any height differences in the exposed surface of the material bed may be assessed (e.g., shown in FIG. 14), e.g., and any protruding object from the exposed surface may be inspected and/or compared to an expected value.

In some embodiments, the QA program may consider a statistical distribution variation in one or more signals collected by one or more sensors. The signal may comprise beam scattering, thermal signal, beam reflection, surface imaging, topographical mapping (height sensor and/or Height Mapper). In some embodiments, it may not be possible to know that a problem exists at a location (e.g., which problem may be a deviation from an expected value of a variable). At times, it may be possible to know that a plurality of variables (e.g., collectively) deviate from expected value, which may in turn allow a (e.g., quick) understanding that the process (i) deviates from expected performance and/or (ii) deviates from expected control level. A magnitude and/or direction of deviation of one or more variables may indicate that the process (i) deviates from expected performance and/or (ii) deviates from expected control level. A magnitude and/or direction of deviation of one or more variables (e.g., and which of the variables deviate) may indicate what type of deviation the process undergoes. A magnitude and/or direction of deviation of one or more variables (e.g., and which of the variables deviate) may indicate what type of deviation of control level the process undergoes. A collective deviation of a plurality of variables from expected levels may increase an accuracy and/or confidence in assessing that the process (i) deviates from expected performance, and/or (ii) deviates from expected control level. Deviation from expected performance may correlate to a deviation in an expected result of forming at least a portion of the 3D object.

In some embodiments, the QA program may be operatively coupled (e.g., directly or through the database) to a plurality of manufacturing mechanisms (e.g., printers). In some embodiments, the QA program may collect variables (e.g., data) from multiple systems a plurality of manufacturing mechanisms (e.g., printers). The QA program may compare the manufacturing machines, any of their components (e.g., sensors, layer dispensers, transforming agents, optical components, and/or gas conveyance systems). In some embodiments, the QA program may assist in comparing the plurality of manufacturing mechanisms (e.g., plurality of printing systems). The comparison may be to each other and/or to a standard. The QA program may assist in calibrating and/or determining a calibration of one or more manufacturing mechanism.

Figure 11:
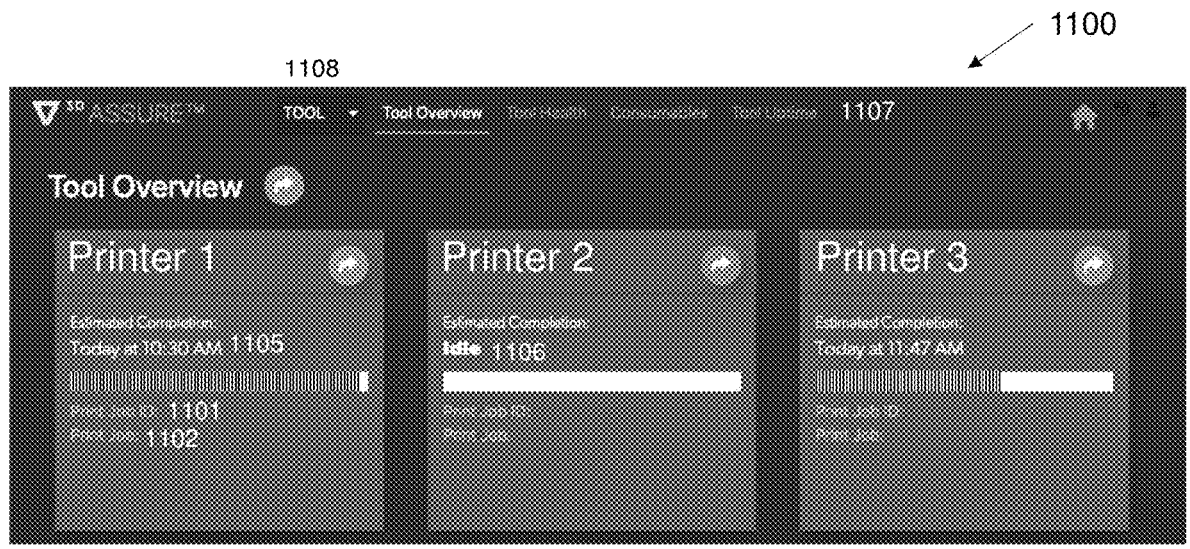
FIG. 11 illustrates various user interfaces.
Figure 11:

In some embodiments, the QA program comprises one or more modules. The modules may be interactive or passive. A user may select one or more options in a module. A user may be presented one or more options/indicators in a module. For example, the user may select a manufacturing mechanism (e.g., also referred herein as "tool"), e.g., among a plurality of manufacturing mechanisms. The user may view a status of the tool (e.g., health of the tool). For example, the user may inspect whether all components of the tool are functioning properly and/or are aligned, or are there any discrepancies or malfunctioning components. The user may inspect what is the status of any consumables (e.g., pre-transformed material, filters, and/or gas supply). The user may inspect whether the tool is functioning (e.g., printing), idle, or disconnected (e.g., shut). The user may inspect how long has the tool been in a status. The user may inspect how long has it been functioning, idle, and/or disconnected (e.g., tool uptime). The user may inspect how many layers are to be printed, what is the time estimate to print the 3D object, how much time is remaining, how many layers are remaining, how many layers have been printed, how long is the tool printing, or any combination thereof. The QA program may present to the user any combination of data to facilitate the inspection. FIG. 11 shows an example of a module as part of the QA program. The module may be represented to a user as a projection onto a screen (e.g., computer screen) operatively coupled to a processor. The processor may be programed to perform the QA program (e.g., having a code, e.g., computer readable code). The screen projection shown the example of FIG. 11, comprises a user interface 1100. The user interface 1100 includes options arranged in a ribbon 1107 (e.g. tool (referring to the manufacturing machinery), tool overview, tool health, consumables, and tool uptime. An option 1108 is interactive and offers a dropdown menu of several tools of choice (e.g., among printer 1, printer 2, and printer 3). Each of the manufacturing mechanisms (e.g., of printer 1-3), is depicted in a rectangle that shows the tool name (e.g., Printer 1). A time estimation to complete formation of the printing cycle in 1105, visually showing a percentage of printer cycle completion as a line under numeral 1105. An identification of the printing cycle (e.g., job ID 1101), and the subject matter of the printing cycle (e.g., print job 1102). FIG. 11 shows an example of an idle manufacturing machinery Printer 2, indicating an idle state 1106.

In some embodiments, the QA program offers the user details regarding a status of the manufacturing mechanism (e.g., tool) and/or a status of one or more variables relating to the manufacturing mechanism and/or process. The variable may relate to a component of the tool. For example, the QA program may indicate whether the variable/component/ tool has a proper value (e.g., within a tolerance), malfunctions (e.g., has an error), no data exists for this variable/ component/tool, and/or old data exists for the status of the variable/component/tool. The QA program may indicate how old the variable/component/tool status is. The QA program may indicate when the last status of the variable/ component/tool was obtained. The tolerance may be preset, automatically set, set by the user, alterable, or non-alterable (e.g., by the user). The components status may be indicated through a variable relating to the component. FIG. 11 shows an example of a user interface 1150 indicating the status of four tools (e.g., printer 1-4). The user may be able to toggle a sub-screen indicating the status of the tool and the status of its component(s)/variable(s). FIG. 11 shows an example of a rectangle 1160 dedicated to Printer 1, which shows example of various variables/components relating to of Printer 1 (e.g., beam stability, laser alignment, thermal sensor, and focus, powder bed), along with symbols indicative of their status (e.g., OK, error, results older than X days, no data). The number of days X below numeral 1159 should be a numerical value, indicative in the legend 1161). FIG. 11 shows an example of a rectangle 1170 dedicated to Printer 2, which shows example of various variables/components relating to of Printer 2 (e.g., beam stability, laser alignment, thermal sensor, and focus, powder bed), along with symbols indicative of their status (e.g., OK, error, results older than X days, no data). The status of Printer 2 in the example shown in FIG. 11 is different from the status of Printer 1. For example, the beam stability data of Printer 1 is old, whereas the beam stability of Printer 1 is non-existent. A user may be able to toggle between status of the variables/components, and the status of the tool and 3D printing process. FIG. 11 shows an example in rectangle 1180 which indicates the printing status of Printer 3. Printer 3 appears to be in operation and printing, as visually indicated by a patterned line representing a relative percentage of 3D object printed 1184, relative to a white line 1187 representing the relative percentage of 3D object to be printed. The representation may be visual or numerical (e.g., in percentage values, or relative values). In the example shown in FIG. 11, the numerical values of number of layers printed versus the total amount of layers to be printed is represented in 1186. Any status of consumables may also be indicated. The consumable status of Printer 3 is indicated as satisfactory (e.g., OK). FIG. 11 shows an example in rectangle 1190 which indicates the printing status of Printer 4. Printer 4 appears to be non-operational as it is indicated as "paused", a black line representing a relative percentage of 3D object printed 1194, relative to a white line 1197 representing the relative percentage of 3D object to be printed. The black line is indicative of an error, as depicted in the legend 1161. The consumables status of Printer 4 is indicated as low. The legend of the status indicators for the variables/components and the visual line indicating of the printing status may or may not match. The rectangle dedicated to a tool may include a field to facilitate toggling between the printing status and the component/variable status. An example for such a filed is a circle having a bent arrow to the right of numeral 1160, 1170, 1180, or 1190.

Figure 12:
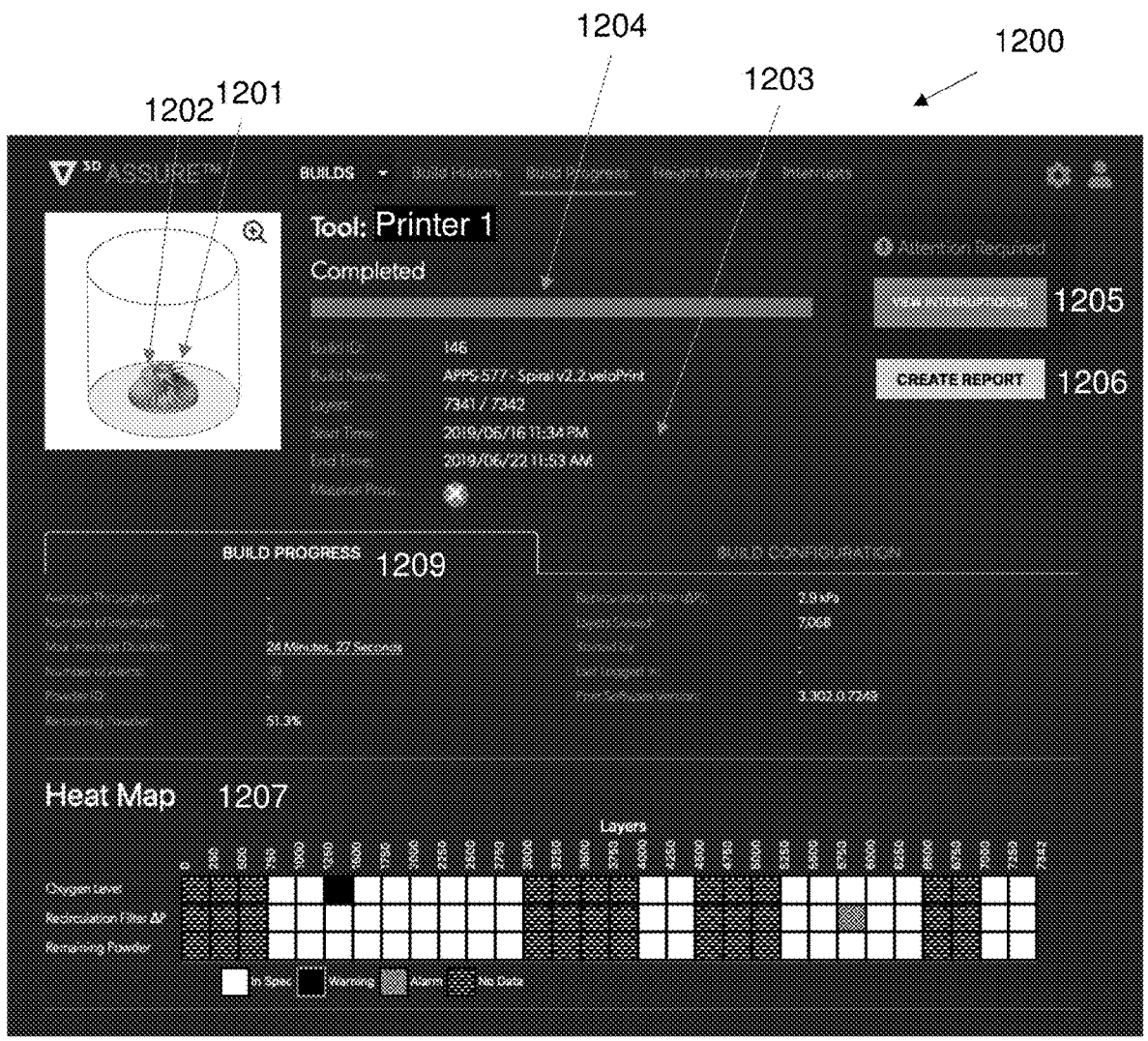
FIG. 12 illustrates various user interfaces.
Figure 12:
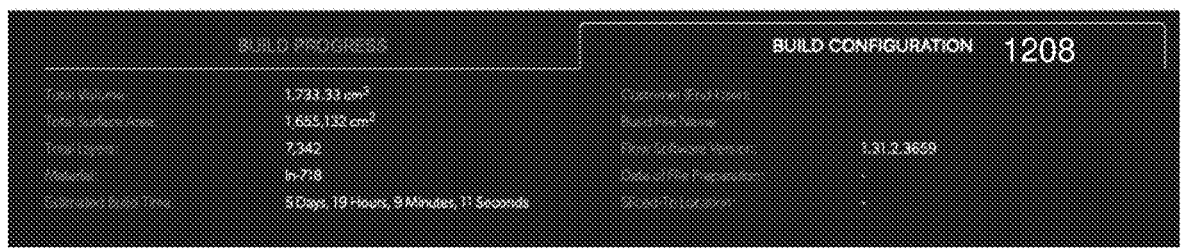

In some embodiments, the QA program illustrates (i) a model of the 3D object to be formed, (ii) a layer of the 3D object that was, is, or is about to be formed, and/or (iii) a plurality of layers of the 3D object that were formed, or are about to be formed. The QA program may display and/or assign an identification number for the 3D object and/or layer of the 3D object. The QA program may display a client name, a build name (e.g., given by a user, e.g., a client). The QA program may display a start time for formation of the 3D object, and an estimated end time 1185, 1195. The QA program may compile an estimated end time for forming the 3D object. The QA program may be operatively coupled, and/or accept input from another program for estimation of build end time, tolerances, thresholds, and/or optimal (e.g., requested) variable values. Data used and/or outputted by the QA program may be encrypted. The QA program may compile a report. The report may comprise any of the items displayed and/or processed by the QA program. The items included in the report may be pre-defined. One or more items included in the report may be user defined. The order of the one or more items in the report may be pre-defined, or user defined. The configuration of the 3D object above the platform and/or in the print volume (e.g., material bed) may be calculated and/or displayed in a user interface pf the QA program. FIG. 12 shows an example of various user interface. The user interface 1200 shown in the example of FIG. 12 displays a 3D object 1201 in a build volume 1202 above a platform that was printed in a tool named Printer 1. Various identification data for the print is displayed 1203 (e.g., build identification number (ID No.), build name, number of layers printed out of the total number of layers, start time and data, and end time and date. The QA displays a visual timeline 1204 for completion of the build (indicating completion). The QA program user interface (UI) indicates that attention is required 1205. The QA program UI provides an option to generate (e.g., and display) a report 1206. The QA program UI can indicate any parameters relating to the build progress. For example, average throughput, number of interrupts, maximum interrupt duration, number of alerts, pre-transformed material (e.g., powder) identification, remaining pre-transformed material, status of a powder recirculation filter, how many layers were sieved, a user name, a last log of the user, and/or a version of the QA program. The QA program UI may have various windows, tabs, dropdown menus, or buttons. Any of the features displayed in the QA program UI may or may not be interactive (e.g., to a user). The QA program UI may display any of the printer components/process/sensors state in prose form, visually, as averaged over the total accumulated print, averaged over a number of layers (e.g., 1207), and/or in real time. The user interface may indicate any status of the components/process/sensors. FIG. 12 shows an example 1207 of three monitored variables related to a monitored item (e.g., the heat map). The three sensors shown in FIG. 12 include oxygen level, recirculation filter, and remaining powder. Which sensor status is averaged over every 250 layers, and indicated as compliant (e.g., "in Spec"), various level of non-compliance (e.g., "warning," and "Alarm"), and a lack of data ("no data"). FIG. 12 shows two tabs that can be toggled by a user (e.g., build progress 1209, and build configuration 1208). The build configuration tab can include a total volume of the 3D object to be formed, its surface area, the total number of layers required to form the 3D object, the material from which it is formed, an estimated total build time, customer, build file name, any version of integrated software (e.g., Flow software that is different than the QA software), a date in which a file is prepare, and particular slicing operations used (e.g., slice-to-location).

Examples of program for estimation of build end time, tolerances, thresholds, and/or optimal (e.g., requested) variable values can be found in: international patent application serial number PCT/US19/42637 filed Jul. 29, 2019, or in international patent application serial number PCT/US19/39909 filed Jun. 28, 2019, each of which is incorporated herein by reference in its entirety. Examples of encryption can be found in U.S. patent application Ser. No. 16/183,557 filed Nov. 7, 2018, which is incorporated herein by reference in its entirety. Examples of pre-transformed material circulation and/or conveyance systems can be found in: international patent application serial number PCT/US18/24667 filed Mar. 27, 2018, which is incorporated herein by reference in its entirety.

Figure 13:
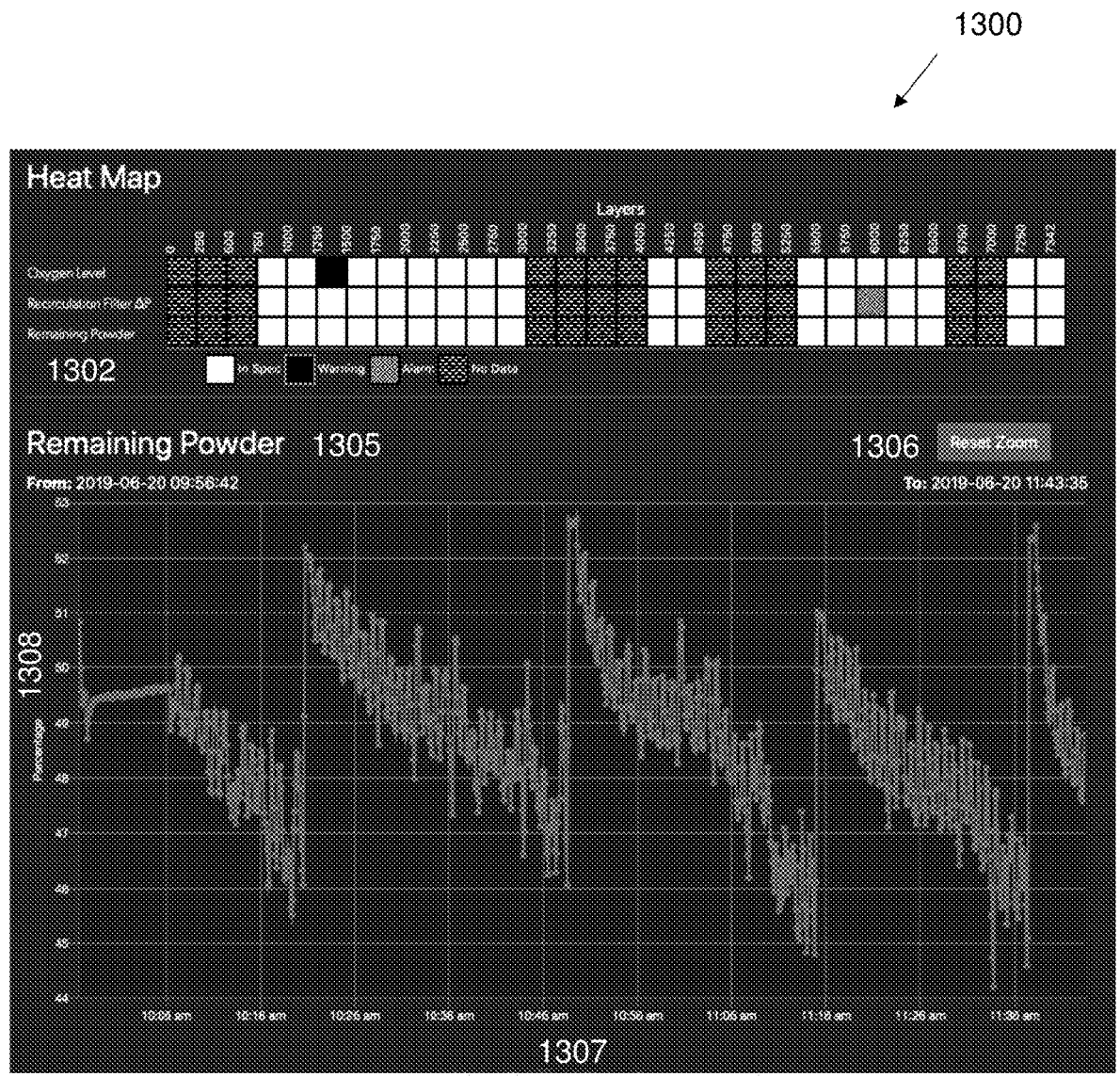
FIG. 13 illustrates a user interface.

In some embodiments, the QA program UI may display a timed status of a variable. FIG. 13 shows an example of a user interface 1300 displaying a monitored item (e.g., remaining powder), and various monitored variables (e.g., oxygen level, recirculation filter, and remaining powder) relating to the Heat Map. The monitored variables can be the same or different than the monitored items. At times, a monitored item requires integration of a plurality of monitored variables. In the example shown in FIG. 13, the monitored item requires one monitored variable (e.g., remaining powder 1305). The monitored variable and/or item can be displayed as a function of time (e.g., 1307), and/or as a function of layer number (e.g., 1302). The monitored variable and/or item can be displayed as an average value, a category (e.g., having a threshold), or as a numerical or relative value (e.g., 1308 showing percentage values). The QA program may allow a user to reset a zoom of any displayed data 1306. FIG. 13 shows an example of a dependency of time to percentage of powder remaining (e.g., in a layer dispenser). The dependency (shown in a graphical representation) can be zoomed in or out, that is the percentage and/or time can be shown as more or less detailed, e.g., per request made by a user.

Figure 14:
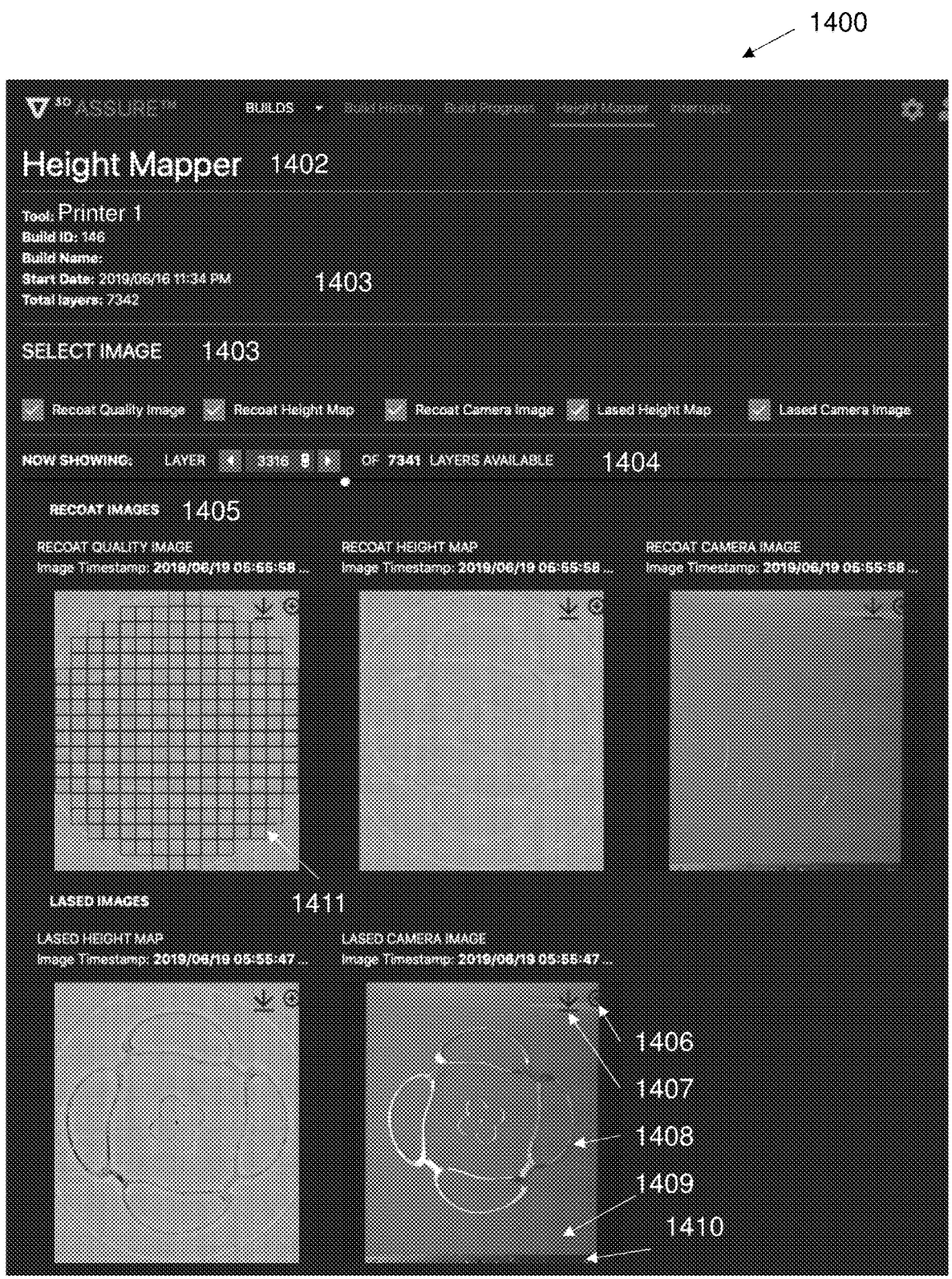
FIG. 14 illustrates a user interface.

In some embodiments, a layer and/or an exposed surface of a material bed may be displayed. The exposed layer of the material bed may or may not comprise a formed/forming layer of hardened material, e.g., as part of the 3D object. An image of the exposed layer (e.g., as obtained by one or more sensors) may be presented. The image may be a result of processing the signal of the one or more sensors (e.g., at least in part by a different application, or as part of the QA program). Any of the images displayed in the UI of the QA program may (e.g., 1411) or may not comprise a grid. The QA program UI may display the item monitored (e.g., Height Mapper 1402), print details 1403 (e.g., tool name, build ID, build name, time stamp of start of build (e.g., start date and time), and total number of layers to be build and/or that were built). FIG. 14 shows an example of a QA program UI showing data relating to the exposed surface of the material bed extracted at least in part using a method and/or an apparatus utilized to topographically map the exposed surface of the material bed (e.g., a Height Mapper). The total number of the object build made by Printer 1 shown in the example of FIG. 14, are 7342. The exposed surface of layer 3316 is shown in section 1405 of the UI. A user may be able to access and/or scroll through data relating to any of the layers processed and made available (e.g., at least in part through the database) to the user by the QA program. FIG. 14 shows an example in 1404 of the exposed surface of layer 3316 out of available 7341 that form the material bed. One or more (e.g., processed) images of the material bed may be shown. For example, FIG. 14 shows example of five different images of the same exposed surface (e.g., undergoing different processing and/or obtained by different sensor). For example, FIG. 14 shows an example of a recoat quality image, recoat height map image, recoat camera image, laser height map, and laser camera image. In some embodiments, the word "recoat" refers to a deposition of a new planar layer of pre-transformed material above a platform to form the material bed. The different sensor may be different in their position relative to a point, and/or different in the type of sensor. Any of the images may be zoomed in and out 1406 (e.g., by a user). Any of the images may be downloaded 1407 (e.g., by a user). Each item, variable, and/or sensor data may be time stamped and/or location stamped (e.g., relating to a layer of the 3D object and/or relating to a layer of pre-transformed material disposed above the platform). At least two of: the number of layers of the 3D object, the number of a layer of pre-transformed material disposed above the platform, and the number of recoat operation (e.g., layer dispense operation) may be correlated. FIG. 14 shows an example of a Lased Camera Image having a time stamp (e.g., 2019/06/19 05:55:49) and a layer stamp (e.g., 3316), which image shows an exposed surface of a material bed having pre-transformed material 1409, a transformed material 1408, and an edge of the material bed free of pre-transformed material 1410 (e.g., correlating to a side of the enclosure as in FIG. 3, 390).

Figure 15:
FIG. 15 illustrates a user interface.

The QA program UI may display one or more items relating to the functionality of the manufacturing mechanism for its intended purpose. The items may relate to calibration of the tool and/or various components thereof. For example, the QA program UI may display various data relating to the transforming agent (e.g., energy beam). Various tools may be displayed and/or selected (e.g., by a user) on the QA program display. Various variable and/or metrics of the selected item may be displayed and/or selected (e.g., by a user) on the QA program display. The tools may be compared to each other, e.g., according to the various metrics, items, and/or variables. The comparison may be displayed in a graphical or prose form. FIG. 15 shows an example of tool health module 1502 displayed on a UI, in which tool was selected (e.g., Printer 1) from various tool options 1505 (dropdown menu not shown), a metric is selected (e.g., beam stability) from various metric/variable options 1506 (dropdown menu not shown). FIG. 15 shows an example of a comparison between two transforming agents (e.g., laser 1 and laser 2) displayed as a graphical time (e.g., represented as dates 1507) dependency with relative thermal lensing

1508, which relative thermal lensing is to a control value (e.g., when the optical apparatus is cold, at initial irradiation). The QA program UI may indicate a status of an item/variable/metric at a time, and/or location. The location may comprise a location within the manufacturing mechanism. For example, the QA program UI may indicate stability of the transforming agent at a location in the printing system. FIG. 15 shows an example of Beam Stability metrics 1509 in the optics box (e.g., FIG. 3, 331) and optical windows (e.g., FIGS. 3, 335, and 315).

In some embodiments, the forming agent comprises an energy beam. At times, an energy beam is directed onto a specified area of at least a portion of the target surface for a specified time period. The material in or on the target surface (e.g., powder material such as in a top surface of a powder bed) can absorb the energy from the energy beam and, and as a result, a localized region of the material can increase in temperature. In some instances, one, two, or more 3D objects are generated in a material bed (e.g., a single material bed; the same material bed). The plurality of 3D objects may be generated in the material bed simultaneously or sequentially. At least two 3D objects may be generated side by side. At least two 3D objects may be generated one on top of the other. At least two 3D objects generated in the material bed may have a gap between them (e.g., gap filled with pre-transformed material). At least two 3D objects generated in the material bed may not contact (e.g., not connect to) each other. In some embodiments, the 3D objects may be independently built one above the other. The generation of a multiplicity of 3D objects in the material bed may allow continuous creation of 3D objects.

A pre-transformed material may be a powder material. A pre-transformed material layer (or a portion thereof) can have a thickness (e.g., layer height) of at least about 0.1 micrometer (µm), 0.5 µm, 1.0 µm, 10 µm, 50 µm, 100 µm, 150 µm, 200 µm, 300 µm, 400 µm, 500 µm, 600 µm, 700 µm, 800 µm, 900 µm, or 1000 µm. A pre-transformed material layer (or a portion thereof) may have any value of the afore-mentioned layer thickness values (e.g., from about 0.1 µm to about 1000 µm, from about 1 µm to about 800 µm, from about 20 µm to about 600 µm, from about 30 µm to about 300 µm, or from about 10 µm to about 1000 µm).

At times, the pre-transformed material comprises a powder material. The pre-transformed material may comprise a solid material. The pre-transformed material may comprise one or more particles or clusters. The term "powder," as used herein, generally refers to a solid having fine particles. The powder may also be referred to as "particulate material." Powders may be granular materials. The powder particles may comprise micro particles. The powder particles may comprise nanoparticles. In some examples, a powder comprises particles having an average FLS of at least about 5 nanometers (nm), 10 nm, 20 nm, 30 nm, 40 nm, 50 nm, 100 nm, 200 nm, 300 nm, 400 nm, 500 nm, 1 µm, 5 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, or 100 µm. In some embodiments, the powder may have an average fundamental length scale of any of the values of the average particle fundamental length scale listed above (e.g., from about 5 nm to about 100 µm, from about 1 µm to about 100 µm, from about 15 µm to about 45 µm, from about 5 µm to about 80 µm, from about 20 µm to about 80 µm, or from about 500 nm to about 50 µm). The powder in a material bed may be flowable (e.g., retain its flowability) during the printing.

At times, the powder is composed of individual particles. The individual particles can be spherical, oval, prismatic, cubic, or irregularly shaped. The particles can have a FLS. The powder can be composed of a homogenously shaped particle mixture such that all of the particles have substantially the same shape and fundamental length scale magnitude within at most about 1%, 5%, 8%, 10%, 15%, 20%, 25%, 30%, 35%, 40%, 50%, 60%, or 70%, distribution of FLS. In some embodiments, the powder may have a distribution of FLS of any of the values of the average particle FLS listed above (e.g., from at most about 1% to about 70%, about 1% to about 35%, or about 35% to about 70%). In some embodiments, the powder can be a heterogeneous mixture such that the particles have variable shape and/or fundamental length scale magnitude.

At times, at least parts of the layer are transformed to a transformed material that subsequently forms at least a fraction (also used herein "a portion," or "a part") of a hardened (e.g., solidified) 3D object. At times a layer of transformed or hardened material may comprise a cross section of a 3D object (e.g., a horizontal cross section). At times a layer of transformed or hardened material may comprise a deviation from a cross section of a 3D object. The deviation may comprise vertical or horizontal deviation.

At times, the pre-transformed material is requested and/or pre-determined for the 3D object. The pre-transformed material can be chosen such that the material is the requested and/or otherwise predetermined material for the 3D object. A layer of the 3D object may comprise a single type of material. For example, a layer of the 3D object may comprise a single metal alloy type. In some examples, a layer within the 3D object may comprise several types of material (e.g., an elemental metal and an alloy, several alloy types, several alloy-phases, or any combination thereof). In certain embodiments, each type of material comprises only a single member of that type. For example, a single member of metal alloy (e.g., Aluminum Copper alloy). In some cases, a layer of the 3D object comprises more than one type of material. In some cases, a layer of the 3D object comprises more than one member of a material type.

In some instances, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare-earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

In some instances, the metal alloy comprises an iron based alloy, nickel based alloy, cobalt based alloy, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising a device, medical device (human & veterinary), machinery, cell phone, semiconductor equipment, generators, turbine, stator, motor, rotor, impeller, engine, piston, electronics (e.g., circuits), electronic equipment, agriculture equipment, gear, transmission, communication equipment, computing equipment (e.g., laptop, cell phone, i-pad), air conditioning, generators, furniture, musical equipment, art, jewelry, cooking equipment, or sport gear. The impeller may be a shrouded (e.g., covered) impeller that is produced as one piece (e.g., comprising blades and cover) during one 3D printing procedure. The 3D object may comprise a blade. The impeller may be used for pumps (e.g., turbo pumps). Examples of an impeller and/or blade can be found in U.S. patent application Ser. No. 15/435,128, filed on Feb. 16, 2017; PCT patent application number PCT/US17/18191, filed on Feb. 16, 2017; or European patent application number. EP17156707.6, filed on Feb. 17, 2017, all titled "ACCURATE THREE-DIMENSIONAL PRINTING," each of which is incorporated herein by reference in its entirety where non-contradictory. The metal (e.g., alloy or elemental) may comprise an alloy used for products for human and/or veterinary applications comprising implants, or prosthetics. The metal alloy may comprise an alloy used for applications in the fields comprising human and/or veterinary surgery, implants (e.g., dental), or prosthetics.

In some instances, the alloy includes a superalloy. The alloy may include a high-performance alloy. The alloy may include an alloy exhibiting at least one of: excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may comprise cast iron, or pig iron. The steel may comprise Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may comprise Mushet steel. The stainless steel may comprise AL-6XN, Alloy 20, celestrium, marine grade stainless, Martensitic stainless steel, surgical stainless steel, or Zeron 100. The tool steel may comprise Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade steel such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may comprise 316L, or 316LVM. The steel may comprise 17-4 Precipitation Hardening steel (e.g., type 630, a chromium-copper precipitation hardening stainless steel, 17-4PH steel).

In some instances, the titanium-based alloy comprises alpha alloy, near alpha alloy, alpha and beta alloy, or beta alloy. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances, the titanium base alloy comprises Ti-6Al-4V or Ti-6Al-7Nb.

In some instances, the Nickel alloy comprises Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The brass may comprise Nickel hydride, Stainless or Coin silver. The cobalt alloy may comprise Megallium, Stellite (e. g. Talonite), Ultimet, or Vitallium. The chromium alloy may comprise chromium hydroxide, or Nichrome.

In some instances, the aluminum alloy comprises AA-8000, Al—Li (aluminum-lithium), Alnico, Duralumin, Hiduminium, Kryron Magnalium, Nambe, Scandium-aluminum, or Y alloy. The magnesium alloy may comprise Elektron, Magnox, or T—Mg—Al—Zn (Bergman-phase) alloy.

In some instances, the copper alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may comprise Calamine brass, Chinese silver, Dutch metal, Gilding metal, Muntz metal, Pinchbeck, Prince's metal, or Tombac. The Bronze may comprise Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84).

In some instances, the metal alloys are Refractory Alloys. The refractory metals and alloys may be used for heat coils, heat exchangers, furnace components, or welding electrodes. The Refractory Alloys may comprise a high melting points, low coefficient of expansion, mechanically strong, low vapor pressure at elevated temperatures, high thermal conductivity, or high electrical conductivity.

In some examples, the material (e.g., pre-transformed material) comprises a material wherein its constituents (e.g., atoms or molecules) readily lose their outer shell electrons, resulting in a free-flowing cloud of electrons within their otherwise solid arrangement. In some examples the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times," or "multiplied by." The high electrical conductivity can be any value between the afore-mentioned electrical conductivity values (e.g., from about $1*10^5$ S/m to about $1*10^8$ S/m). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{-7}$ $\Omega*m$, $5*10^{-8}$, or $1*10^{-8}$ $\Omega*m$. The low electrical resistivity can be any value between the afore-mentioned electrical resistivity values (e.g., from about $1*10^{-5}$ $\Omega*m$ to about $1*10^{-8}$ $\Omega*m$). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the afore-mentioned thermal conductivity values (e.g., from about 20 W/mK to about 1000 W/mK). The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore-mentioned density values (e.g., from about 1 g/cm$^3$ to about 25 g/cm$^3$, from about 1 g/cm$^3$ to about 10 g/cm$^3$, or from about 10 g/cm$^3$ to about 25 g/cm$^3$).

At times, a metallic material (e.g., elemental metal or metal alloy) comprises small amounts of non-metallic materials, such as, for example, oxygen, sulfur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (based on weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (based on weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

In some embodiments, a pre-transformed material within the enclosure is in the form of a powder, wires, sheets, or droplets. The material (e.g., pre-transformed, transformed, and/or hardened) may comprise elemental metal, metal alloy, ceramics, an allotrope of elemental carbon, polymer, and/or resin. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may comprise high performance material (HPM). The ceramic material may comprise a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon-based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or comprising (e.g., with) metal alloy. The material may comprise a stainless steel. The material may comprise a titanium alloy, aluminum alloy, and/or nickel alloy.

In some embodiments, the target surface is detected by a detection system. The detection system may comprise at least one sensor. The detection system may comprise a light source operable to illuminate a portion of the 3D forming (e.g., printing) system enclosure (e.g., the target surface). The light source may be configured to illuminate onto a target surface. The illumination may be such that objects in the field of view of the detector are illuminated with (e.g., substantial) uniformity. For example, sufficient uniformity may be uniformity such that at most a threshold level (e.g., 25 levels) of variation in grayscale intensity exists (for objects), across the build plane. The illumination may comprise illuminating a map of varied light intensity (e.g., a picture made of varied light intensities). Examples of illumination apparatuses include a lamp (e.g., a flash lamp), a LED, a halogen light, an incandescent light, a laser, or a fluorescent light. The detection system may comprise a camera system, CCD, CMOS, detector array, a photodiode, or line-scan CCD (or CMOS). The detection system may be a Height Mapper. Examples of a control system, detection system and/or illumination can be found in U.S. patent application Ser. No. 15/435,090, titled "ACCURATE THREE-DIMENSIONAL PRINTING" that was filed Feb. 16, 2017, which is incorporated herein by reference in its entirety. Examples of detection system can be found in: international patent application serial number PCT/US17/18191 filed on Feb. 16, 2017, U.S. patent application Ser. No. 15/435,065 filed on Feb. 16 2017, patent application serial number EP17156707 filed on Feb. 17, 2017, international patent application number PCT/US18/12250 filed Jan. 3, 2018, or in international patent application serial number PCT/US15/65297 filed on Dec. 11, 2015, each of which is incorporated herein by reference in its entirety.

In some embodiments, the manufacturing device includes an optical system. The optical system may be used to control the one or more transforming agents (e.g., energy beams). The energy beams may comprise a single mode beam (e.g., Gaussian beam) or a multi-mode beam. The optical system may be coupled with or separate from an enclosure. The optical system may be enclosed in an optical enclosure (e.g., FIG. 3, 331). In some embodiments, aspects of the optical system are controlled by one or more controllers of the printer. For example, one or more controllers may control one or more mirrors (e.g., of galvanometer scanners) that directs movement of the one or more energy beams in real time. Examples of various aspects of optical systems and their components can be found in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" international patent application number PCT/US17/64474, filed Dec. 4, 2017, titled "OPTICS, DETECTORS, AND THREE-DIMENSIONAL PRINTING;" or international patent application number PCT/US18/12250, filed Jan. 3, 2018, titled "OPTICS IN THREE-DIMENSIONAL PRINTING," each of which is entirely incorporated herein by reference.

In some cases, the optical system modifies a focus of the one or more energy beams at the target surface (or adjacent thereto, e.g., above or below the target surface to form a defocused beam spot at the target surface). In some embodiments, the energy beam is (e.g., substantially) focused at the target surface. In some embodiments, the energy beam is defocused at the target surface. An energy beam that is focused at the target surface may have a (e.g., substantially) minimum spot size at the target surface. An energy beam that is defocused at the target surface may have a spot size at the target surface that is (e.g., substantially) greater than the minimum spot size, for example, by a pre-determined amount. For example, a Gaussian energy beam that is defocused at the target surface can have spot size that is outside of a Rayleigh distance from the energy beams focus (also referred to herein as the beam waist).

In some cases, one or more controllers control the operation of one or more components of a manufacturing device. For example, one or more controllers may control one or more aspects (e.g., movement and/or speed) of a layer forming apparatus. One or more controllers may control one or more aspects of an energy source (e.g., energy beam power, scan speed and/or scan path). One or more controllers may control one or more aspects of an energy beam optical system (e.g., energy beam scan path and/or energy beam focus). One or more controllers may control one or more operations of a gas flow system (e.g., gas flow speed and/or direction). In some embodiments, one or more controllers control aspects of multiple components or systems. For example, a first controller can control aspects of the energy source(s), a second controller can control aspects of a layer forming apparatus(es), and a third controller can control aspects of a gas flow system. In some embodiments, one or more controller controls aspect of one component or system. For example, multiple controllers may control aspects of an optical system. For instance, a first controller can control the path of the one or more energy beams, a second controller may control scan speed of the one or more energy beams, and a third controller may control a focus of the one or more energy beams. As another example, multiple controllers may control aspects of an energy source. For instance, a first controller can control the power of one or more energy beams, a second controller may control pulsing (e.g., pulse versus continuous, or pulse rate) of the one or more energy beams, and a third controller may control a power profile over time (e.g., ramp up and down) one or more energy beams. At times, the first controller, second controller, and the third controller are the same controller. At times, at least two of the first controller, second controller, and the third controller are different controllers. Any combination of one or more controllers may control aspects of one or more components or systems of a printer. The one or more controllers may control the operations before, during, and/or after the printing, or a portion of the printing (irradiation operation). The controller may comprise an electrical circuitry, one or more electrical wiring, a signal receiver, and/or a signal emitter. The controller may be operatively coupled to one or more components of the forming apparatus via a connecter and/or signal communication. The connection may be wired and/or wireless. The controller may communicate via signal receipt and/or transmission. The signal may comprise electrical, optical or audio signal.

In some instances, the controller(s) can include (e.g., electrical) circuitry that is configured to generate output (e.g., voltage signals) for directing one or more aspects of the apparatuses (or any parts thereof) described herein. The subordinate-controller may be an internal-controller. The controller (e.g., or subordinate controller) may comprise a proportion-integral-derivative (PID) loop. The subordinate-controller can be a second-controller as part of the first controller. The subordinate-controller can be a linear controller. The controller may be configured to control one or more components of the forming tool. The controller may be configured to control a transforming agent generator (e.g., an energy source, a dispenser of the binding agent and/or reactive agent), a guidance mechanism (e.g., scanner and/or actuator), at least one component of a layer dispenser, a dispenser (e.g., of a pre-transformed material and/or a transforming agent), at least one component of a gas flow system, at least one component of a chamber in which the 3D object is formed (e.g., a door, an elevator, a valve, a pump, and/or a sensor). The controller may control at least one component of the forming apparatus such as the forming agent (e.g., transforming agent). For example, the controller may be configured to control (e.g., in real time, during at least a portion of the 3D printing) a controllable property comprising: (i) an energy beam power (e.g., delivered to the material bed), (ii) temperature at a position in the material bed (e.g., on the forming 3D object), (iii) energy beam speed, (iv) energy beam power density, (v) energy beam dwell time, (vi) energy beam irradiation spot (e.g., on the exposed surface of the material bed), (vii) energy beam focus (e.g., focus or defocus), or (viii) energy beam cross-section (e.g., beam waist). The controller may be configured to control (e.g., in real time, during at least a portion of the 3D printing) a controllable (e.g., binding and/or reactive agent) property comprising: (i) strength (e.g., reaction rate), (ii) volume (e.g., delivered to the material bed), (iii) density (e.g., on a location of the material bed), or (iv) dwell time (e.g., on the material bed). The controllable property may be a control variable. The control may be to maintain a target parameter (e.g., temperature) of one or more 3D objects being formed. The target parameter may vary in time (e.g., in real time) and/or in location. The location may comprise a location at the exposed surface of the material bed. The location may comprise a location at the top surface of the (e.g., forming) 3D object. The target parameter may correlate to the controllable property. The (e.g., input) target parameter may vary in time and/or location in the material bed (e.g., on the forming 3D object). The subordinate-controller may receive a pre-determined power per unit area (of the energy beam), temperature, and/or metrological (e.g., height) target value. For example, the subordinate-controller may receive a target parameter (e.g. temperature) to maintain at least one characteristic of the forming 3D object (e.g., dimension in a direction, and/or temperature). The controller can receive multiple (e.g., three) types of target inputs: (i) characteristic of the transforming agent (e.g., energy beam power), (ii) temperature, and (iii) geometry. Any of the target input may be user defined. The geometry may comprise geometrical object pre-print correction. The geometric information may derive from the 3D object (or a correctively deviated (e.g., altered) model thereof). The geometry may comprise geometric information of a previously printed portion of the 3D object (e.g., comprising a local thickness below a given layer, local build angle, local build curvature, proximity to an edge on a given layer, or proximity to layer boundaries). The geometry may be an input to the controller (e.g., via an open loop control scheme). Some of the target values may be used to form 3D forming instructions for generating the 3D object. The forming instructions may be dynamically adjusted in real time. The controller may monitor (e.g., continuously) one or more signals from one or more sensors for providing feedback. For example, the controller may monitor the energy beam power, temperature of a position in the material bed, and/or metrology (e.g., height) of a position on the target surface (e.g., exposed surface of a material bed). The position on the target surface may be of the forming 3D object. The monitor may be continuous or discontinuous. The monitor may be in real-time during the 3D printing. The monitor may be using the one or more sensors. The forming instructions may be dynamically adjusted in real time (e.g., using the signals from the one or more sensors). A variation between the target parameter and the sensed parameter may be used to estimate an error in the value of that parameter. The variation (e.g., error) may be used by the subordinate-controller to adjust the forming instructions. The controller may control (e.g., continuously) one or more parameters (e.g., in real time). The controller may use historical data (e.g., for the parameters). The historical data may be of previously printed 3D objects, or of previously printed layers of the 3D object. Configured may comprise built, constructed, designed, patterned, or arranged. The hardware of the controller may comprise the control-model. The control-model may be linear or non-linear. For example, the control-model may be non-linear. The control-model may comprise linear or non-linear modes. The control-model may comprise free parameters which may be estimated using a characterization process. The characterization process may be before, during and/or after the 3D printing. The control-model may be wired to the controller. The control model can be configured into the controller (e.g., before and/or during the 3D printing). Examples of a controller, subordinate controller, and/or control-model can be found in patent application serial number PCT/US16/59781; patent application serial number PCT/US17/18191; U.S. patent application Ser. No. 15/435,065; patent application serial number EP17156707; and/or patent application serial number PCT/US17/54043; each of which is incorporated herein by reference in its entirety.

In some embodiments, the energy source(s) are modulated. The modulation may be recorded (e.g., and time stamped) in the database. The energy (e.g., beam) emitted by the energy source can be modulated. The modulator can comprise an amplitude modulator, a phase-modulator, or polarization modulator. The modulation may alter the intensity of the energy beam. The modulation may alter the current supplied to the energy source (e.g., direct modulation). The modulation may affect (e.g., alter) the energy beam (e.g., external modulation such as external light modulator). The modulator can comprise an aucusto-optic modulator or an electro-optic modulator. The modulator can comprise an absorptive modulator or a refractive modulator. The modulation may alter the absorption coefficient of the material that is used to modulate the energy beam. The modulator may alter the refractive index of the material that is used to modulate the energy beam.

The scanner can be included in an optical system that is configured to direct energy from the energy source to a predetermined position on the (target) surface (e.g., exposed surface of the material bed). The configuration of at least one component of the optical system may be recorded (e.g., and time stamped) in the database. At least one controller can be programmed to control a trajectory of the energy source(s) with the aid of the optical system. The programing and/or operation of the at least one controller may be recorded (e.g., and time stamped) in the database. The controller can regulate a supply of energy from the energy source to the pre-transformed material (e.g., at the target surface) to form a transformed material. The optical system may be enclosed in an optical enclosure. Examples of an optical enclosure and/or system can be found in Patent Application serial number PCT/US17/64474, titled "OPTICS, DETECTORS, AND THREE-DIMENSIONAL PRINTING" that was filed Dec. 4, 2017, in Patent Application serial number PCT/US18/12250, titled "OPTICS IN THREE-DIMENSIONAL PRINTING" that was filed Jan. 3, 2018, or in or international patent application number PCT/US18/12250, filed Jan. 3, 2018, titled "OPTICS IN THREE-DIMENSIONAL PRINTING," each of which is incorporated herein by reference in its entirety.

The energy beam (e.g., transforming energy beam) may comprise a Gaussian energy beam. The energy beam may have any cross-sectional shape comprising an ellipse (e.g., circle), or a polygon. The energy beam may have a cross section (e.g., at an intersection of the energy beam on a target surface) with a FLS of at least about 20 µm, 50 µm, 75 µm, 100 µm, 150 µm, 200 µm or 250 µm, 0.3 millimeters (mm), 0.4 mm, 0.5 mm, 0.8 mm, 1 mm, 1.5 mm, 2 mm, 2.5 mm, 3 mm, 3.5 mm, 4 mm, 4.5 mm, or 5 mm. The cross section of the energy beam may be any value of the afore-mentioned values. The FLS may be measured at full width half maximum intensity of the energy beam. The FLS may be measured at $1/e^2$ intensity of the energy beam. In some embodiments, the energy beam is a focused energy beam at the target surface. In some embodiments, the energy beam is a defocused energy beam at the target surface. The energy profile of the energy beam may be (e.g., substantially) uniform (e.g., in the energy beam's cross-sectional area that impinges on the target surface). The energy profile of the energy beam may be (e.g., substantially) uniform during an exposure time (e.g., also referred to herein as a dwell time). The exposure time (e.g., at the target surface) of the energy beam may be at least about 0.1 milliseconds (ms), 0.5 ms, 1 ms, 10 ms, 50 ms, 100 ms, 200 ms, 500 ms, 1000 ms, 2500 ms, or 5000 ms. The exposure time may be between any of the above-mentioned exposure times). In some embodiments, the energy beam is configured to be continuous or non-continuous (e.g., pulsing). A characteristic of the energy beam may be recorded (e.g., and time stamped) in the database. The characteristic of the energy beam may comprise power density, position of its footprint on the target surface, power profile across the footprint, scanning speed across the target surface, or scanning trajectory across the target surface.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "between" as used herein is meant to be inclusive unless otherwise specified. For example, between X and Y is understood herein to mean from X to Y.

In some embodiments, at least one energy source can provide an energy beam having an energy density of at least about 50 joules/cm$^2$ (J/cm$^2$), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The at least one energy source can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The at least one energy source can provide an energy beam having an energy density of a value between the afore-mentioned values. A characteristic of the energy source may be recorded (e.g., and time stamped) in the database. The characteristic of the energy source may comprise power.

In some embodiments, the power density (e.g., power per unit area) of the energy beam is at least about 100 Watts per millimeter square (W/mm$^2$), 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm2, 7000 W/mm$^2$, 8000 W/mm$^2$, 9000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the energy beam may be any value between the afore-mentioned values. The energy beam may emit energy stream towards the target surface in a step and repeat sequence. The target surface may comprise an exposed surface of an energy beam, a previously formed 3D object portion, or a platform.

At times, an energy source provides power at a peak wavelength. For example, an energy source can provide electromagnetic energy at a peak wavelength of at least about 100 nanometer (nm), 400 nm, 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. An energy beam can provide energy at a peak wavelength between any value of the afore-mentioned peak wavelength values. The energy source (e.g., laser) may have a power of at least about 0.5 Watt (W), 1 W, 5 W, 10 W, 50 W, 100 W, 250 W, 500 W, 1000 W, 2000 W, 3000 W, or 4000 W. The energy source may have a power between any value of the afore-mentioned laser power values (e.g., from about 0.5 W to about 4000 W, from about 0.5 W to about 1000 W, or from about 1000 W to about 4000 W).

At times, an energy beam is translated relative to a surface (e.g., target surface) at a given rate (e.g., a scanning speed), e.g., in a trajectory. The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be any value between the afore-mentioned values. The energy beam may be continuous or non-continuous (e.g., pulsing). The energy profile of the energy beam may be (e.g., substantially) uniform during the exposure time (e.g., also referred to herein as dwell time). The exposure time (e.g., at the target surface) of the energy beam may be at least about 0.1 milliseconds (ms), 0.5 ms, 1 ms, 10 ms, 50 ms, 100 ms, 500 ms, 1000 ms, 2500 ms, or 5000 ms. The exposure time may be any value between the above-mentioned exposure times. The exposure time (e.g., irradiation time) may be the dwell time. The dwell time may be at least 1 minute, or 1 hour.

In some embodiments, the at least one 3D object is formed (e.g., printed) using a plurality of energy beams and/or energy sources. At times, at least two transforming agents (e.g., energy sources (e.g., producing at least two energy beams)) may have at least one characteristic value in common with each other. At times, the at least two energy sources may have at least one characteristic value that is different from each other. Characteristics of the transforming agent may comprise transformation density (or transformation strength), trajectory, FLS of footprint on the target surface, hatch spacing, scan speed, or scanning scheme. The transformation density may refer to the volume or weight of material transformed in a given time by the transforming agent. The FLS of footprint on the target surface may refer to the FLS of the energy beam on the target surface, of a binder stream dispensed on the target surface. Characteristics of the energy beam may comprise wavelength, power density, amplitude, trajectory, FLS of footprint on the target surface, intensity, energy, energy density, fluence, Andrew Number, hatch spacing, scan speed, scanning scheme, or charge. The scanning scheme may comprise continuous, pulsed or tiled scanning scheme. The charge can be electrical and/or magnetic charge. Andrew number is proportional to the power of the irradiating energy over the multiplication product of its velocity (e.g., scan speed) by a hatch spacing. The Andrew number is at times referred to as the area filling power of the irradiating energy. In some embodiments, at least two of the energy source(s) and/or beam(s) can be translated at different rates (e.g., velocities).

Figure 16:
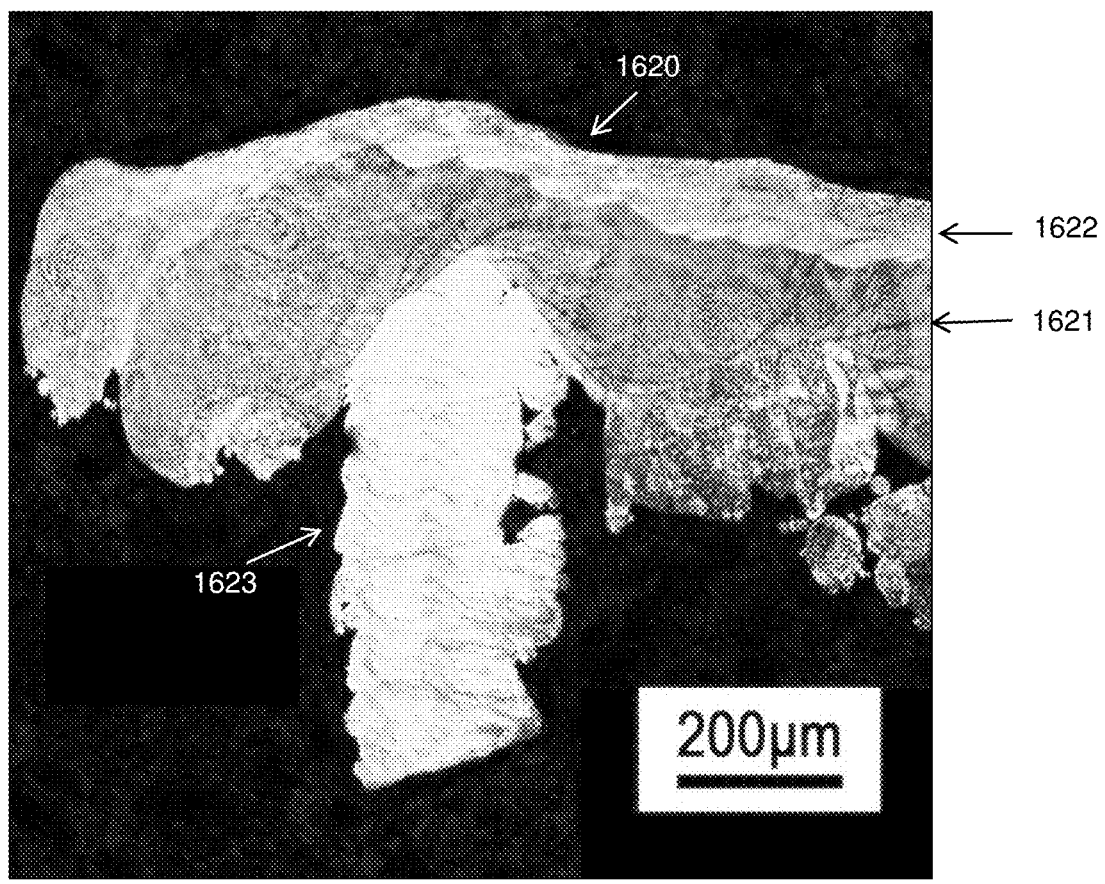
FIG. 16 shows a three-dimensional object with auxiliary support.

In some embodiments, a 3D object includes one or more auxiliary features. The auxiliary feature(s) can be supported by the material (e.g., powder) bed. The term "auxiliary feature" or "support structure" as used herein, generally refers to a feature that is part of a printed 3D object, but is not part of the requested, intended, designed, ordered, modeled, or final 3D object. Auxiliary feature(s) (e.g., auxiliary support(s)) may provide structural support during and/or subsequent to the formation of the 3D object. The 3D object may have any number of supports. The supports may have any shape and size. In some examples, the supports comprise a rod, plate, wing, tube, shaft, pillar, or any combination thereof. In some cases, the auxiliary supports support certain portions of the 3D object and do not support other portions of the 3D object. In some cases, the supports are (e.g., directly) coupled to a bottom surface the 3D object (e.g., relative to the platform). In some embodiments, the supports are anchored to the platform during formation of the 3D object. In some examples, the supports are used to support portions of the 3D object having a certain (e.g., complex or simple) geometry. The 3D object can have auxiliary feature(s) that can be supported by the material bed (e.g., powder bed) and not contact and/or anchor to the platform, container accommodating the material bed, or the bottom of the enclosure. The 3D part (3D object) in a complete or partially formed state can be completely supported by the material bed (e.g., without contacting the platform, container accommodating the powder bed, or enclosure). The 3D object in a complete or partially formed state can be completely supported by the powder bed (e.g., without touching anything except the powder bed). The 3D object in a complete or partially formed state can be suspended anchorlessly in the powder bed, without resting on and/or being anchored to any additional support structures. In some cases, the 3D object in a complete or partially formed (e.g., nascent) state can freely float (e.g., anchorlessly) in the material bed. Auxiliary feature(s) may enable the removal of energy from the 3D object that is being formed. In some instances, the auxiliary support is a scaffold that encloses the 3D object or part thereof. The scaffold may comprise lightly sintered or lightly fused powder material. In some examples, the 3D object may not be anchored (e.g., connected) to the platform and/or walls that define the material bed (e.g., during formation). At times, the 3D object may not touch (e.g., contact) to the platform and/or walls of the container that define and/or encloses the material bed (e.g., during formation). The 3D object be suspended (e.g., float) in the material bed. The scaffold may comprise a continuously sintered (e.g., lightly sintered) structure that is at most 1 millimeter (mm), 2 mm, 5 mm or 10 mm. The scaffold may comprise a continuously sintered structure having dimensions between any of the aforementioned dimensions (e.g., from about 1 mm to about 10 mm, from about 5 mm to about 10 mm, or from about 1 mm to about 5 mm). In some examples, the 3D object may be printed without a supporting scaffold. The supporting scaffold may engulf the 3D object. The supporting scaffold may float in the material bed. The printed 3D object may be printed without the use of auxiliary features, may be printed using a reduced number of auxiliary features, or printed using spaced apart auxiliary features. Examples of an auxiliary support structure can be found in Patent Application Serial No. PCT/US15/36802 filed on Jun. 19, 2015, titled "APPARATUSES, SYSTEMS AND METHODS FOR THREE-DIMENSIONAL PRINTING," which is entirely incorporated herein by reference in its entirety. The printed 3D object may comprise a single auxiliary support mark reminiscent of a single auxiliary support feature. The single auxiliary feature (e.g., auxiliary support or auxiliary structure) may be a platform (e.g., a building platform such as a base or substrate), or a mold. The auxiliary support may be adhered to the platform or mold. In some embodiments, the 3D object comprises a layered structure indicative of 3D forming procedure that is devoid of one or more auxiliary support features or one or more auxiliary support feature marks that are indicative of a presence or removal of the one or more auxiliary support features. Examples of auxiliary features comprise heat fins, wires, anchors, handles, supports, pillars, columns, frame, footing, scaffold, flange, projection, protrusion, mold, or other stabilization features. FIG. 16 shows an example of a vertical cross section of 3D object comprising two substantially horizontal layers (e.g., 1621 and 1622), and a vertical auxiliary support 1623 that comprises an area of discontinuity and introduces a geometrical deformation (e.g. 1620) in layers 1621 and 1622 which is caused by the presence of auxiliary support, and cannot be otherwise explained (and thus indicates its presence).

In some embodiments, 3D printing methodologies are employed for forming (e.g., printing) at least one 3D object (or portion thereof such as a ledge) that is substantially two-dimensional, such as a wire or a planar object. The 3D object may comprise a plane-like structure (referred to herein as "planar object," "three-dimensional plane," or "3D plane"). The 3D plane may have a relatively small thickness as compared to a relatively large surface area. The 3D plane may have a relatively small height relative to its width and length. For example, the 3D plane may have a small height relative to a large horizontal plane. The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf. The term "3D plane" is understood herein to be a generic (e.g., curved) 3D surface. For example, the 3D plane may be a curved 3D surface. The one or more layers within the 3D object may be substantially planar (e.g., flat). The planarity of a surface or a boundary the layer may be (e.g., substantially) uniform. Substantially uniform may be relative to the intended purpose of the 3D object. The height of the layer at a position may be compared to an average layering plane. The layering plane can refer to a plane at which a layer of the 3D object is (e.g., substantially) oriented during printing. A boundary between two adjacent (printed) layers of hardened material of the 3D object may define a layering plane. The boundary may be apparent by, for example, one or more melt pool terminuses (e.g., bottom or top). A 3D object may include a plurality of layering planes (e.g., with each layering plane corresponding to each layer). In some embodiments, the layering planes are (e.g., substantially) parallel to one another. An average layering plane may be defined by a linear regression analysis (e.g., least squares planar fit of the top-most part of the surface of the layer of hardened material). An average layering plane may be a plane calculated by averaging the material height at each selected point on the top surface of the layer of hardened material. The selected points may be within a specified region of the 3D object. The deviation from any point at the surface of the planar layer of hardened material may be at most 20% 15%, 10%, 5%, 3%, 1%, or 0.5% of the height (e.g., thickness) of the layer of hardened material.

At times, one or more controllers are configured to control (e.g., direct) one or more apparatuses and/or operations. Control may comprise regulate, modulate, adjust, maintain, alter, change, govern, manage, restrain, restrict, direct, guide, oversee, manage, preserve, sustain, restrain, temper, or vary. The control configuration (e.g., "configured to") may comprise programming. The controller may comprise an electronic circuitry, and electrical inlet, or an electrical outlet. The configuration may comprise facilitating (e.g. and directing) an action or a force. The force may be magnetic, electric, pneumatic, hydraulic, and/or mechanic. Facilitating may comprise allowing use of ambient (e.g., external) forces (e.g., gravity). Facilitating may comprise alerting to and/or allowing: usage of a manual force and/or action. Alerting may comprise signaling (e.g., directing a signal) that comprises a visual, auditory, olfactory, or a tactile signal.

In some embodiments, at least one sensor is operatively coupled to the manufacturing machinery (e.g., printer). In some embodiments, at least one sensor is operatively coupled to a control system (e.g., computer control system). The manufacturing machinery may be operatively coupled to the control system. The control system may comprise one or more controllers. The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may comprise temperature sensor, weight sensor, material (e.g., powder) level sensor, metrology sensor, gas sensor, or humidity sensor. The metrology sensor may comprise a measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, and/or electromagnetic signal. The electromagnetic signal may comprise a visible, infrared, ultraviolet, ultrasound, radio wave, or microwave signal. The metrology sensor may measure a vertical, horizontal, and/or angular position of at least a portion of the target surface. The metrology sensor may measure a gap. The metrology sensor may measure at least a portion of the layer of material. The layer of material may be a pre-transformed material (e.g., powder), transformed material, or hardened material. The metrology sensor may measure at least a portion of the 3D object. The metrology sensor may measure the FLS (e.g., depth) of at least one melt pool. The metrology sensor may measure a height of a 3D object that protrudes from the exposed surface of the material bed. The metrology sensor may measure a height of a 3D object that deviates from the average and/or mean of the exposed surface of the material bed. The gas sensor may sense any of the gas. The distance sensor can be a type of metrology sensor. The distance sensor may comprise an optical sensor, or capacitance sensor. The temperature sensor can comprise Bolometer, Bimetallic strip, Calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise or be operatively coupled to an optical fiber. The temperature sensor may comprise image processing. The temperature sensor may be coupled to a processor that would perform image processing by using at least one sensor generated signal. The temperature sensor may comprise a camera (e.g., IR camera, CCD camera).

Figure 18:
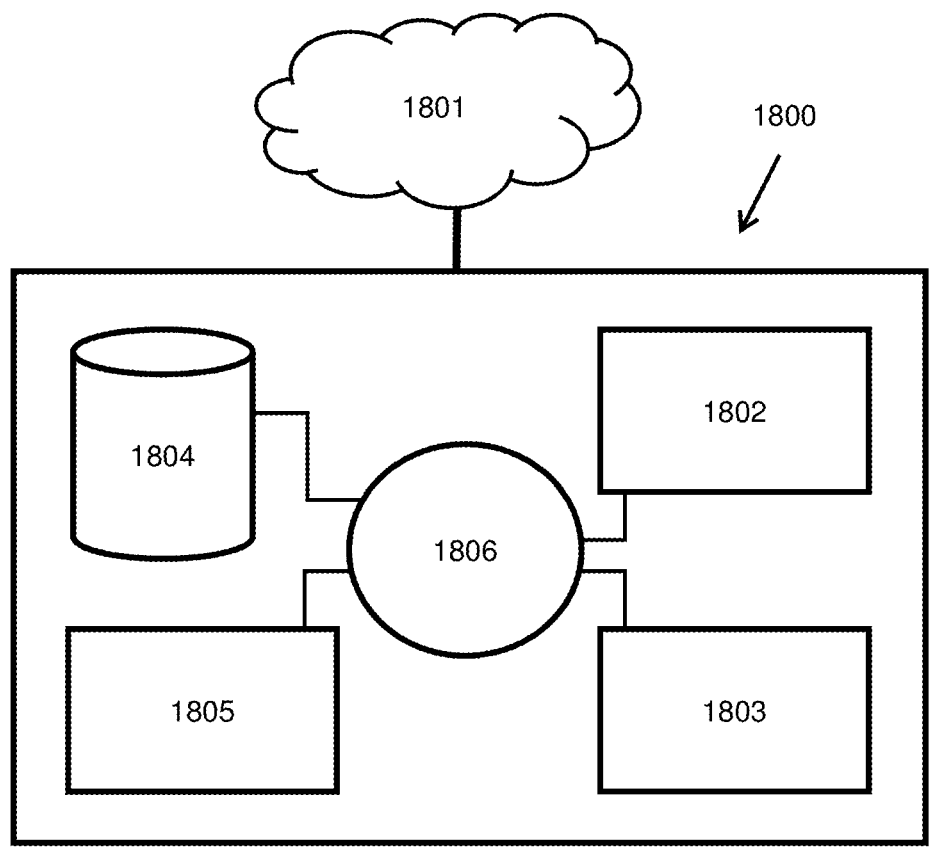
FIG. 18 schematically illustrates a computer system.

The controller may comprise processing circuitry (e.g., a processing unit). The processing unit may be central. The processing unit may comprise a central processing unit (herein "CPU"). The controllers or control mechanisms (e.g., comprising a computer system) may be configured to, e.g., programmed to implement methods of the disclosure. The controller may control at least one component of the systems and/or apparatuses disclosed herein. FIG. 18 is a schematic example of a computer system 1800 that is programmed or otherwise configured to facilitate the formation of a 3D object according to the methods provided herein. The computer system 1800 can control (e.g., direct and/or regulate) various features of printing methods, apparatuses and systems of the present disclosure, such as, for example, generation of forming instructions for formation of a 3D object. Generated forming instructions may comprise application of a pre-transformed material, application of an amount of energy (e.g., radiation) emitted to a selected location, a detection system activation and deactivation, sensor data and/or signal acquisition, image processing, process parameters (e.g., dispenser layer height, planarization, chamber pressure), or any combination thereof. The computer system 1800 can implement at least one data assurance measure. The data assurance measure may comprise a security (e.g., level) and/or error detection for at least a part of a file, e.g., that is related to forming instructions for a requested 3D object. The computer system 1800 can be part of, or be in communication with, a printing system or apparatus, such as a 3D printing system or apparatus of the present disclosure. The processor may be coupled to one or more mechanisms disclosed herein, and/or any parts thereof. For example, the computer may be coupled to one or more energy sources, optical elements, processing chamber, build module, platform, sensors, valves, switches, motors, pumps, or any combination thereof.

The computer system 1800 can include a processing unit 1806 (also "processor," "computer" and "computer processor" used herein). The computer system may include memory or memory location 1802 (e.g., random-access memory, read-only memory, flash memory), electronic storage unit 1804 (e.g., hard disk), communication interface 1803 (e.g., network adapter) for communicating with one or more other systems, and peripheral devices 1805, such as cache, other memory, data storage and/or electronic display adapters. The memory 1802, storage unit 1804, interface 1803, and peripheral devices 1805 are in communication with the processing unit 1806 through a communication bus (solid lines), such as a motherboard. The storage unit can be a data storage unit (or data repository) for storing data. The computer system can be operatively coupled to a computer network ("network") 1801 with the aid of the communication interface. The network can be the Internet, an Internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 1802. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a system on module (SOM) a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1800 can be included in the circuit.

The storage unit 1804 can store files, such as drivers, libraries, and saved programs. The storage unit can store user data, e.g., user preferences and user programs. The storage unit may store one or more geometric models. The storage unit may store encryption and/or decryption keys. The computer system in some cases can include one or more additional data storage units that are external to the computer system, such as located on a remote server that is in communication with the computer system through an intranet or the Internet.

The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory 1802 or electronic storage unit 1804. The machine executable or machine-readable code can be provided in the form of software. During use, the processor 1806 can execute the code. In some cases, the code can be retrieved from the storage unit and stored on the memory for ready access by the processor. In some situations, the electronic storage unit can be precluded, and machine-executable instructions are stored on memory.

Figure 19:
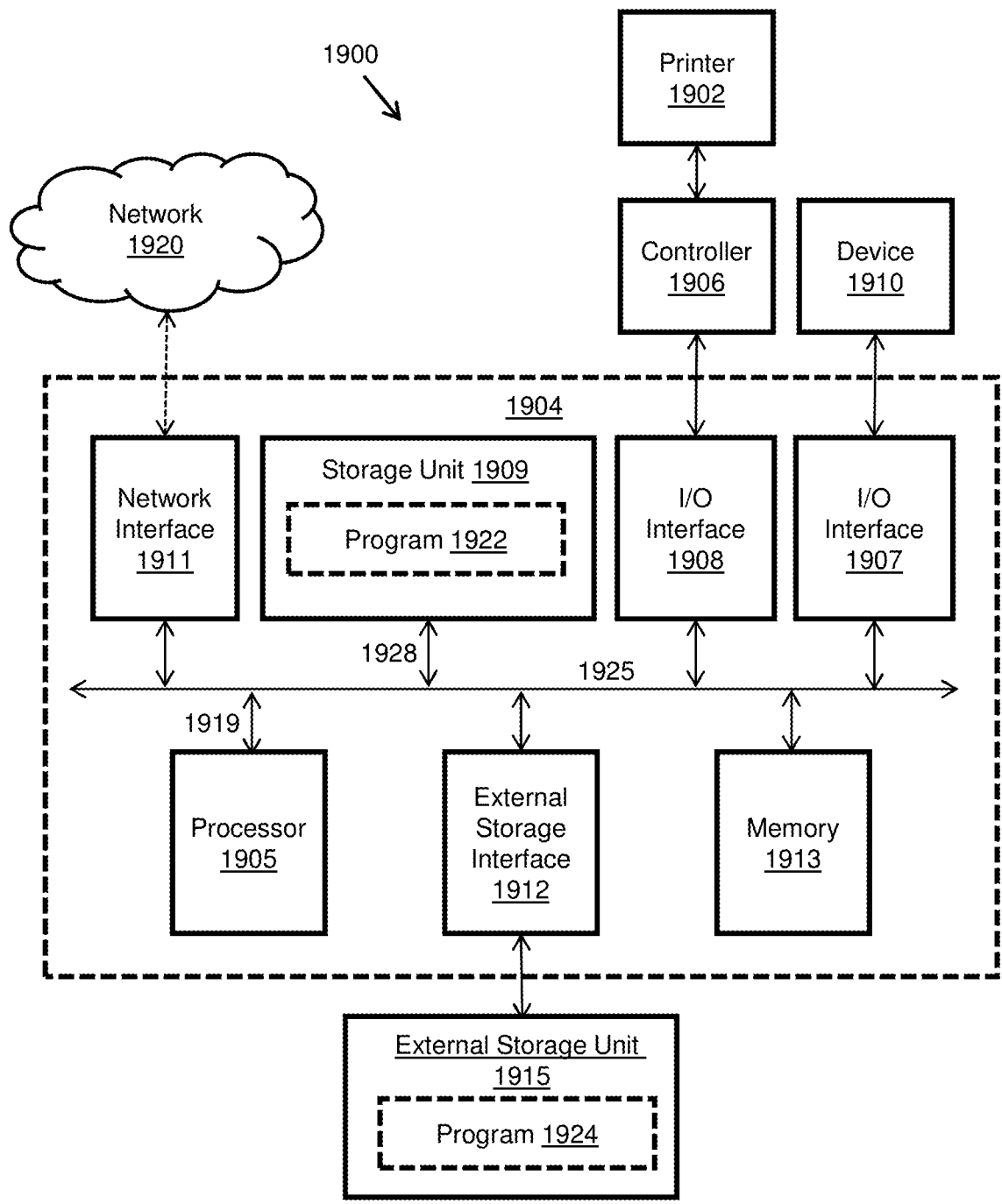
FIG. 19 schematically illustrates a computer system.

FIG. 19 shows an example computer system 1900, upon which the various arrangements described, can be practiced. The computer system (e.g., FIG. 19, 1900) can control and/or implement (e.g., direct and/or regulate) various features of printing methods, apparatus and/or system operations of the present disclosure. For example, the computer system can be used to instantiate a forming instructions engine. A forming instructions engine may generate instructions to control energy source parameters, processing chamber parameters (e.g., chamber pressure, gas flow and/or temperature), energy beam parameters (e.g., scanning rate, path and/or power), platform parameters (e.g., location and/or speed), layer forming apparatus parameters (e.g., speed, location and/or vacuum), or any combination thereof. A forming instructions engine may generate instructions for forming a 3D object in a layerwise (e.g., slice-by-slice) manner. The generated instructions may according to default and/or designated (e.g., override) forming (e.g., printing) processes. The forming instructions may be provided to at least one controller (e.g., FIG. 19, 1906). The at least one controller may implement at least one data assurance measure. The data assurance measure may comprise a security (e.g., level) and/or error detection for at least a part of a file, e.g., that is related to forming instructions for a requested 3D object. The computer system can be part of, or be in communication with, one or more 3D printers (e.g., FIG. 19, 1902) or any of their (e.g., sub-) components. The computer system can include one or more computers (e.g., FIG. 19, 1904). The computer(s) may be operationally coupled to one or more mechanisms of the printer(s). For example, the computer(s) may be operationally coupled to one or more sensors, valves, switches, actuators (e.g., motors), pumps, optical components, and/or energy sources of the printer(s). In some cases, the computer(s) controls aspects of the printer(s) via one or more controllers (e.g., FIG. 19, 1906). The controller(s) may be configured to direct one or more operations of the one or more printer(s). For example, the controller(s) may be configured to direct one or more actuators of printer(s). In some cases, the controller(s) is part of the computer(s) (e.g., within the same unit(s)). In some cases, the controller(s) is separate (e.g., a separate unit) from the computer(s). In some instances, the computer(s) communicates with the controller(s) via one or more input/output (I/O) interfaces (e.g., FIG. 19, 1908). The input/output (I/O) interface(s) may comprise one or more wired or wireless connections to communicate with the printer(s). In some embodiments, the I/O interface comprises Bluetooth technology to communicate with the controller(s).

The computer(s) (e.g., FIG. 19, 1904) may have any number of components. For example, the computer(s) may comprise one or more storage units (e.g., FIG. 19, 1909), one or more processors (e.g., FIG. 19, 1905), one or more memory units (e.g., FIG. 19, 1913), and/or one or more external storage interfaces (e.g., FIG. 19, 1912). In some embodiments, the storage unit(s) includes a hard disk drive (HDD), a magnetic tape drive and/or a floppy disk drive. In some embodiments, the memory unit(s) includes a random-access memory (RAM) and/or read only memory (ROM), and/or flash memory. In some embodiments, the external storage interface(s) comprises a disk drive (e.g., optical or floppy drive) and/or a universal serial bus (USB) port. The external storage interface(s) may be configured to provide communication with one or more external storage units (e.g., FIG. 19, 1915). The external storage unit(s) may comprise a portable memory medium. The external storage unit(s) may be a non-volatile source of data. In some cases, the external storage unit(s) is an optical disk (e.g., CD-ROM, DVD, Blu-ray Disc™), a USB-RAM, a hard drive, a magnetic tape drive, and/or a floppy disk. In some cases, the external storage unit(s) may comprise a disk drive (e.g., optical or floppy drive). Various components of the computer(s) may be operationally coupled via a communication bus (e.g., FIG. 19, 1925). For example, one or more processor(s) (e.g., FIG. 19, 1905) may be operationally coupled to the communication bus by one or more connections (e.g., FIG. 19, 1919). The storage unit(s) (e.g., FIG. 19, 1909) may be operationally coupled to the communication bus one or more connections (e.g., FIG. 19, 1928). The communication bus (e.g., FIG. 19, 1925) may comprise a motherboard.

In some embodiments, methods described herein are implemented as one or more software programs (e.g., FIG. 19, 1922 and/or 1924). For example, a pre-formation environment may be implemented as a software program. The software program(s) may be executable within the one or more computers (e.g., FIG. 19, 1904). The software may be implemented on a non-transitory computer readable media. The software program(s) may comprise machine-executable code. The machine-executable code may comprise program instructions. The program instructions may be carried out by the computer(s) (e.g., FIG. 19, 1904). The machine-executable code may be stored in the storage device(s) (e.g., FIG. 19, 1909). The machine-executable code may be stored in the external storage device(s) (e.g., FIG. 19, 1915). The machine-executable code may be stored in the memory unit(s) (e.g., FIG. 19, 1913). The storage device(s) (e.g., FIG. 19, 1909) and/or external storage device(s) (e.g., FIG. 19, 1915) may comprise a non-transitory computer-readable medium. The processor(s) may be configured to read the software program(s) (e.g., FIG. 19, 1922 and/or 1924). In some cases, the machine-executable code can be retrieved from the storage device(s) and/or external storage device(s), and stored on the memory unit(s) (e.g., FIG. 19, 1906) for access by the processor (e.g., FIG. 19, 1905). In some cases, the access is in real-time (e.g., during printing). In some situations, the storage device(s) and/or external storage device(s) can be precluded, and the machine-executable code is stored on the memory unit(s). The machine-executable code may be pre-compiled and configured for use with a machine have a processer adapted to execute the machine-executable code, or can be compiled during runtime (e.g., in real-time). The machine-executable code can be supplied in a programming language that can be selected to enable the machine-executable code to execute in a pre-compiled or as-compiled fashion.

In some embodiments, the computer(s) is operationally coupled with, or comprises, one or more devices (e.g., FIG. 19, 1910). In some embodiments, the device(s) (e.g., FIG. 19, 1910) is configured to provide one or more (e.g., electronic) inputs to the computer(s). In some embodiments, the device(s) (e.g., FIG. 19, 1910) is configured to receive one or more (e.g., electronic) outputs from the computer(s). The computer(s) may communicate with the device(s) via one or more input/output (I/O) interfaces (e.g., FIG. 19, 1907). The input/output (I/O) interface(s) may comprise one or more wired or wireless connections. The device(s) can include one or more user interfaces (UI). The UI may include one or more keyboards, one or more pointer devices (e.g., mouse, trackpad, touchpad, or joystick), one or more displays (e.g., computer monitor or touch screen), one or more sensors, and/or one or more switches (e.g., electronic switch). In some cases, the UI may be a web-based user interface. At times, the UI provides a model design or graphical representation of a 3D object to be printed. The sensor(s) may comprise a light sensor, a thermal sensor, an audio sensor (e.g., microphone), and/or a tactile sensor. In some cases, the sensor(s) are part of the printer(s) (e.g., FIG. 19, 1902). For example, the sensor(s) may be located within a processing chamber of a printer (e.g., to monitor an atmosphere therein). The sensor(s) may be configured to monitor one or more signals (e.g., thermal and/or light signal) that is generated during a printing operation. In some cases, the sensor(s) are part of a component or apparatus that is separate from the printer(s). In some cases, the device(s) is a pre-printing processing apparatus. For example, in some cases, the device(s) can be one or more scanners (e.g., 2D or 3D scanner) for scanning (e.g., dimensions of) a 3D object. In some cases, the device(s) is a post-printing processing apparatus (e.g., a docking station, unpacking station, and/or a hot isostatic pressing apparatus). In some embodiments, the I/O interface comprises Bluetooth technology to communicate with the device(s).

In some embodiments, the computer(s) (e.g., FIG. 19, 1904), controller(s) (e.g., FIG. 19, 1906), printer(s) (e.g., FIG. 19, 1902) and/or device(s) (e.g., FIG. 19, 1910) comprises one or more communication ports. For example, one or more I/O interfaces (e.g., FIG. 19, 1907 or 1908) can comprise communication ports. The communication port(s) may be a serial port or a parallel port. The communication port(s) may be a Universal Serial Bus port (i.e., USB). The USB port can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The communication port(s) may comprise a plug and/or a socket (e.g., electrical, AC power, DC power). The communication port(s) may comprise an adapter (e.g., AC and/or DC power adapter). The communication port(s) may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

In some embodiments, the computer(s) is configured to communicate with one or more networks (e.g., FIG. 19, 1920). The network(s) may comprise a wide-area network (WAN) or a local area network (LAN). In some cases, the computer(s) includes one or more network interfaces (e.g., FIG. 19, 1911) that is configured to facilitate communication with the network(s). The network interface(s) may include wired and/or wireless connections. In some embodiments, the network interface(s) comprises a modulator demodulator (modem). The modem may be a wireless modem. The modem may be a broadband modem. The modem may be a "dial up" modem. The modem may be a high-speed modem. The WAN can comprise the Internet, a cellular telecommunications network, and/or a private WAN. The LAN can comprise an intranet. In some embodiments, the LAN is operationally coupled with the WAN via a connection, which may include a firewall security device. The WAN may be operationally coupled the LAN by a high capacity connection. In some cases, the computer(s) can communicate with one or more remote computers via the LAN and/or the WAN. In some instances, the computer(s) may communicate with a remote computer(s) of a user (e.g., operator). The user may access the computer(s) via the LAN and/or the WAN. In some cases, the computer(s) (e.g., FIG. 19, 1904) store and/or access data to and/or from data storage unit(s) that are located on one or more remote computers in communication via the LAN and/or the WAN. The remote computer(s) may be a client computer. The remote computer(s) may be a server computer (e.g., web server or server farm). The remote computer(s) can include desktop computers, personal computers (e.g., portable PC), slate or tablet PC's (e.g., Apple® iPad, Samsung® Galaxy Tab), telephones, smart phones (e.g., Apple® iPhone, Android-enabled device, Blackberry®), or personal digital assistants.

At times, the processor (e.g., FIG. 19, 1905) includes one or more cores. The computer system may comprise a single core processor, a multiple core processor, or a plurality of processors for parallel processing. The processor may comprise one or more central processing units (CPU) and/or graphic processing units (GPU). The multiple cores may be disposed in a physical unit (e.g., Central Processing Unit, or Graphic Processing Unit). The processor may be a single physical unit. The physical unit may be a die. The physical unit may comprise cache coherency circuitry. The processor may include multiple physical units. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the aforementioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 mm², 60 mm², 70 mm², 80 mm², 90 mm², 100 mm², 200 mm², 300 mm², 400 mm², 500 mm², 600 mm², 700 mm², or 800 mm². The integrated circuit chip may have an area of at most about 50 mm², 60 mm², 70 mm², 80 mm², 90 mm², 100 mm², 200 mm², 300 mm², 400 mm², 500 mm², 600 mm², 700 mm², or 800 mm². The integrated circuit chip may have an area of any value between the afore-mentioned values (e.g., from about 50 mm² to about 800 mm², from about 50 mm² to about 500 mm², or from about 500 mm² to about 800 mm²). The multiple cores may be disposed in close proximity. The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processors may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating-point operations per second (FLOPS). The number of FLOPS may be at least about 1 Tera Flops (T-FLOPS), 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS, or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, or from about 0.1 T-FLOP to about 10 EXA-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be an HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

At times, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processor(s) may be able to process algorithms comprising a matrix or a vector. The core may comprise a complex instruction set computing core (CISC), or reduced instruction set computing (RISC).

At times, the computer system includes an electronic chip that is reprogrammable (e.g., field programmable gate array (FPGA), e.g., application programming unit (APU)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

At times, the computer system includes configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, APU, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration.

At times, the computing system includes an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (µs), 1 µs, 10 µs, 100 µs, or 1 millisecond (ms). The physical unit may produce the algorithm output in any time between the afore-mentioned times (e.g., from about 0.1 µs, to about 1 ms, from about 0.1 µs, to about 100 µs, or from about 0.1 µs to about 10 µs).

In some instances, the controller(s) (e.g., FIG. 14, 1406) uses real time measurements and/or calculations to regulate one or more components of the printer(s). In some cases, the controller(s) regulate characteristics of the energy beam(s). The sensor(s) (e.g., on the printer) may provide a signal (e.g., input for the controller and/or processor) at a rate of at least about 0.1 KHz, 1 KHz, 10 KHz, 100 KHz, 1000 KHz, or 10000 KHz). The sensor(s) may be a temperature and/or positional sensor(s). The sensor(s) may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processor(s) may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processor(s) may be at most about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processor(s) may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real-time measurements may be conducted during at least a portion of the 3D printing process. The real-time measurements may be in-situ measurements in the 3D printing system and/or apparatus. the real-time measurements may be during at least a portion of the formation of the 3D object. In some instances, the processor(s) may use the signal obtained from the at least one sensor to provide a processor(s) output, which output is provided by the processing system at a speed of at most about 100 minute (min), 50 min, 25 min, 15 min, 10 min, 5 min, 1 min, 0.5 min (i.e., 30 seconds (sec)), 15 sec, 10 sec, 5 sec, 1 sec, 0.5 sec, 0.25 sec, 0.2 sec, 0.1 sec, 80 milliseconds (ms), 50 ms, 10 ms, 5 ms, or 1 ms. In some instances, the processor(s) may use the signal obtained from the at least one sensor to provide a processor(s) output, which output is provided at a speed of any value between the aforementioned values (e.g., from about 100 min to about 1 ms, from about 100 min to about 10 min, from about 10 min to about 1 min, from about 5 min to about 0.5 min, from about 30 sec to about 0.1 sec, or from about 0.1 sec to about 1 ms). The processor(s) output may comprise an evaluation of the attribute (e.g., temperature) at a location, position at a location (e.g., vertical and/or horizontal), or a map of locations. The location may be on the target surface. The map may comprise a topological and/or attribute (e.g., temperature) related map.

At times, the processor(s) (e.g., FIG. 14, 1405) uses the signal obtained from one or more sensors (e.g., on the printer) in an algorithm that is used in controlling the energy beam. The algorithm may comprise the path of the energy beam. In some instances, the algorithm may be used to alter the path of the energy beam on the target surface. The path may deviate from a cross section of a model corresponding to the requested 3D object. The processor may use the output in an algorithm that is used in determining the manner in which a model of the requested 3D object may be sliced. The processor may use the signal obtained from the at least one sensor in an algorithm that is used to configure one or more parameters and/or apparatuses relating to the 3D printing procedure. The parameters may comprise a characteristic of the energy beam. The parameters may comprise movement of the platform and/or material bed. The parameters may include characteristics of the gas flow system. The parameters may include characteristics of the layer forming apparatus. The parameters may comprise relative movement of the energy beam and the material bed. In some instances, the energy beam, the platform (e.g., material bed disposed on the platform), or both may translate. Alternatively, or additionally, the controller(s) (e.g., FIG. 14, 1410) may use historical data for the control. Alternatively, or additionally, the processor may use historical data in its one or more algorithms. The parameters may comprise the height of the layer of pre-transformed material disposed in the enclosure and/or the gap by which the cooling element (e.g., heat sink) is separated from the target surface. The target surface may be the exposed layer of the material bed.

At times, the memory (e.g., FIG. 14, 1406) comprises a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

At times, all or portions of the software program(s) (e.g., FIG. 14, 1427) are communicated through the WAN or LAN networks. Such communications, for example, may enable loading of the software program(s) from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software program(s). As used herein, unless restricted to non-transitory, tangible "storage" media, terms such as computer or machine "readable medium" refer to any medium that participates in providing instructions to a processor for execution. Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and/or infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

At times, the computer system monitors and/or controls various aspects of the 3D printer(s). In some cases, the control is via controller(s) (e.g., FIG. 14, 1406). The control may be manual and/or programmed. The control may comprise an open loop control or a closed loop control (e.g., including feed forward and/or feedback) control scheme. The closed loop control may utilize signals from the one or more sensors. The control may utilize historical data. The control scheme may be pre-programmed. The control scheme may consider an input from one or more sensors (described herein) that are connected to the control unit (i.e., control system or control mechanism) and/or processor(s). The computer system (including the processor(s)) may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total times, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output a (e.g., current, or historical) state of at least one control variable that is controlled via integrated and/or adaptive control. The output may comprise an indication of (e.g., which of) at least two control variables that are controlled via integrated control. The output may comprise an indication of (e.g., any) processing operation that comprises adaptive control. The output may comprise an indication of (e.g., a duration) of an adaptive timing for the processing operation that is under adaptive control. The computer may generate a report comprising various parameters of the 3D printing system, method, and or objects at predetermined time(s), on a request (e.g., from an operator), and/or at a whim. The output unit may comprise a screen, printer, a light source (e.g., lamp), or speaker. The control system may provide a report. The report may comprise any items recited as optionally output by the output unit.

At times, the systems, methods, and/or apparatuses disclosed herein comprise providing data assurance for instruction data related to forming a requested 3D object. The instructions data may be generated considering a requested 3D object. The request can include a geometric model (e.g., a CAD file) of the requested 3D object. Alternatively, or additionally, a model of the requested 3D object may be generated. The model may be used to generate (e.g., 3D forming) instructions. The software program(s) (e.g., FIG. 14, 1422 and/or 1424) may comprise the 3D forming instructions. The 3D forming instructions may exclude the 3D model. The 3D forming instructions may be based on the 3D model. The 3D forming instructions may take the 3D model into account. The 3D forming instructions may be alternatively or additionally based on simulations (e.g., a control model). The 3D forming instructions may use the 3D model. The 3D forming instructions may comprise using a calculation (e.g., embedded in a software program(s)) that considers the 3D model, simulations, historical data, sensor input, or any combination thereof. The 3D forming instructions may be provided to at least one controller (e.g., FIG. 14, 1406) that implements at least one data assurance (e.g., measure). The data assurance measure may comprise a security (e.g., level) and/or error detection for at least a part of a file, e.g., that is related to forming instructions for a requested 3D object. The data assurance measure may comprise computing a calculation (e.g., a hash value). The at least one controller may compute the calculation during generation of forming instructions, during generation of layout instructions, prior to the 3D forming procedure, after the 3D forming procedure, or any combination thereof. The at least one controller may compute the calculation during the 3D forming procedure (e.g., in real-time), during the formation of the 3D object, prior to the 3D forming procedure, after the 3D forming procedure, or any combination thereof. The at least one controller may compute a calculation in the interval between activations of a transforming agent. For example, between pulses of an energy beam, during the dwell time of the energy beam, before the energy beam translates to a new position, while the energy beam is not translating, while the energy beam does not impinge upon the target surface, while the (e.g., at least one) energy beam impinges upon the target surface, or any combination thereof. For example, between depositions of a binding agent, during a persistence time of the binding agent, before a dispenser (e.g., that provides the binding agent) translates to a new position, while the dispenser is not translating, while the binding agent is not provided to the target surface, while the binding agent is provided to the target surface, or any combination thereof. The processor may compute a calculation in the interval between a movement of at least one guidance (e.g., optical) element from a first position to a second position, while the at least one optical element moves (e.g., translates) to a new (e.g., second) position. For example, the processor(s) may compute a calculation while the energy beam translates and does substantially not impinge upon the exposed surface. For example, the processor(s) may compute the calculation while the energy beam does not translate and impinges upon the exposed surface. For example, the processor(s) may compute the calculation while the energy beam does not substantially translate and does substantially not impinge upon the exposed surface. For example, the processor(s) may compute the calculation while the energy beam does translate and impinges upon the exposed surface. The transforming agent may be provided along a path that corresponds to a cross section of the model of the 3D object. For example, a translation of the energy beam may be translation along at least one energy beam path. For example, a dispenser movement may be along at least one dispenser path.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for assuring quality in printing at least one three-dimensional object, the method comprising:
   (a) comparing three-dimensional printers to a standard to generate a printer comparison, the three-dimensional printers being selected by a user, the standard relating to components of the three-dimensional printers;
   (b) outputting the printer comparison to the user for a choice of a three-dimensional printer of the three-dimensional printers;
   (c) analyzing a first data collected by a first sensor to identify a first deviation from a first expected value, the first sensor being configured to sense a first aspect of the printing of the at least one three-dimensional object, the first aspect comprising a first variable of the printing;
   (d) analyzing a second data collected by a second sensor to identify a second deviation from a second expected value, the second sensor being configured to sense a second aspect of the printing of the at least one three-dimensional object, the second sensor being different from the first sensor in sensor type and/or in sensor location, the second aspect comprising a second variable of the printing;
   (e) assessing the quality of the printing of the at least one three-dimensional object to generate a result by considering at least (I) the first deviation and (II) the second deviation, the result comprising a third aspect, the third aspect being different from the first aspect, the third aspect being different from the second aspect, the result comprising an integration of (i) the first data collected by the first sensor and (ii) the second data collected by the second sensor, wherein the integration is based at least in part on the choice of the three-dimensional printer utilized for the printing among the three-dimensional printers; and
   (f) directing the three-dimensional printer chosen to print the at least one three-dimensional object based at least in part on the result.

2. The method of claim 1, wherein the method further comprises displaying to the user a status of at least one component based at least in part on the choice of the at least one component by the user, the components comprising the at least one component; and optionally wherein the method comprises (a) comparing two or more of the components selected by the user to generate a component comparison; and (b) outputting the component comparison to the user.

3. The method of claim 1, further comprising alerting the user of a deviation in a specific aspect relative to a threshold of the specific aspect altered by the user, the specific aspect comprising the first aspect, the second aspect, or the third aspect.

4. The method of claim 1, wherein the standard relates to the components comprising a sensor of each of the three-dimensional printers; and optionally wherein the sensor is selected from hundreds of sensors of each three-dimensional printer of the three-dimensional printers.

5. The method of claim 4, wherein the sensor is configured to sense a target surface of the printing to generate (I) a topographical map of the target surface, and/or (II) a reflectivity map of the target surface, the topographical map being a layerwise three-dimensional map corresponding to the layers of the at least one three-dimensional object, and the reflectivity map being a layerwise three-dimensional map corresponding to the layers of the at least one three-dimensional object.

6. The method of claim 1, wherein the standard relates to the components comprising a layer dispenser configured to successively dispense layers of powder material to generate a material bed from which the at least one three-dimensional object is printed during the printing.

7. The method of claim 6, wherein the layers of powder material comprising an elemental metal, a metal alloy, a ceramic, or an allotrope of elemental carbon.

8. The method of claim 1, wherein the standard relates to the components comprising a transforming agent utilized in the printing, the transforming agent being configured to transform during the printing a starting material to a transformed material, the starting material comprising an elemental metal, a metal alloy, a ceramic, or an allotrope of elemental carbon.

9. The method of claim 8, wherein the standard relates to the components comprising the transforming agent being a laser beam having (I) a stability property during the printing, (II) an alignment property with a target surface of the printing, and/or (III) a focus property on the target surface of the printing.

10. The method of claim 9, wherein the stability property, the alignment property, and/or the focus property, is a function of time during the printing.

11. The method of claim 1, wherein the standard relates to the components comprising an optical component of each of the three-dimensional printers; and optionally wherein the optical component (I) has a thermal lensing property during the printing, (II) is disposed in or above a roof of an enclosure in which the at least one three-dimensional object is disposed during the printing, (III) comprising an optical window through which a transforming agent traverses into the enclosure in which the at least one three-dimensional object is disposed during the printing utilizing the transforming agent, and/or (IV) is configured to direct the transforming agent to traverse into the enclosure in which the at least one three-dimensional object is disposed during the printing utilizing the transforming agent; and optionally wherein the thermal lensing property varies as a function of time during the printing.

12. The method of claim 1, wherein the standard relates to the components comprising a gas conveyance system.

13. The method of claim 12, wherein the standard relates to the components comprising the gas conveyance system configured to, during the printing, maintain an internal atmosphere in an enclosure different from an ambient atmosphere external to the enclosure in which the at least one three-dimensional object is disposed during the printing.

14. The method of claim 13, wherein the gas conveyance system is configured to, during the printing, maintain the internal atmosphere having (I) an internal pressure different from an ambient pressure of the ambient atmosphere, (II) a level of contaminants below a threshold, the contaminants being gas borne, the contaminants being generated during the printing, and/or (III) at least one reactive agent at an internal concentration different from an ambient concentration of the at least one reactive agent in the ambient atmosphere, the at least one reactive agent being configured to react during the printing with a starting material of the printing.

15. At least one non-transitory computer-readable medium for assuring quality in printing at least one three-dimensional object, the at least one non-transitory computer-readable medium comprising saved instructions that, when read by one or more processors, cause the one or more processors to execute, or direct execution of, operations comprising:
 (a) comparing three-dimensional printers to a standard to generate a printer comparison, the three-dimensional printers being selected by a user, the standard relating to components of the three-dimensional printers;
 (b) outputting the printer comparison to the user for a choice of a three-dimensional printer of the three-dimensional printers;
 (c) analyzing a first data collected by a first sensor to identify a first deviation from a first expected value, the first sensor being configured to sense a first aspect of the printing of the at least one three-dimensional object, the first aspect comprising a first variable of the printing;
 (d) analyzing a second data collected by a second sensor to identify a second deviation from a second expected value, the second sensor being configured to sense a second aspect of the printing of the at least one three-dimensional object, the second sensor being different from the first sensor in sensor type and/or in sensor location, the second aspect comprising a second variable of the printing;
 (e) assessing the quality of the printing of the at least one three-dimensional object to generate a result by considering at least (I) the first deviation and (II) the second deviation, the result comprising a third aspect, the third aspect being different from the first aspect, the third aspect being different from the second aspect, the result comprising an integration of (i) the first data collected by the first sensor and (ii) the second data collected by the second sensor, wherein the integration is based at least in part on the choice of the three-dimensional printer utilized for the printing among the three-dimensional printers; and
 (f) directing the three-dimensional printer chosen to perform the printing of the at least one three-dimensional object based at least in part on the result.

16. The at least one non-transitory computer-readable medium of claim 15, wherein the operations comprise stamping a third data collected, the third data collected comprising the first data collected by the first sensor or the second data collected by the second sensor, the stamping comprising location stamping; and optionally wherein the at least one three-dimensional object is printed layerwise, and wherein location of the location stamping corresponds to a location of a layer as part of the at least one three-dimensional object and the user is able to access a fourth data relating to the layer, the fourth date being from the first data, from the second data, or from the third data.

17. The at least one non-transitory computer-readable medium of claim 15, wherein a subject comprises the component or the three-dimensional printer, and wherein the operations comprise outputting, or directing outputting, to the user an indicator of the subject, the indicator indicating (i) that no data exists for the subject, (ii) that old data exists for the subject, (iii) age of the subject, (iv) when last data of the subject was obtained, or (v) any combination thereof.

18. The at least one non-transitory computer-readable medium of claim 15, wherein the operations comprise outputting, or directing outputting, a symbol and/or color, to indicate a compliance level of a variable of the printing to the user, the variable comprising the first variable or the second variable.

19. The at least one non-transitory computer-readable medium of claim 15, wherein the operations comprise comparing the three-dimensional printers to the standard relating to the components comprising sensors of the three-dimensional printers; and optionally wherein the sensors are selected from hundreds of sensors of each three-dimensional printer of the three-dimensional printers.

20. The at least one non-transitory computer-readable medium of claim 19, wherein the sensors are configured to sense a target surface of the printing to generate (I) a topographical map of the target surface, (II) a reflectivity map of the target surface or (III) the topographical map of the target surface and the reflectivity map of the target surface, the topographical map being a layerwise three-dimensional map corresponding to the layers of the at least one three-dimensional object, and the reflectivity map being a layerwise three-dimensional map corresponding to the layers of the at least one three-dimensional object.

21. The at least one non-transitory computer-readable medium of claim 15, wherein the operations comprise comparing the three-dimensional printers to the standard relating to the components comprising layer dispensers each configured to successively dispense layers of powder material to generate a material bed from which the at least one three-dimensional object is printed during the printing; and optionally wherein the layers of powder material comprising an elemental metal, a metal alloy, a ceramic, or an allotrope of elemental carbon.

22. The at least one non-transitory computer-readable medium of claim 15, wherein the operations comprise comparing the three-dimensional printers to the standard relating to the components comprising a transforming agent utilized in the printing, the transforming agent being configured to transform during the printing a starting material to a transformed material, the starting material comprising an elemental metal, a metal alloy, a ceramic, or an allotrope of elemental carbon.

23. The at least one non-transitory computer-readable medium of claim 15, wherein the operations comprise comparing the three-dimensional printers to the standard relating to the components comprising a transforming agent utilized in the printing, the transforming agent being a laser beam having (I) a stability property during the three-dimensional printing, (II) an alignment property with a target surface of the printing, and/or (III) a focus property on the target surface of the printing; and optionally wherein the property is a function of time during the three-dimensional printing, the property including (a) the stability property, (b) the alignment property, and/or (c) the focus property.

24. The at least one non-transitory computer-readable medium of claim 15, wherein the operations comprise comparing the three-dimensional printers to the standard relating to the components comprising an optical component of each of the three-dimensional printers; and optionally wherein the optical components (I) has a thermal lensing property during the printing, (II) is disposed in or above a roof of an enclosure in which the at least one three-dimensional object is disposed during the printing, (III) comprising an optical window through which a transforming agent traverses into the enclosure in which the at least one three-dimensional object is disposed during the printing utilizing the transforming agent, and/or (IV) is configured to direct the transforming agent to traverse into the enclosure in which the at least one three-dimensional object is disposed during the printing utilizing the transforming agent; and optionally wherein the thermal lensing property varies as a function of time during the printing.

25. The at least one non-transitory computer-readable medium of claim 15, wherein the operations comprise comparing the three-dimensional printers to the standard relating to the components comprising a gas conveyance system; optionally wherein the standard relates to the components comprising the gas conveyance system configured to, during the printing, maintain an internal atmosphere in an enclosure different from an ambient atmosphere external to the enclosure in which the at least one three-dimensional object is disposed during the printing; and optionally wherein the gas conveyance system is configured to, during the printing, maintain the internal atmosphere having (I) an internal pressure different from an ambient pressure of the ambient atmosphere, (II) a level of contaminants below a threshold, the contaminants being gas borne, the contaminants being generated during the printing, and/or (III) at least one reactive agent at an internal concentration different from an ambient concentration of the at least one reactive agent in the ambient atmosphere, the at least one reactive agent being configured to react during the printing with a starting material of the printing.

26. An apparatus for assuring quality in printing at least one three-dimensional object, the apparatus comprising: at least one controller configured to operatively couple with a three-dimensional printer, the at least one controller comprising a power connector, the at least one controller being configured to perform or direct performance of:

(a) comparison of three-dimensional printers to a standard to generate a printer comparison, the three-dimensional printers being selected by a user, the standard relating to components of the three-dimensional printers;
(b) output of the printer comparison to the user for a choice of the three-dimensional printer;
(c) analysis of a first data collected by a first sensor to identify a first deviation from a first expected value, the first sensor being configured to sense a first aspect of the printing of the at least one three-dimensional object, the first aspect comprising a first variable of the printing;
(d) analysis of a second data collected by a second sensor to identify a second deviation from a second expected value, the second sensor being configured to sense a second aspect of the printing of the at least one three-dimensional object, the second sensor being different from the first sensor in sensor type and/or in sensor location, the second aspect comprising a second variable of the printing;
(e) assessment of quality of the printing of the at least one three-dimensional object to generate a result by considering at least (I) the first deviation and (II) the second deviation, the result comprising a third aspect, the third aspect being different from the first aspect, the third aspect being different from the second aspect, the result comprising an integration of (i) the first data collected by the first sensor and (ii) the second data collected by the second sensor, wherein the integration is based at least in part on the choice of the three-dimensional printer utilized for the printing among the three-dimensional printers; and
(f) use the three-dimensional printer chosen to print the at least one three-dimensional object based at least in part on the result.

27. The apparatus of claim 26, wherein the at least one controller is configured to perform, or direct performance of, stamping of a third data collected, the stamping comprising time stamping and location stamping, the third data being collected by the first sensor and/or by the second sensor; and wherein the at least one three-dimensional object is printed layerwise, and wherein location of the location stamping corresponds to a location of a layer as part of the at least one three-dimensional object and the user is able access a fourth data relating to the layer, the fourth date being from the first data, from the second data, or from the third data.

28. The apparatus of claim 26, wherein the at least one controller is configured to perform, or direct performance of, comparing the three-dimensional printers to the standard to generate the printer comparison, the standard relating to the components comprising a sensor; and optionally wherein the sensor is selected from hundreds of sensors of each three-dimensional printer of the three-dimensional printers.

29. The apparatus of claim 28, wherein the at least one controller is configured to perform, or direct performance of, averaging sensor data of the sensor, the averaging being over a number of layers of the at least one three-dimensional object.

30. The apparatus of claim 28, wherein the at least one controller is configured to perform, or direct performance of, comparing the three-dimensional printers to the standard to generate the printer comparison, the standard relating to the components comprising the sensor configured to sense a target surface of the printing to generate a topographical map of the target surface, the topographical map being a layerwise three-dimensional map corresponding to the layers of the at least one three-dimensional object.

31. The apparatus of claim 30, wherein the at least one controller is configured to perform, or direct performance of, comparing the three-dimensional printers to the standard to generate the printer comparison, the standard relating to the components comprising the sensor configured to sense the target surface of the printing to generate a reflectivity map of the target surface, the reflectivity map being a layerwise three-dimensional map corresponding to the layers of the at least one three-dimensional object.

32. The apparatus of claim 31, wherein the at least one controller is configured to perform, or direct performance of, comparing the three-dimensional printers to the standard to generate the printer comparison, the standard relating to the components comprising the sensor selected from at least hundreds of sensors of each of the three-dimensional printers.

33. The apparatus of claim 28, wherein the at least one controller is configured to perform, or direct performance of, comparing the three-dimensional printers to the standard to generate the printer comparison, the standard relating to the components comprising a transforming agent utilized in the printing, the transforming agent configured to transform during the printing a starting material to a transformed material, the starting material comprising an elemental metal, a metal alloy, a ceramic, or an allotrope of elemental carbon.

34. The apparatus of claim 28, wherein the at least one controller is configured to perform, or direct performance of, comparing the three-dimensional printers to the standard to generate the printer comparison, the standard relating to the components comprising transforming agent utilized in the printing, the transforming agent being a laser beam having a stability property during the three-dimensional printing.

35. The apparatus of claim 34, wherein the at least one controller is configured to perform, or direct performance of, comparing the three-dimensional printers to the standard to generate the printer comparison, the standard relating to the components comprising the transforming agent being laser the beam having the stability property as a function of time during the three-dimensional printing.

36. The apparatus of claim 34, wherein the at least one controller is configured to perform, or direct performance of, comparing the three-dimensional printers to the standard to generate the printer comparison, the standard relating to the components comprising the transforming agent being laser the beam having an alignment property with a target surface of the printing.

37. The apparatus of claim 36, wherein the at least one controller is configured to perform, or direct performance of, comparing the three-dimensional printers to the standard to generate the printer comparison, the standard relating to the components comprising the transforming agent being the laser beam having the alignment property as a function of time, the alignment property being with the target surface of the printing.

38. The apparatus of claim 28, wherein the at least one controller is configured to perform, or direct performance of, comparing the three-dimensional printers to the standard to generate the printer comparison, the standard relating to the components comprising a transforming agent utilized in the printing, the transforming agent being a laser beam having a focus property on a target surface of the printing.

39. The apparatus of claim 38, wherein the at least one controller is configured to perform, or direct performance of, comparing the three-dimensional printers to the standard to generate the printer comparison, the standard relating to the components comprising the transforming agent being the laser beam having a focus as a function of time, the focus property being on the target surface of the printing.

40. The apparatus of claim 28, wherein the at least one controller is configured to perform, or direct performance of, comparing the three-dimensional printers to the standard to generate the printer comparison, the standard relating to the components comprising an optical component of each of the three-dimensional printers.

41. The apparatus of claim 40, wherein the at least one controller is configured to perform, or direct performance of, comparing the three-dimensional printers to the standard to generate the printer comparison, the standard relating to the components comprising the optical component having a thermal lensing property during the printing.

42. The apparatus of claim 41, wherein the at least one controller is configured to perform, or direct performance of, comparing the three-dimensional printers to the standard to generate the printer comparison, the standard relating to the components comprising the optical components having the thermal lensing property as a function of time during the printing.

43. The apparatus of claim 41, wherein the at least one controller is configured to perform, or direct performance of, comparing the three-dimensional printers to the standard to generate the printer comparison, the standard relating to the components comprising the optical component being disposed in, or above, a roof of an enclosure in which the at least one three-dimensional object is disposed during the printing.

44. The apparatus of claim 41, wherein the optical components comprises an optical window through which a transforming agent traverses into an enclosure in which the at least one three-dimensional object is disposed during the printing utilizing the transforming agent.

45. The apparatus of claim 41, wherein the optical component is configured to direct a transforming agent to traverse into an enclosure in which the at least one three-dimensional object is disposed during the printing utilizing the transforming agent utilized in the printing.

46. The apparatus of claim 28, wherein the at least one controller is configured to perform, or direct performance of, comparing the three-dimensional printers to the standard to generate the printer comparison, the standard relating to the components comprising a gas conveyance system.

47. The apparatus of claim 46, wherein the at least one controller is configured to perform, or direct performance of, comparing the three-dimensional printers to the standard to generate the printer comparison, the standard relating to the components comprising the gas conveyance system configured to, during the printing, maintain an internal atmosphere in an enclosure different from an ambient atmosphere external to the enclosure in which the at least one three-dimensional object is disposed during the printing.

48. The apparatus of claim 47, wherein the at least one controller is configured to perform, or direct performance of, comparing the three-dimensional printers to the standard to generate the printer comparison, the standard relating to the components comprising the gas conveyance system configured to, during the printing, maintain the internal atmosphere having an internal pressure different from an ambient pressure of the ambient atmosphere.

49. The apparatus of claim 48, wherein the at least one controller is configured to perform, or direct performance of, comparing the three-dimensional printers to the standard to generate the printer comparison, the standard relating to the components comprising the gas conveyance system configured to, during the printing, maintain the internal atmosphere having the internal pressure different from the ambient pressure, the internal pressure being above ambient pressure.

50. The apparatus of claim 46, wherein the at least one controller is configured to perform, or direct performance of, comparing the three-dimensional printers to the standard to generate the printer comparison, the standard relating to the components comprising the gas conveyance system configured to, during the printing, maintain an internal atmosphere having at least one reactive agent at an internal concentration different from an ambient concentration of the at least one reactive agent of in ambient atmosphere, the at least one reactive agent being configured to react during the printing with a starting material of the printing.

51. The apparatus of claim 46, wherein the at least one controller is configured to perform, or direct performance of, comparing the three-dimensional printers to the standard to generate the printer comparison, the standard relating to the components comprising the gas conveyance system configured to, during the printing, maintain a level of contaminants below a threshold, the contaminants being generated during the printing.

52. The apparatus of claim 46, wherein the at least one controller is configured to perform, or direct performance of, comparing the three-dimensional printers to the standard to generate the printer comparison, the standard relating to the components comprising the gas conveyance system configured to, during the printing, maintain a level of contaminants comprising hardened material that does not form a part of the at least one three-dimensional object; and optionally wherein the hardened material comprises soot.

53. The apparatus of claim 46, wherein the at least one controller is configured to perform, or direct performance of, comparing the three-dimensional printers to the standard to generate the printer comparison, the standard relating to the components comprising the gas conveyance system configured to recycle gas flowing in the gas conveyance system.

54. The apparatus of claim 46, wherein the at least one controller is configured to perform, or direct performance of, comparing the three-dimensional printers to the standard to generate the printer comparison, the standard relating to the components comprising the gas conveyance system operatively coupled to a material recycling system configured to recycle a remainder of a starting material for the printing.

55. The apparatus of claim 54, wherein the at least one controller is configured to perform, or direct performance of, comparing the three-dimensional printers to the standard to generate the printer comparison, the standard relating to the components comprising the gas conveyance system operatively coupled to the material recycling system comprising a powder recirculation filter; and optionally wherein the at least one controller is configured to output, or direct output of, (i) status of the powder recirculation filter, and/or (ii) a remainder material of number of layers that was sieved by the material recycling system.

56. The apparatus of claim 26, wherein the at least one controller is configured to perform, or direct performance of, comparing the three-dimensional printers to the standard to generate the printer comparison, the standard relating to the components comprising a layer dispenser configured to successively dispense layers of powder material to generate a material bed from which the at least one three-dimensional object is printed during the printing.

57. The apparatus of claim 56, wherein the at least one controller is configured to perform, or direct performance of, comparing the three-dimensional printers to the standard to generate the printer comparison, the standard relating to the components comprising the layer dispenser configured to successively dispense planar layers of powder material to generate the material bed from which the at least one three-dimensional object is printed during the printing.

58. The apparatus of claim 56, wherein the at least one controller is configured to perform, or direct performance of, comparing the three-dimensional printers to the standard to generate the printer comparison, the standard relating to the components comprising the layer dispenser configured to successively dispense the layers of powder material comprising an elemental metal, a metal alloy, a ceramic, or an allotrope of elemental carbon.

59. The apparatus of claim 26, wherein the at least one controller is configured to perform, or direct performance of, generating a three-dimensional map of one or more characteristics of the at least one three-dimensional object comprising porosity.

60. The apparatus of claim 26, wherein the at least one controller is configured to perform, or direct performance of, utilizing a threshold tolerance of a variable, the threshold tolerance being altered by the user, the variable comprising the first variable or the second variable.

* * * * *